(12) United States Patent
Moriyama et al.

(10) Patent No.: US 7,644,220 B2
(45) Date of Patent: Jan. 5, 2010

(54) PROGRAMMABLE CONTROLLER

(75) Inventors: Takao Moriyama, Chiyoda-ku (JP);
Hideyuki Oguro, Chiyoda-ku (JP);
Seigo Inobe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 150 days.

(21) Appl. No.: 12/042,068

(22) Filed: Mar. 4, 2008

(65) Prior Publication Data
US 2009/0070514 A1 Mar. 12, 2009

(30) Foreign Application Priority Data
Sep. 10, 2007 (JP) ............................. 2007-234092

(51) Int. Cl.
*G06F 13/36* (2006.01)

(52) U.S. Cl. .................... 710/311; 710/104; 710/110

(58) Field of Classification Search ............... 710/5, 710/13, 20–23, 36–40, 104–106, 110, 306, 710/311–315; 700/2
See application file for complete search history.

(56) References Cited

U.S. PATENT DOCUMENTS

| | | | | | |
|---|---|---|---|---|---|
| 4,303,990 | A | * | 12/1981 | Seipp | 710/267 |
| 4,858,101 | A | * | 8/1989 | Stewart et al. | 700/2 |
| 5,193,189 | A | * | 3/1993 | Flood et al. | 718/103 |
| 5,410,717 | A | * | 4/1995 | Floro | 710/104 |
| 5,909,586 | A | * | 6/1999 | Anderson | 713/340 |
| 6,725,283 | B2 | * | 4/2004 | Moriyama | 710/2 |
| 2002/0161944 | A1 | * | 10/2002 | Okada | 710/22 |
| 2004/0024935 | A1 | * | 2/2004 | Fujiwara et al. | 710/52 |
| 2006/0064511 | A1 | * | 3/2006 | Fukatsu | 710/8 |
| 2006/0236013 | A1 | * | 10/2006 | Okeda | 710/300 |
| 2006/0253626 | A1 | * | 11/2006 | Ueno et al. | 710/62 |
| 2007/0094434 | A1 | * | 4/2007 | Engl et al. | 710/300 |

FOREIGN PATENT DOCUMENTS

| | | |
|---|---|---|
| JP | 2002-006907 A | 1/2002 |
| JP | 2002-169602 A | 6/2002 |
| JP | 2002-222003 A | 8/2002 |
| JP | 2007-234092 | 9/2007 |

OTHER PUBLICATIONS

Mitsubishi Electric Corporation, new product digest, new product news, Japan, May 2007, No. 459, p. 3-4.

* cited by examiner

*Primary Examiner*—Raymond N Phan
(74) *Attorney, Agent, or Firm*—Sughrue Mion, PLLC

(57) ABSTRACT

In a programmable controller including a special unit, a special-purpose integrated circuit element can be readily utilized for multiple purposes to extend the range of applications to reduce a manufacture cost. A special unit (130) connected to a microprocessor for performing I/O control through a bus includes an integrated circuit element (10) having a logic circuit unit (1000n (n=0 to 7)) whose operation specifications are determined by a parameter memory. The logic circuit unit (1000n) includes a reversible counter used for both high-speed input processing and high-speed output processing as a main component, and is connected to I/O interface circuits (139X) (139Y) through a first port (11) and a second port (12). In addition, because the function of the logic circuit unit (1000n) is determined by a content of a special instruction in a sequential program, the logic circuit unit (1000n) is commonly used for various types of I/O interface circuits to allow the integrated circuit element to be used for multiple purposes.

30 Claims, 41 Drawing Sheets

FIG. 15

| DEVICE NAME | RANGE OF NUMBERS | NUMBER OF DEVICES | NOTES | NUMBER OF WORDS |
|---|---|---|---|---|
| INPUT RELAY | X000~X177 | OCTAL NUMBER・128 | | 8 |
| OUTPUT RELAY | Y000~Y177 | OCTAL NUMBER・128 | | 8 |
| AUXILIARY RELAY | M0000~M7999 | DECIMAL NUMBER・8000 | | 500 |
| | M8000~M8999 | DECIMAL NUMBER・992点 | SPECIAL | 62 |
| TIMER | T000~T255 | DECIMAL NUMBER・256点 | CURRENT VALUE | 256 |
| | | | SET VALUE | 256 |
| | | | MEASURED TIME OUTPUT | 16 |
| | | | RESET | 16 |
| COUNTER | C000~C255 | DECIMAL NUMBER・256点 | CURRENT VALUE | 256 |
| | | | SET VALUE | 256 |
| | | | MEASURED TIME OUTPUT | 16 |
| | | | RESET | 16 |
| DATA REGISTER | D0000~D7999 | DECIMAL NUMBER・8000点 | | 8000 |
| | D8000~D8999 | DECIMAL NUMBER・1000点 | SPECIAL | 1000 |

FIG. 16

| TYPE | NUMBER bb | X0 | X1 | X2 | X3 | X4 | X5 | X6 | X7 |
|---|---|---|---|---|---|---|---|---|---|
| VARIABLE FILTER | — | REF | REF | REF | REF | REF | REF | REF | REF |
| PULSE DENSITY | — | FREQ | FREQ | FREQ | FREQ | FREQ | FREQ | FREQ | FREQ |
| PULSE WIDTH MEASUREMENT | — | PWD | PWD | PWD | PWD | PWD | PWD | PWD | PWD |
| 1-PHASE 1-INPUT U/D COUNT INPUT COUNT DIRECTION DETERMINED BY COMMAND SIGNAL | 00 | U/D | | | | | | | |
| | 01 | | U/D | | | | | | |
| | 02 | | | U/D | | | | | |
| | 03 | | | | U/D | | | | |
| | 04 | | | | | U/D | | | |
| | 05 | | | | | | U/D | | |
| | 06 | | | | | | | U/D | |
| | 07 | | | | | | | | U/D |
| 1-PHASE 1-INPUT WITH P S  P: PRESET COMMAND INPUT  S: START COMMAND INPUT | 10 | U/D | P | | | | | | |
| | 11 | S | U/D | | | | | | |
| | 12 | | | U/D | P | | | | |
| | 13 | | | S | U/D | | | | |
| | 14 | | | | | U/D | P | | |
| | 15 | | | | | S | U/D | | |
| | 16 | | | | | | | U/D | P |
| | 17 | | | | | | | S | U/D |
| | 18 | U/D | P | S | | | | | |
| | 19 | | | | | U/D | P | S | |
| 1-PHASE 2-INPUT  U: COUNT-UP COUNT INPUT  D: COUNT-DOWN COUNT INPUT | 20 | U | D | | | | | | |
| | 21 | P | U | D | | | | | |
| | 22 | | S | U | D | | | | |
| | 24 | | | | | U | D | | |
| | 25 | | | | | P | U | D | |
| | 26 | | | | | | S | U | D |
| | 30 | U | D | P | S | | | | |
| | 32 | | | U | D | | | | |
| | 34 | | | | | U | D | P | S |
| | 36 | | | | | | | U | D |
| 2-PHASE 2-INPUT/ SINGLE EDGE EVALUATION  A: A-PHASE SIGNAL INPUT  B: B-PHASE SIGNAL INPUT | 40 | A | B | | | | | | |
| | 41 | P | A | B | | | | | |
| | 42 | | S | A | B | | | | |
| | 44 | | | | | A | B | | |
| | 45 | | | | | P | A | B | |
| | 46 | | | | | | S | A | B |
| | 50 | A | B | P | S | | | | |
| | 52 | | | A | B | | | | |
| | 54 | | | | | A | B | P | S |
| | 56 | | | | | | | A | B |
| 2-PHASE 2-INPUT/D OUBLE EDGE EVALUATION | 60 | A | B | | | | | | |
| | 61 | P | A | B | | | | | |
| | 62 | | S | A | B | | | | |
| | 64 | | | | | A | B | | |
| | 65 | | | | | P | A | B | |
| | 66 | | | | | | S | A | B |
| | 70 | A | B | P | S | | | | |
| | 72 | | | A | B | | | | |
| | 74 | | | | | A | B | P | S |
| | 76 | | | | | | | A | B |
| 2-PHASE 2-INPUT/QUAD EDGE EVALUATION | 80 | A | B | | | | | | |
| | 81 | P | A | B | | | | | |
| | 82 | | S | A | B | | | | |
| | 84 | | | | | A | B | | |
| | 85 | | | | | P | A | B | |
| | 86 | | | | | | S | A | B |
| | 90 | A | B | P | S | | | | |
| | 92 | | | A | B | | | | |
| | 94 | | | | | A | B | P | S |
| | 96 | | | | | | | A | B |

FIG. 17

| TYPE | NUMBER bb | Y0 | Y1 | Y2 | Y3 | Y4 | Y5 | Y6 | Y7 |
|---|---|---|---|---|---|---|---|---|---|
| GENERAL-PURPOSE OUTPUT | — | | | | | | | | |
| PWM OUTPUT | — | PWM | PWM | PWM | PWM | PWM | PWM | PWM | PWM |
| PLS OUTPUT | 00 | FP | RP | | | | | | |
| | 01 | DIR | FRP | | | | | | |
| | 02 | | | FP | RP | | | | |
| | 03 | | | DIR | FRP | | | | |
| | 04 | | | | | FP | RP | | |
| | 05 | | | | | DIR | FRP | | |
| | 06 | | | | | | | FP | RP |
| | 07 | | | | | | | DIR | FRP |
| DRV OUTPUT ZRN OUTPUT | 10 | FP | RP | CLR | — | | | | |
| | 11 | DIR | FRP | CLR | — | | | | |
| | 14 | | | | | FP | RP | CLR | — |
| | 15 | | | | | DIR | FRP | CLR | — |

FP: FORWARD PULSE OUTPUT
RP: REVERSE ROTATION PULSE OUTPUT
FRP: REVERSIBLE PULSE OUTPUT
DIR: DIRECTION SIGNAL OUTPUT
CLR: CLEAR SIGNAL OUTPUT
PWM: PULSE WIDTH MODULATION SIGNAL

PROGRAMMABLE CONTROLLER

BACKGROUND OF THE INVENTION

1. Field of the Invention

The present invention relates to a programmable controller to be used with a special unit for complementing an insufficient computational speed of a microprocessor which performs input/output control, in particular, to an improvement of functions and handling ability of a special-purpose integrated circuit element to be mounted in the special unit.

2. Background of the Invention

There exists a programmable controller which includes a microprocessor to operate in response to an operating state of an input signal of an operation switch or various sensors and a sequential program stored in a program memory to perform the driving control of an electrical load such as various actuators or display devices. In the programmable controller, as a complementary functional unit for handling a high-speed pulse signal to be cyclically computed, which is faster than a computation cycle of the program memory, for example, a high-speed counter unit or a high-speed pulse output unit is additionally provided for use. Moreover, a special functional unit for variably setting a time constant of a filter or for generating a pulse-width modulation signal output to keep a delay in fetching an input signal with an input filter small to perform a high-speed input is also known.

For example, according to JP 2002-169602 A (FIG. 1 and Abstract) and JP 2002-222003 A (FIG. 1 and Abstract), a special functional unit which is adapted for general use by using a programmable logic device (PLD) or a gate array has been described. JP 2002-169602 A discloses a programmable controller which includes an external connector for connecting an external device, a joint connector for connecting a unit of the programmable controller, and an arithmetic processing unit which has functions of transmitting and receiving a signal to/from the external device connected through the external connector to perform a logical computation based on the signal received from the external device and of transmitting a signal according to the result of the computation to the unit of the programmable controller through the joint connector. The arithmetic processing unit is configured by a programmable logic device which allows a selection of a plurality of functions by rewriting a program. In this manner, the programmable controller, which allows a plurality of functions to be realized in a simple manner and intends to reduce the cost by commonly using the same circuit components, is provided.

JP 2002-222003 A discloses a programmable controller which includes an external connector, a joint connector, a gate array, and an expansion connector. A device to be controlled is connected to the joint connector. A CPU unit including a CPU for executing a sequential program is connected to the joint connector. The gate array includes a plurality of special functions incorporated therein. The special functions assist the CPU unit connected through the joint connector to enhance the functions thereof. The gate array also transmits/receives a signal through the external connector. The expansion connector connects an additional substrate for expanding the special functions incorporated in the gate array to further add special functions. The expansion connector includes a programmable logic device in which the special functions are incorporated, and an expansion-side connector connected to the programmable logic device and connecting to the expansion connector. In this manner, the programmable controller allows the addition of special functions to reduce the cost. According to the multi-functional special functional unit as described above, rewriting of a program allows a single general-purpose functional circuit to realize various functions such as an I/O function, an input time constant function, an interruption function, a counter function, a compare output function, a pulse output function, a PWM output function, and a positioning function.

On the other hand, JP 2002-006907 A (FIG. 3 and Abstract), the following I/O unit is disclosed. A programming function is provided for the I/O unit serving as a special functional unit to allow a user to freely program an I/O control logic and a computation function. As a result, the I/O unit can be customized (optimized) according to a user's application. In this case, the user inputs a program for the I/O control logic and the arithmetic processing to the I/O unit having special functions to create a user's original unit operation mode to allow the I/O unit to be customized to be optimal for an object to be controlled and a controlling method. Moreover, the I/O unit is configured to allow the attachment of an I/O board thereto. The I/O board includes a special input circuit to which a pulse input, an analog input, a special sensor input, and the like are input, and a special output circuit for outputting a pulse output, an analog output, and the like. The special I/O is controlled by the I/O unit.

Each of the programmable controllers according to JP 2002-169602 A, JP 2002-222003 A, and JP 2002-006907 A described above is used with the special functional unit including the programmable logic device, the combination of the gate array and the programmable logic device, or the microprocessor. The functions of the special functional unit can be programmably changed. As a result, the arithmetic unit which can be used for various special applications in the same manner as in the general-purpose use is provided.

From user's point of view, however, the programmable controllers as described above are required to learn different program languages respectively for a program for the programmable logic device and a program for the microprocessor in addition to a sequence language for creating a control program for the programmable controller. Therefore, the programmable controller is so difficult that only a specific professional engineer can handle, which makes the diffusion of the programmable controller difficult.

Moreover, the programmable controller has various applications. For example, the programmable controller is used when only one high-speed counter function is required, one high-speed pulse output is required, or multiple high-speed counter functions and multiple high-speed pulse outputs are simultaneously required. However, how to construct an efficient standardized I/O interface circuit for various applications as those described above has never been discussed.

SUMMARY OF THE INVENTION

An object of the present invention is to provide a programmable controller capable of handling a special functional unit only in a sequence language for creating a control program for the programmable controller, obtaining a special functional unit easily handled by a user, and contributing to further enhancement of the functions of the programmable controller and the diffusion thereof.

Further, another object of the present invention is to provide limited types of special units configured to reduce ineffective use for various special functions of various numbers of I/Os, to thereby provide a programmable controller including a standardized integrated circuit having a plurality of special functions for various applications, which is commonly used for the limited types of special units.

According to the present invention, there is provided a programmable controller including: a CPU unit including a microprocessor, a system memory operating in corporation with the microprocessor, a program memory for storing a sequential program, and a device memory for storing I/O information and control information; and at least one I/O unit connected to the CPU unit through a bus, at least one of the I/O units including a special unit including an integrated circuit element for sharing a special I/O processing function to complement a control function of the microprocessor. In the programmable controller: the special unit includes an electronic substrate, on which a multi-channel input interface circuit and a multi-channel output interface circuit each connected to external connection terminals, and the integrated circuit element used for I/O control whose control specifications can be partially variably set are provided; the integrated circuit element includes a parameter memory corresponding to each channel number and a logic circuit unit whose operation specifications for I/O processing are determined by circuit organization data transmitted from the microprocessor to the parameter memory corresponding to each channel number; the logic circuit unit includes a notification bit memory for counting a logic input signal obtained through the input interface circuit at high speed to transmit a count-up output as a notification signal to the microprocessor, a calculation register for transmitting count data as computational data to the microprocessor, a setting register for storing set data received from the microprocessor, a command latch memory for storing a command signal received from the microprocessor, and a reversible counter for feeding a high-speed pulse output based on contents of the setting register and the command latch memory to the output interface circuit; whether the reversible counter constitutes a high-speed counter circuit for an input signal fed from the input interface circuit to perform high-speed input processing for transmitting the count-up output to the CPU unit or constitutes a high-speed pulse output circuit based on the set data received from the CPU unit to perform high-speed output processing for feeding a predetermined pulse output to the output interface circuit is determined for each channel according to a content of a special instruction included in a control program stored in the program memory; a plurality of types of the high-speed input processing and a plurality of types of the high-speed output processing are performed by the circuit organization data transmitted to the parameter memory; and the input interface circuit feeds a pulse having a frequency proportional to an input signal to the integrated circuit element when the input signal from an external sensor connected to the external connection terminal is an analog signal, whereas the integrated circuit element generates a pulse output at a commanded ON/OFF ratio as an output signal and the output interface circuit smoothes the received pulse output signal to feed the smoothed pulse output signal to an external load when the external load is an analog load.

According to the present invention, in place of a microprocessor for executing a sequential program, a special unit including an integrated circuit element for performing high-speed I/O processing for a pulse signal having a shorter cycle than a computation cycle of the programmable controller and an I/O interface circuit is used with the programmable controller. The integrated circuit element includes a parameter memory whose operation mode is determined according to the content of a special instruction in the program memory, and a logic circuit unit. A reversible counter constituting the logic circuit unit is used both for high-speed input processing and high-speed output processing. Therefore, by changing the I/O interface circuit, the programmable controller can be used for various applications requiring any of high-speed logic input processing, high-speed logic output processing, analog input processing, analog output processing, and the combination thereof. Accordingly, the manufacturing cost of the special-purpose integrated circuit element can be reduced. At the same time, the mere use of a predetermined special instruction in the sequential program allows the user to readily communicate with the special unit to easily use an advanced function. As a result, the great effect leading to further expansion of the applications can be provided. Moreover, simultaneous use of a plurality of special units can deal with the special functions of various numbers of inputs and outputs. As a result, the programmable controller is effective in that an efficient system construction is enabled.

BRIEF DESCRIPTION OF THE DRAWINGS

In the accompanying drawings:

FIG. 15 is a view illustrating an exemplary structure of a device memory illustrated in FIG. 1;

FIG. 16 is a view illustrating an exemplary structure of high-speed counter numbers illustrated in FIG. 1;

FIG. 17 is a view illustrating an exemplary structure of high-speed output numbers illustrated in FIG. 1;

DETAILED DESCRIPTION OF THE PREFERRED EMBODIMENTS

First Embodiment (1) Detailed Description of a Configuration

Figure 1:
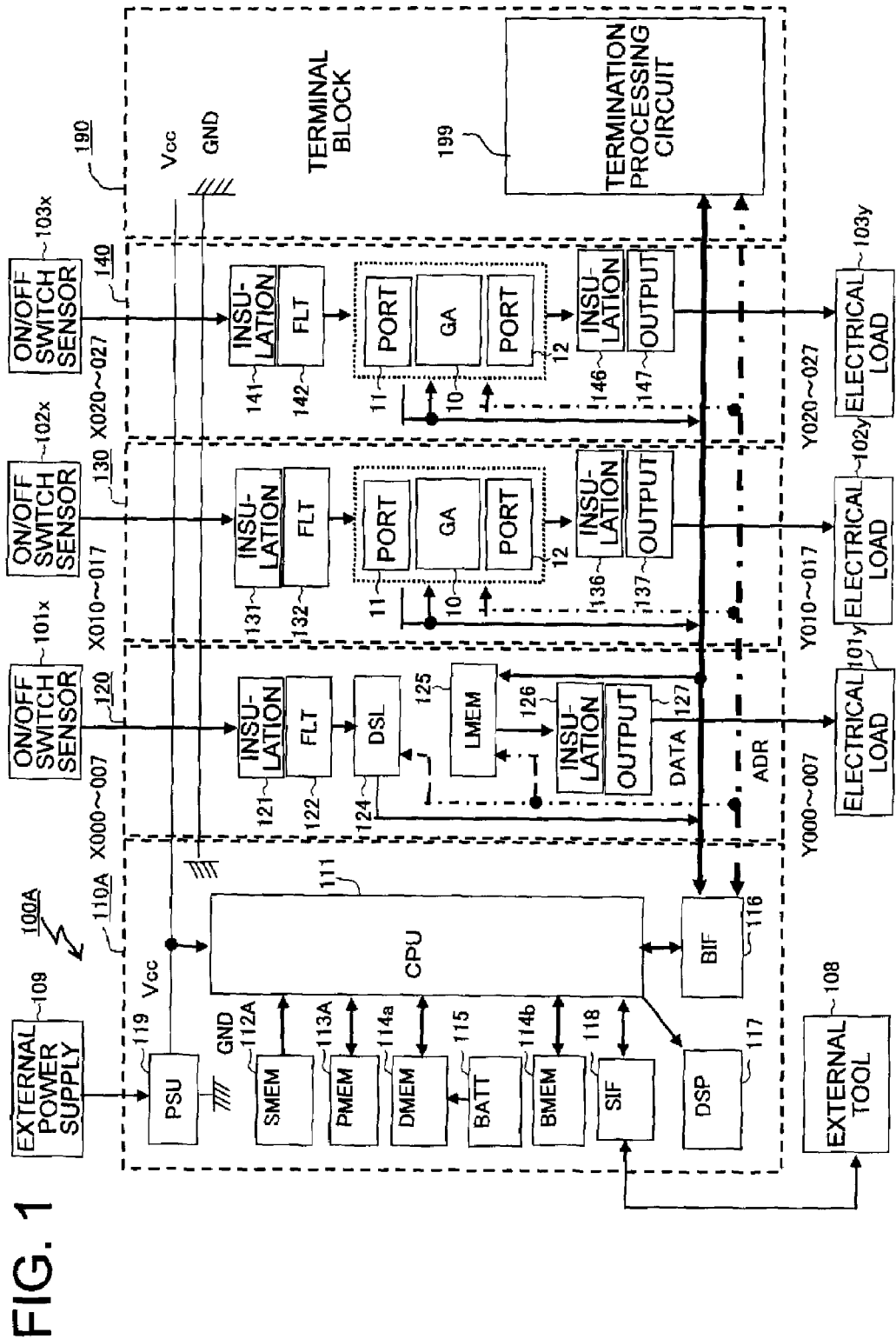
FIG. 1 is a view illustrating a unit configuration of a programmable controller according to a first embodiment of the present invention.

FIG. 1 illustrates a unit configuration of a programmable controller according to a first embodiment of the present invention. In FIG. 1, a programmable controller 100A includes a CPU unit 110A, input/output units (hereinafter, referred to as I/O units) 120, 130 and 140, and a terminal block 190.

Electric power is supplied to the CPU unit 110A from an external power supply 109 which is, for example, a commercial power supply for 100V to 240V AC. The CPU unit 110A is also connected to an external tool 108 through a removable connector (not shown) to be capable of writing an I/O control program and monitoring an operating state with the external tool 108.

The CPU unit 110A includes a microprocessor (CPU) 111, a system memory (SMEM) 112A, a program memory (PMEM)113A, a device memory (DMEM) 114a, a buffer memory (BMEM) 114b described below, a battery (BATT) 115, a bus interface circuit (BIF) 116, a warning display unit (DSP) 117, a serial interface (SIF) 118, and a control power supply 119. The system memory 112A is, for example, a mask ROM memory or a non-volatile flash memory. The program memory 113A is, for example, a non-volatile flash memory, and stores I/O control programs created by a user. The device memory 114a is, for example, a RAM memory, and includes I/O image memories X and Y, an auxiliary relay M, and a data register D described below. The battery 115 backs up a part of the device memory 114a. The bus interface circuit 116 serves for data communication with each of the I/O units. The serial interface 118 connects the external tool 108 and the microprocessor 111 to each other. Among the above-described components, the microprocessor 111, the system memory 112A, the program memory 113A, the device memory 114a, the buffer memory 114b, the bus interface 116, and the serial interface 118 are connected to each other through a bus.

Electric power is supplied from the external power supply 109 to the control power supply (PSU) 119, which in turn supplies regulated 24V DC power to an input signal circuit (not shown) or, for example, a regulated 5V DC voltage to a constant-voltage power supply line Vcc. The constant-voltage power supply line Vcc is provided together with a ground circuit GND for each unit. The control power supply 119 can also be provided outside the CPU unit 110A. The power supply unit, the CPU unit, and a predetermined number of I/O units constitute a basic unit.

The system memory 112A includes various control programs described below referring to FIGS. 18 and 19. The system memory 112A converts the I/O control programs in a sequential language, which is stored in the program memory 113A, into a machine language compatible with the microprocessor 111 to operate the microprocessor 111. The programs are stored by a manufacturer of the programmable controller at the time of shipping of the manufactured product.

An I/O control sequential program created by the user using the external tool 108 which is, for example, a personal computer, is written in the program memory 113A through the serial interface 118. Examples of the sequential program are illustrated as sequence diagrams of FIGS. 20 to 25, 27 and 29. The generation of the sequence diagram on a personal computer screen automatically creates a sequential program. The program memory 113A may be a RAM memory which is backed up by the battery. In this case, the attachment of a memory cassette including a non-volatile memory such as a flash memory or an EPROM allows the non-volatile memory to be used as a program memory area.

The device memory 114a is a RAM memory which stores I/O signal information or an operating state of a device such as an auxiliary relay, a timer, a counter, and a data register open to the user, which is provided in the programmable controller 100A. A part of the device memory 114*a* is backed up by the battery 115 which is, for example, a lithium battery. The battery 115 keeps a storage state even if the power supply to the programmable controller 100A is cut off.

The warning display unit 117 displays an operating state of the microprocessor 111, and is composed of, for example, a plurality of light-emitting diodes or a seven-segment display. The warning display unit 117 displays an incoming power supply, a normal operating state, and various abnormal states.

The I/O unit 120 is connected to the CPU unit 110A through a connector (not shown) provided on an end face of the CPU unit 110A. An external On/Off switch sensor 101*x* and an electrical load 101*y* are connected to the I/O unit 120 through an I/O terminal block (not shown). The I/O unit 120 as an exemplary embodiment is divided into a plurality of input units and a plurality of output units. The number of input units to be used and that of output units to be used correspond to the required number of inputs and that of outputs.

The On/Off switch sensor 101*x* is, for example, various operation switches and a sensor switch for confirming operations of actuators, which are provided on a control panel. For example, eight input signals can be connected to one input unit. For the connection of a larger number of the On/Off switch sensors, the number of input units to be connected is increased. Although the power supply to the On/Off switch sensor 101*x* is normally at 24V DC, the On/Off switch sensor 101*x* is connected to a commercial power supply for 100V to 240V AC in some cases.

The electrical load 101*y* is, for example, various display lamps, an electromagnetic valve for driving the actuator, or an electromagnetic relay for driving a motor, which are provided on the control panel. For example, eight output signals can be connected to one output unit. For the connection of a larger number of electrical loads, the number of output units to be connected is increased.

An input interface circuit provided in the I/O unit 120 includes an input insulating circuit 121 such as a photo-coupler transistor or a photo-triac, an input filter 122 for restraining noise, and a data selector 124. An output interface circuit provided in the I/O unit 120 includes a latch memory 125 for a driving signal which drives the electrical load 101*y*, an output insulating circuit 126 such as a photo-coupler transistor, a photo-triac, or an electromagnetic relay, and an output element 127 such as a power transistor, a triac, or an electromagnetic relay.

The I/O unit 130 constitutes a special unit including an integrated circuit element 10 having a first port 11 and a second port 12. The special unit is used for both inputs and outputs. For example, eight signals from the On/Off switch sensor 102*x* operating at high speed are input to the special unit through an input insulating circuit 131 and an input filter 132. At the same time, the special unit drives eight electrical loads 102*y* operating at low speed through an output insulating circuit 136 and an output element 137.

The I/O unit 140 constitutes the special unit including an integrated circuit element 10 having the first port 11 and the second port 12. The special unit is used for both inputs and outputs. For example, eight signals from the On/Off switch sensor 103*x* operating at low speed are input to the special unit through an input insulating circuit 141 and an input filter 142. At the same time, the special unit drives eight electrical loads 103*y* operating at high speed through an output insulating circuit 146 and an output element 147.

The input filter 122 in the I/O unit 120 serving as a general-purpose I/O unit is a low-pass filter used for low-speed logic input, which generally has a response delay of about 10 msec to prevent an erroneous operation caused by chattering of the On/Off switch sensor 101*x* (interrupted operation occurring when the sensor is switched off) or by line noise superimposed on an input wiring. On the other hand, the input filter 132 in the I/O unit 130 serving as the special unit is a low-pass filter having a response delay of 5 μsec or less to, for example, count the number of input pulse signals at 100 KHz. The On/Off switch sensor 102*x* serving as a high-speed logic input is a contactless sensor and requires special consideration to prevent line noise from being superimposed on the input wiring by, for example, using a separate wiring or a shielded twisted pair cable. The input filter 142 in the I/O unit 140 serving as the special unit is a low-pass filter having a response delay of, for example, 1 msec and used for medium-speed logic input. When the special unit 140 deals with both a high-speed input and a high-speed output, however, the input filter 142 for high-speed logic input is used as described below.

On the other hand, as an output element 127 in the I/O unit 120 serving as a general-purpose I/O unit, a small electromagnetic relay is the most frequently used. In addition, a triac is used as a contactless output element for an AC load, whereas a transistor is used as a contactless output element for a DC load. As a result, a power supply for the DC load is normally at DC 24V. On the other hand, an output element 137 in the I/O unit 130 and an output element 147 in the I/O unit 140 are transistor outputs. For the output element 147, in particular, a transistor operating at high speed is used to generate a high-speed pulse output at, for example, 100 KHz. As the output element 137, a low-cost transistor operating at low speed is used. By replacing the transistor operating at low speed with a transistor operating at high speed, a high-speed pulse output can be generated.

The terminal block 190 connected in the last stage includes a termination processing circuit 199. The termination processing circuit 199 connects a terminal of a data bus DATA and that of an address bus ADR, which are provided from the CPU unit 110A through the I/O units, to the constant-voltage power supply line Vcc and a ground circuit GND through a pull-up circuit and a pull-down circuit to restrain reflected noise of a high-speed signal. A feedthrough bus signal line as an exemplary embodiment includes sixteen buses for both address and data (hereinafter, referred to as address/data buses) and eight control signal buses. Whether the sixteen address/data buses are to deal with an address signal or transmitted/received data is designated by a control signal line. Furthermore, each of the I/O units includes a bus controller (not shown). Among multiple data selectors and latch memories, the one designated by the microprocessor 111 is connected to the data bus to be able to communicate with the microprocessor 111.

Figure 2:
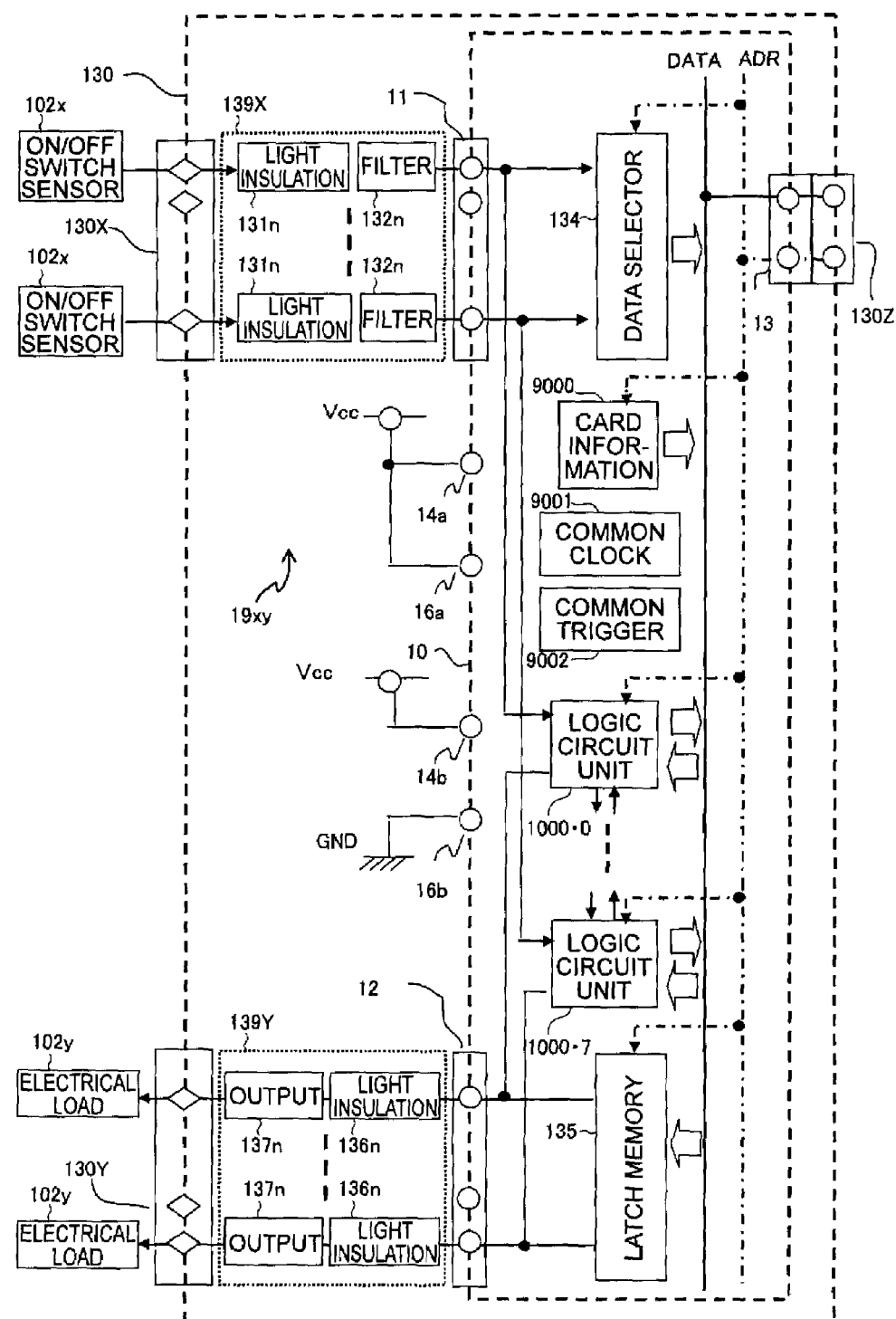
FIG. 2 is a view illustrating an internal configuration of an I/O unit configured as a special unit illustrated in FIG. 1.

Next, an internal configuration of the I/O unit 130 constituted as the special unit in FIG. 1 will be described referring to FIG. 2, whereas that of the I/O unit 140 will be described referring to FIG. 3. First, the configuration of the I/O unit 130 illustrated in FIG. 2 will be described. In FIG. 2, the I/O unit 130 configured as the special unit includes an input terminal 130X connected to the eight On/Off switch sensors 102*x* and an output terminal 130Y connected to the eight electrical loads 102*y*.

An input interface circuit 139X for high-speed logic input is provided between the input terminal 130X and the first port 11 provided for the integrated circuit element 10. The input interface circuit 139X includes input insulating circuits 131*n* and input filters 132*n* having a relatively small time constant, for example, of about 5 μsec. The combination of the input insulating circuit 131*n* and the input filter 132*n* connected in series is provided for each channel number: n=0 to 7.

An output interface circuit 139Y for ON/OFF operation is provided between the output terminal 130Y and the second port 12 provided for the integrated circuit element 10. The output interface circuit 139Y includes output elements 137$n$ corresponding to power transistors and output insulating circuits 136$n$. The combination of the output element 137$n$ and the output insulating circuit 136$n$ connected in series is provided for each channel number: n=0 to 7. The input terminal 130X and the input interface circuit 139X, the output terminal 130Y and the output interface circuit 139Y, a bus joint connector 130Z, and the integrated circuit element 10 are mounted on an electronic substrate 19$xy$ to constitute the special unit 130.

The first port 11 includes channel terminals 11$n$ (not illustrated with a reference numeral) respectively corresponding to the channel numbers n=0 to 7, whereas the second port 12 includes channel terminals 12$n$ (not illustrated with a reference numeral) respectively corresponding to the channel numbers n=0 to 7. Each of the channel terminals 11$n$ is selectively connected to the data bus DATA through a data selector 134, a bus connection terminal 13, and the bus joint connector 130Z to transmit an input signal to the microprocessor 111. On the other hand, each of the channel terminals 12$n$ is selectively connected to the data bus DATA through an output latch memory 135 to receive an output signal from the microprocessor 111. A logic circuit unit 1000$n$ (1000•0, 1000•1, . . . , 1000•7) is allocated to each of the channels (n=0 to 7).

The logic circuit unit 1000$n$ transmits and receives a signal to/from the data bus DATA and also to/from another logic circuit unit 1000$n$. Furthermore, the logic circuit unit 1000$n$ receives a signal from the channel terminal 11$n$ and outputs a signal to the channel terminal 12$n$. The details of the logic circuit unit 1000$n$ will be described below referring to FIG. 4. In a typical high-speed input processing operation, for example, a high-speed pulse signal is input from the channel terminal 11$n$. The logic circuit unit 1000$n$ counts the number of the high-speed pulse signals. When the number of the high-speed pulse signals reaches a predetermined target number, the logic circuit unit 1000$n$ transmits a count-up output through the data bus DATA to the microprocessor 111. The target number is transmitted in advance as set data from the microprocessor 111 through the data bus DATA to the logic circuit unit 1000$n$. In a typical high-speed output processing operation, for example, the logic circuit unit 1000$n$ generates a high-speed pulse output from the channel terminal 12$n$ based on a pulse cycle and the number of generated pulses, which are transmitted in advance as set data from the microprocessor 111 through the data bus DATA to the logic circuit unit 1000$n$.

A first identification terminal 14$a$ identifies whether the input interface circuit 139X serves for a logic signal or an analog signal described below. When the input interface circuit 139X is used for a logic signal, a wiring pattern is connected to set a logic level to "H". A second identification terminal 14$b$ identifies whether the output interface circuit 139Y serves for a logic signal or an analog signal described below. When the output interface circuit 139Y serves for a logic signal, a wiring pattern is connected to set a logic level to "H".

A wiring pattern of a first signal terminal 16$a$ is connected to set its logic level to "H" to indicate that the first signal terminal 16$a$ serves for high-speed logic input. A wiring pattern of a second signal terminal 16$b$ is connected to set its logic level to "L" to indicate that the second signal terminal 16$b$ serves for low-speed logic output. Identification terminal information as described above is supplied to a card information storage memory 9000 to be transmitted to the microprocessor 111 through the data bus DATA.

A common clock circuit 9001 generates a clock signal T having, for example, a cycle of 1 μsec and supplies the clock signal to each logic circuit unit 1000$n$ as needed. A common trigger circuit 9002 generates trigger signals P0 and Q0 in tandem, each having, for example, a signal cycle of T0=10 msec and a width of 1 μsec, and supplies the trigger signals P0 and Q0 to each logic circuit unit 1000$n$ as needed.

Next, the configuration of the I/O unit 140 illustrated in FIG. 3 will be described. In FIG. 3, the I/O unit 140 configured as the special unit includes an input terminal 140X connected to the eight On/Off switch sensors 103$x$ and an output terminal 140Y connected to the eight electrical loads 103$y$.

An input interface circuit 149X for medium-speed logic input is provided between the input terminal 140X and the first port 11 provided in the integrated circuit element 10. The input interface circuit 149X includes input insulating circuits 141$n$ and input filters 142$n$, each having a relatively small time constant of, for example, about 1 msec. The combination of the input insulating circuit 141$n$ and the input filter 142$n$ connected in series is provided for each channel number: n=0 to 7.

An output interface circuit 149Y for ON/OFF operation is provided between the output terminal 140Y and the second port 12 provided in the integrated circuit element 10. The output interface circuit 149Y includes output elements 147$n$ corresponding to power transistors for high-speed operation and output insulating circuits 146$n$. The combination of the output element 147$n$ and the output insulating circuit 146$n$ connected in series is provided for each channel number: n=0 to 7. The input terminal 140X and the input interface circuit 149X, the output terminal 140Y and the output interface circuit 149Y, a bus joint connector 140Z, and the integrated circuit element 10 are mounted on the electronic substrate 19$xy$ to constitute the special unit 140.

Since the input interface circuit 149X serves for a logic signal, the wiring pattern of the first identification terminal 14$a$ is connected to set its logic level to "H". Since the output interface circuit 149Y serves for a logical signal, the wiring pattern of the second identification terminal 14$b$ is connected to set its logic level to "H".

The wiring pattern of the first signal terminal 16$a$ is connected to set the logic level to "L" to indicate that the first signal terminal 16$a$ serves for medium-speed logic input. The wiring pattern of the second signal terminal 16$b$ is connected to set the logic level to "H" to indicate that the second signal terminal 16$b$ serves for high-speed logic output.

Figure 3:
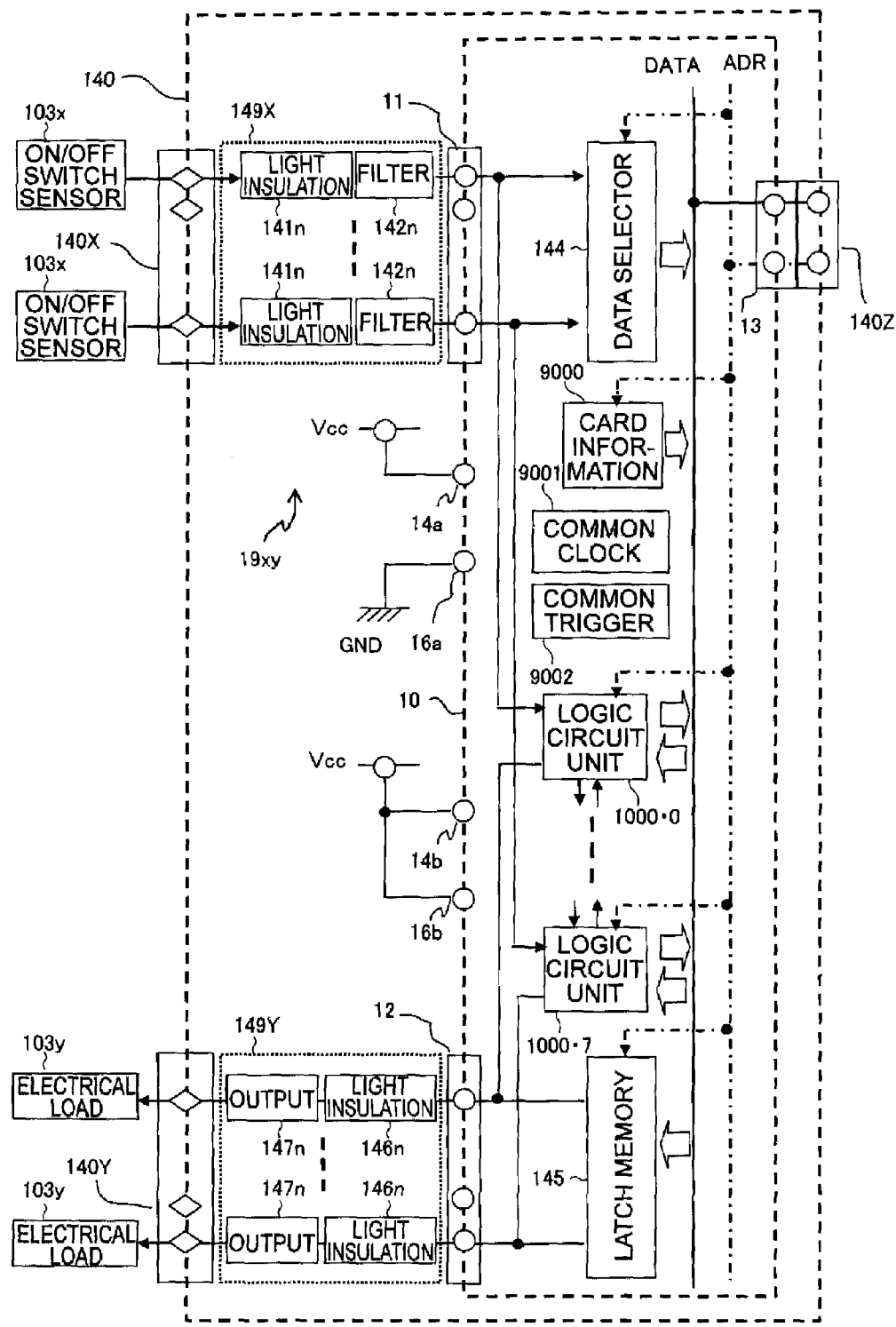
FIG. 3 is a view illustrating an internal configuration of another I/O unit configured as the special unit illustrated in FIG. 1.
Figure 4:
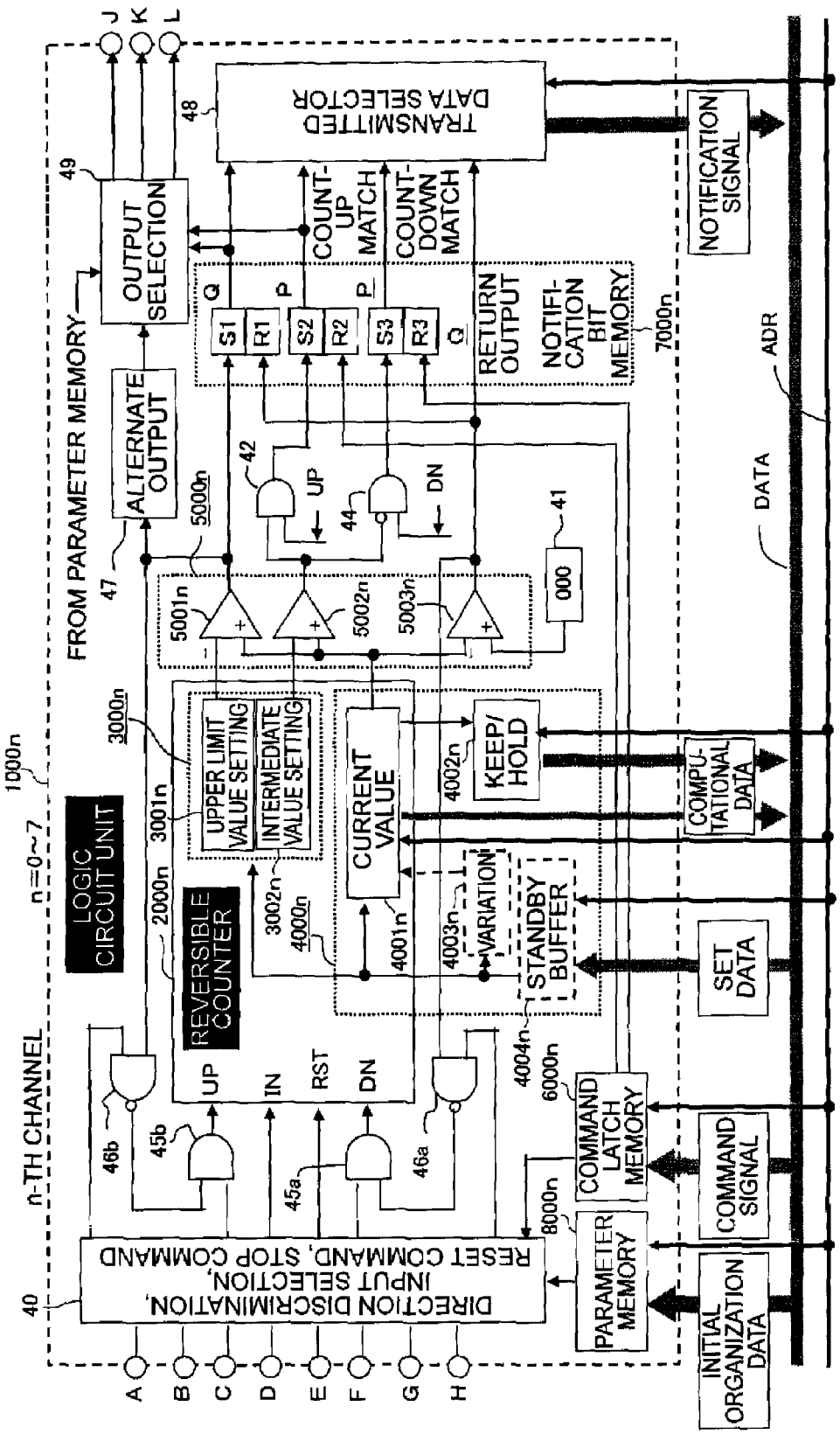
FIG. 4 is a view showing a detailed configuration of a logic circuit unit illustrated in FIGS. 2 and 3.

Next, FIG. 4 illustrating a detailed configuration of the logic circuit unit 1000$n$ shown in FIGS. 2 and 3 will be referred to. In FIG. 4, the logic circuit unit 1000$n$ (1000•0, 1000•1, . . . , 1000•7) allocated to each of the channels: n=0 to 7 is configured based on a reversible counter 2000$n$ (2000•0, 2000•1, . . . , 2000•7). In the reversible counter 2000$n$, when the logic level of any one of a count-up command terminal UP and a count-down command terminal DN changes to "H", a current counter value of a current value register 4001$n$ is increased or reduced upon transition of the logic level of a count input terminal IN from "L" to "H". An incremental or decremental variation in the current counter value is determined based on a numerical value stored in a variation adjusting register 4003$n$. The value of the variation adjusting register 4003$n$ is normally 1, and the current counter value of the current value register 4001 is increased or reduced only by one upon a logical transition of the count input terminal IN.

Upon input of a reset command to a reset terminal RST of the reversible counter 2000n, the value of the current value register 4001n is reset to zero. When some numerical value is stored in a preset register in a standby buffer register 4004n, the content of the preset register is transferred to the current value register 4001n. A keep/hold register 4002n serves to regularly read and store the content of the current value register 4001n. The current value register 4001n, the keep/hold register 4002n, the variation adjusting register 4003n, and the standby buffer register 4004n are collectively referred to as a calculation register 4000n. In particular, as is apparent from the following description, the variation adjusting register 4003n is provided only for the logic circuit units 1000•1, 1000•2, 1000•5 and 1000•6. Each of the reversible counters with the other channel numbers always increases or decreases the counter value by one.

The setting register 3000n includes a first setting register 3001n which stores an upper limit count value and a second setting register 3002n which stores an intermediate value less than the upper limit count value.

A first comparison circuit 5001n is a value comparison circuit. A logic level of the first comparison circuit 5001n changes to "H" to set a determination storage circuit S1 to generate a count-up output Q when a set value stored in the first setting register 3001n and the current counter value of the current value register 4001n are identical with each other or when the current counter value exceeds a set value. A second comparison circuit 5002n is a value comparison circuit for comparing a set value stored in the second setting register 3002n and the current counter value of the current value register 4001n. When the set value and the current counter value are identical with each other or the current counter value exceeds the set value in a count-up mode, the second comparison circuit 5002n sets a determination storage circuit S2 through an AND element 42 to generate a count-up compare match output P. On the other hand, when the current counter value is less than the set value in a count-down mode, the second comparison circuit 5002n sets a determination storage circuit S3 through a gate element 44 to generate a count-down compare match output P̲.

A return comparison circuit 5003n is a value comparison circuit which generates a return output Q̲ to reset the determination storage circuit S1 when the current counter value of the current value register 4001n decreases to be identical with a value of a zero register 41 or to be a negative value. A command signal from the microprocessor 111 can reset the determination storage circuits S2 and S3 or the current counter value of the current value register 4001n through a command latch memory 6000n.

A notification bit memory 7000n includes the count-up output Q, the return output Q̲, the count-up compare match output P, and the count-down compare match output P̲. The determination outputs described above are connected to the data bus DATA through a data selector 48. An alternate output circuit 47 is a logic circuit for alternatively inverting the logic of an output each time the logic level of the compare match output from the first comparison circuit 5001n changes from "L" to "H". An output selecting circuit 49 selects and determines an output circuit according to the content of a parameter memory 8000n. The output selecting circuit 49 determines, for example, whether to allocate terminals J and K as a forward pulse output FP and a reverse pulse output RP or as a forward-reverse pulse output FRP and a direction command output DIR. Moreover, the output selecting circuit 49 feeds the count-up compare match output P output from the determination storage circuit S2 or an operation completion output as the count-up output Q to a terminal L.

An input circuit unit 40 is an input processing circuit for the reversible counter 2000n. A specific circuit configuration of the input circuit unit 40 is determined based on the content of the parameter memory 8000n. Specific circuit configurations of the input circuit unit 40 and the output selecting circuit 49 will be described below referring to FIGS. 5 to 14. For example, when the reversible counter 2000n constitutes a high-speed counter circuit, the reversible counter is any one of a 1-phase 1-input reversible counter in which a count direction is determined by a command signal, a 1-phase 2-input reversible counter to which a count-up/-down input is individually fed, and a 2-phase 2-input reversible counter in which a count-up/-down direction is determined based on a phase difference of a two-phase input. Furthermore, the high-speed counter circuit has any of a single edge evaluation mode, a double edge evaluation mode, and a quad edge evaluation mode depending on whether counting is started when the high-speed counter instruction is executed or when a count start command input is switched ON, whether or not a preset command input for transferring initial value data to the current value register is added, or whether the counting is performed at a rise or a fall of the pulse signal in each phase in the case of the 2-phase 2-input high-speed counter circuit. Each of various high-speed counter circuits as those described above is provided with a unique identification number. Circuit organization information determined by the combination of a special instruction and the identification number is stored in the parameter memory 8000n.

All the input signals, which are required to allow the logic circuit unit 1000n in each channel to demonstrate its predetermined various functions, are connected to input terminals A to H. The parameter memory 8000n selects and determines the input signal to be connected to the reversible counter 2000n from all the input signals and the circuit configuration used for the connection.

The data from the parameter memory 8000n is transmitted from the microprocessor 111 upon start of the operation of the programmable controller 100A and is not changed during the operation of the programmable controller 100A except for some cases described below. A part of the operation of the input circuit unit 40 can also be changed by the content of the command latch memory 6000n, which is transmitted from the microprocessor 111 during the operation. For example, the selection of the count-up/-down direction in the 1-phase 1-input high-speed counter is variably set by the content of the command latch memory 6000n.

As described above, the input circuit unit 40 performs a command of discriminating a count direction of the reversible counter, a selective connection of the count input signal to the count input terminal IN, the selective connection of a reset signal to the reset terminal RST, and the selective connection of a stop command signal for forcibly stopping the count signal input to the count input terminal IN.

A NAND output element 46a is a gate circuit which acts on an AND element 45a to stop a subtractive counting operation when the logic level of the return comparison circuit 5003n changes to "H". Whether or not to enable the gate circuit is determined by the NAND output element 46a based on the content of the input circuit unit 40. The AND element 45a is a gate circuit which feeds a count-down direction command signal obtained through the input circuit unit 40 to a count-down command terminal DN of the reversible counter 2000n.

A NAND output element 46b is a gate circuit which acts on an AND element 45b to stop an additive counting operation when the logic level of the first comparison circuit 5001n changes to "H". Whether or not to enable the gate circuit is determined by the NAND output element 46b based on the content of the input circuit unit 40. The AND element 45b is a gate circuit which feeds a count-up direction command signal obtained through the input circuit unit 40 to a count-up command terminal UP of the reversible counter 2000n.

Figure 5:
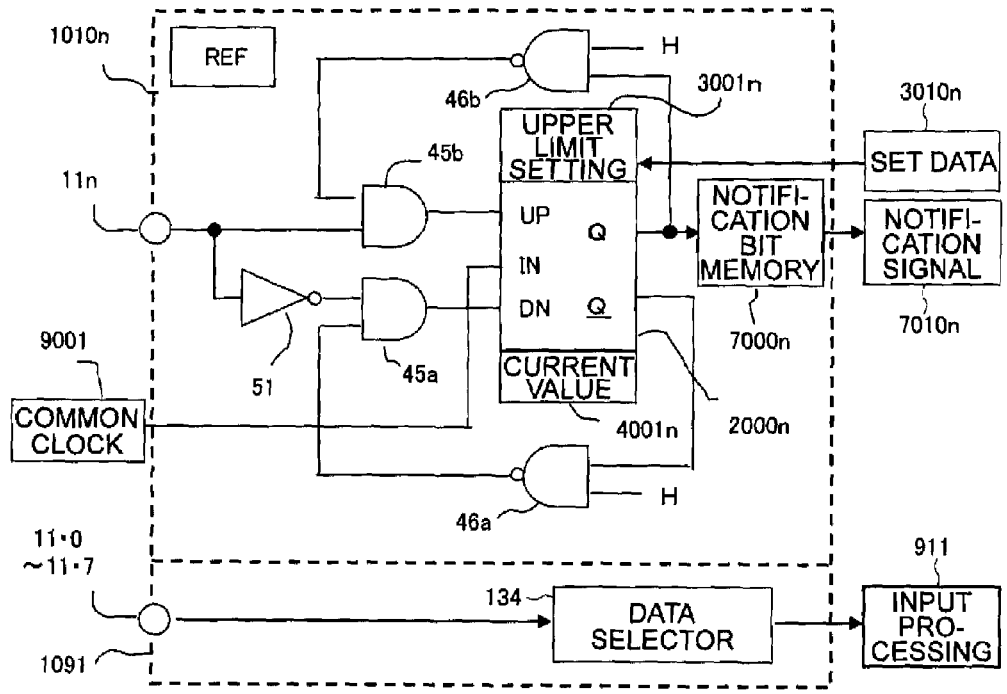
FIG. 5 is a block diagram illustrating the logic circuit unit illustrated in FIG. 4 configured as a variable filter circuit.
Figure 6:
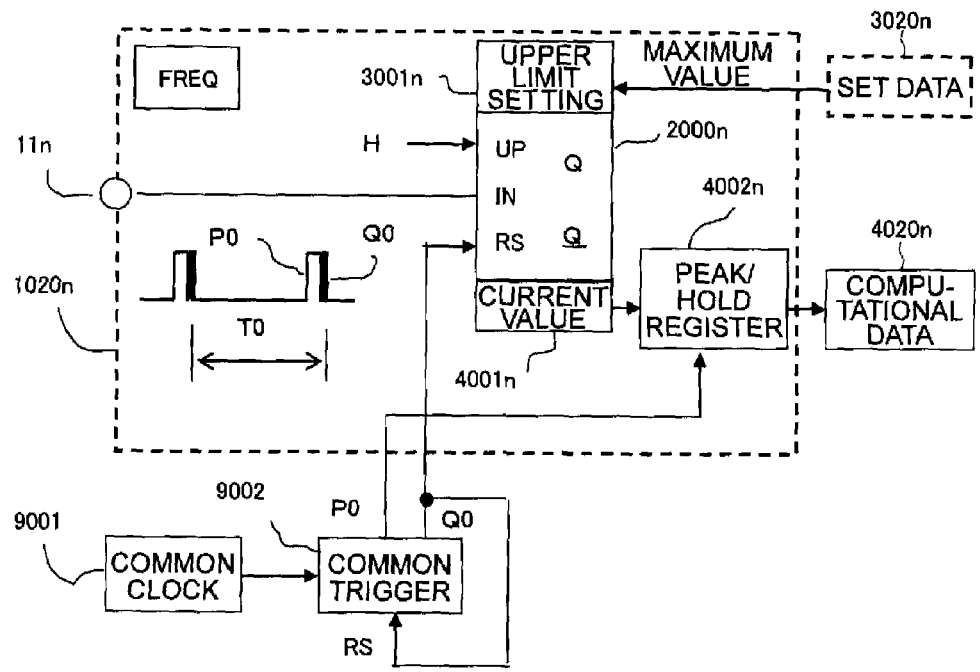
FIG. 6 is a block diagram illustrating the logic circuit unit illustrated in FIG. 4 configured as a pulse density measuring circuit.

FIG. 5 is a block diagram illustrating the logic circuit unit 1000n illustrated in FIG. 4 constituted as a variable filter circuit 1010n, whereas FIG. 6 is a block diagram illustrating the logic circuit unit 1000n constituted as a pulse density measuring circuit 1020n. In FIG. 5, the variable filter circuit 1010n (n=0 to 7) includes the reversible counter 2000n using a clock signal generated from the common clock signal circuit 9001 as a count input signal. Set data 3010n corresponding to a filter constant is transmitted from the microprocessor 111 to be stored in the first setting register 3001n of the reversible counter 2000n. For example, one of the inputs from the On/Off switch sensor 102x of the special unit 130 is input to a channel terminal 11n of the first port 11 with a channel number n through the input interface circuit 139X. When the On/Off switch sensor 102x is switched ON to change the logic level of the channel terminal 11n to "H", a count-up direction command is fed to the count-up command terminal UP through the AND element 45b. As a result, the variable counter 2000n counts up the clock signals generated from the common clock signal circuit 9001 to gradually increase the current value of the current value register 4001n.

When the current counter value reaches the upper limit set value corresponding to the filter constant prestored in the first setting register 3001n, the reversible counter 2000n generates the count-up output Q. The count-up output Q serves as a notification signal 7010n to cause the microprocessor 111 to activate a predetermined auxiliary relay in the device memory 114a. On the other hand, upon generation of the count-up output Q, the logic level of the count-up command terminal UP changes to "L" through the NAND output element 46b and the AND element 45b. As a result, the reversible counter 2000n is prevented from performing an additive count exceeding the upper limit set value. When the On/Off switch sensor 102x is switched OFF to change the logic level of the channel terminal 11n to "L", a count-down direction command is fed to the count-down command terminal DN through a NAND element 51 and the AND element 45a. As a result, the reversible counter 2000n counts down the clock signals generated from the common clock signal circuit 9001 to gradually decrease the current counter value of the current value register 4001n. When the current counter value is decreased to be zero, the return output $\bar{Q}$ is generated to reset the count-up output Q. The return output $\bar{Q}$ serves as the notification signal 7010n to cause the microprocessor 111 to inactivate the auxiliary relay. On the other hand, upon generation of the return output $\bar{Q}$, the logic level of the count-down command terminal DN changes to "L" through the NAND output element 46a and the AND element 45a to prevent a subtractive count from being performed below zero.

Therefore, when the state of the On/Off switch sensor 102 changes from ON to OFF or from OFF to ON, the notification signal 7010n is changed with a response delay time of: N×τ=N μsec, which corresponds to a product of the clock cycle τ=1 μsec of the common clock signal circuit 9001 and the filter constant N stored in the first setting register 3001n. When chattering is generated in the On/Off switch sensor 102x to cause an irregular intermittent operation, the reversible counter 2000n performs a count-up/-down operation. When the counter value reaches the upper limit set value as a result of the addition, the ON operation is determined. On the other hand, when the counter value reaches zero as a result of the subtraction, the OFF operation is determined.

On the other hand, with a general-purpose input circuit 1091, all the signals input to the first port 11 are transferred to an input image memory corresponding to a specific area in the device memory 114a through a data selector 134. However, the signals are transmitted to the image memory in an input process 911 described below referring to FIG. 19, and therefore, the transmission of the signals is affected by a computation cycle of the programmable controller 100A for updating. Therefore, when a high-speed pulse signal is input to the channel terminal 11a, for example, the general-purpose input circuit 1091 cannot follow its high speed and uses the high-speed pulse signal merely as information for sampling check.

In FIG. 6, in the reversible counter 2000n constituting the pulse density measuring circuit 1020n (n=0 to 7), an input signal to the channel terminal 11n is fed to the count input terminal IN. At the same time, the reversible counter 2000n is constituted to count up the ON/OFF operations of the input signal. An upper limit value represented by a 32-bit numerical value is stored as the set data 3020n in the first setting register 3001n. The common trigger circuit 9002 generates a trigger signal P0 which is a short pulse of 1 μsec and a count-up output Q0 for each constant cycle T0=10 msec. The pulse of the trigger signal P0 is generated immediately before the count-up output Q0 to transfer the current counter value of the current value register 4001n to a peak hold register 4002n, whereas the count-up output Q0 feeds a reset signal to the reset terminal RST of the reversible counter 2000n. As a result, the content of the current value register 4001n is reset to zero. Therefore, the maximum counter value of the reversible counter 2000n immediately before the reversible counter 2000n is reset for each constant cycle T0 is stored in the peak hold register 4002n for each time. The maximum counter value represents a density of the pulse (that is, a frequency of the pulse) of the On/Off switch sensor 102x, which is fed to the channel terminal 11n, to be transmitted as computational data 4020n to the microprocessor 111.

Figure 7:
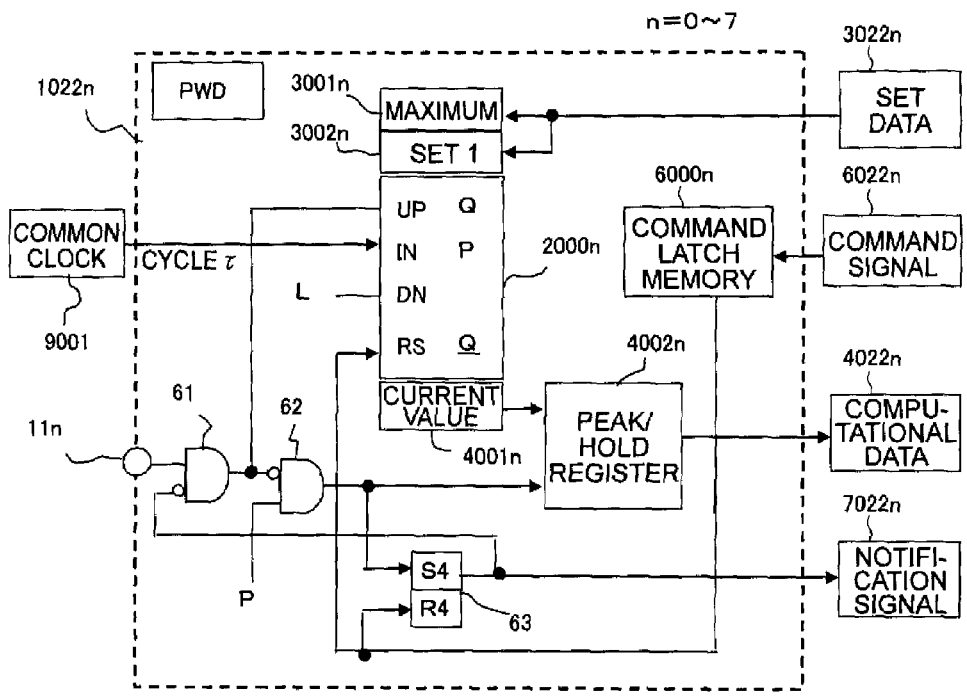
FIG. 7 is a block diagram illustrating the logic circuit unit illustrated in FIG. 4 configured as a pulse width measuring circuit.
Figure 8:
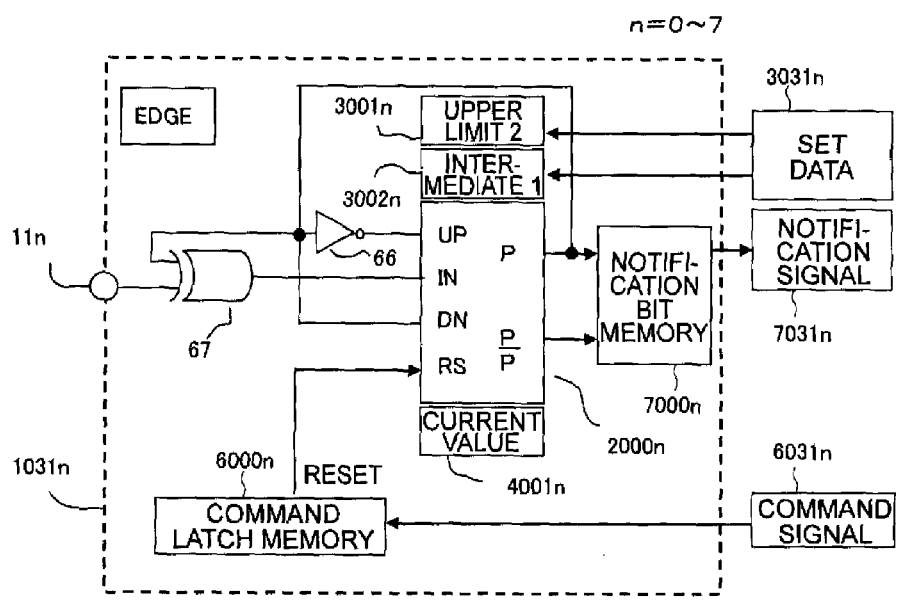
FIG. 8 is a block diagram illustrating the logic circuit unit illustrated in FIG. 4 configured as an edge detecting circuit.

Next, description will be made referring to FIGS. 7 and 8. FIG. 7 is a block diagram illustrating the logic circuit unit 1000n illustrated in FIG. 4 constituted as a pulse width measuring circuit 1022n, whereas FIG. 8 is a block diagram illustrating the logic circuit unit 1000n constituted as an edge detecting circuit 1031n. In FIG. 7, in the variable counter 2000n constituting the pulse width measuring circuit 1022n (n=0 to 7), an input signal to the channel terminal 11n is input to the count-up command terminal UP through a gate element 61, whereas a clock signal generated from the common clock signal circuit 9001 is fed to the count input terminal IN. An upper limit value represented by a 32-bit numerical value is stored as the set data 3022n in the first setting register 3001n, whereas a set value "1" is stored as the set data 3022n in the second setting register 3002n.

When the logic level of the channel terminal 11n changes to "H", the reversible counter 2000n starts counting up. Then, when the logic level of the channel terminal 11n changes to "L", the reversible counter 2000n stops counting. At the same time, a transfer command to the peak hold register 4002n is generated through the gate element 62 to transfer the maximum counter value of the current value register 4001n to the peak hold register 4002n. Simultaneously with the transfer to the peak hold register 4002n, a storage circuit 63 is set to transmit a measurement completion signal as a notification signal 7022n to the microprocessor 111. Once the storage circuit 63 is set, the counting-up operation is stopped by the gate element 61 until the storage circuit 63 is reset by a command signal 6022n. The gate element 62 inhibits a storage operation of the storage circuit 63 until the count-up compare match output P is operated.

As a result, the content N of the peak hold register 4002n is proportional to a measured time period during which the logic level of the channel terminal 11n is kept at "H". For example, if a clock signal cycle τ is 1 μsec, a detected time length is N μsec. The content of the peak hold register 4002n is transmitted as computational data 4022n to the microprocessor 111. In response to the command signal 6022n, the microprocessor 111 resets the storage circuit 63 through the command latch memory 6000n to restart the measurement of the pulse width. It is also possible to add a command signal for switching between the measurement of an ON time width of the input signal and the measurement of an OFF time width of the input signal by a pulse width measurement instruction. The pulse density measuring circuit 1020n as illustrated in FIG. 6 is effective in the following case. An encoder driven by, for example, a rotary body generates a high-speed rotation pulse. A density of the generated pulse is measured to detect a rotational speed of the rotary body. In the case of a low-speed rotation pulse, however, a rotational speed cannot be detected unless a measurement time is set sufficiently long. To cope with this problem, the pulse width measuring circuit 1022n measures a time width of a low-speed pulse, which is then reciprocally calculated by the microprocessor 111. As a result, the pulse width measuring circuit 1022n can detect a rotational speed at high accuracy.

In FIG. 8, when the reversible counter 2000n constitutes the edge detection circuit 1031n (n=0 to 7), an input signal to the channel terminal 11n is input to the count input terminal IN of the reversible counter 2000n through an exclusive-OR element 67. The other input to the exclusive-OR element 67 is the count-up compare match output P. For example, a constant value "2" is written as set data 3031n to the first setting register 3001n, whereas a constant value "1" is written as set data 3031n to the second setting register 3002n. The count-up compare match output P is connected to the count-down command terminal DN and also to the count-up command terminal UP through a NOT element 66. In response to a command signal 6031n, the microprocessor 111 resets the current value register 4001n of the reversible counter 2000n, the count-up compare match output P, and the count-down compare match output $\underline{P}$ through the command latch memory 6000n. The count-up compare match output P and the count-down compare match output $\underline{P}$ are transmitted as a notification signal 7031n to the microprocessor 111.

Therefore, when the logic level of the channel terminal 11n changes from "L" to "H" in the state where the content of the current value register 4001n is zero and both the count-up compare match output P and the count-down compare match output $\underline{P}$ are reset, an output logic of the exclusive-OR element 67 changes to "H" to cause the reversible counter 2000n to increase the counter value by 1. As a result, the logic level of the count-up compare match output P changes to "H", which is notified to the microprocessor 111 as a rising edge detection output. At the same time, the mode of the reversible counter 2000n is switched from the count-up mode to the count-down mode to change the logic level of the count input terminal IN to "L".

Subsequently, when the logic level of the channel terminal 11n changes from "H" to "L", an output logic of the exclusive-OR element 67 changes to "H" to cause the reversible counter 2000n to decrease the counter value by 1. As a result, the logic level of the count-down compare match output $\underline{P}$ changes to "H", which is notified to the microprocessor 111 as a falling edge detection output.

Figure 9:
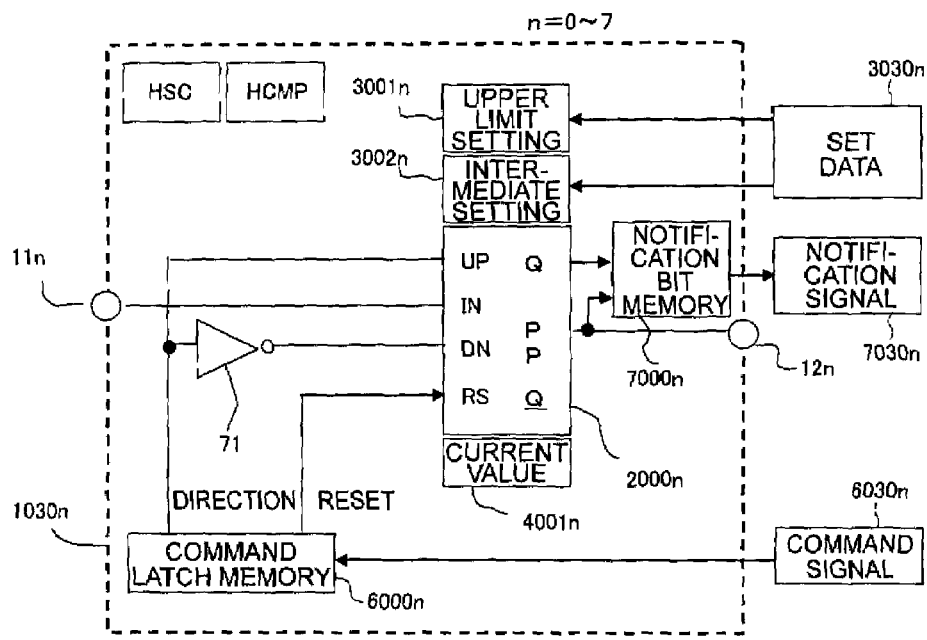
FIG. 9 is a block diagram illustrating the logic circuit unit illustrated in FIG. 4 configured as a 1-phase 1-input high-speed counter circuit.
Figure 10:
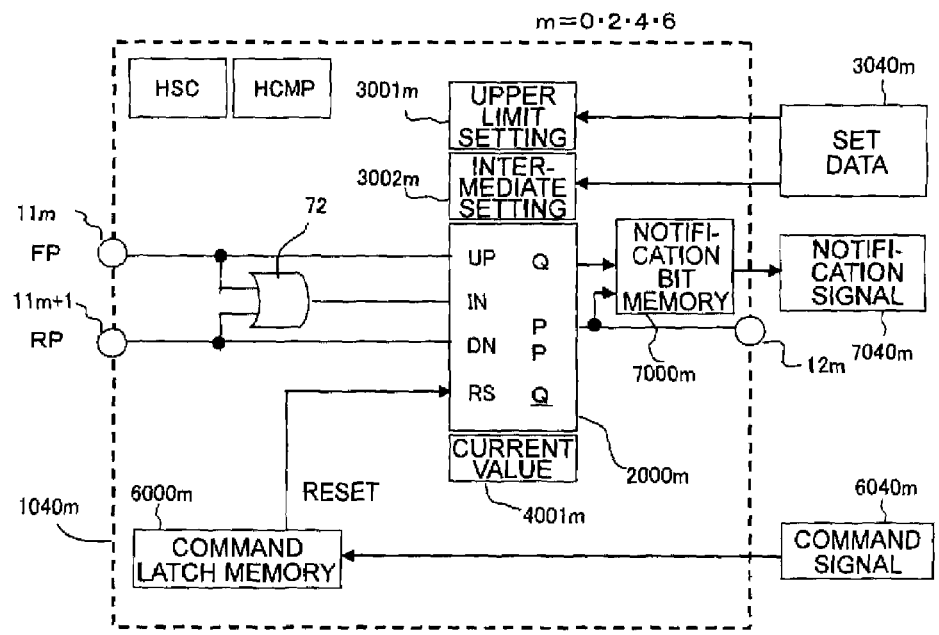
FIG. 10 is a block diagram illustrating the logic circuit unit illustrated in FIG. 4 configured as a 1-phase 2-input high-speed counter circuit.

Next, FIG. 9 is a block diagram illustrating the logic circuit unit 1000n shown in FIG. 4 which is used as a 1-phase 1-input high-speed counter circuit 1030n, whereas FIG. 10 is a block diagram illustrating the logic circuit unit 1000n which is used as a 1-phase 2-input high-speed counter circuit 1040m. There are also a 2-phase input high-speed counter and high-speed counters using single edge evaluation, double edge evaluation, and quad edge evaluation. Each of the high-speed counters as mentioned above has a circuit configuration (not shown) according to the content of the parameter memory.

In FIG. 9, the 1-phase 1-input high-speed counter circuit 1030n (n=0 to 7) for counting the number of operations of the ON/OFF switch sensor 102x, which are input to the channel terminal 11n, includes the reversible counter 2000n. An upper limit set value and an intermediate set value are stored in the first setting register 3001n and the second setting register 3002n of the reversible counter 2000n by using set data 3030n from the microprocessor 111. A count direction of the reversible counter 2000n is transmitted as a command signal 6030n from the microprocessor 111 to the command latch memory 6000n to be stored therein. When the logic level of the command signal is "H", the reversible counter 2000n performs a count-up operation. On the other hand, when the logic level of the command signal is "L", the reversible counter 2000n performs a count-down operation by the function of a NOT element 71.

When the current counter value of the reversible counter 2000n reaches the upper limit set value, the count-up output Q is generated to be transmitted by using a notification signal 7030n to the microprocessor 111. In the case where the second setting register 3002n of the reversible counter 2000n is in use and a high-speed compare instruction HCMP in the program memory 113A is executed, the count-up compare match output P is operated to be output to the corresponding channel terminal 12n and is transmitted by using the notification signal 7030n to the microprocessor 111 when the current counter value of the current value register 4001n increases to pass through the medium set value stored in the second setting register 3002n.

The corresponding channel terminal 12n is a channel terminal of the other port (in this case, the second port), which has the same channel number as the count input channel number n. For example, an output corresponding to an input X014 of the special unit 130 is Y014. Therefore, only when the first port 11 is a high-speed logic input port and the second port 12 is a high-speed or low-speed logic output port, the high-speed compare instruction HCMP can be used. The output from the other port occupied by the high-speed compare instruction HCMP cannot be used as the other high-speed outputs.

The microprocessor 111 can be notified of the compare match by the notification signal 7030n. In this case, the compare match can be recognized when the high-speed compare instruction HCMP is executed. On the other hand, the count-up compare match output P from the reversible counter 2000n can be externally output as the output Y014 through the corresponding channel terminal 12n. Therefore, the notification of the compare match can be immediately given to the exterior. The content of the current value register 4001n of the reversible counter 2000n, the count-up output Q, the count-up compare match output P, and the count-down compare match output $\underline{P}$ can be reset by the command latch memory 6000n which has received and stored the command signal 6030n from the microprocessor 111. As an exemplary application of the high-speed compare instruction HCMP, for example, it is assumed that a wound-off size of an elongated material which is wound around a winding frame is measured by a pulse generated from the encoder to stamp the elongated material at predetermined intervals. In this case, a constant feed size amount is sequentially updated and measured by the count-up output Q from the reversible counter to drive a stamp with the count-up compare match output P. As a result, the elongated material can be accurately stamped at a predetermined position.

In FIG. 10, the 1-phase 2-input high-speed counter circuit 1040m (m=0, 2, 4 or 6) includes the reversible counter 2000m. The reversible counter 2000m counts up the number of operations of a forward pulse FP input to the channel terminal 11m or counts down the number of operations of a reverse pulse RP input to an adjacent channel terminal 11m+1. Therefore, the forward pulse FP is input to the count-up command terminal UP, whereas the reverse pulse RP is input to the count-down command terminal DN. The forward pulse FP and the reverse pulse RP are connected to the count input terminal IN through an OR element 72.

An upper limit set value and an intermediate set value are stored in the first setting register 3001m and the second setting register 3002m of the reversible counter 2000m by using set data 3040m from the microprocessor 111. The count-up output Q of the reversible counter 2000m, a notification signal 7040m for the count-up compare match output P or the count-up compare match output for the corresponding channel terminal 12m, or a reset process of the reversible counter 2000m by a command signal 6040 are handled in the same manner as in the case of the 1-phase 1-input high-speed counter circuit 1030n described above referring to FIG. 9.

As the other high-speed counter circuit (not illustrated), there exists a 2-phase 2-input high-speed counter. In this case, a count direction (count-up or count-down) is determined based on a phase difference between an A-phase input pulse and a B-phase input pulse. There also exist those which use single edge evaluation for counting only the rising edge of a pulse in any of the A-phase and the B-phase, double edge evaluation for counting the rising edge and the falling edge of a pulse in any of the A-phase and the B-phase, and quad edge evaluation for counting the rising edge and the falling edge of a pulse in both the A-phase and the B-phase.

Figure 11:
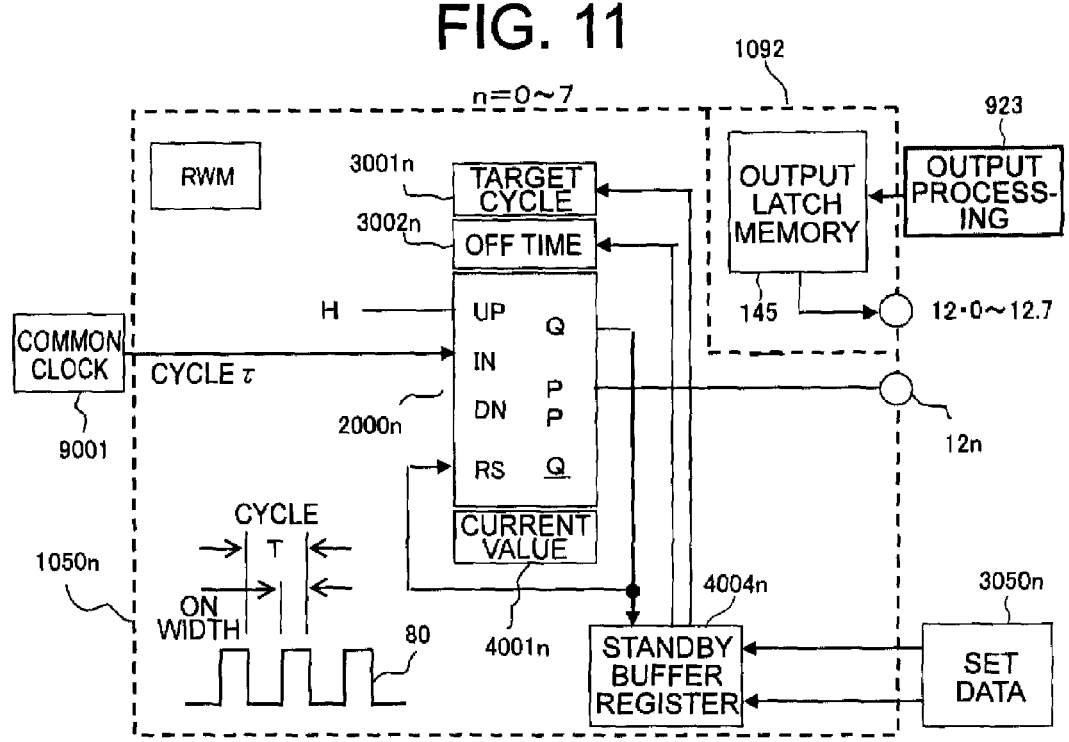
FIG. 11 is a block diagram illustrating the logic circuit unit illustrated in FIG. 4 configured as a PWM output circuit.
Figure 12:
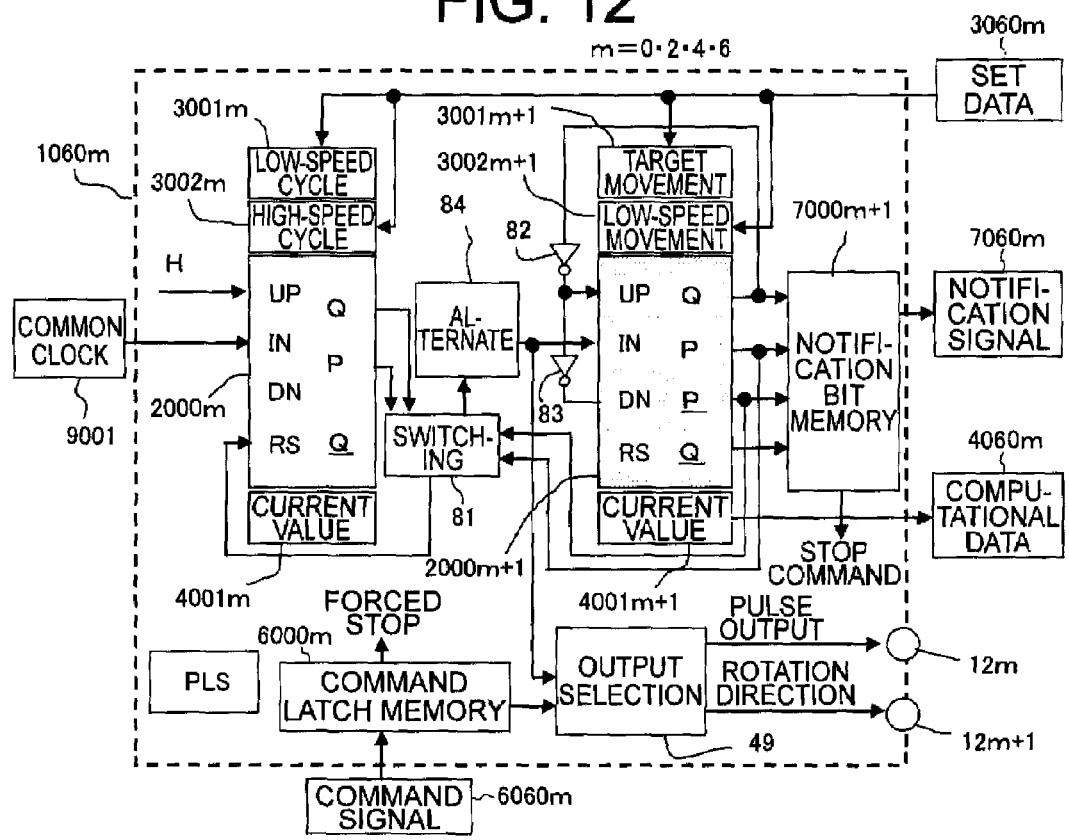
FIG. 12 is a block diagram illustrating the logic circuit unit illustrated in FIG. 4 configured as a first pulse output circuit.

Next, FIGS. 11 and 12 will be referred to. FIG. 11 is a block diagram illustrating the logic circuit unit 1000n shown in FIG. 4 which is used as a PWM output circuit 1050n, whereas FIG. 12 is a block diagram illustrating the logic circuit unit 1000n shown in FIG. 4 which is used as a first pulse output circuit 1060m. In FIG. 11, the reversible counter 2000n included in the PWM output circuit 1050n (n=0 to 7) counts up a clock signal generated from the common clock signal circuit 9001. The first setting register 3001n stores a target cycle T of a pulse width modulation signal 80, whereas the second setting register 3002n stores a target OFF time width of the pulse width modulation signal 80. The microprocessor 111 transmits set values as those described above by using set data 3050n to the standby buffer register 4004n. The content of the standby buffer register 4004n is transferred to the first setting register 3001n and the second setting register 3002n at the end of each cycle of the pulse width modulation signal 80.

When the current counter value of the current value register 4001n increases to reach the set value corresponding to the OFF time width stored in the second setting register 3002n, the count-up compare match output P operates to be fed from the channel terminal 12n through the output interface circuit 149Y and the output terminal 140Y to the corresponding channel of the electrical load 103y. Then, when the current counter value of the current value register 4001n further increases to reach the set value corresponding to the cycle stored in the first setting register 3001n, the count-up output Q operates. As a result, the reversible counter 2000n is reset. Then, the logic level of the compare match output P returns to "L" to switch the output from the channel terminal 12n OFF to reset the content of the current value register 4001n to zero. At the same time, the set data in the standby buffer register 4004n is transferred to the first setting register 3001n and the second setting register 3002n.

Therefore, the cycle T of the pulse width modulation signal 80 is equal to the product of a cycle τ of the clock signal and a set value N1 stored in the first setting register 3001n: τ×N1. Similarly, the OFF time width of the pulse width modulation signal 80 is equal to the product of the cycle τ of the clock signal and a set value N2 stored in the second setting register 3002n: τ×N2. Therefore, an ON time width of the pulse width modulation signal 80 output from the channel terminal 12n is calculated by: τ×(N1−N2). If an inverted logic output of the compare match output P is fed to the channel terminal 12n, the definition of ON/OFF is inverted. In this case, therefore, τ×N2 corresponds to the ON time width. Accordingly, in the case of logic inversion, the set value N2 stored in the second setting register 3002n corresponds to the ON time width.

On the other hand, in the general-purpose output circuit 1092, an ON/OFF state of an output image memory corresponding to a specific area in the device memory 114a is transmitted to the second port 12 through the output latch memory 145. The general-purpose output circuit 1092 is enabled for the channel terminal 12n which is not used for the special instruction. For example, when the channel terminal 12n is occupied as a high-speed pulse output described below, the general-purpose output circuit cannot be used for a general-purpose output. Therefore, the output image memory of the channel is required to be switched OFF.

In FIG. 12, the first pulse output circuit 1060m (m=0, 2, 4 or 6) is a pulse generating circuit suitable for a two-speed operation with a stepping motor, which includes a low-speed starting operation, a high-speed operation, a low-speed operation before stop, and a stop operation. The first pulse output circuit generates a first predetermined amount of pulses in a low-speed cycle, a second predetermined amount of pulses in a high-speed cycle, the first predetermined amount of pulses in the low-speed cycle again, and then stops the generation of pulses. The detailed description of the pulse generation is as follows. The first pulse output circuit 1060m includes a pair of reversible counters 2000m and 2000m+1. The former reversible counter 2000m counts up the clock signal generated from the common clock signal circuit 9001. The first setting register 3001m stores a numerical value corresponding to a half of the target cycle T of the low-speed output pulse, whereas the second setting register 3002m stores a numerical value corresponding to a half of the target cycle T of the high-speed output pulse.

When the current counter value of the current value register 4001m of the former reversible counter 2000m increases to reach any one of the set value N1 in the first setting register 3001m and the set value N2 in the second setting register 3002m (N2≦N1), the count-up output Q or the count-up compare match output P is generated to reset the reversible counter 2000m. At the same time, an output from an alternate output circuit 84 is inverted in an alternate manner. The selection of the set value to be used from those stored in the first and the second setting registers is determined by a logic operation of a switching circuit 81 described below. As a result of the reset of the reversible counter 2000m to return the value of the current value register 4001m to zero, the count-up output Q and the count-up compare match output P are reset to restart the counting of the clock signal.

As a result, assuming that the cycle τ of the clock signal generated from the common clock signal circuit 9001 is 1 μsec, a cycle of an output pulse from the alternate output circuit 84 is 2×N1 or 2×N2 (μsec). The output mode of the output selecting circuit 49 changes depending on the content of a parameter memory 8000m and that of a command latch memory 6000m. For example, the output selecting circuit 49 generates a reversible pulse output FRP for the channel terminal 12m and a rotation direction command output DIR for the adjacent channel terminal 12m+1, or generates a forward pulse output FP for the channel terminal 12m and a reverse pulse output RP for the adjacent channel terminal 12m+1.

The latter reversible counter 2000m+1 counts up and down the output signal from the alternate output circuit 84. A first setting register 3001m+1 of the reversible counter 2000m+1 stores a half value of a target total number of pulses to be generated. Based on the number of pulses to be generated, for example, a total amount of displacement of a stepping motor is determined. A second setting register 3002m+1 of the reversible counter 2000m+1 stores a target number of low-speed pulses to be generated. Based on the number of pulses to be generated, the amounts of displacement generated by a low-speed starting operation and by a low-speed operation before stop of the stepping motor are determined.

When the current counter value of the current value register 4001m+1 of the reversible counter 2000m+1 increases to reach a set value M2 in the second setting register 3002m+1, the count-up compare match output P is generated to cause the switching circuit 81 to switch and set a set cycle of the former reversible counter 2000m from a low-speed cycle to a high-speed cycle. When the current counter value of the current value register 4001m+1 of the reversible counter 2000m+1 further increases to reach a set value M1 (M2≦M1) in the first setting register 3001m+1, the count-up output Q is generated to cause the reversible counter 2000m+1 to start a subtractive operation with NOT elements 82 and 83. Then, upon operation of the count-down compare match output P̄, the switching circuit 81 is caused to switch and set the set cycle of the former reversible counter 2000m from the high-speed cycle to the low-speed cycle again.

When the current counter value of the current value register 4001m+1 of the reversible counter 2000m+1 further decreases to be zero again to cause the return output Q̄ to operate, each of the reversible counters stops the counting operation. Then, a notification signal 7060m notifies the microcomputer 111 of the completion of pulse generation. As a result, a total number of pulses generated by the first pulse output circuit 1060m is equal to the sum of the number of low-speed pulses M2 generated until the count-up compare match output P of the latter reversible counter 2000m+1 starts operating, the number of high-speed pulses (M1−M2) generated until the generation of the count-up output Q, the number of high-speed pulses (M1−M2) generated until the count-down compare match output P starts operating by the subtractive operation, and the number of low-speed pulses M2 generated until the return output Q̄ starts operating. Therefore, a total number of generated pulses is: M2+(M1−M2)+(M1−M2)+M2=2×M1. As described above, before and after the generation of high-speed pulses, M2 low-speed pulses are respectively generated.

When an odd total number of pulses is desired to be generated, "+1" or "−1" is stored in the current value register 4001m+1 as an initial value. The remaining even numbers are assigned to the set values Ml and M2. While the first pulse output circuit 1060m is not performing the counting operation, the microprocessor 111 transmits the set value for each of the first and second setting registers by using set data 3060m. At the same time, the microprocessor 111 transmits a rotation direction command signal by using a command signal 6060m to the command latch memory 6000m. The current value of the number of generated pulses indicated by the current value register 4000m+1 is transmitted by using computational data 4060m to the microprocessor 111.

The microprocessor 111 transmits a forward rotation limit stop command, a reverse rotation limit stop command, and a forced stop command by using the command signal 6060m to the command latch memory 6000m to stop the generation of pulses. The first pulse output circuit 1060m issues a rotation driving command to the stepping motor. Some drivers for driving the stepping motor have a forward driving terminal and a reverse driving terminal, and the others have a forward/reverse rotation driving terminal and a rotation direction command terminal. The first pulse output circuit 1060m can generate a pulse output according to each of the driving modes as described above.

In the above description, for the two-speed operation including the low-speed starting operation, the high-speed operation, the low-speed operation before stop and the stop operation, the set values for cyclically operating the former reversible counter as a ring counter are switched by the first and second setting registers, thereby obtaining a low-speed or high-speed output pulse cycle. The latter reversible counter 2000m+1 generates a count of the number of generated pulses and a speed switching command signal. In this speed switching control, the count-up compare match output P and count-down compare match output P̄, which operate in response to the generation of the number of generated low-speed pulses, are used. However, at the beginning of operation of the latter reversible counter 2000m+1, a negative number corresponding to the number of pulses generated in the low-speed operation is stored in the current value register 4001m+1, the number of pulses generated in the high-speed operation is set for the second setting register 3002m+1, and the sum of the number of pulses generated in the high-speed operation and the number of pulses generated in the low-speed operation before stop is set for the first setting register 3001m+1. In this manner, the reversible counter may perform the low-speed starting operation while the return output Q̄ is operating, the high-speed operation after the current counter value of the current value register 4001m+1 becomes positive, the low-speed operation before stop after the start of operation of the count-up compare match output P, and the stop operation upon generation of the count-up output Q.

Figure 13:
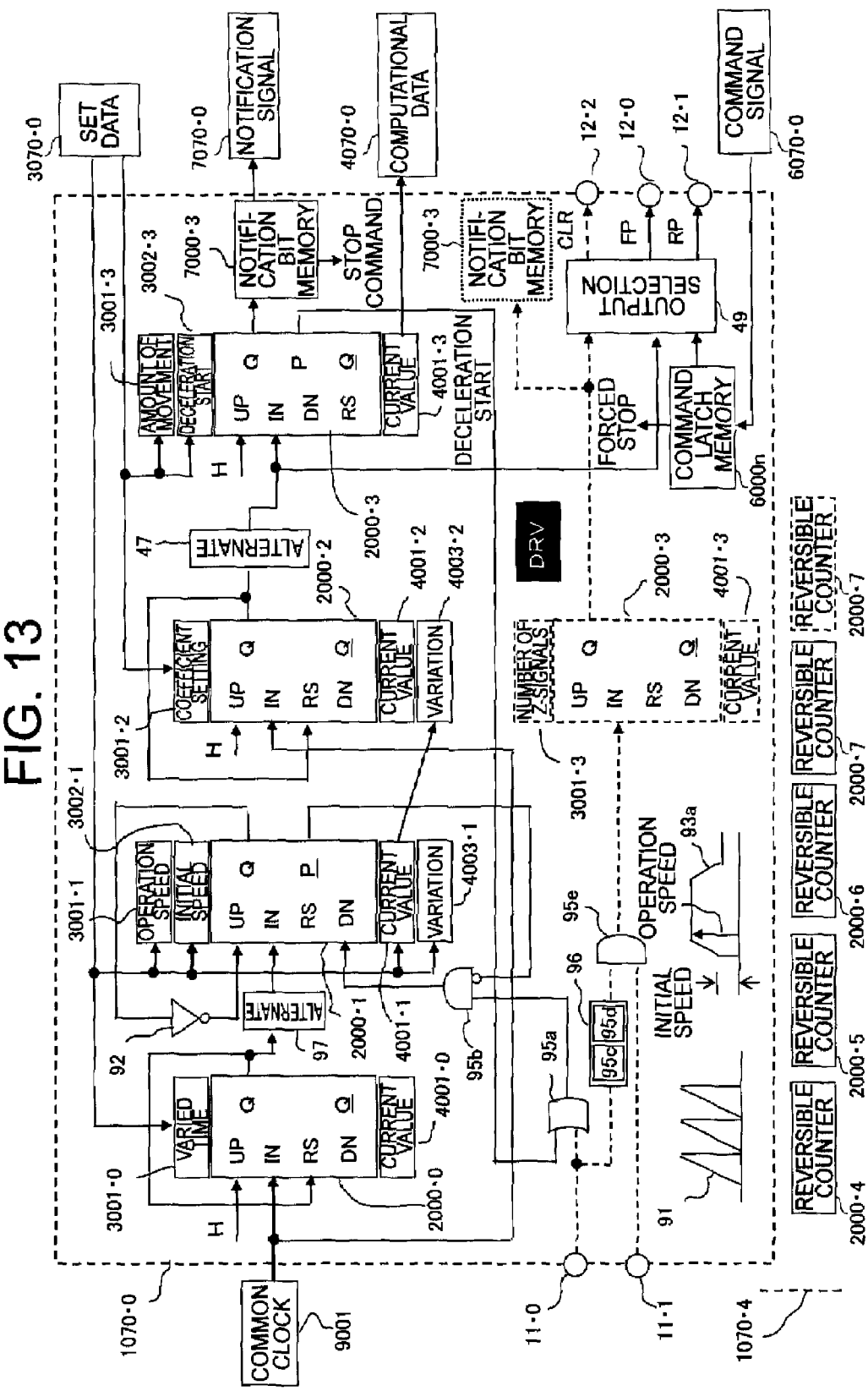
FIG. 13 is a block diagram illustrating the logic circuit unit illustrated in FIG. 4 configured as a second pulse output circuit.

Next, the description will be continued referring to FIG. 13. FIG. 13 is a block diagram illustrating the logic circuit unit 1000n shown in FIG. 4 which is used as a second pulse output circuit 1070k (k=0 or 4). The second pulse output circuit 1070k feeds a rotation pulse command to a servo amplifier which drives a servo motor. The second pulse output circuit 1070k feeds a forward rotation pulse or a reverse rotation pulse, or a forward/reverse rotation pulse and a rotation direction command to the servo motor. The second pulse output circuit 1070k is provided with an acceleration/deceleration control function for gradually increasing or decreasing a pulse frequency for slow start/slow stop of the servo motor. A partial modification of the circuit allows the second pulse output circuit 1070k to perform zero return control described below. Therefore, the second pulse output circuit 1070k is enabled by using the first port 11 and the second port 12 at the same time, and occupies two channel inputs, three channel outputs, and four reversible counters.

In FIG. 13, four reversible counters 2000•0, 2000•1, 2000•2 and 2000•3 are used in the second pulse output circuit 1070•0, whereas four reversible counters 2000•4, 2000•5, 2000•6 and 2000•7 are used in the second pulse output circuit 1070•4. Since the two reversible counters are the same, only the second pulse output circuit 1070•0 will be described below. The reversible counter 2000•0 in a first stage (hereinafter, referred to as the first reversible counter) counts up the clock signal generated from the common clock signal circuit 9001. The first setting register 3001•0 prestores a numerical value corresponding to a half of a target gradually increasing/decreasing step time Δt by using set data 3070•0. When the current counter value of the current value register 4001•0 of the first reversible counter 2000•0 increases to reach the set value N1 in the first setting register 3001•0, the count-up output Q is generated to reset the reversible counter 2000•0 and alternately invert the output from the alternate output circuit 97.

With the resetting of the reversible counter 2000•0 to return the value of the current value register 4001•0 to zero, the count-up output Q is also reset to restart the counting of the clock signals. As a result, a cycle of generation of the count-up output Q is equal to the product of the set value N1 and the clock signal cycle τ: N1×τ. A cycle of the output pulse from the alternate output circuit 97 is double of the cycle of generation of the count-up output Q: 2×N1×τ, which corresponds to the step time Δt. Therefore, the first reversible counter 2000•0 serves as means for generating a step time in a gradually increasing/decreasing pattern. A change in the current counter value of the current value register 4001•0 is represented by a sawtooth-like wave 91. The reversible counter 2000•1 in a second stage (hereinafter, referred to as the second reversible counter) counts up or down the output signals from the alternate output circuit 97. In response to a single count-up/-down command, a value of a gradually increasing/decreasing frequency Δf stored in the variation adjusting register 4003•1 is added to or subtracted from the value of the current value register 4001•1.

The reversible counter 2000•1 serves to generate a speed pattern 93A. For starting the operation of the second pulse output circuit 1070•0, initial setting with the set data 3070•0 is performed. A value of a pulse frequency f1 corresponding to a target operation speed is set in the first setting register 3001•1, a value of a pulse frequency f2 corresponding to a low-speed operation is set in the second setting register 3002•1, a value of a pulse frequency f0 corresponding to an initial speed at the start of operation is set in the current value register 4001•1, and a value of the gradually increasing/decreasing frequency Δf is set in the variation adjusting register 4003•1.

In general, however, the same value is used as the low speed and the initial speed, and therefore, f2=f0. As a result, each time the count input signal in the cycle Δt is input to the count input terminal IN, the gradually increasing frequency Δf is sequentially added to the value of the current value register 4001•1 which stores the pulse frequency f0 for the initial speed as an initial value. When the current value obtained as the result of addition reaches the pulse frequency f1 corresponding to the target operation speed stored in the first setting register 3001•1, the count-up output Q is generated to cause the output from a NOT element 92 to stop the count-up command input. As a result, even when a count input is generated, the current value register 4001•1 keeps a constant value.

However, when the reversible counter 2000•3 described below generates a deceleration start command, outputs from an OR element 95a and a gate element 95b allow the reversible counter 2000•1 to start a subtractive operation. Each time a count input signal in the cycle Δt is input to the count input terminal IN, the gradually decreasing frequency Δf is sequentially subtracted from the value of the current value register 4001•1. Then, when the value of the current value register 4001•1 becomes equal to or less than the low-speed frequency f2 (=f0) stored in the second setting register 3002•1, the logic level of the count-down compare match output P changes to "H" and the logic level of the output of the gate element 95b is inverted to "L". As a result, the subtractive operation is stopped. The current value register 4001•1 keeps the value of the low-speed frequency f2 (=f0).

The reversible counter 2000•2 in a third stage (hereinafter, referred to as the third reversible counter) sequentially adds an increment stored in the variation adjusting register 4003•2 to the current value register 4001•2 in response to the clock signal generated from the common clock signal circuit 9001. A predetermined coefficient K is stored in the first setting register 3001•2 by using the set data 3070•0 from the microprocessor 111. In the variation adjusting register 4003•2, the value of the current value register 4001•1 of the first reversible counter 2000•1 is sequentially stored for updating.

Therefore, the increment stored in the variation adjusting register 4003•2 is sequentially added to the current counter value of the current value register 4001•2 of the reversible counter 2000•2 by the ON/OFF operation of the clock signal input from the common clock signal circuit 9001. Then, when the current counter value reaches the coefficient K stored in the first setting register 3001•2, the count-up output Q is generated to self-reset the reversible counter 2000•2. Thereafter, the same operation is repeated. As a result, the cycle of generation of the count-up output Q becomes shorter as the increment stored in the variation adjusting register 4003•2 becomes larger. The output from the alternate output circuit 47 is a pulse output in a cycle inversely proportional to the increment stored in the variation adjusting register 4003•2. The pulse output is output to the channel terminals 12•0 and 12•1 through the output selecting circuit 49.

The output mode of the output selecting circuit 49 is determined based on the content of the parameter memory 8000•2. For example, the output selecting circuit 49 outputs the forward rotation pulse output FP and the reverse rotation pulse output RP, or the reversible pulse FRP and the direction signal output DIR. The last reversible counter 2000•3 counts up the output signal from the alternate output circuit 47 to count the number of generated pulses. A target number of pulses to be generated is stored in the first setting register 3001•3 of the reversible counter 2000•3, whereas the number of pulses generated before the start of deceleration is stored in the second setting register 3002•3. The set values as those mentioned above are transmitted in advance as the set data 3070•0 from the microprocessor 111.

When the reversible counter 2000•3 counts the number of generated pulses and then the number of generated pulses reaches the number of pulses generated before the start of deceleration, which is stored in the second setting register 3002•3, the logic level of the count-up compare match output P changes to "H" to start a subtractive operation of the reversible counter 2000•1 through the OR element 95a and the gate element 95b. When the reversible counter 2000•3 counts the number of generated pulses and then the number of generated pulses reaches the target number of pulses to be generated, which is stored in the first setting register 3001•3, the logic level of the count-up output Q changes to "H" to stop the operations of all the reversible counters to stop the generation of output pulses. At the same time, the microprocessor 111 is notified of the completion of operation by using a notification signal 7070•0. The microprocessor 111 can transmit a forward rotation limit stop command, a reverse rotation limit stop command, and a forced stop command as a command signal 6070•0 to the command latch memory 6000•0 to stop the generation of pulses. The operations indicated with a dotted line in FIG. 13 will be described below referring to FIG. 14.

Figure 14:
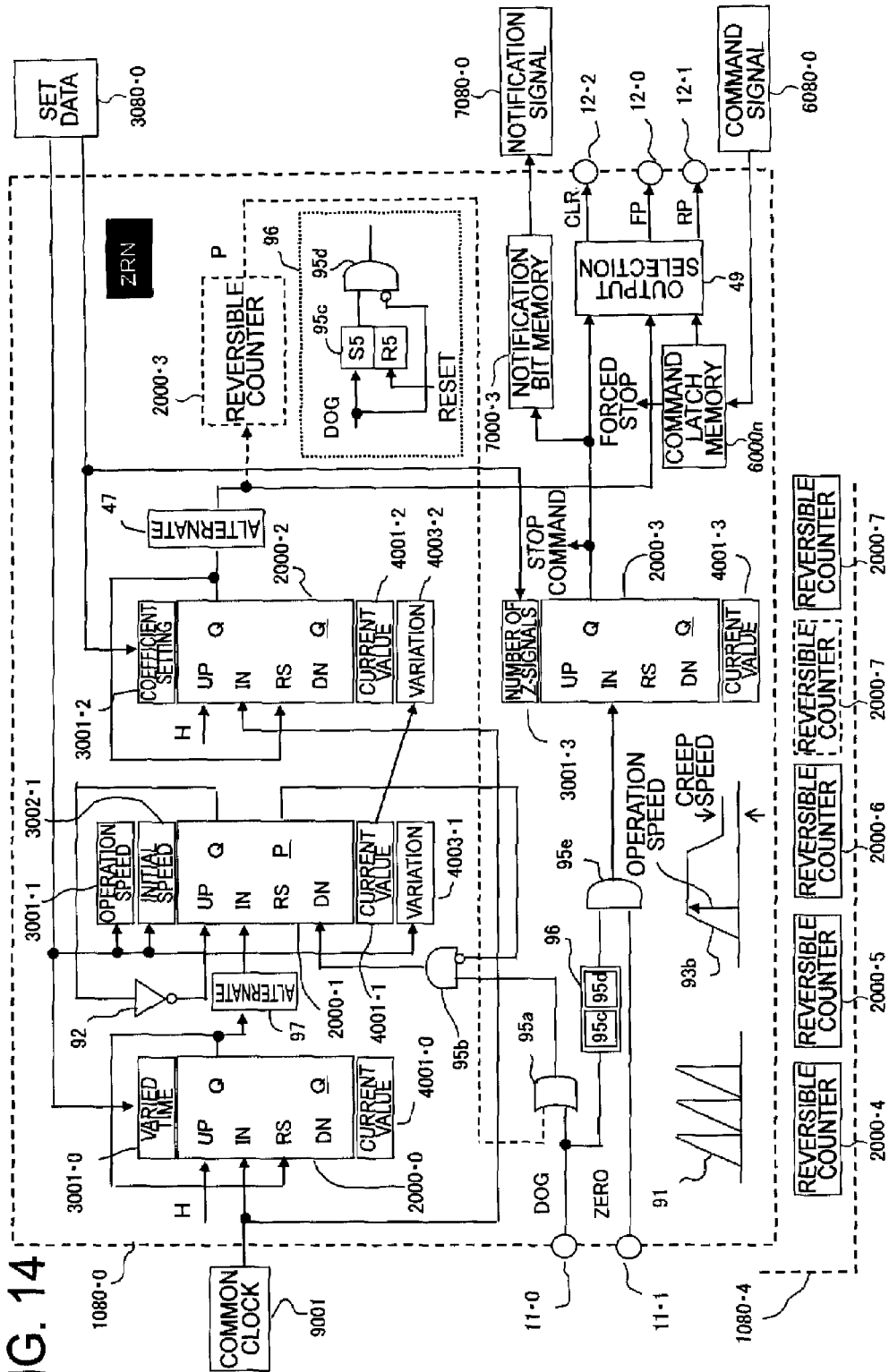
FIG. 14 is a block diagram illustrating the logic circuit unit illustrated in FIG. 4 configured as a modified pulse output circuit.

Next, FIG. 14 will be referred to mainly for the description of differences from FIG. 13. FIG. 14 is a block diagram illustrating the logic circuit unit 1000n shown in FIG. 4 which is used as a modified pulse output circuit 1080k (k=0 or 4). The modified pulse output circuit 1080k is obtained by partially modifying the second pulse output circuit 1070k illustrated in FIG. 13 with parameter change means 918 described below referring to FIG. 19. Since a special instruction to be used is a zero return instruction ZRN, set data for the respective units differ from those in FIG. 13.

In FIG. 14, the first reversible counter 2000•0 operates in exactly the same manner as in FIG. 13. The reversible counter 2000•0 performs a repeated operation corresponding to the gradually increasing/decreasing step time set in the first setting register 3001•0 while counting up the clock signal generated from the common clock signal circuit 9001. The current counter value of the current value register 4001•0 varies as represented by the sawtooth-like wave 91. The second reversible counter 2000•1 operates in approximately the same manner as in FIG. 13 to generate a speed pattern as represented by a characteristic diagram 93b.

In the case of FIG. 14, however, the initial speed is not set for the current value register 4001•1. Therefore, the speed gradually increases from zero as a speed increasing pattern. Moreover, the start of the subtractive operation of the reversible counter 2000•1 depends on an operation of a near-point dog signal DOG input from the channel terminal 11•0. The near-point dog signal DOG feeds a count-down command to the reversible counter 2000•1 through the OR element 95a and the gate element 95b based on a switch signal which performs an ON operation at a near point of a mechanical origin.

Furthermore, in a deceleration completion stage, a constant speed corresponding to a creep speed stored in the second setting register 3002•1 is kept. The constant speed is kept to stop the count-down operation through the gate element 95b by the count-down compare match output P̄. The third reversible counter 2000•2 operates in exactly the same manner as in FIG. 13. The current value of the second current value register 4001•1 is sequentially transferred to the variation adjusting register 4003•2. The reversible counter 2000•2 generates a pulse output in a cycle inversely proportional to a frequency corresponding to the operating speed for the channel terminals 12•0 and 12•1.

The last reversible counter 2000•3 counts up a zero-phase signal generated from an encoder provided for a servo motor. A count signal input to the reversible counter is an output signal from an AND element 95e. A holding circuit 95c stores the transition of the near-point dog signal DOG from OFF to ON to bring the logic level of the channel terminal 11•0 from "L" to "H. The logic level of an output from a gate element 95d is brought to "H" by the transition of the near-point dog signal DOG from ON to OFF after the holding circuit 95c is set.

As a result, a zero-point signal ZERO input to the channel terminal 11•1 is input to the count input terminal IN of the reversible counter 2000•3 through the AND element 95e. A count start determination circuit 96 for the zero-point signal includes the holding circuit 95c and the gate element 95d. The relation between the near-point dog signal DOG and the zero-point signal ZERO will be specifically described below referring to FIG. 28. The logic level of the near-point dog signal DOG changes to "H" in the vicinity of the origin, and then returns to "L" when the deceleration is almost completed. Thereafter, the reversible counter 2000•3 starts counting the zero-point signal ZERO.

When the current counter value of the current value register 4001•3 of the reversible counter 2000•3 reaches the number of zero-point signals, which is prestored in the first setting register 3001•3, the count-up output Q is generated to stop the operations of all the reversible counters and the generation of pulse outputs. The reversible counter 2000•3 generates a clear signal CLR for the channel terminal 12•2 via the output selecting circuit 49, resets the holding circuit 95c, or transmits an operation completion signal to the microprocessor 111 by using a notification signal 7080•0. The clear signal CLR, which is output to the channel terminal 12•2, is used for initializing the servo amplifier. In FIG. 14, the reversible counter 2000•3, which is used to count the number of generated pulses in FIG. 13, also serves to count the number of zero-point signals to keep down the number of reversible counters to be used.

Next, the description will be made referring to FIG. 15. FIG. 15 illustrates an exemplary structure of the device memory 114a illustrated in FIG. 1. In FIG. 15, one hundred twenty-eight input relays are identified by octal-digit numbers X000 to X177. Each of the input relays is a virtual electronic relay driven by each of the ON/OFF switch sensors X000 to X177 connected to the input terminal of the programmable controller 100A. The input relay has innumerable normally open contacts and normally closed contacts, and can be used in a user's sequential program. Further, for example, one hundred twenty-eight output relays are identified by octal-digit numbers Y000 to Y177. Each of the output relays drives an electrical load externally connected by a single output element connected to the output terminal of the programmable controller 100A, such as an electromagnetic relay, a transistor or a triac. The output relay has innumerable normally open contacts and normally closed contacts corresponding to virtual electronic contacts, and can be used in the user's sequential program.

Auxiliary relays M0000 to M8999 identified by decimal-digit numbers are virtual electronic relays. Each of the auxiliary relays has innumerable normally open contacts and normally closed contact corresponding to virtual electronic contacts, and can be used in the user's sequential program. A part of the auxiliary relays are special auxiliary relays whose operation is defined by the manufacturer. For example, the auxiliary relay M8000 is a special auxiliary relay which is automatically driven upon start of an operation of the programmable controller 100A. The user can use contact information of the special auxiliary relay in the sequential program.

Timers T000 to T255 identified by decimal-digit numbers are virtual electronic timers, each including a 16-bit set value register, a current value register, a measured time output contact, and a reset coil. When the timer is driven by the sequential program, the timer outputs a time-up output with elapse of time. As a result, innumerable normally open contacts and normally closed contacts corresponding to virtual electronic output contacts can be used in the user's sequential program.

Counters C000 to C255 identified by decimal-digit numbers are virtual counters, each including a 16-bit set value register, a current value register, a count-up output, and a reset coil. When the counter is driven/stopped by the sequential program, the number of driven times of the counter is counted. When the number of driven times reaches a target number, the counter outputs a count-up output. As a result, innumerable normally open contacts and normally closed contacts corresponding to virtual electronic output contacts can be used in the user's sequential program. Therefore, the counter cannot count an input signal operating faster than the computation cycle of the programmable controller.

Data registers identified by decimal digit numbers D0000 to D8999 are 16-bit word devices. The combination of two adjacent data registers allows 32-bit data to be handled. A part of the data registers are special data registers whose application is defined by the manufacturer. For example, a battery voltage is stored in a data register D8005, whereas a scanning time is stored in a data register D8010. Destinations of storage of operating states or current value/set value information of multiple devices as those described above are allocated to the device memory according to device numbers. Some of the auxiliary relays, the timers, the counters and the data registers are battery backed-up, while the others are not. The two types are identified based on the range of device numbers.

Next, FIG. 16 illustrating an exemplary structure of the high-speed counter number shown in FIG. 1 will be referred to. In FIG. 16, the types of high-speed counters are roughly classified into: 1-phase 1-input without PS input; 1-phase 1-input with PS input; 1-phase 2-input; and 2-phase 2-input with single edge evaluation, double edge evaluation, and quad edge evaluation. The high-speed counters are respectively provided with non-overlapping extension numbers bb=00 to 96. On the other hand, the input terminals of the special unit are provided with numbers from X0 to X7. The first two digits of the input number correspond to a placement number determined by the position of connection of the special unit. As is apparent from FIG. 1, the placement number ** of the input connected to the first port 11 in the special unit 130 is 01. A placement number is determined as an octal-digit number for each unit of eight inputs in the order of units closer to the CPU unit 110A. Therefore, the input numbers for the first port 11 of the special unit 130 are X010 to X017, and the last digit number 0 to 7 serves as a channel number.

A high-speed counter number is represented by Cbbn. For example, a high-speed counter number C20010 indicates a 1-phase 2-input high-speed counter including an input terminal X010, to which a count-up signal U is input, and an input terminal X011, to which a count-down signal D is input. Since the extension numbers bb are allocated not to overlap each other, the high-speed counter can be identified by the extension number bb even without the channel number n. Therefore, the channel number n is merely a reference notation, and Cbb is an official high-speed number in a strict sense.

In the case of the 1-phase 1-input high-speed counter, the count-up/-down direction is designated by a program in a high-speed counter instruction HSC. A reference symbol P in FIG. 16 indicates that the high-speed counter is provided with a preset command input terminal. For example, in the case of a high-speed counter C10010, X010 is a count input signal terminal, whereas X011 is a preset command input terminal. When an ON/OFF switch signal connected to the input terminal is switched ON, predetermined preset data based on the sequential program is transferred to the current value register of the high-speed counter C10010.

A reference symbol S in FIG. 16 indicates that the high-speed counter is provided with a count start command input terminal. For example, in the case of a high-speed counter C11011, X011 is a count input signal terminal, whereas X010 is a count start command input terminal. The high-speed counter C11011 holds a counting operation until an ON/OFF switch signal connected to the input terminal is switched ON. On the other hand, in the case of a high-speed counter without the count start command input signal S, the high-speed counter starts a counting operation upon execution of the high-speed counter instruction HSC. For the command terminals P and S, the above description is applied to the other high-speed counters.

In the 2-phase 2-input high-speed counter designated by the extension numbers bb=40 to 96, pulse signals in two phases, i.e., the A-phase and the B-phase, which have a phase difference of 90 degrees, are respectively applied to the count input terminals. For example, when the logic level of the A-phase signal is "H" upon transition of the logic level of the B-phase signal from "L" to "H", the high-speed counter performs a count-up operation. On the other hand, when the logic level of the A-phase signal is "L", the high-speed counter performs a count-down operation. In this manner, the mode of counting only a rising logic transition of the B-phase signal is referred to as single edge evaluation. In double edge evaluation, both rising and falling logic transitions of the B-phase signal are counted. In quad edge evaluation, both rising and falling logical transitions of the A-phase and the B-phase signals are counted. In the case of a variable filter instruction REF, a pulse density measurement instruction FREQ, and a pulse width measurement instruction PWD which are described below, the extension number bb is not needed. Moreover, the variable filter instruction REF can be used for the input, for which the high-speed counter instruction HSC, the pulse density measurement instruction FREQ, or the pulse width measurement instruction PWD is not used.

Next, FIG. 17 illustrating an exemplary structure of the high-speed output numbers shown in FIG. 1 is referred to. In FIG. 17, outputs, for which various high-speed output instructions PLS, DRV, and ZRN are used, are provided with extension numbers bb=00 to 15 which do not overlap each other. On the other hand, the output terminals of the special unit are provided with numbers ranging from Y0 to Y7. The first two digits of the output number constitute a placement number determined by the position of connection of the special unit. As is apparent from FIG. 1, the placement number ** of the output connected to the second port 12 in the special unit 140 is 02. As the placement number, one octal number is determined for each unit of eight outputs, in the order of the output units closer to the CPU unit 110A.

Therefore, the output numbers for the second port 12 of the special unit 140 are Y020 to Y027. The last digit of the output number corresponds to a channel number. The high-speed output number is denoted by Ybbn. For example, a high-speed output number Y02022 is used for a first pulse output instruction PLS. The forward rotation pulse output FP is output to an output terminal Y022, whereas the reverse rotation pulse output RP is output to an output terminal Y023. Since the extension numbers bb are allocated not to overlap each other, the high-speed output can be identified by the extension number bb even without the channel number n. Therefore, the channel number n is a mere reference notation, and Ybb is an official high-speed output number in a strict sense.

FIG. 17 also illustrates a direction signal output denoted by DIR and a reversible pulse output denoted by FRP. For example, in the case of the extension number 01, the reversible pulse is output to the output terminal Y021. Whether the output reversible pulse is treated as a forward rotation pulse or a reverse rotation pulse is determined based on the logic level of the direction signal output from the output terminal Y020. FIG. 17 also illustrates a clear signal output CLR which commands the servo amplifier which drives the servo motor to perform initialization. In FIG. 17, an output terminal which generates a pulse width modulation signal output is denoted by PWM. The output terminals as those described above cannot be used in an overlapping manner. The output which is not occupied by the high-speed output instruction can be used as a general-purpose output. For the PWM outputs and the general-purpose outputs, the extension number bb is not required.

(2) Detailed Description of the Functions and Operation

Figure 18:
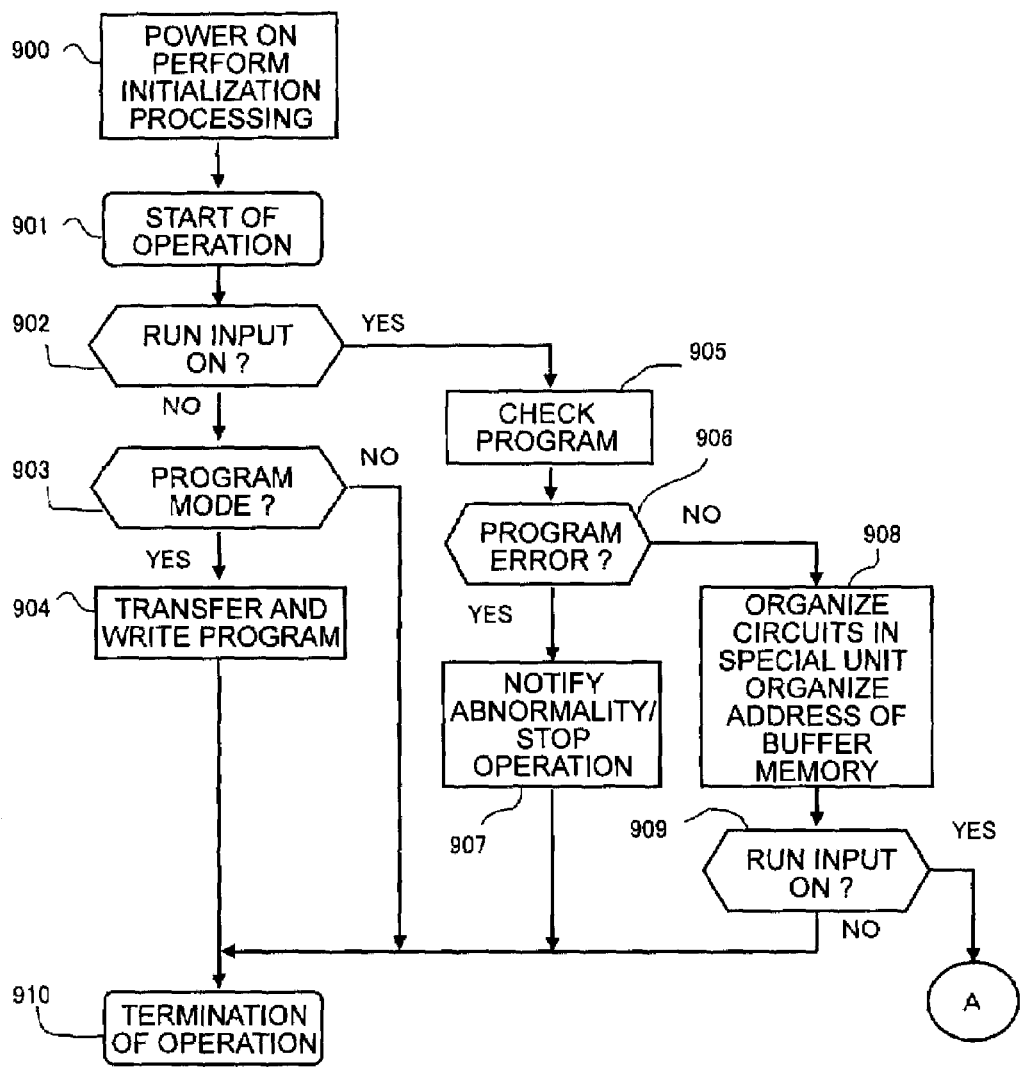
FIG. 18 is a flowchart illustrating a basic operation of the programmable controller illustrated in FIG. 1.
Figure 19:
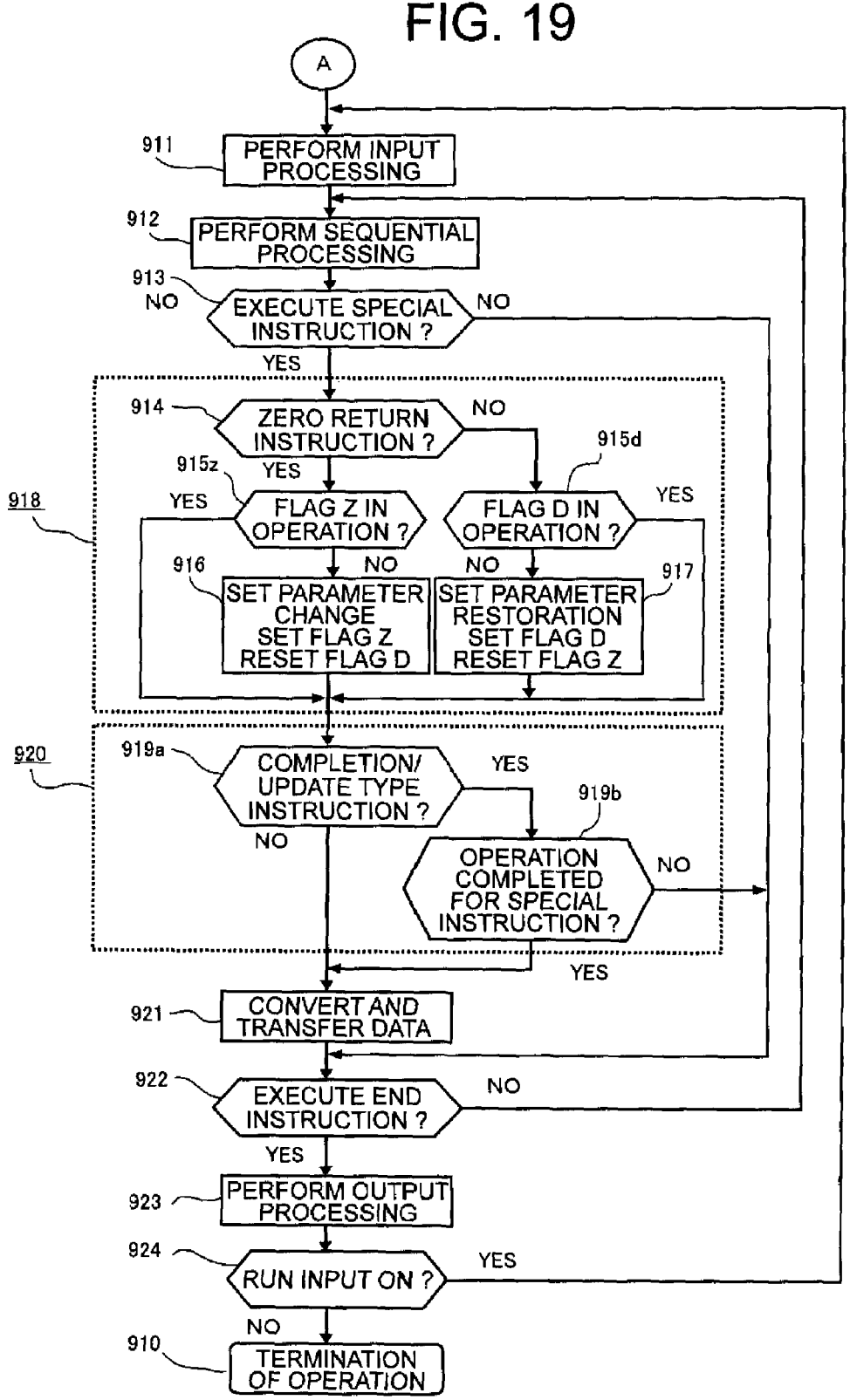
FIG. 19 is a flowchart following the flowchart illustrated in FIG. 18.

Regarding the programmable controller configured as described above, its functions and operation will be first described in detail based on FIGS. 18 and 19 which are flowcharts for illustrating a basic operation. In FIG. 18, the programmable controller 100A is powered ON in Step 900. As a result, power activation is detected in the programmable controller 100A to initialize each of the units. Subsequently, in Step 901, the microprocessor 111 starts operating. In subsequent Step 902, it is determined whether or not a RUN switch for operation/stop command (not shown) is switched ON. If the RUN switch is turned ON to be in an operating state, it is determined as YES and the process proceeds to Step 905 (setting abnormality detection means). If the RUN switch is OFF, it is determined as NO and the process proceeds to Step 903.

In Step 903, it is determined whether or not the external tool 108 is connected and a program mode is set. If the program mode is set, it is determined as YES and the process proceeds to Step 904. If the external tool is not connected or a monitor mode is set even though the external tool is connected, it is determined as NO and the process proceeds to Step 910 corresponding to an operation completion step (hereinafter, referred to simply as Step 910). In Step 904, after the sequential program is transmitted by the external tool 108 to the program memory 113A, the process proceeds to Step 910. In Step 910, after the other control operations are performed, the process returns to Step 901 where the operation is started. Then, the above-described operation is repeated. Therefore, if it is determined NO in both Steps 902 and 903, the microprocessor 111 operates cyclically through Steps 901, 902, 903, 910 and again 901 to wait for the switch-ON of the RUN switch in Step 902 or the setting of the program mode in Step 903.

Then, when the RUN switch is switched ON, programs in the program memory 113A are first checked in Step 905. One of the program checks is the determination of types of the I/O interface circuits connected to the first and the second ports based on the card information stored in the card information storage memory 9000 to determine if the types of the I/O interface circuits and the content of the instruction corresponding to the special unit stored in the program memory 113A correspond to each other. Besides, the I/Os of the special unit illustrated in FIG. 16 and 17 are checked not to be used in an overlapping manner. For example, if the high-speed counters with the extension numbers 01 and 10 are used, the input X011 is used in an overlapping manner. Therefore, an error is detected. In subsequent Step 906, if abnormality is detected in the program check performed in Step 905, it is determined as YES and the process proceeds to Step 907. If no abnormality is detected, it is determined as NO and the process proceeds to Step 908 (organization processing means). In Step 907, an abnormality notification command is generated for the display unit 117. At the same time, the operation is stopped to proceed to Step 910 (operation completion step).

In Step 908, circuit organization information is transmitted to the parameter memory 8000n of the special unit based on the content of the program memory 113A. At the same time, the organization of allocation of the buffer memory 114b storing communication data for the special unit is performed. In the special unit which has received the circuit organization information, the circuit of each of the logic circuit units 1000n is specifically organized based on the received parameters. In Step 909, it is checked again whether or not the RUN switch is ON. If the RUN switch is OFF, it is determined as NO and the process proceeds to Step 910. If the RUN switch is ON, it is determined as YES and the process proceeds to Step 911 (input processing means) in FIG. 19 through a relay terminal A.

In FIG. 19, in Step 911, accesses are sequentially made to the data selectors 124, 134 and 144 provided respectively for the I/O units 120, 130 and 140 to transfer and write the ON/OFF state of the ON/OFF switch signal connected to each of the input terminals to the input image memory allocated in the device memory 114a. In subsequent Step 912, the sequential program stored in the program memory 113A is sequentially read and executed in response to each instruction. In subsequent Step 913, it is determined whether or not the instruction read in Step 912 is for executing a special instruction for the special unit. If the instruction is not for executing the special instruction, it is determined as NO and the process proceeds to Step 922. In Step 922, it is determined whether or not the instruction is an END instruction for the completion of the sequential program. If the instruction is not the END instruction, it is determined as NO and the process returns to Step 912. Therefore, when the special instruction is not used, a cyclic operation through Steps 912, 913, 922 and again 912 is performed to sequentially execute general sequential instructions.

However, if it is determined as YES in Step 913 to read the special instruction, the process proceeds to Step 914. In Step 914, it is determined whether or not the read special instruction is the zero return instruction ZRN. If the special instruction is the zero return instruction ZRN, it is determined as YES and the process proceeds to Step 915z. If not, it is determined as NO and the process proceeds to Step 915d. In Step 915z, it is determined whether or not a flag Z has already been set in subsequent Step 916. If the flag Z has already been set, it is determined as YES and the process proceeds to Step 919a. If not, it is determined as NO and the process proceeds to Step 916.

In Step 916, the circuit organization data for organizing the modified pulse output circuit 1080•0 or 1080•4 illustrated in FIG. 14 is transmitted to the parameter memory 8000n to set the circuit organization completion flag Z. At the same time, after resetting the flag D, which is set in subsequent Step 917, the process proceeds to Step 919a. In Step 915d, it is determined in subsequent Step 917 whether or not the flag D has already been set. If the flag D has already been set, it is determined as YES and the process proceeds to Step 919a. If not, it is determined as NO and the process proceeds to Step 917. In Step 917, the circuit organization data for organizing the second pulse output circuit 1070•0 or 1070•4 illustrated in FIG. 13 is transmitted to the parameter memory 8000n to set the circuit organization completion flag D. At the same time, after resetting the flag Z, which is set in Step 916 described above, the process proceeds to Step 919a.

In Step 919a, it is determined whether or not the special instruction read in Step 912 is a special instruction for making an operation completion notification. If the special instruction is for making the operation completion notification, it is determined as YES and the process proceeds to Step 919b. If not, it is determined as NO and the process proceeds to Step 921. In Step 919b, it is determined whether or not the operation completion notification for the executed special instruction has been obtained. If the completion notification has been obtained, it is determined as YES and the process proceeds to Step 921. If not, it is determined as NO and the process proceeds to Step 922. In Step 921, after another set data for the read special instruction is transmitted, the process proceeds to Step 922. In Step 921, after the set data designated by the special instruction is converted into data which is easily handled in the special unit, the converted data is transferred to the buffer memory 114b. Then, the data is transmitted from the buffer memory 114b to the corresponding special unit.

For example, when the special instruction is the first pulse output instruction PLS for the first pulse output circuit 1060m described above referring to FIG. 12 and the special instruction designates the pulse frequency and the number of generated pulses, the pulse frequency is converted into a pulse cycle corresponding to an inverse of the pulse frequency in Step 921. Then, the obtained pulse cycle and the number of generated pulses are transmitted to the special unit. Since the special unit is configured to make a completion notification as the notification signal 7060m at the completion of generation of the designated number of pulses, the process does not proceed to Step 921 based on the determination in Step 919b until the completion of the generation of pulses. As a result, new set data is not transmitted.

In the above-described manner, the sequential program stored in the program memory 113A is sequentially executed. Then, when the END instruction for the completion of the program is read, it is determined as YES in Step 922 and the process proceeds to Step 923. In Step 923, accesses are sequentially made to the latch memories 125, 135 and 145 respectively provided for the I/O units 120, 130 and 140 to sequentially transfer and write the content of the output image memory allocated in the device memory 114a to the respective latch memories. However, for the output in the special unit, to which the special instruction is applied, the content of the output image memory is required to be in the OFF state.

At the completion of the output processing in Step 923, the process proceeds to Step 924. After the verification that the RUN switch is switched ON again, the process returns to Step 911 to cyclically execute the input processing, the sequential processing, and the output processing in the above-described manner. Some programmable controllers perform a batch processing of the input processing and the output processing before or after the sequential processing, and the other programmable controllers directly read the input information or directly perform the output processing at appropriate timing during the sequential processing. Although the batch processing method is herein described for convenience, the direct processing method can also be used. The above-described operation flow includes Step 905 corresponding to the setting abnormality detection means, Step 908 corresponding to the organization processing means, Step 911 corresponding to the input processing means, Step block 918 composed of Steps 914 to 917, corresponding to the parameter modification means, Step block 920 composed of Steps 919a and 919b, corresponding to transfer inhibition means, Step 921 corresponding to data conversion/transfer means, and Step 923 corresponding to the output processing means.

Figure 20:
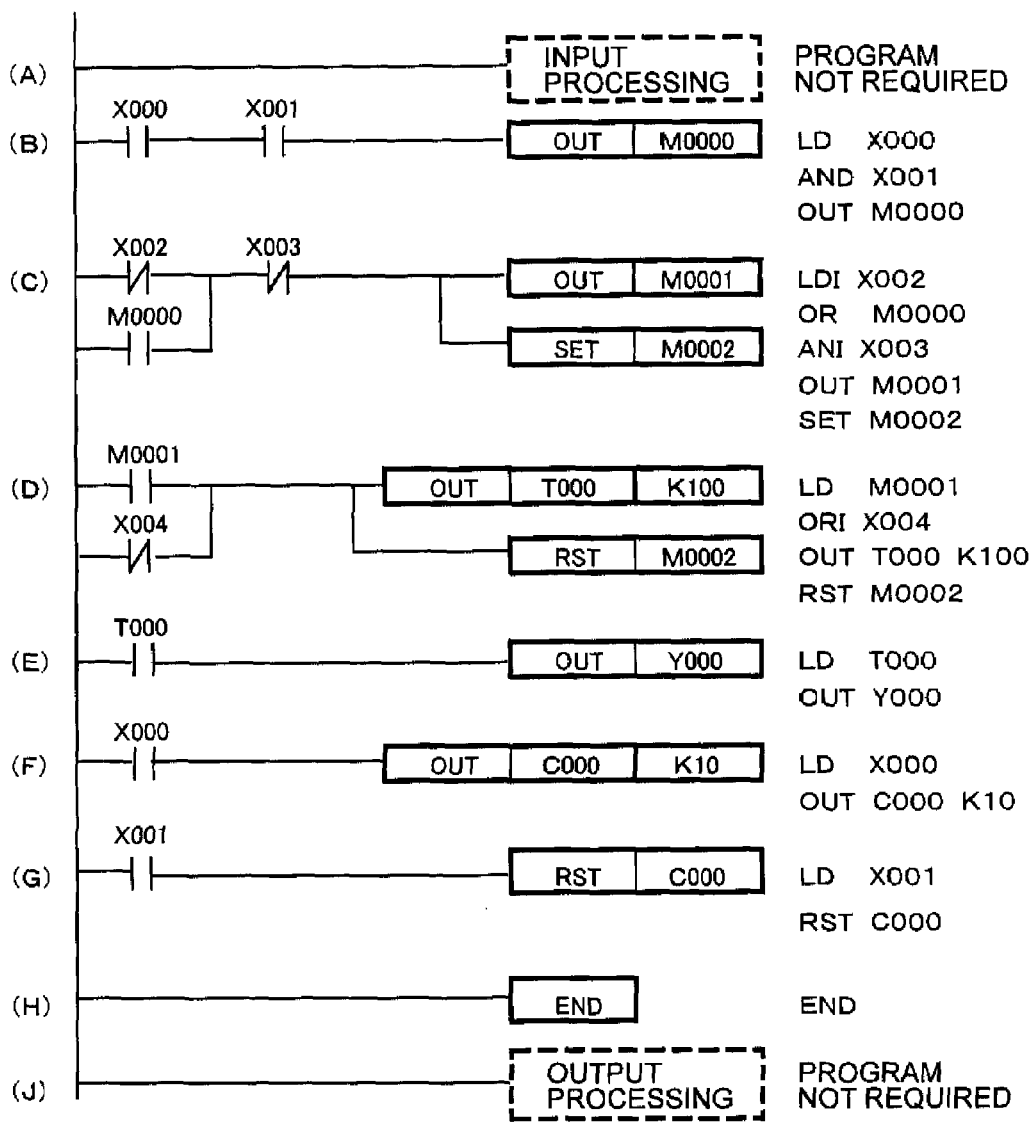
FIG. 20 is a general sequence control circuit diagram of the programmable controller illustrated in FIG. 1.

Next, FIG. 20 is a general sequential control circuit diagram of FIG. 1. In FIG. 20, FIGS. 20(A) and 20(J) respectively correspond to Steps 911 and 923 in FIG. 19. These I/O processings are executed by the control program in the system memory 112A, and therefore, the user is not required to execute the program. FIGS. 20(B) to 20(H) correspond to the sequential processing in Step 912 in FIG. 19, and FIG. 20(H) illustrates the END instruction for the completion of the sequential program.

FIG. 20(B) illustrates a circuit block for driving the auxiliary relay M0000 when the input relays X000 and X001 are both in the ON state. A computation start instruction LD and a serial contact instruction AND for the normally open contact, and a coil driving instruction OUT are used. FIG. 20(C) illustrates a circuit block for driving the auxiliary relay M0001 and driving the auxiliary relay M0002 in a self-holding manner when the input relay X002 does not operate or the auxiliary relay M0000 operates, and the input relay X003 does not operate. A computation start instruction LDI for the normally closed contact and a parallel contact instruction OR, and a serial contact instruction ANI for the normally closed contact, the coil driving instruction OUT, and a self-holding driving instruction SET are used. In the case of the coil driving instruction OUT, when a contact for driving the coil is closed, the coil is activated to be driven. On the other hand, when the contact is open, the coil is inactivated. In the case of the self-holding driving instruction SET, however, once the auxiliary relay is driven, the operating state is kept even when the driving circuit is closed.

FIG. 20(D) illustrates a circuit block for driving the timer T000 and canceling the self-holding state of the auxiliary relay M0002 when the auxiliary relay M0001 is driven or the input relay X004 operates. The computation start instruction LD for the normally open contact, and the parallel contact instruction ORI for the normally closed contact, the coil driving instruction OUT, and a self-holding canceling instruction RST are used. The driving instruction OUT for the timer has an operand for setting a delay operation time. For example, the operand K100 indicates a delay operation time of 100 seconds. However, in some range of timer numbers, a different time unit is used. For example, some timers are set in msec.

FIG. 20(E) illustrates a circuit block for driving the output relay Y000 when a delay operation contact T000 is closed after the elapse of a predetermined time from the start of driving of the timer T000. The LD instruction and the OUT instruction are used in this circuit block. FIG. 20(F) illustrates a circuit block for driving a counter C000 by the input relay X000. The LD instruction and the OUT instruction are used in this circuit block. The driving instruction OUT for the counter has a target number K of operation times as an operand.

The counter C000 illustrated in the circuit block in FIG. 20(F) signifies that the output contact C000 is closed when the number of switching operations of the input relay X000 reaches a target number, i.e., 10. Therefore, if the input relay X000 performs a switching operation in a cycle shorter than the computation cycle of the programmable controller 100A, the counting operation is not performed. FIG. 20(G) illustrates a circuit block for resetting the counter C000 when the input relay X001 starts operating. The LD instruction and the RST instruction are used in the circuit block. The RST instruction for the counter cancels the operation of the output contact of the counter and resets the current count value of the counter.

The computation cycle for sequentially executing the sequential program stored in the program memory 113A to perform the cyclic operation is varied depending on the content of the instruction and the number of instructions to be used. In general, for example, the computation cycle is about 10 to 100 msec. In order to avoid an erroneous operation due to noise, a response delay time of, for example, about 10 msec is provided by a noise filter for the input signal terminal. Therefore, in the case of the counter C000 illustrated in FIG. 20(F), for example, even when the computation cycle is 10 msec, a correct counting operation cannot be performed without an ON time width and an OFF time width, each being of 20 msec or longer. Therefore, a countable frequency is 25 Hz or less. Moreover, when the pulse signal is to be output by the sequential program, a high-speed pulse of 50 Hz or higher cannot be output if the computation cycle is 10 msec. On the other hand, the high-speed counter or the high-speed pulse output described below takes account of the handling of a pulse signal of, for example, 100 KHz or less.

Figure 21:
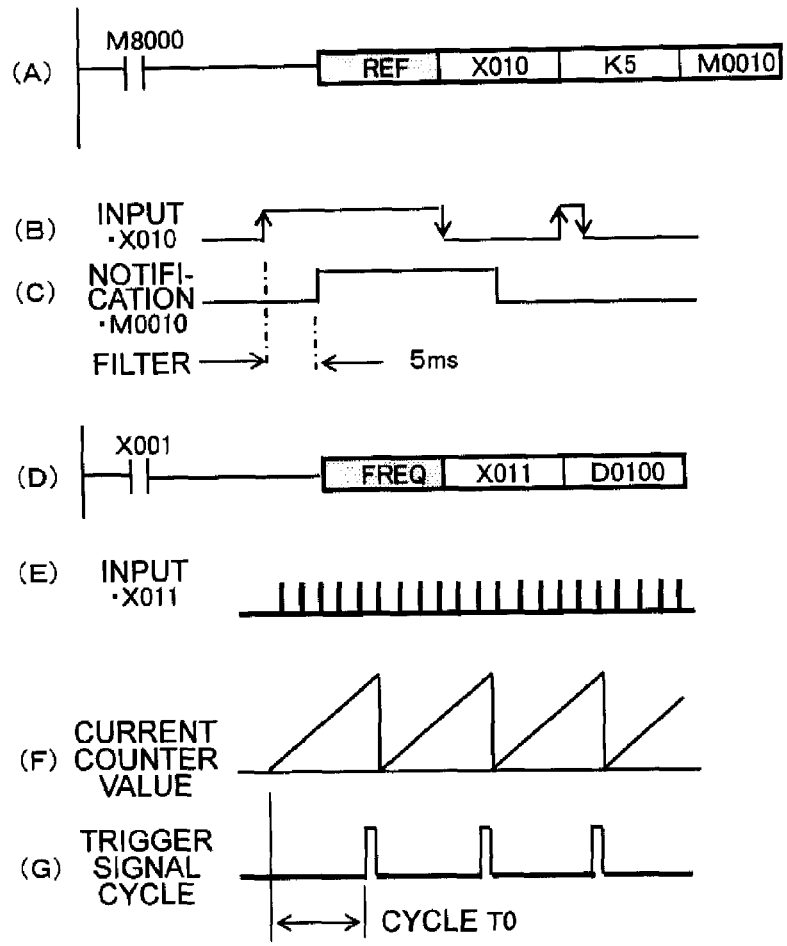
FIG. 21 is a view illustrating an exemplary use of a variable filter instruction and a pulse density measurement instruction.
Figure 22:
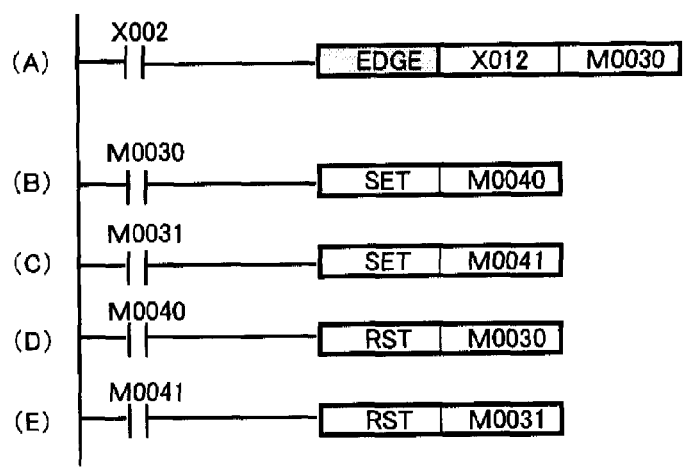
FIG. 22 is a view illustrating an exemplary use of an edge detection instruction corresponding to FIG. 22.

Next, FIGS. 21 and 22 illustrating an exemplary use of the variable filter instruction REF, the pulse density measurement instruction FREQ, and the edge detection instruction EDG will be referred to. FIG. 21(A) illustrates a circuit block for applying the variable filter instruction REF to the input X010 of the special unit 130 to set the filter constant to K5 (5 msec) to drive the auxiliary relay M0010 when the special auxiliary relay M8000 is closed. The special auxiliary relay M8000 is automatically activated when the RUN switch of the programmable controller 100A is in the ON state. Therefore, when the ON/OFF switch sensor X010 connected to the special unit 130 performs an ON/OFF operation as illustrated in FIG. 21(B), a response delay of 5 msec is generated as illustrated in FIG. 21(C) for the input signal stored in the notification bit memory 7000n (in this case, n=0) in FIG. 5. As a result, when the ON/OFF switch sensor X010 performs the ON operation for a short time, the notification signal M0010 is not recognized.

The notification signal 7010n based on the notification bit memory 7000n is transferred to the auxiliary relay M0010 of the device memory 114a upon execution of the REF instruction. For a second operand of the REF instruction, for example, a time from 1 to 63 msec can be set as a target response delay time. The cycle T of the clock signal generated from the common clock circuit 9001 illustrated in FIG. 5 is, for example, 1 μsec. The upper limit set value of the reversible counter 2000n for obtaining 1 msec as the response delay time is 1000. Therefore, the microprocessor 111 transfers a numerical value of 5000 obtained by multiplying the response delay time 5 msec by 1000 to the buffer memory 114b to obtain the response delay time of 5 msec. The transferred numerical value is then transferred as the set data 3010n to the first setting register 3001n.

FIG. 21(D) illustrates a circuit block for measuring a pulse density of the input signal X011 of the special unit 130 to transmit the obtained pulse density to the data register D0100 when the input relay X001 starts operating. FIG. 21(E) illustrates a pulse string of the input signal X011. FIG. 21(F) illustrates variation in the current counter value of the current value register 4001n of the reversible counter 2000n in the pulse density measuring circuit 1020n (in this case, n=1) illustrated in FIG. 6. FIG. 21(G) illustrates an output characteristic of the common trigger circuit 9002. After the current counter value of the reversible counter 2000n is transferred to the peak hold register 4002n for each cycle T0, the current value register 4001n is reset.

Therefore, a value of the peak hold register 4002n, which is transferred to the data register D0100 by using the computational data 4020n, indicates the number of operations of the input signal X011 within the cycle T0. When the cycle T0 of the trigger signal is, for example, 10 msec, however, the value of the peak hold register 4002n, which has been transferred to the buffer memory 114b, is multiplied by 100 and then transferred to the data register D0100. Ultimately, an ON/OFF switching frequency (in Hz) of the input signal X011 per second is obtained.

In FIG. 22, FIG. 22(A) illustrates a circuit block for driving the edge detection instruction EDG when the input relay X002 starts operating. For a first operand of the edge detection instruction EDGE, the input X012 of the special unit 130 is designated as a target input. For a second operand, a number of the head auxiliary relay for storing the result of detection is designated. In this example, the result of detection of a rising edge of the input X012, specifically, a transition of the input X012 from OFF to ON, is stored in the auxiliary relay M0030. The result of detection of a falling edge of the input X012, specifically, a transition of the input X012 from ON to OFF, is stored in the auxiliary relay M0031. FIG. 22(B) illustrates a circuit block for driving the auxiliary relay M0040 in a self-holding manner by the auxiliary relay M0030, which operates upon detection of the rising edge. FIG. 22(C) illustrates a circuit block for driving the auxiliary relay M0041 in a self-holding manner by the auxiliary relay M0031, which operates upon detection of the falling edge. FIG. 22(D) illustrates a circuit block for resetting the auxiliary relay M0030 by the auxiliary relay M0040 to cancel the rising edge detection. FIG. 22(E) illustrates a circuit block for resetting the auxiliary relay M0031 by the auxiliary relay M0041 to cancel the falling edge detection. The edge detection instruction EDGE is suitable for detecting the presence of a pulse input shorter than the computation cycle of the microprocessor 111.

Figure 23:
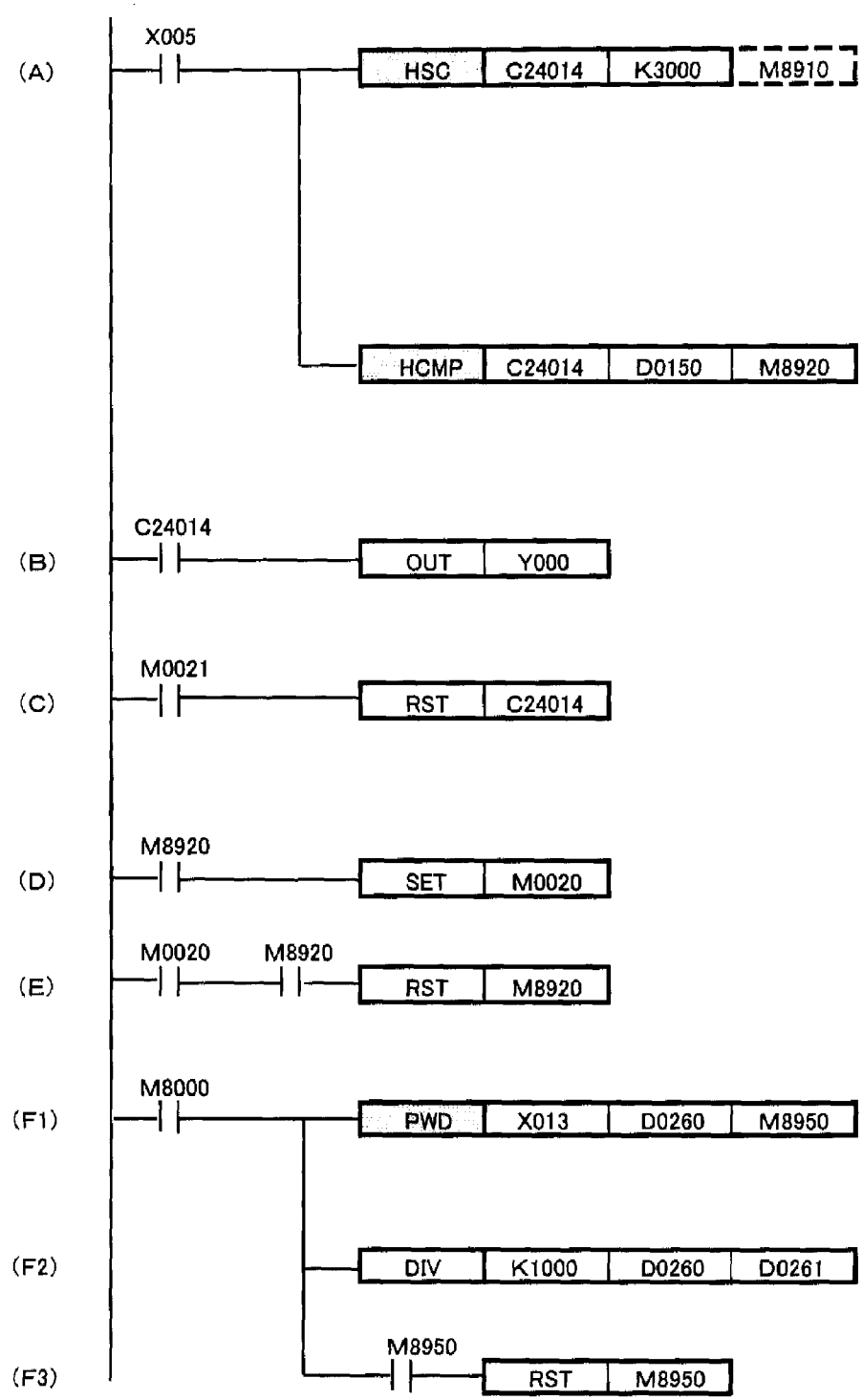
FIG. 23 is a view illustrating an exemplary use of a high-speed counter instruction and a pulse width measurement instruction.

Next, FIG. 23 illustrating an exemplary use of the high-speed counter instruction HSC, the high-speed compare instruction HCMP, and the pulse width measurement instruction PWD will be referred to. In FIG. 23, FIG. 23(A) illustrates a circuit block for operating a high-speed counter C24014 by the high-speed counter instruction HSC upon start of operation of the input relay X005 to obtain a high-speed compare match output by the high-speed compare instruction HCMP. Based on the extension number bb=24 in FIG. 16, the high-speed counter C24014 designated by a first operand of the HSC instruction or the HCMP instruction used herein is a high-speed counter which performs a count-up operation in response to the input signal X014 to the special unit 130 and a count-down operation in response to the input signal X015.

For a second operand of the HSC instruction, an upper limit value to be stored in the first setting register 3001m of the reversible counter 2000m (in this example, m=4) illustrated in FIG. 10 is directly designated as K3000. The upper limit value may also be indirectly set by using the data register. In this case, a number of the data register, in which the upper limit value is written, is designated by the second operand.

When the high-speed counter number designated by the first operand indicates that the high-speed counter is a 1-phase 1-input counter with the extension number bb from 00 to 19 in FIG. 16, the HSC instruction has a third operand. The third operand designates an auxiliary relay number by which the count direction, specifically, count-up or count-down, is directed. In the illustrated example, when the auxiliary relay M8910 is switched ON, a count-up operation is performed. When the auxiliary relay is switched OFF, a count-down operation is performed.

As a second operand of the HCMP instruction, an intermediate set value to be transferred to the second setting register 3002m in FIG. 10 is stored. In the illustrated example, the intermediate set value is indirectly set by a data register number D0150 which stores the intermediate set value. When the current counter value of the high-speed counter C24014 increases to exceed the intermediate set value, the compare match output Y014 operates. At the same time, the auxiliary relay M8920 designated by the third operand performs the ON operation.

FIG. 23(B) illustrates a circuit block for driving the output relay Y000 in response to the count-up output from the high-speed counter C24014. FIG. 23(C) illustrates a circuit block for resetting the high-speed counter C24014 upon start of operation of the auxiliary relay M0021 which is controlled by another sequence (not shown). As a result, the value of the current value register 4001m of the reversible counter 2000m in FIG. 10 becomes zero, whereas the output contact C24014 is switched OFF.

FIG. 23(D) illustrates a circuit block for driving the auxiliary relay M0020 in a self-holding manner by the auxiliary relay M8920 which operates upon start of operation of the count-up compare match output P from the high-speed counter C24014 in response to the HCMP instruction. FIG. 23(E) illustrates a circuit block for canceling the self-holding state of the auxiliary relay M8920 driven by the count-up compare match output P with the operation of the auxiliary relay M0020. When the self-holding state is cancelled, the auxiliary relay M8920 is inactivated. At the same time, the count-up compare match output P is reset.

FIG. 23(F1) illustrates a circuit block indicating the pulse width measurement instruction PWD driven by a special auxiliary relay M8000 which is constantly driven during the operation. A first operand of the PWD instruction designates an input terminal number corresponding to a target of the pulse width measurement. In this exemplary case, an input X013 of the I/O unit 130 is designated. A second operand designates a number of the data register which stores a measured time width, whereas a third operand designates a number of the auxiliary relay operated by a measurement completion notification signal.

In this exemplary case, when the logic level of the input signal X013 connected to the channel terminal 11n changes to "H" in the pulse width measuring circuit 1022n (in this exemplary case, n=3) illustrated in FIG. 7, the reversible counter 2000n counts the clock signals, each having the cycle τ of 1 μsec. A measured time at the transition of the logic level of the input signal X013 to "L" is stored in the peak hold register 4002n. The result of measurement is transmitted to the microprocessor 111 as the computational data 4022n to be stored in the data register D0260. Measurement completion information is transmitted by using the notification signal 7022n to drive the auxiliary relay M8950. In FIG. 23(F2), a value obtained by multiplying the result of reciprocal computation of the value of the data register D0260 by 1000 in response to a division instruction DIV is stored in the data register D0261.

In FIG. 23(F3), when the auxiliary relay M8950 is reset by its own contact M8950, the command signal 6022n is transmitted to the command latch memory 6000n to reset the storage circuit 63, thereby restarting the measurement of the pulse width. The data communication between the logic circuit unit and the microprocessor is performed when the special instruction is executed. Therefore, if the pulse width to be measured is longer than the computation cycle of the microprocessor, the pulse width is measured by the operation of the microprocessor in a plurality of cycles. On the other hand, if the pulse width to be measured is shorter than the computation cycle of the microprocessor, the pulse width is measured and updated for each computation cycle of the microprocessor.

Figure 24:
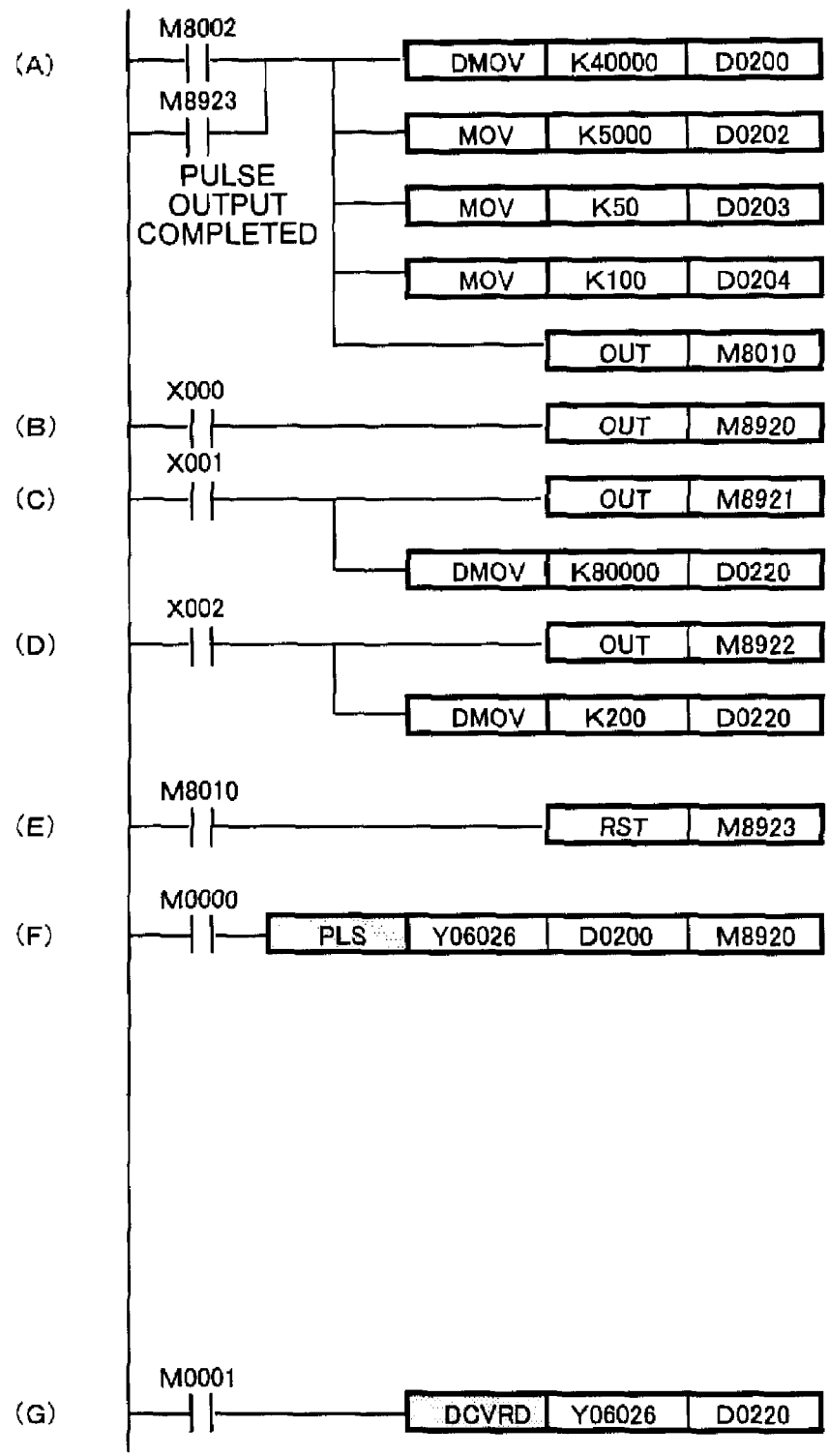
FIG. 24 is a view illustrating an exemplary use of a first pulse output instruction.

Next, FIG. 24 illustrating an exemplary use of the first pulse output instruction PLS will be referred to. In FIG. 24, FIG. 24(F) illustrates a circuit block of the first pulse output instruction PLS driven when the auxiliary relay M0000 operated by another sequence (not shown) operates. The high-speed output Y06026 designated by a first operand of the PLS instruction contains the extension number bb=06 illustrated in FIG. 17 in its number, the forward rotation pulse output FP is generated from the output terminal Y026, whereas the reverse rotation pulse RP is generated from the adjacent output terminal Y027.

The number of the data register D0200 designated by a second operand of the instruction PLS corresponds to a number of a head data register for various set data. A pair of data registers (D0201 and D0200) designate a 32-bit target number of pulses to be generated. A subsequent data register D0202 designates the number of pulses to be generated in the low-speed operation, a subsequent data register D0203 designates a cycle of the generated pulse in the high-speed operation in μsec, and a subsequent data register D0204 designates a cycle of the generated pulse in the low-speed operation in μsec.

The set values as those described above are transmitted to the first setting register 3001•7 (a half value of the target number of step pulses to be generated) and the second setting register 3002•7 (the number of low-speed step pulses), and the first setting register 3001•6 (the cycle of the low-speed pulse) and the second setting register 3002•6 (the cycle of the high-speed pulse) as the set data 3060m (in this exemplary case, m=6) in FIG. 12. A rotation direction command is transmitted as the command signal 6060•6.

However, the half values of the target cycles respectively designated by the data registers D0203 and D0204 are transmitted through the buffer memory 114b to the first setting register 3001•6 and the second setting register 3002•6, respectively. Moreover, a half value of the target number of step pulses designated by the data registers (D0201 and D0200) is transmitted through the buffer memory 114b to the first setting register 3201•7. As a result, the cycle of the output pulse from the alternate output circuit 84 in FIG. 12 is equal to the target cycle designated by the data register D0203 or D0204. If the content of the data registers (D0201 and D0200) has a positive value, the forward/forward rotation pulse is generated. On the other hand, if the content has a negative value, the reverse/reverse rotation pulse is generated. However, it is always an absolute value that is transmitted to the first setting register 3001•7. The rotation direction is directed by the command signal 6060•6.

The number of the auxiliary relay M8920 designated by a third operand of the instruction PLS is a number of a head auxiliary relay for various command signals and notification signals. The auxiliary relay M8920 is for a forced stop command, the next auxiliary relay M8921 is for a forward rotation limit stop command, the next auxiliary relay M8922 is for a reverse rotation limit stop command, and the subsequent M8923 is for a pulse output completion notification. A unit conversion constant is stored in the data register D0205 subsequent to the data register D0204. Alternatively, in the data registers (D0201 and D0200), a target amount of movement (for example, in mm) is designated in place of the target number of pulses to be generated. In this case, it is possible to obtain the target number of pulses to be generated by multiplying the target amount of movement by the unit conversion constant.

In FIG. 24, FIG. 24(A) illustrates a circuit block for driving a 32-bit transfer instruction DMOV and a 16-bit transfer instruction MOV, which are driven by the special auxiliary relay M8002 which is switched ON only for one computation cycle at the start of operation and the auxiliary relay M8923 serving as the pulse output completion signal, and the auxiliary relay M8010 for transfer verification. In the case of the DMOV instruction, a constant K40000 designated by a first operand thereof is transmitted to the pair of data registers (D0201 and D0200), for which the data register designated by a second operand is a lower data register.

In the MOV instruction, a constant K5000 designated by a first operand thereof is transferred to the data register D0202 designated by a second operand. In the next MOV instruction, a constant K50 designated by a first operand thereof is transferred to the data register D0203 designated by a second operand. In the subsequent MOV instruction, a constant K100 designated by a first operand thereof is transferred to the data register D0204 designated by a second operand. Therefore, a pulse having a high-speed cycle of 50 μs (20 KHz in terms of the pulse frequency) and a pulse having a low-speed cycle of 100 μs (10 KHz in terms of the pulse frequency) are generated. The number of low-speed pulses is 5000, and a total number of generated pulses is 40000. If an indirect setting method of designating the data register number is used in place of the direct setting method using the constant K, the set values as those described above can be changed during the operation.

FIG. 24(B) illustrates a circuit block for driving the auxiliary relay M8920 serving as the forced stop command upon operation of the input relay X000. FIG. 24(C) illustrates a circuit block for driving the auxiliary relay M8921 serving as the forward rotation limit stop command and driving the 32-bit transfer instruction DMOV for transferring and writing a constant K80000 to the pair of data registers (D0221 and D0220) upon operation of the input relay X001. FIG. 24(D) illustrates a circuit block for driving the auxiliary relay M8922 serving as the reverse rotation limit stop command and the 32-bit transfer instruction DMOV for transferring and writing a constant K200 to the pair of data registers (D0221 and D0220) upon operation of the input relay X002.

FIG. 24(E) illustrates a circuit block for resetting the auxiliary relay M8923, which has operated as a result of the completion of pulse outputs, by the auxiliary relay M8010 driven by the circuit block illustrated in FIG. 24(A). Therefore, if the auxiliary relay M0000 is closed in FIG. 24(F), the first pulse instruction PLS is executed to transmit the set data 3060•6 or the command signal 6060•6 shown in FIG. 11 to the first pulse output circuit 1060•6. As a result, the pulse output completion signal is reset to set constants respectively for the first setting registers 3001•6 and 3001•7 and the second setting registers 3002•6 and 3002•7.

FIG. 24(G) illustrates a circuit block for driving a current position read instruction DCVRD by the auxiliary relay M0001 driven by a sequence circuit (not shown). A first operand of the DCVRD instruction designates a high-speed pulse output number Y06026, and a second operand designates a lower data register number for the pair of the data registers (D0221 and D0220) handling the 32-bit data. Upon execution of the DCVRD instruction, a value of the current value register 4001•7 in FIG. 12 is read into the buffer memory 114b. Then, the read value is converted into the number of generated step pulses according to a moving direction, an operating state of the count-up compare match output P, an operating state of the count-up output Q, an operating state of the count-down compare match output P, and an operating state of the return output Q, and is then algebraically added to the data registers (D0221 and D0220). As is illustrated in FIG. 24(C) or 24(D), the predetermined current position is transferred and written to the data registers (D0221 and D0220) at the forward rotation limit position or the reverse rotation limit position. Therefore, absolute position information based on the reference positions as those described above are obtained.

Figure 25:
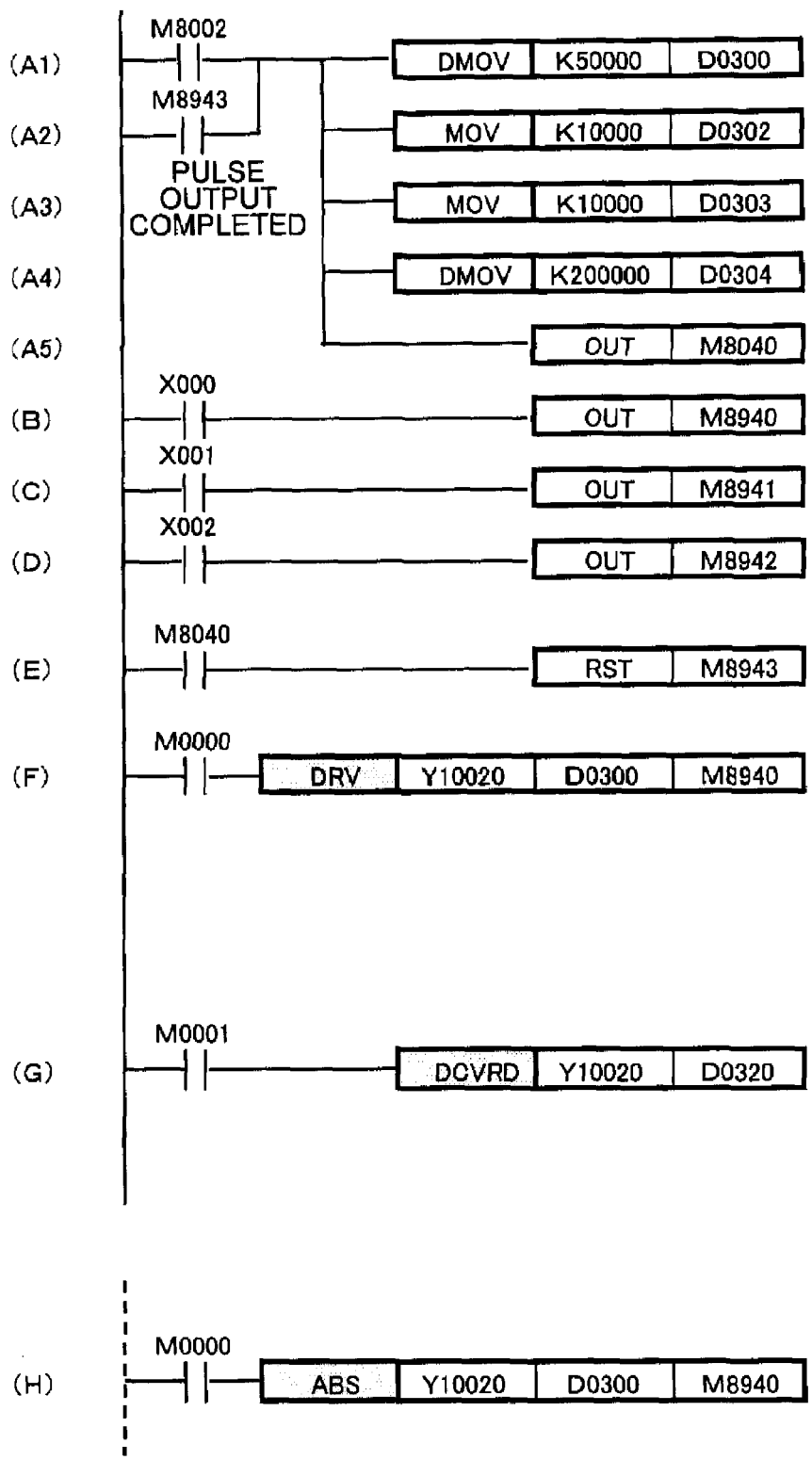
FIG. 25 is a view illustrating an exemplary use of a second pulse output instruction.
Figure 26:
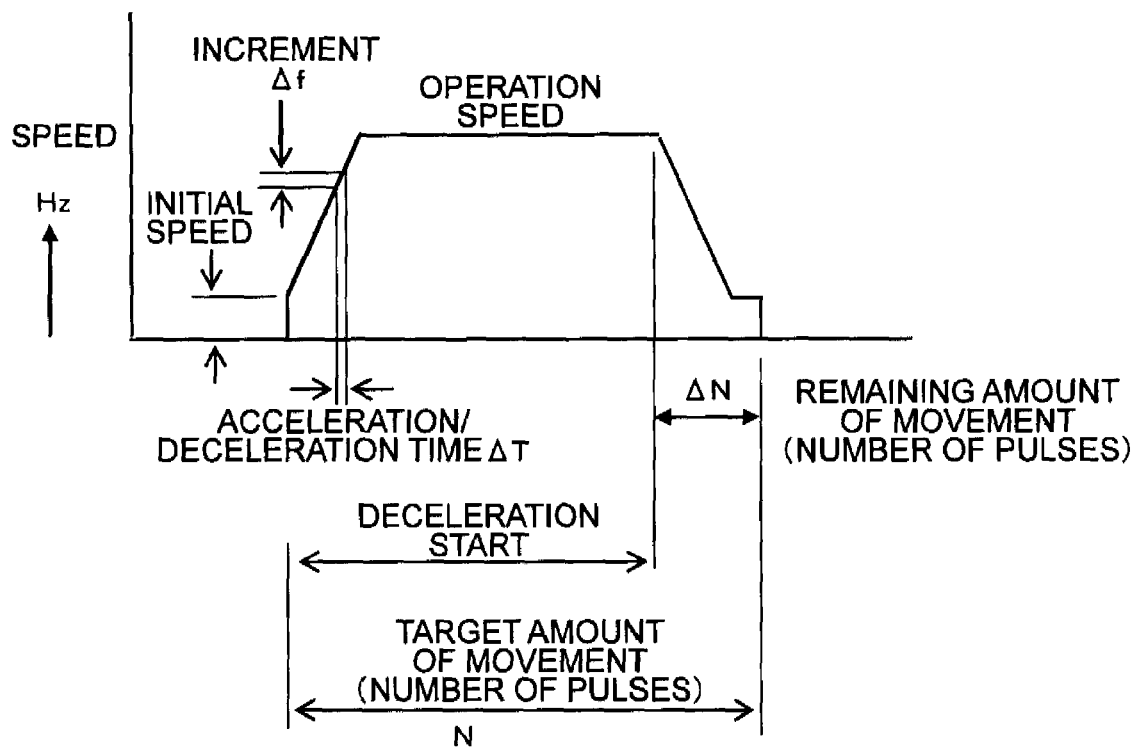
FIG. 26 is a characteristic diagram for explaining FIG. 25.

Next, FIG. 25 illustrating an exemplary use of the second pulse output instruction DRV and FIG. 26 which is a characteristic diagram illustrating an acceleration/deceleration pattern will be referred to. In FIG. 25, FIG. 25(F) illustrates a circuit block of the second pulse output instruction DRV driven upon operation of the auxiliary relay M0000 which is operated by another sequence (not shown). Since a number of the high-speed output Y10020 designated by a first operand of the DRV instruction contains the extension number bb=10 illustrated in FIG. 17, the forward pulse output FP is generated from the output terminal Y020, whereas the reverse rotation pulse RP is generated from the adjacent output terminal Y021. Upon the use of the zero return instruction ZRN described below, the clear signal CLR is generated from the adjacent output terminal Y022.

The data register D0300 having the number designated by a second operand of the DRV instruction indicates that the data register is the head data register for various set data. The content of setting will be described referring to FIGS. 24(A1) to 24(A4). The auxiliary relay M8940 having the number designated by a third operand of the DRV instruction corresponds to the head auxiliary relay of various command signals and notification signals. The auxiliary relay M8940 is for the forced stop command, the next auxiliary relay M8941 is for the forward rotation limit stop command, the next auxiliary relay M8942 is for the reverse rotation limit stop command, and the subsequent auxiliary relay M8943 is for the pulse output completion notification.

In FIG. 25, FIGS. 25(A1) to 25(A5) illustrate a circuit block for driving various transfer instructions driven by the special auxiliary relay M8002 which remains switched ON only for one computation cycle at the start of operation and the auxiliary relay M8943 serving as the pulse output completion signal, and the auxiliary relay M8040 for transfer verification. The first transfer instruction DMOV is for writing a target operation speed to a pair of data registers (D0301 and D0300) in pulse frequency Hz. In this case, a pulse frequency of 50 KHz is designated by a constant K50000. The next transfer instruction MOV is for writing an initial operation speed to the data register D0302 in pulse frequency Hz. In this case, a pulse frequency of 10 KHz is designated by a constant K10000. The subsequent transfer instruction MOV is for writing an acceleration/deceleration time Δt (μsec) to the data register D0303 when an increment of the frequency Δf illustrated in FIG. 26 is 1024 Hz. In this case, 10 msec is set by a constant K10000.

Therefore, a time required for the speed to reach the target operation speed from the initial speed is: $10 \times (50-10)/1.024 = 390.6$ msec. The next transfer instruction DMOV is for writing a target amount of movement to a pair of data registers (D0305 and D0304) in number of generated pulses. The set target amount of movement has a positive or negative value depending on a moving direction. In this case, by a positive constant K200,000, a forward rotation operation for 200,000 pulses is performed. The subsequent auxiliary relay M8040 verifies the transfer.

FIG. 25(B) illustrates a circuit block for driving the auxiliary relay M8940 serving as the forced stop command upon operation of the input relay X000. FIG. 25(C) illustrates a circuit block for driving the auxiliary relay M8941 serving as the forward rotation stop command upon operation of the input relay X001. FIG. 25(D) illustrates a circuit block for driving the auxiliary relay M8942 serving as the reverse rotation stop command upon operation of the input relay X002. FIG. 25(E) illustrates a circuit block for resetting the auxiliary relay M8943, which has operated as a result of the pulse output completion, by the auxiliary relay M8040 driven by the circuit block illustrated in FIG. 25(A5). The set values in FIGS. 25(A1) to 25(A4) and the commands in FIGS. 25(B) to 25(E) are transferred to each of the units of the second pulse output circuit 1070•0 illustrated in FIG. 13 through the buffer memory 114b when the second pulse output instruction DRV is executed in FIG. 25(F).

For the data to be transferred to the second pulse output circuit 1070•0, a deceleration start position is calculated in advance by the microprocessor 111 according to the operation speed pattern illustrated in FIG. 26. In this exemplary case, a time required for the completion of deceleration from the operation speed of 50 KHz is: $50 \times 10$ msec=0.5 sec.

Therefore, the number of pulses generated during this time period is: $\Delta N=50\times 10^3\times 0.5/2=12500$. Therefore, the number of pulses generated up to the deceleration start point is: 200, 000−12,500=187,500.

A half value of the acceleration/deceleration time, 10000 μsec, stored in the data register D0303, specifically, 5000 is stored in the first setting register 3001•0 of the first reversible counter 2000•0 in FIG. 13. As a result, a cycle of the output signal from the alternate output circuit 97 is the target cycle, i.e., 10000 μsec=10 msec. The target operation speed of 50,000 stored in the data registers (D0301 and D0300) is written in the first setting register 3001•1 of the next reversible counter 2000•1. The initial speed, 10000, stored in the data register D0302 is written in the second setting register 3002•1 and the current value register 4001•1. The incremental/decremental frequency Δf=1024 in FIG. 26 is written in the variation adjusting register 4003•1.

As a result, as the operation speed pattern, the operation speed increases from the initial speed of 10 KHz at the rate of about 1 KHz per 10 msec to the target operation speed of 50 KHz. When the operation speed reaches the target operation speed, the count-up output Q operates to stop increasing the value of the current value register 4001•1. The incremental/decremental frequency Δf is set to 1024 because this value facilitates binary addition for the current value register 4101•1. Therefore, there arises no problem even when the incremental/decremental frequency Δf is set to 1000. For example, a coefficient of 500,000 corresponding to a quintuple of the maximum operation speed of 100 KHz is stored in the first setting register 3001•2 of the third reversible counter 2000•2. As a result, when the variation adjusting register 4003•2 stores 50,000 corresponding to the target operation speed of 50 KHz, it is necessary to count ten before the operation of the count-up output Q.

Since the cycle τ of the count input signal of the reversible counter 2000•2 is 1 μsec, the cycle of the output pulse from the alternate output circuit 47 is 20 μsec, which corresponds to the frequency of the target operation speed, 50 KHz. The number N of generated pulses corresponding to the target amount of movement stored in the data registers (D0305 and D0304), N=200,000, is written to the first setting register 3001•3 of the last reversible counter 2000•3. The number of pulses generated up to the deceleration start point, i.e., 187, 500, is written to the second setting register 3002•3. The rotation direction is transmitted to the command latch memory 6000•0 by using the command signal 6070•0.

As a result, when the current counter value of the reversible counter 2000•3 which counts the number of generated output pulses reaches the number of generated pulses up to the deceleration start point, the count-up compare match output P operates to feed a subtraction start command through the OR element 95a and the gate element 95b to the reversible counter 2000•1. The reversible counter 2000•1 starts a subtraction at the rate of about 1 KHz per 10 msec. When the value reaches the initial speed stored in the second setting register 3002•1, the count-down compare match output P̲ operates (at the logical level "H") to stop the subtraction operation through the gate element 95b. As the speed pattern, the initial speed is maintained.

When the current counter value of the reversible counter 2000•3 reaches the target amount of movement, the count-up output Q operates to transmit a completion notification signal. At the same time, the operation of each of the reversible counters is stopped. In FIGS. 25(A1) to 25(A4), if the indirect setting method of designating the data register number without using the constant K is used in place of the direct setting method, the set values as those described above can be changed during the operation. During the operation of each of the reversible counters, however, the transfer to the logic circuit unit is not performed. The next setting is enabled only after the completion of the operation. The stop commands by the auxiliary relays M8940, M8941, and M8942 are enabled even when the DRV instruction is executed. The stop commands are transmitted as the command signal 6070•0 to the command latch memory 6000•0 to stop the operation of each of the reversible counters. When the driving of the auxiliary relays M8940, M8941, and M8942 is cancelled, the stop command is cancelled upon execution of the DRV instruction. The stop command cancellation is transmitted by using the command signal 6070•0 to the command latch memory 6000•0 to start the operation of each of the reversible counters.

FIG. 25(G) illustrates a circuit block for driving the current position read instruction DCVRD by the auxiliary relay M0001 driven by a sequence circuit (not illustrated). A first operand of the DCVRD instruction designates a high-speed pulse output number Y10020, whereas a second operand designates a lower data register number for a pair of data registers (D0321 and D0320) handling 32-bit data. Upon execution of the DCVRD instruction, the value of the current value register 4001•3 illustrated in FIG. 13 is read into the buffer memory 114b to be algebraically added to the data registers (D0321 and D0320) according to the moving direction. A coordinate value of the position of the zero point is transferred and written to the data registers (D0321 and D0320) as illustrated in FIG. 27(F) referred to below. Therefore, absolute position information based on the reference position is obtained.

FIG. 25(H) illustrates a circuit block when a third pulse output instruction ABS is driven by the auxiliary relay M0000 driven by a sequence circuit (not shown). Since the number of the high-speed output Y10020 designated by a first operand of the ABS instruction contains the extension number bb=10 illustrated in FIG. 17, the forward rotation pulse output FP is output from the output terminal Y020, whereas the reverse rotation pulse RP is generated from the adjacent output terminal Y021. When the zero return instruction ZRN described below is used, the clear signal CLR is generated from the adjacent output terminal Y022. The data register number D0300 designated by a second operand of the ABS instruction corresponds to a number of the head data register for various set data. The set content is as described above referring to FIGS. 25(A1) to 25(A4). In the case of the ABS instruction, however, a target moving position is designated in place of the target amount of movement set in FIG. 25(A4). For the first setting register 3001•3 of the reversible counter 2000•3 illustrated in FIG. 13, the target moving amount is set based on a difference between the target moving position and the current position stored in the data registers (D0321 and D0320). The rotation direction command is transmitted as the command signal to the first setting register 3001•3.

The auxiliary relay M8940 designated by a third operand of the ABS instruction corresponds to a number of the head auxiliary relay for various command signals and notification signals. The auxiliary relay M8940 is for a forced stop command, the subsequent auxiliary relay M8941 is for a forward rotation limit stop command, the next auxiliary relay M8942 is for a reverse rotation limit stop command, and the subsequent auxiliary relay M8943 is for a pulse output completion notification. When a first operand of the ABS instruction is the extension numbers from 00 to 07 in FIG. 17, the ABS instruction is a substituting instruction for the first pulse output instruction PLS. Even in this case, a target moving position is set in place of the target moving amount.

Figure 27:
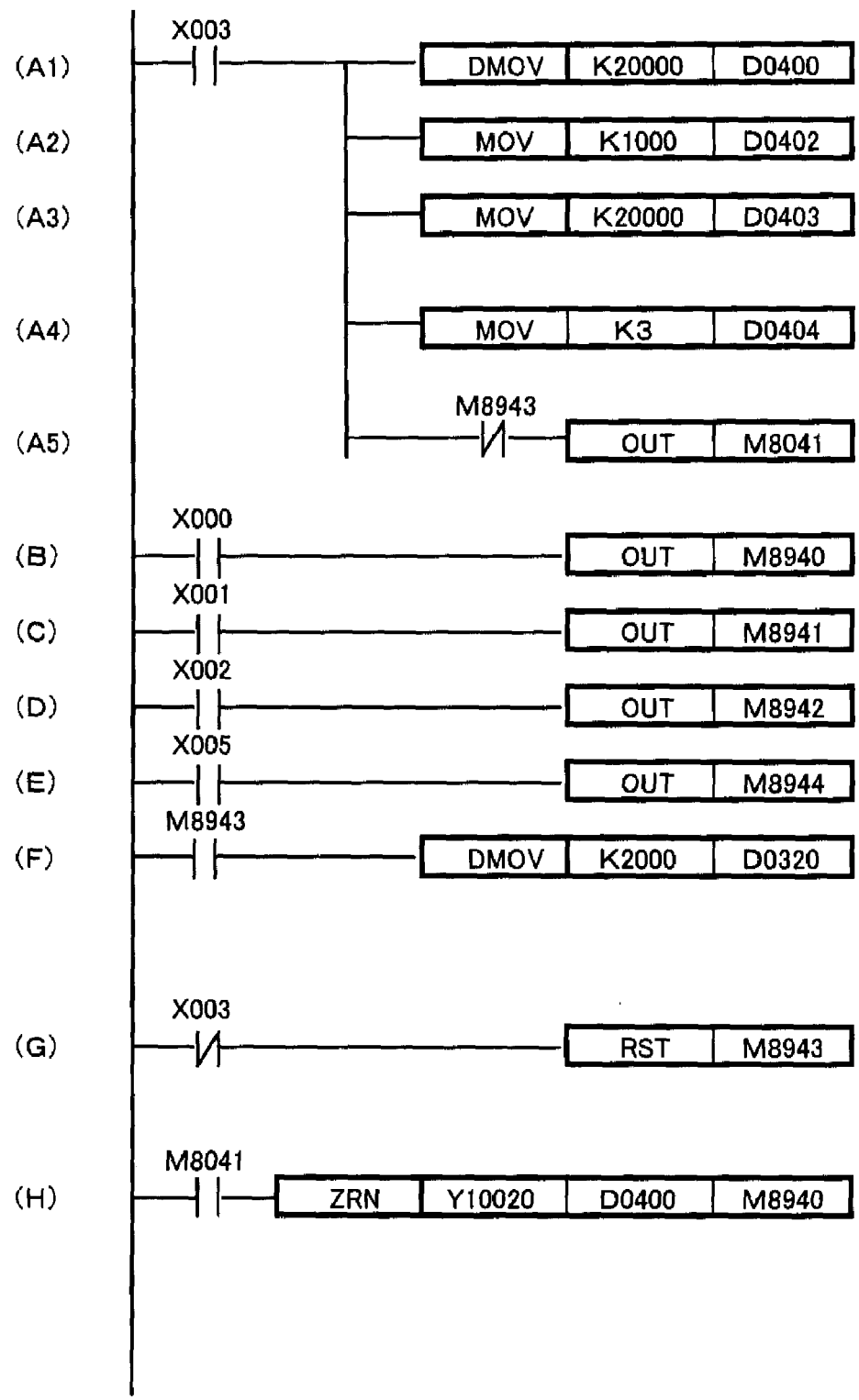
FIG. 27 is a view illustrating an exemplary use of a zero return instruction.
Figure 28:
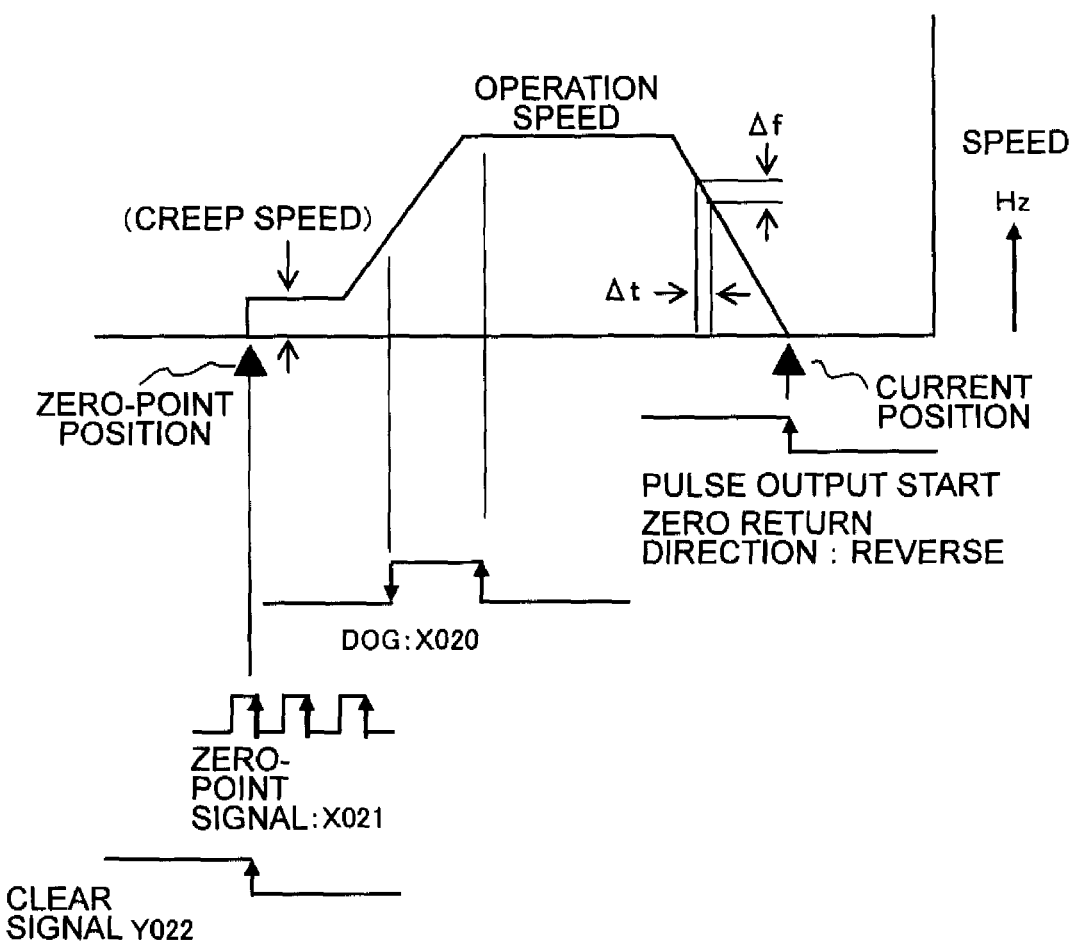
FIG. 28 is a characteristic diagram for explaining FIG. 27.

Next, FIG. 27 illustrates an exemplary use of the zero return instruction ZRN, and FIG. 28 is a characteristic diagram illustrating a zero return operation. FIG. 27(H) illustrates a circuit block of the zero return instruction ZRN driven through the auxiliary relay M8041 which is driven upon operation of the input relay X003 in FIG. 27(A5). The high-speed output Y10020 designated by a first operand of the ZRN instruction contains the extension number bb=10 illustrated in FIG. 17. Therefore, the forward rotation pulse output FP is generated from the output terminal Y020, whereas the reverse rotation pulse output RP is generated from the adjacent output terminal Y021. The clear signal CLR is generated from the adjacent output terminal Y022. The data register D0400 designated by a second operand of the ZRN instruction corresponds to the head data register number for various set data. The content of setting will be described referring to FIGS. 27(A1) to 27(A4) below. The auxiliary relay M8940 designated by a third operand of the ZRN instruction corresponds to a number of the head auxiliary relay for various command signals and notification signals. The auxiliary relay M8940 is for a forced stop command, the auxiliary relay M8941 is for a forward rotation limit stop instruction, the auxiliary relay M8942 is for a reverse rotation limit stop instruction, the auxiliary relay M8943 is for a zero return completion notification, and the auxiliary relay M8944 is for a zero return direction command signal.

FIGS. 27(A1) to 27(A5) illustrate a circuit block for driving various transfer instructions driven by the input relay X003 and the auxiliary relay M8041 for transfer verification. A first transfer instruction DMOV is for writing a target operation speed in pulse frequency Hz to a pair of data registers (D0401 and D0400). In this case, 20 KHz is designated by a constant K20000. The next transfer instruction MOV is for writing a creep operation speed in pulse frequency Hz to the data register D0402. In this case, 1 KHz is designated by a constant K1000.

The next transfer instruction MOV is for writing to the data register D0403 the acceleration/deceleration time Δt (μsec) when the increment Δf of the frequency illustrated in FIG. 28 is set to 1024 Hz. In this case, 20 msec is set by a constant K20000. Therefore, a time required for the operation speed to reach the target operation speed of 20 KHz is: 20×20/1.024=390.6 msec. The next transfer instruction MOV is for writing the number of zero-point signals described below to the data register D0404. The number of pulses, 3, is set by K3. The subsequent auxiliary relay M8041 is for transfer verification. When the auxiliary relay M8943 for zero return completion operates, the auxiliary relay M8041 is not driven.

FIG. 27(B) illustrates a circuit block for driving the auxiliary relay M8940 serving as a forced stop command upon operation of the input relay X000. FIG. 27(C) illustrates a circuit block for driving the auxiliary relay M8941 serving as a forward rotation limit stop command upon operation of the input relay X001. FIG. 27(D) illustrates a circuit block for driving the auxiliary relay M8942 serving as a reverse rotation limit stop command upon operation of the input relay X002. FIG. 27(E) illustrates a circuit block for driving the auxiliary relay M8944 serving as a zero return direction command to perform a forward operation upon operation of the input relay X005. FIG. 27(F) illustrates a circuit block for transferring a coordinate value K2000 of the position of the zero point to a pair of the data registers (D0321 and D0320) upon operation of the auxiliary relay M8943. FIG. 27(G) illustrates a circuit block for resetting the auxiliary relay M8943 which has been operated as a result of zero return completion when the input relay X003 is inactivated.

The set values in FIGS. 27(A) to 27(A4) and the commands in FIGS. 27(B) to 27(E) are transferred to the respective units of the modified pulse output circuit 1080•0 illustrated in FIG. 14 through the buffer memory 114b upon execution of the zero return instruction ZRN in FIG. 27(H). However, when the zero return instruction ZRN is driven, the parameters are first modified and set according to Step 916 in FIG. 19 to then perform communication with each of the units.

In the first setting register 3001•0 of the first reversible counter 2000•0 in FIG. 14, a half value of the acceleration/deceleration time of 20000 μsec stored in the data register D0403, i.e., 10000, is stored. As a result, the cycle of the output signal from the alternate output circuit 97 is obtained as a target value, 20000 μsec=20 msec. The target operation speed of 20,000, which is stored in the data registers (D0401 and D0400), is written to the first setting register 3001•1 of the second reversible counter 2000•1, whereas a creep speed of K1000 stored in the data register D0402 is written to the second setting register 3002•1. The incremental/decremental frequency Δf=1024 illustrated in FIG. 28 is written to the variation adjusting register 4003•1.

As a result, the operation speed increases from the initial speed of 0 KHz at the rate of about 1 KHz per 20 msec to the target operation speed of 20 KHz as an operation speed pattern. When the operation speed reaches the target operation speed, the count-up output Q starts operating to stop increasing the value of the current value register 4001•1. In the first setting register 3001•2 of the third reversible counter 2000•2, for example, a coefficient corresponding to a quintuple of the maximum operation speed of 100 KHz, that is, 500,000 is stored. As a result, when 20,000 corresponding to the target operation speed of 20 KHz is stored in the variation adjusting register 4003•2, it is necessary to count twenty-five before the start of operation of the count-up output Q.

Since the cycle τ of the count input signal of the reversible counter 2000•2 is equal to 1 μsec, the cycle of the output pulse from the alternate output circuit 47 is 50 μsec, which corresponds to the frequency of the target operation speed, i.e., 20 KHz. By driving the ZRN instruction, a reverse operation is performed from the current position as illustrated in FIG. 28. Then, the speed increases to reach a target speed ①. Then, the near-point dog signal DOG is switched ON to operate the input relay X020. As a result, a subtraction start instruction is fed to the reversible counter 2000•1 through the OR element 95a and the gate element 95b. The reversible counter 2000•1 starts a subtraction at the rate of about 1 KHz per 20 msec. Then, when the operation speed reaches the creep speed stored in the second setting register 3002•1, the count-down compare match output P̲ is operated (at the logic level "H") to stop the subtraction operation. Then, the creep operation speed is kept as the speed pattern.

The near-point dog signal DOG is switched OFF immediately before the completion of deceleration to inactivate the input relay X020. After the inactivation of the input relay X020, the operation of the input relay X021 operating in response to a Z-phase signal of the servo motor is input to the count input terminal IN of the last reversible counter 2000•3 though the AND element 95e. The value of the data register D0404, which is set by the circuit block in FIG. 27(A4), is transferred in advance to the first setting register 3001•3 of the reversible counter 2000•3. In this exemplary case, when three Z-phase signals are counted, the count-up output Q is generated to stop the operation of each of the reversible counters. At the same time, the clear signal CLR is output to Y022 to initialize the servo amplifier. Then, a zero return completion notification is made to operate the auxiliary relay M8943. As a result, the coordinate data of the position of the zero point is written to the data registers (D0321 and D0320) by the circuit block in FIG. 27(F). When the input relay X003 is cancelled as a result of completion of zero return, the auxiliary relay M8943 indicating the zero return completion is reset by the circuit block in FIG. 27(G). Then, the auxiliary relay M8041 illustrated in FIG. 27(H) is inactivated to stop driving the zero return instruction ZRN.

In FIGS. 27(A1) to 27(A4), if an indirect setting method of designating the data register number without using the constant K is used in place of the direct setting method, the set values as those described above can be changed during the operation. During the operation of each of the reversible counters, however, the transfer to the logic circuit unit is not performed. The next setting is enabled only after the completion of the operation. The commands by the auxiliary relays M8940, M8941, and M8942 are enabled when the ZRN instruction is executed. The commands are transmitted by using the command signal 6080•0 to the command latch memory 6200•0 to stop the operation of each of the reversible counters. When the driving of the auxiliary relays M8940, M8941, and M8942 is cancelled, the stop command is cancelled upon execution of the ZRN instruction. The stop command cancellation is transmitted as the command signal 6080•0 to the command latch memory 6000•0 to start the operation of each of the reversible counters.

Figure 29:
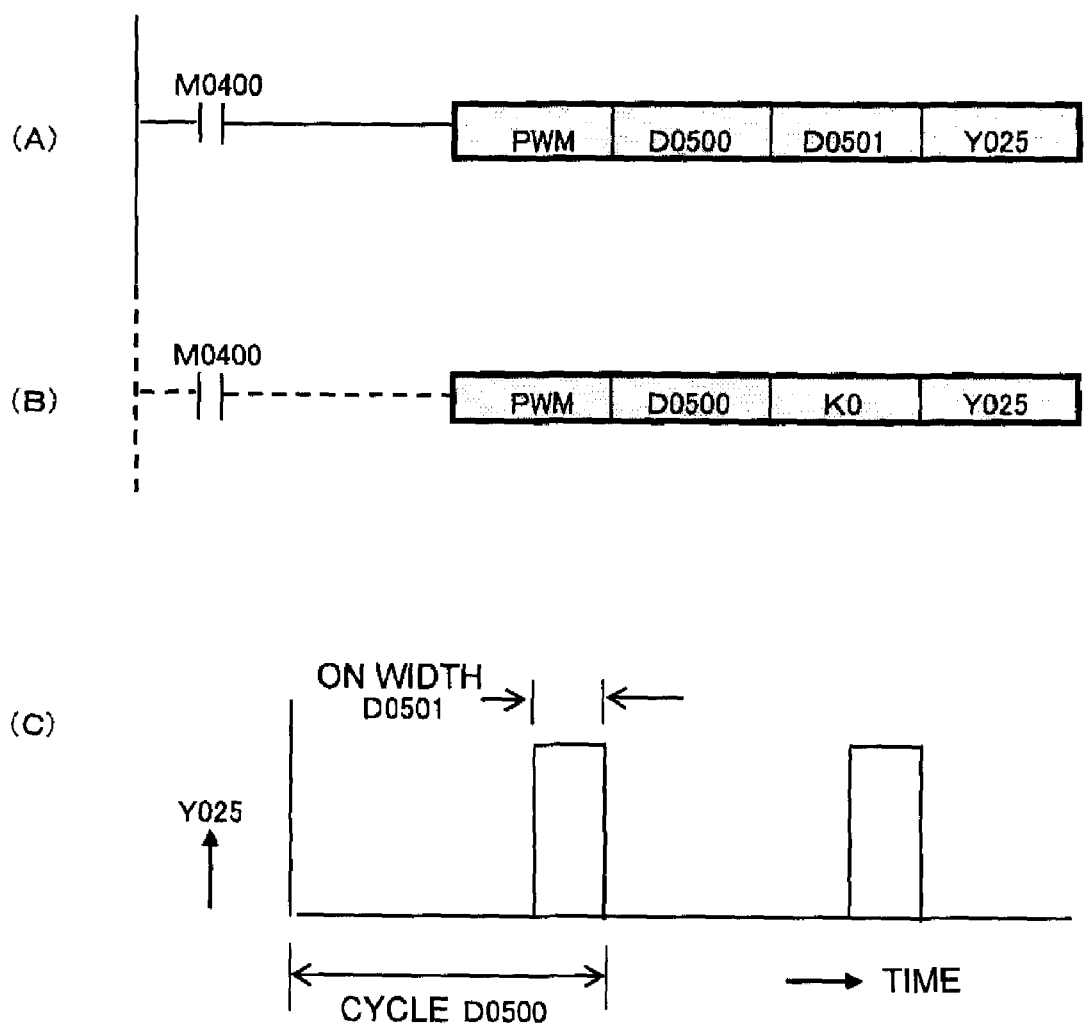
FIG. 29 is a view illustrating an exemplary use of a PWM output instruction.

Next, description will be made for FIG. 29 illustrating an exemplary use of the PWM output instruction, referring to FIG. 11. FIG. 29(A) illustrates a circuit block of the PWM output instruction driven by the auxiliary relay M0400 driven by a sequence circuit (not shown). For a data register D0500 designated by a first operand of the PWM instruction, a pulse cycle of the pulse width modulation signal is set in μsec. For a data register D0501 designated by a second operand, an ON time of the pulse width modulation signal is set in μsec. An output number of the special unit which generates the pulse width modulation signal (PWM) output is designated by a third operand. In this exemplary case, the pulse width modulation signal is output from the output terminal Y025 of the special unit 140. Upon execution of the PWM instruction, the cycle (μsec) of the pulse width modulation signal set by the data register D0500 is set for the first setting register 3001n of the reversible counter 2000n (n=5 in this exemplary case) illustrated in FIG. 11. In the second setting register 3002n, an OFF time obtained by subtracting the ON time set in the data register D0501 from the set cycle is set.

As a result, when the counter value of the reversible counter 2000n for counting the clock signals, each having the cycle τ of 1 μsec, generated from the common clock circuit 9001, reaches the set OFF time, the reversible counter 2000n generates the count-up compare match output P. Then, the counter value reaches the set cycle, the count-up output Q is generated. At this time, the reversible counter 2000n as well as the count-up compare match output P are reset. Therefore, as illustrated in FIG. 29(C), the pulse width modulation signal having the cycle (D0500) and the ON time width (D0501) is output to the output Y025. If an inversion logic element is interposed between the channel terminal 12n and the count-up compare match output P illustrated in FIG. 11, ON and OFF are inverted. Therefore, the ON time is set in the second setting register 3002n in this case.

FIG. 29(B) illustrates a structure of operands of the PWM output instruction according to another embodiment. In this exemplary case, the data register D0500 designated by a first operand of the PWM instruction corresponds to a number of the head data register to be set. An instruction form is defined by the constant K designated by a second operand. An output number of the special unit which generates the pulse width modulation signal (PWM) output is designated by a third operand.

Depending on the value of the constant K, the setting is performed in the following manner. With K0, the cycle is set for D0500, whereas the ON time is set for D0501. With K1, the cycle is set for D0500, whereas the OFF time is set for D0501. With K2, the cycle is set for D0500, whereas a value obtained by: a duty (ON time/cycle)×1000 is set for D0501. Even if the original data is in any form, the data converted into the cycle and the OFF time are transmitted to the reversible counter 2000n in FIG. 11. The set data 3050n from the microprocessor 111 is transferred to and is temporarily stored in the standby buffer memory 4004n upon execution of the PWM instruction. Thereafter, at the time when the count-up output Q operates to reset the current value register 4001n and the count-up compare match output P, the set data 3050n is transferred to the first and second setting registers 3001n and 3002n.

(4) Summary and Characteristics of the First Embodiment

As is apparent from the above description, the programmable controller 100A according to the first embodiment of the present invention includes the CPU unit 110A which includes the microprocessor 111, the system memory 112A operating in cooperation with the microprocessor 111, the program memory 113A to which the sequential program created by the user is transferred and written from the external tool 108, and the device memory 114a having the I/O image memories X and Y for storing the I/O information and the control information, the auxiliary relay M, and the data register D, and one of or a plurality of the I/O units 120 to 140 connected to the CPU unit 110A through the bus. A part or all of the I/O units serve as the special units 130 and 140 respectively including the integrated circuit elements 10 sharing the special I/O processing functions to complement the control function of the microprocessor 111. The special unit 130 includes the electronic substrate 19xy, on which the external connection terminals 130X and 130Y connected to at least one of or both of the plurality of external sensors and the plurality of external loads, the multi-channel input interface circuit 139X or output interface circuit 139Y connected to the external connection terminal, the integrated circuit element 10 used for I/O control whose control specifications can be partially variably set, and the bus joint terminal 130Z for connection to the microprocessor 111, are mounted. In the same manner, the special unit 140 includes the electronic substrate 19xy, on which the external connection terminals 140X and 140Y, the multi-channel input interface circuit 149X or output interface circuit 149Y, the integrated circuit element 10, and the bus joint terminal 140Z are mounted. The integrated circuit element 10 includes the first port 11 to which the logic signal performing the ON/OFF operation is input from the input interface circuit 139X or 149X, the second port 12 for outputting the logic signal for performing the ON/OFF operation to the output interface circuit 139Y or 149Y, the parameter memory 8000n corresponding to each channel number n, and the logic circuit unit 1000n whose operation specifications for the I/O processing are determined by the circuit organization data transmitted from the microprocessor 111 to the parameter memory.

The logic circuit unit 1000n further includes the notification bit memory 7000n for counting the logic input signal obtained through the input interface circuit 139X at high speed to transmit the count-up output or the count data as the notification signal or the computational data to the microprocessor 111, the calculation register 4000n, and the reversible counter 2000n which stores the set data or the command signal received from the microprocessor 111 in the setting register 3000n and the command latch memory 6000n to feed the high-speed pulse output based on the contents of the setting register and the command latch memory to the output interface circuit 149X. The reversible counter 2000n includes the current value register 4001n forming a part of the calculation register 4000n. Whether to constitute the high-speed counter circuit for the input signal fed from the input interface circuit 139X to perform the high-speed input processing for transmitting the count-up output to the CPU unit 110A or to constitute the high-speed pulse output circuit based on the set data received from the CPU unit 110A to perform the high-speed output processing for feeding a predetermined pulse output to the output interface circuit 149Y is determined for each channel according to the content of the special instruction included in the control program stored in the program memory 113A. When the circuit organization data transmitted to the parameter memory 8000n causes a plurality of high-speed input processings and a plurality of high-speed output processings to be performed and the input signal from the external sensor is an analog signal, the input interface circuit feeds a pulse having a frequency proportional to that of the input signal to the integrated circuit element 10. When the external load is an analog load, the integrated circuit element 10 generates a pulse output having an ON/OFF ratio as a commanded output signal. The output interface circuit smoothes the received pulse output signal and then feeds the smoothed signal to the external load.

The CPU unit 110A includes the buffer memory 114b for data communication with the special unit 130 or 140. The system memory 112A includes the control programs functioning as the organization processing means 908 and the data conversion/transfer means 921. Immediately after the start of the operation of the programmable controller 100A, the organization processing means 908 searches through the content of the program memory 113A to extract the special instruction corresponding to the special unit 130 or 140 and transmits the type of the logic circuit unit 1000n used in the special unit according to the content of the special instruction and the circuit organization data corresponding to the operation mode to the parameter memory 8000n. At the same time, the organization processing means 908 performs the address organization of the buffer memory 114b for the communication with each logic circuit unit 1000n whose circuit organization is specified by the parameter. The data conversion/transfer means 921 converts the data into the set data in unit suitable for the operation of the logic circuit unit 1000n and the command signal based on the content of the device memory 114 designated by the special instruction to transmit the set data and the command signal to the setting register 3000n and the command latch memory 6000n through the buffer memory 114b. At the same time, the data conversion/transfer means 921 transfers the computational data or the notification signal obtained from the logic circuit unit 1000n to the device memory 114a designated by the special instruction through the buffer memory 114b.

The special instruction is composed of an instruction word indicating the type of instruction, a first operand, and at least one of a second operand and a third operand, the first to third operands being in no particular order. The first operand designates an identification number for specifying a target I/O number of the special unit. The second operand designates a number of the data register which stores the computational data obtained from the calculation register or a number of the data register which stores the set data transmitted to the setting register, or directly designates a set constant. The third operand designates a number of the auxiliary relay which stores the notification signal obtained from the notification bit memory or a number of the auxiliary relay which stores the command signal to be transmitted to the command latch memory. Accordingly, the organization processing means performs initial organization of the parameters, and performs data conversion/transfer between the microprocessor and the logic circuit unit through the buffer memory during the operation. Therefore, the microprocessor performs complicated computation processing (for example, a multiplication or a reciprocal computation for unit conversion) which does not require high-speed processing, whereas the logic circuit unit performs a high-speed operation based on the set data and the command signal which facilitate the operation of the logic circuit unit. As a result, the configuration of the logic circuit unit is simplified to obtain a low-cost special-purpose integrated circuit element.

Moreover, each of some or all of the reversible counters 2000n provided in the logic circuit units 1000n includes the current value register 4001n, the first setting register 3001n, the second setting register 3002n, the first comparison circuit 5001n, and the second comparison circuit 5002n. The current value register 4001n increases or decreases the number of operations of the count input to the reversible counter 2000n according to the count direction and serves as a memory to store a cumulative total value from an initial value at the start of the operation of the reversible counter. The first comparison circuit 5001n is a value comparison circuit which generates a first compare match output when the value stored in the first setting register 3001n and the value stored in the current value register 4001n are identical with each other. The second comparison circuit 5002n is a value comparison circuit which generates a second compare match output when the value stored in the second setting register 3002n and the value stored in the current value register 4001n are identical with each other. A value is set for the current value register or each of the first and second setting registers from the microprocessor 111 through the buffer memory 114b when the special instruction is executed. Specifically, the reversible counter constituting the logic circuit unit includes a plurality of setting registers and comparison circuits. Therefore, by performing setting processing for a plurality of setting registers before the start of operation of the reversible counter, a new set value is not required to be transmitted during the high-speed counting operation. Therefore, the burden of communication control on the microprocessor for the logic circuit unit can be reduced. At the same time, the plurality of setting registers and the plurality of comparison circuits enable the control operation at a higher level.

The logic circuit unit 1000n mounted on the special unit 130 or 140 includes the general-purpose input circuit 1091 or the general-purpose output circuit 1092 for all the channels. The general-purpose input circuit 1091 is an input signal relay circuit for transmitting the input signal connected to the first port 11 to the input image memory allocated in the device memory 114a through the data selector 134 or 144 for input processing. The transfer from the data selector to the input image memory is executed by the input processing means 911 which is a control program stored in the system memory 112A. The general purpose output circuit 1092 is an output signal relay circuit which outputs the signal from the output image memory area allocated in the device memory 114a through the output latch memory 135 or 145 provided in the logic circuit unit 1000n to the output circuit connected to the second port 12. The transfer from the output image memory to the output latch memory is executed by the output processing means 923 which is a control program stored in the system memory 112A. The general-purpose I/O circuit 1091 or 1092 is enabled when the logic circuit unit 1000$n$ is used neither as a high-speed I/O circuit nor as an analog I/O circuit. Specifically, the integrated circuit element included in the special unit includes the general-purpose I/O circuit in addition to the high-speed I/O processing circuit. Therefore, for the application which requires the high-speed output or the analog output but not the high-speed input or the analog input or for the application which requires the high-speed input or the analog input but not the high-speed output or the analog output, unnecessary I/O terminals are efficiently used. As a result, the special unit can be economically and effectively used.

The special unit 130 or 140 includes both the multi-channel input interface circuit 139X or 149X and the multi-channel output interface circuit 139Y or 149Y respectively connected to the external connection terminals 130X and 130Y or 140X and 140Y. The input interface circuit 139X or 149X is classified as any of the input interface circuit 139X or 149X for an ON/OFF switch sensor, which includes the input filter having a small time constant for the high-speed input pulse or the input filter having a large time constant, to which the high-speed input pulse is not input, and the input interface circuit for an analog sensor, which includes the voltage/frequency converter. The output interface circuit 139Y or 149Y is classified as any of the output interface circuit 149Y or 139Y which includes a transistor for performing a high-speed ON/OFF switching operation for a high-speed output pulse as an output element or a transistor as an output element for performing a low-speed ON/OFF switching operation, which does not output a high-speed output pulse, and the output interface circuit for the analog load, which includes a smoothing circuit for the pulse width modulation signal output generated from the logic circuit unit 1000$n$. Each of a plurality of types of the special unit 130 or 140 is applicably composed of an arbitrary combination of any one of the high-speed logic input, the low-speed logic input and the analog input, and any one of the high-speed logic output, the low-speed logic output, and the analog output, excluding the combination of the low-speed logic input and the low-speed logic output. Specifically, the special unit includes both the input interface circuit and the output interface circuit. The input interface circuit and the output interface circuit, each having various specifications, can be used. Therefore, the reversible counter provided for each channel is used for various special purposes to be fully used, thereby enhancing the economical effects.

The logic circuit unit 1000$n$ includes the variable filter circuit 1010$n$ operating in response to the variable filter instruction REF stored in the program memory 113A. The variable filter circuit 1010$n$ includes the reversible counter 2000$n$ for counting up/down a predetermined clock signal according to the logic level of the input signal, i.e., "H" or "L", and the notification bit memory 7000$n$ serving as an input determination circuit. The first setting register 3001$n$ stores the filter constant received as the set data 3010$n$. When the value of the current value register 4001$n$ increases to reach the set value in the first setting register 3001$n$, the first setting register 3001$n$ generates the count-up output Q to stop the count-up operation. When the current value of the current value register 4001$n$ decreases to zero, the first setting register 3001$n$ generates the return output Q in place of the count-up output Q to stop the count-down operation. The input determination circuit is set by the count-up output Q and is reset by the return output Q. The output from the input determination circuit is transmitted as the notification signal 7010$n$.

The variable filter instruction REF is a special instruction having the target input relay number X, the number D of the data register which stores the required input filter constant or the directly set constant K, and the number M of the auxiliary relay which stores the notification signal 7010$n$. Upon execution of the special instruction, the input filter constant is transmitted to the first setting register 3001$n$ of the reversible counter 2000$n$ corresponding to the input relay number X as the set data 3010$n$. At the same time, the auxiliary relay M is operated by the notification signal 7010$n$. Specifically, the high-speed input terminal of the special unit is used as a general input, and the input filter thereof can be variably set. Therefore, by setting the filter constant of the input filter larger than that of the filter provided for a general input circuit, the input signal containing large superimposed noise can be sufficiently smoothed to be fetched into the CPU unit. On the other hand, by setting the filter constant of the input filter smaller than that of the filter provided for a general input circuit, the input signal containing small superimposed noise can be quickly fetched into the CPU unit. In this manner, the input processing according to the actual type of the input signal circuit can be performed. The variable filter circuit is configured using the reversible counter allocated to each of the input channels. Therefore, in the input channel which does not perform the high-speed I/O processing, the reversible counter allocated to each channel can be effectively used. As a result, the variable filter circuits in a wide range can be easily obtained.

The integrated circuit element 10 or the special unit 130 or 140 including the integrated circuit element includes the card information storage memory 9000. The system memory 112A includes a control program serving as the setting abnormality detecting means 905. The card information storage memory 9000 stores the first and the second identification terminal information 14$a$ and 14$b$ for identifying whether the interface circuit for logic signal or the interface circuit for analog signal is connected to each of the first port 11 and the second port 12, and the first and the second signal terminal information 16$a$ and 16$b$ for identifying whether the interface circuit is for the low-speed logic signal or for the high-speed logic signal when the connected interface circuit is for the logic signal. The setting abnormality detecting means 905 detects that the types of the I/O interface circuits connected to the first port 11 and the second port 12, and the content of the instruction stored in the program memory 113A do not correspond to each other to stop the operation and notify the abnormality. Specifically, for starting the operation, the card information for the type of the I/O interface circuit of the special unit and the content of the instruction in the program memory are compared. If an inappropriate instruction is used, the setting abnormality detecting means 905 stops the operation and notifies the abnormality. Therefore, it is possible to find the presence of an erroneous control program to perform a debug process. In addition, a dangerous operation can be avoided. Accordingly, the safety is improved.

Each of some or all of the reversible counters 2000$n$ provided in the logic circuit units 1000$n$ includes the standby buffer register 4004$n$. The standby buffer register 4004$n$ temporarily stores the numeric data transmitted from the buffer memory 114$b$. The content of the standby buffer register is transmitted to the first setting register 3001$n$ or the second setting register 3002$n$ based on the timing signal generated from the logic circuit unit 1000$n$. Whether the numeric data transmitted from the buffer memory 114$b$ is transmitted to the first and the second setting registers through the standby buffer register with a time difference or is directly transmitted to the first and the second setting registers without through the standby buffer register is determined based on the content of the special instruction. Specifically, the reversible counter 2000$n$ includes the standby buffer register for controlling the timing of transfer of the set data to the setting registers by the logic circuit unit. Therefore, a plurality of setting processing can be performed prior to the operation of the logic circuit unit. Moreover, the set data can be updated at the time when the timing signal is generated from the logic circuit unit during the operation of the logic circuit unit. Therefore, the burden of communication control on the microprocessor for the logic circuit unit can be reduced to enable a complicated control operation.

The system memory 112A includes the control program serving as the transfer inhibiting means 920 executed during the operation of the programmable controller 100A. The transfer inhibiting means 920 is the special instruction used for the special unit 130 or 140 and is an instruction for generating the operation completion signal. From the start of the execution of the special instruction to the acquisition of the operation completion signal, the transfer inhibiting means 920 inhibits the transmission of the set data at least to the first setting register 3001n and the second setting register 3002n. The operation completion signal is obtained by reading the content of the notification bit memory 7000n when the number of the pulse signals input to the first port 11 or the pulse signals generated from the second port 12 reaches a preset target number of pulses or the generation/count of the pulses is completed by the command signal. Specifically, the system memory 112A includes operation completion verification means for preventing the control constant from being changed while the special unit is performing the high-speed I/O control to transmit the control constant such as a new set value based on the operation completion signal. Therefore, since the microprocessor manages not to erroneously receive the control constant for a next operation during the operation of the special unit in order to prevent an erroneous control operation, the memory capacity of and the control burden on the special unit can be reduced.

Each of some or all of the reversible counters 2000n provided in the logic circuit units 1000n includes the variation adjusting register 4003n. The variation adjusting register 4003n is activated when a count-up/-down input is fed to the reversible counter 2000n. The value stored in the variation adjusting register 4003n is added to or subtracted from the current value of the current value register 4001n. Specifically, the incremental/decremental value by a single counting operation of the reversible counter can be changed by the content of the variation adjusting register. Therefore, a count-up time required to reach the upper limit value as a result of addition is inversely proportional to the content of the variation adjusting register. The reciprocal computation using the reversible counter is performed to generate a pulse output in a cycle corresponding to, for example, a target frequency. Moreover, an increasing/decreasing gradient of the current value can be variably set.

The logic circuit unit 1000n includes the high-speed counter circuit 1030n or 1040m operating in response to the high-speed counter instruction HSC stored in the program memory 113A. The high-speed counter circuit 1030n or 1040m is any one of a 1-phase 1-input reversible counter whose count direction is determined by a command signal 6030n, a 1-phase 2-input reversible counter to which a count-up/-down input is individually fed, and a 2-phase 2-input reversible counter in which a count-up/-down direction is determined based on a phase difference between inputs in two phases. Furthermore, as the high-speed counter circuit 1030n or 1040m which determines the operation mode of the high-speed counter circuit, there are the high-speed counter circuit which starts counting upon execution of the high-speed counter instruction HSC, the high-speed counter circuit provided with the count start command input, and the high-speed counter circuit provided with the preset command input for transferring the initial value data to the current value register. The 2-phase 2-input high-speed counter circuit has any of a single edge evaluation mode, a double edge evaluation mode, and a quad edge evaluation mode depending on whether the counting is performed at a rising edge or a falling edge of the pulse signal in each phase. Each of the high-speed counter circuits is provided with a unique identification number.

The identification number is a multi-digit number corresponding to the combination of the placement number indicating the position of connection of the special unit including the high-speed counter circuit and the extension number bb which allows the identification of the channel number n or m indicating the input terminal number of the special unit and corresponds to each operation mode. The high-speed counter instruction HSC is a special instruction having the operands for designating the identification number of the target high-speed counter, the number D of the data register which stores the target count value for generating the count-up output or the directly set constant K, the number M of the auxiliary relay for designating the count direction in the case of the 1-phase 1-input counter and the number C of the counter which stores the count-up output. Upon execution of the special instruction, the set data and the count direction command signal are transmitted to the first setting register 3001n or 3001m and the command latch memory 6000n or 6000m corresponding to the identification number to transmit the count-up output Q from the notification bit memory 7000n or 7000m to the device memory 114a having the counter number designated by the notification bit memory 7000n or 7000m as the count completion notification signal 7030n or 7040m. Specifically, each of the various high-speed counter circuits is provided with the identification number for avoiding the use of the input channel in an overlapping manner. At the same time, the start command or the preset command is directed from the microprocessor without using the input terminal of the special unit when the high-speed processing is not required. Therefore, any of the various target high-speed counters can be created for each channel by using a single reversible counter allocated to each of the input channels. Moreover, since the start command or the preset command which does not require the high-speed processing does not use the input terminal of the special unit, the input terminal having a special function is not needlessly used.

The high-speed counter circuit 1030n or 1040m has the high-speed output function which operates in response to the high-speed compare instruction HCMP stored in the program memory 113A. The high-speed compare instruction HCMP is a special instruction which has the identification number of the target high-speed counter circuit, the number D of the data register which stores the target comparison value or the directly set constant K, and the number M of the auxiliary relay which stores the compare match output as operands. The special instruction is enabled when the first port 11 is used as the high-speed input port and the second port 12 is used as the logic output port. Upon execution of the special instruction, the target comparison value is transmitted as the set data 3030n or 3040m to the second setting register 3002n or 3002m of the reversible counter 2000n or 2000m corresponding to the identification number. The count-up compare match output P corresponding to a stored compare match signal in the count-up operation of the second comparison circuit 5002n or 5002m is transmitted to the output terminal having the channel number n (m) corresponding to the channel number n (m) of the count input of the high-speed counter circuit 1030n (1040m). At the same time, the count-up compare match output P functions as the notification signal 7030n (7040*m*) to drive the designated auxiliary relay M. The auxiliary relay M is driven to be reset to reset the count-up compare match output P. Specifically, when the current value of the high-speed counter becomes identical with the target comparison value, the microprocessor is notified of this matching by the notification signal. At the same time, the compare match output can be obtained from the corresponding output channel of the second port corresponding to the input channel of the first port. Therefore, the compare match signal can be fetched into the microprocessor through the data bus to be used in the microprocessor. At the same time, the control signal corresponding to the external load can be quickly transmitted.

The logic circuit unit 1000*n* includes the first pulse output circuit 1060*m* allocated to each even-numbered channel m. The pulse output circuit operates in response to the first pulse output instruction PLS stored in the program memory 113A. The first pulse output circuit 1060*m* operates in any of the mode in which the first pulse output circuit operates as a pair of pulse outputs for generating any one of the forward pulse output FP and the reverse pulse output RP and the pulse output mode in which the rotational direction command output DIR is added to the reversible pulse output FRP. The pulse output circuit in each of the output modes has a unique identification number for occupying two reversible counters 2000*m* and 2000*m*+1 in the adjacent channels. One of the reversible counters includes the first setting register 3001*m* and the second setting register 3002*m* to which the constants proportional to the low-speed pulse cycle and the high-speed pulse cycle are written, whereas the other reversible counter includes the first setting register 3001*m*+1 and the second setting register 3002*m*+1 to which the constants associated with the number of pulses generated in the high-speed operation and the number of pulses generated in the low-speed operation are written.

The identification number is a multi-digit number corresponding to the combination of the placement number  indicating the position of connection of the special unit including the pulse output circuit 1060***m* and the extension number bb which allows the identification of the channel number n indicating the input terminal number of the special unit and corresponds to each operation mode. The first pulse output instruction PLS is a special instruction having the identification number of the target pulse output circuit 1060*m*, the operand for specifying the number of the data register which stores the target number of pluses to be generated which is positive or negative corresponding to the rotational direction, the number of pulses in the low-speed operation, the high-speed operation pulse cycle, and the low-speed operation pulse cycle, and the operand for specifying the number of the auxiliary relay which stores the forced stop command, the forward rotation limit stop command or the reverse rotation limit stop command, and the pulse generation completion signal. Upon execution of the special instruction, the target number of pulses to be generated, the number of low-speed operation pulses, the high-speed pulse cycle, and the low-speed pulse cycle are transmitted as the set data and the rotational direction command, the forced stop command, and the forward rotation limit stop command or the reverse rotation limit stop command are transmitted as the command signal, to the first and second setting registers 3001*m* and 3002*m*, or 3001*m*+1 and 3002*m*+1 and the command latch memory 6000*m* corresponding to the identification number. The pulse generation completion signal is transmitted as the notification signal 7060*m* to the auxiliary relay M designated by the notification bit memory 7000*m*+1. Specifically, the logic circuit unit included in the special unit includes the first pulse output circuit which operates in response to the first pulse output instruction. The first pulse output circuit occupies the two outputs identified by the identification numbers to output the two-speed pulse outputs. Therefore, by using the two reversible counters respectively allocated to the output channels, various intended pulse outputs can be generated for each pulse output circuit. Even without an acceleration/deceleration inhibition function for linearly increasing/decreasing the operation speed, the logic circuit unit can be easily used for simple positioning control for stopping the starting operation below a self-starting frequency of the stepping motor and performing a high-speed operation at a frequency equal to or higher than the self-starting frequency.

The logic circuit unit 1000*n* includes the second pulse output circuit 1070•0 (1070•4) which operates in response to the second pulse output instruction DRV stored in the program memory 113A. The second pulse output circuit 1070•0 (1070•4) has any of the two operation modes. In one of the modes, a pair of pulse outputs for generating any of the forward pulse output FP and the reverse pulse output RP are provided. In the other mode, the pulse obtained by adding the rotation direction command output DIR to the reversible pulse output FRP is output. The pulse output circuit operating in each of the modes includes at least the setting register for the number of generated pulses, the setting register for the pulse frequency, and the setting register for the acceleration/deceleration. In addition, the pulse output circuit is provided with a unique identification number for occupying four reversible counters corresponding to two inputs and three outputs. The second pulse output circuit further includes the reversible counter 2000•2 (2000•6) having an adder function for adding a numerical value stored in the variation adjusting register 4003•2 (4006•6) to the value of the current value register 4001•2 (4001•6) when an add count input is provided. The predetermined coefficient K is stored in the first setting register 3001•2 (3001•6) of the reversible counter, whereas the target pulse frequency is stored in the variation adjusting register 4003•2 (4006•6). As a result, the count-up output Q in the cycle which is inversely proportional to the pulse frequency is obtained. With the generation of the count-up output Q, the current value register 4001•2 (4001•6) is reset to obtain the count-up output Q corresponding to the target pulse cycle. The identification number is a multi-digit number composed of the combination of the placement number indicating the position of connection of the special unit including the pulse output circuit 1070•0 (1070•4) and the extension number bb which allows the identification of the channel number n indicating the output terminal number of the special unit and corresponds to each of the operation modes.

The second pulse output instruction DRV is a special instruction having the identification number of the target pulse output circuit 1070•0 (1070•4), the operand for specifying the number D of the data register which stores the target number of pluses to be generated, which is positive or negative corresponding to the rotational direction, and the number D of the data register which stores the pulse cycle or pulse frequency and the data for setting the acceleration/deceleration rate, and the operand for specifying the number M of the auxiliary relay which stores the forced stop command, the forward rotation limit stop command or the reverse rotation limit stop command, and the pulse generation completion signal. Upon execution of the special instruction, the target number of pulses to be generated, the acceleration/deceleration rate data, the target pulse frequency, and the deceleration start position data are transmitted as the set data 3070•0 (3070•4), and the rotational direction command, the forced stop command, and the forward rotation limit stop command or the reverse rotation limit stop command are transmitted as the command signal 6070•0 (6070•4) to the first and second setting registers 3001n and 3002n of each reversible counter corresponding to the identification number and the command latch memory 6000n. The pulse generation completion signal is transmitted as the notification signal 7070•0 (7070•4) to the auxiliary relay M designated by the notification bit memory 7000n. Specifically, the logic circuit unit included in the special unit includes the second pulse output circuit which operates in response to the second pulse output instruction stored in the program memory. The second pulse output circuit occupies four reversible counters identified by the identification numbers. Therefore, by using the four reversible counters respectively allocated to the I/O channels, various intended pulse outputs can be generated from the respective pulse output circuits. Moreover, the second pulse output circuit is additionally provided with the acceleration/deceleration control function for gradually increasing or decreasing the target speed for each logic circuit unit by simply receiving a predetermined acceleration/deceleration command from the microprocessor. Therefore, since the microprocessor is not required to momentarily update the set data, the control burden on the microprocessor is reduced to perform smooth acceleration/deceleration control.

The logic circuit unit 1000n includes the modified pulse output circuit 1080•0 (1080•4) obtained by partially modifying the second pulse output circuit 1070•0 (1070•4). The modified pulse output circuit is additionally provided with the positioning I/O signal for operating in response to the zero return instruction ZRN, which is stored in the program memory 113A. The system memory 112A includes the control program serving as the parameter change means 918 for obtaining the modified pulse output circuit 1080•0 (1080•4). The positioning input signal is composed of the near-point dog signal DOG operating in the vicinity of the zero point and the zero-point signal ZERO provided in the servo motor driven by the pulse output, to which the Z-phase signal which generates one pulse output for one revolution of the servo motor is input. The positioning output signal contains the clear signal CLR for resetting the residual pulse of the positioning deviation of the servo amplifier for driving the servo motor at the completion of zero return. The zero return instruction ZRN is a special instruction having the identification number of the target modified pulse output circuit 1080•0 (1080•4), the operand for specifying the number D of the data register which stores at least the high-speed pulse frequency or pulse cycle for zero return, the low-speed pulse frequency or pulse frequency for the creep operation in the vicinity of the zero point, the data for setting the acceleration/deceleration rate and the number of zero-point signals and the operand for specifying the number M of the auxiliary relay which stores the zero return direction command, the forced stop command, the forward rotation limit stop command or the reverse rotation limit stop command, and the zero return completion signal.

Upon execution of the special instruction, the pulse frequency for the high-speed operation, the pulse frequency for the low-speed creep operation, the acceleration/deceleration rate set data, and the number of zero-point signals are transmitted as the set data 3080•0 (3080•4), and the zero return direction command, the forced stop command and the forward rotation limit stop command or the reverse rotation limit stop command are transmitted as the command signal 6080•0 (6080•4) to the first and the second setting registers 3001n and 3002n of the reversible counter corresponding to the identification number, and the command latch memory 6000n. Then, the zero return completion signal is transmitted as the notification signal 7080•0 (7080•4) from the notification bit memory 7000n to the designated auxiliary relay M. The parameter change means 918 serves to change the I/O circuit of the last reversible counter which has counted the number of generated pulses in response to the second pulse output instruction DRV to use the reversible counter as the last reversible counter for counting the number of zero-point signals in response to the zero return instruction. The change in connection is enabled for a limited time period from the start of execution of the zero return instruction ZRN to the completion thereof. The I/O circuit is normally reproducibly set as the circuit for the second pulse output instruction DRV. Specifically, the second pulse output circuit is provided with two positioning input signals and one positioning output signal. By changing the parameters, the zero return instruction can be used without increasing the number of occupied reversible counters. Therefore, by using the occupied five I/Os and four reversible counters for the second pulse output instruction, the zero return operation can be easily performed. In particular, the second pulse output instruction and the zero return instruction are configured in the same logic circuit except for the last reversible counter and differ from each other only in the content of the control command. Therefore, the parameter setting for the logic circuit unit can be easily changed.

Each of the first and second pulse output circuits 1060m and 1070•0 (1070•4) is additionally provided with the monitoring means operating in response to the current position read instruction DCVRD stored in the program memory 113A. The current position read instruction DCVRD has the operand for specifying the identification number of the target pulse output circuit 1060m or 1070•0 (1070•4) and the number D of the data register which stores the current position information with respect to the forward rotation limit position, the reverse rotation limit position or the zero-point position. Upon execution of the special instruction, the content of the current register 4001m+1 or 4001•3 (4001•7) which stores the pulse output information of the pulse output circuit 1060m or 1070•0 (1070•4) corresponding to the identification number after the completion of movement is transmitted as the computational data 4060m or 4070•0 (4070•7). As a result, the computational data is sequentially algebraically added to the data register D according to the moving direction. The predetermined initial position data is written in advance at the reference position including the zero point or the forward/reverse rotation limit position by the sequential program. Specifically, the amount of movement caused in response to the pulse output instruction is read by the current position read instruction to be algebraically added to the data register in which the predetermined initial position data is written at the reference position including the zero point or the forward/reverse rotation limit position by the sequential program. Therefore, since the pulse output circuit has only to notify the amount of movement for each time to allow the microprocessor to know the current position as the result of the forward/reverse operation in various amounts of movement. Therefore, the pulse output circuit can be configured at low cost. If the target amount of movement designated by the pulse output instruction is cumulatively added to the second data register in which the predetermined initial position data is written at the zero-point position or the forward/reverse rotation limit position by the sequential program, whether or not normal positioning control is performed can be determined by the user's sequential program by comparing and determining if the target current position obtained by the cumulative addition and the estimated current position obtained by the current position read instruction are identical with each other.

The third pulse output instruction ABS used in place of the first pulse output instruction PLS and the second pulse output instruction DRV stored in the program memory 113A is applied to the first and second pulse output circuits 1060m and 1070•0 (1070•4). The third pulse output instruction ABS designates the target position of movement in place of the target amount of movement designated by the first and second pulse output instructions PLS and DRV. The data conversion/transfer means 921 calculates the target amount of movement based on a difference between the current position detected and stored by the current position read instruction DCVRD and the target movement position, and transmits the target amount of movement to the first and second setting register 3001n and 3002n through the buffer memory 114b. Specifically, the positioning control can be performed by designating the absolute position with the data conversion/transfer means provided for the system memory and the third pulse output instruction. Therefore, since a relative amount of movement is always designated for the pulse output circuits, the first and second pulse output circuits can be used without any modification to perform an operation in response to the third pulse output instruction based on the user's intension.

The logic circuit unit 1000n includes the pulse width measuring circuit 1022n which operates in response to the pulse width measurement instruction PWD stored in the program memory 113A. The pulse width measuring circuit 1022n is configured by the reversible counter 2000n for operating in accordance with a transition of the input logic of the channel terminal 11n connected to the input interface circuit 139X for high-speed logic signal to count the number of clock signals, each having a predetermined cycle. The pulse width measuring circuit 1022n stores the current counter value from the transition of the input logic to the next transition in the peak hold register 4002n to transmit the current counter value as the computational data 4022n. At the same time, the pulse width measuring circuit 1022n transmits the measurement completion signal as the notification signal 7022n. The microprocessor 111, which has received the notification signal 7022n, resets the measurement completion signal in response to the command signal 6022n to restart the measurement of the pulse width. The pulse width measurement instruction PWD is used for the special unit 130 to which the input interface circuit 139X for the high-speed logic signal is connected. The pulse width measurement instruction PWD has the target input number X, the number D of the data register which stores the result of measurement, and the number M of the auxiliary register which stores the measurement completion signal as the operands. Upon execution of the special instruction, the content of the peak hold register 4002n is transferred to and stored in the data register D as the computational data 4022n. At the same time, the measurement completion signal drives the auxiliary relay M to reset the operation of the auxiliary relay M. As a result, the measurement restart command is transmitted as the command signal 6022n to the command latch memory 6000n. Specifically, the pulse width measuring circuit measures and notifies the ON width or the OFF width of the input logic signal by the clock signals. Therefore, the microprocessor reciprocally computes the measured time width to enable highly accurate detection of the rotation speed with the low-speed rotation pulse signal. For simply determining whether the low-speed rotation speed is high or low, the reciprocal computation is not required. Whether the rotation speed is high or low can be determined based on the length of the measured time.

The logic circuit unit 1000n includes the edge detecting circuit 1031n which operates in response to the edge detection instruction EDGE stored in the program memory 113A. The edge detecting circuit 1031n is configured by the 1-count reversible counter 2000n which operates in response to a transition of the input logic of the channel terminal 11n connected to the input interface circuit 139X for high-speed logic signal to detect and store at least one of the rising edge and the falling edge to transmit the edge as the notification signal 7031n. The microprocessor 111, which has received the notification signal 7031n, resets the detection storage signal by the command signal 6031n to restart the next edge detection. The edge detection instruction EDGE is applied to the special unit 130 to which the input interface circuit 139X for the high-speed logic signal is connected. The edge detection instruction has the target input number X and the number M of the auxiliary relay which stores the result of detection as the operands. Upon execution of the special instruction, a value exceeding 1 is stored in the first setting register 3001n of the reversible counter 2000n, whereas the set value of 1 is stored in the second setting register 3002n. The rising edge is detected by the count-up compare match output P which stores the compare match during the count-up operation of the second comparison circuit 5002n. With the generation of the count-up compare match output P, the count direction and the count input logic are inverted. Then, the falling edge is detected by the count-down compare match output $\underline{P}$ which stores the compare match during the count-down operation of the second comparison circuit 5002n. The count-up compare match output P and the count-down compare match output $\underline{P}$ are transmitted as the notification signal 7031n to the auxiliary relay M. By resetting the operation of the auxiliary relay M, the detection restart command is transmitted by the command signal 6031n to the command latch memory 6000n. Specifically, the count-up compare match output and the count-down compare match output from the reversible counter allow the detection of the rising edge or the falling edge of the input signal. Therefore, the reversible counter can be effectively used to quickly detect a logical transition of the input signal or to detect and store the incoming input signal pulse having a shorter cycle than the sequential computation cycle.

The logic circuit unit 1000n includes the pulse density measuring circuit 1020n which operates in response to the pulse density measurement instruction FREQ stored in the program memory 113A. The pulse density measuring circuit 1020n is a high-speed counter whose current counter value is reset for each predetermined time. By storing the maximum count value immediately before the resetting, the digital value proportional to the frequency of the input pulse signal is obtained. The measured frequency is stored in the peak hold register 4002n. The pulse density measurement instruction FREQ is applied to the special unit 130, to which the input interface circuit 139X for the high-speed logic signal is connected. The pulse density measurement instruction FREQ has the target input number X and the number D of the data register which stores the result of measurement as the operands. Upon execution of the special instruction, the content of the peak hold register 4002n is transferred to and stored in the data register D as the computational data 4020n. Specifically, the logic circuit unit included in the special unit includes the pulse density measuring circuit which operates in response to the pulse density measurement instruction stored in the program memory. Therefore, when the pulse density measuring circuit configured by using one reversible counter allocated to each input channel is used for the input interface circuit for logic signal, the pulse density measuring circuit can be used to, for example, measure the pulse density of the rotation pulse signal of the motor to measure the rotation speed of the motor.

Furthermore, the logic circuit unit 1000n includes the PWM output circuit 1050n which operates in response to the PWM output instruction PWM stored in the program memory 113A. The PWM output circuit 1050n generates a pulse width modulation signal having a variable duty ratio (ratio of the ON time to the ON/OFF cycle) in the predetermined cycle based on the contents of the first and second setting registers 3001n and 3002n. The PWM output instruction PWM is applied to the special unit 140, to which the output interface circuit 149Y for logic signals is connected. The PWM output instruction has the target output number and the number D of the data register which stores the data for determining the cycle of the output pulse and the ON width as the operands. Upon execution of the special instruction, two data items associated with the cycle of the output pulse and the ON width or the OFF width are temporarily stored in the standby buffer register 4004n as the set data 3050n. The temporarily stored data are transferred again to the first and second setting registers 3001n and 3002n at the completion of generation of one pulse. Specifically, the logic circuit unit included in the special unit includes the PWM output circuit which operates in response to the PWM output instruction stored in the program memory. Therefore, when the PWM output circuit configured by using one reversible counter allocated to each channel is used for the output interface circuit for logic signals, for example, the PWM output circuit can be used for ON/OFF control of an electrical load such as temperature control with an electric heater or dimmer control with an incandescent lamp.

Second Embodiment (1) Detailed Description of a Configuration

Figure 30:
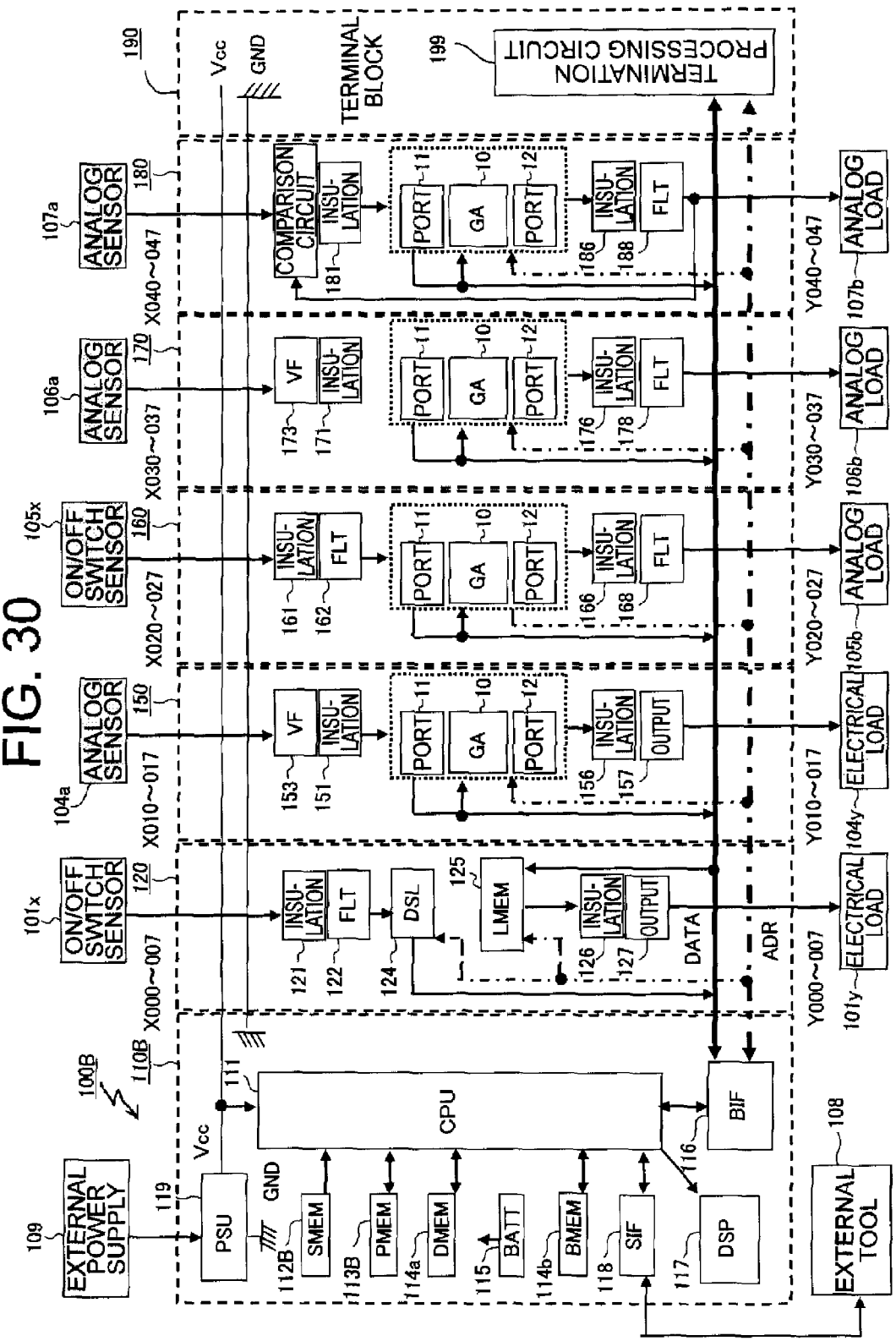
FIG. 30 is a view illustrating a unit configuration of a programmable controller according to a second embodiment of the present invention.

Hereinafter, FIG. 30 illustrating a unit configuration of a programmable controller according to a second embodiment of the present invention will be referred to, mainly for the description of differences with the configuration illustrated in FIG. 1 according to the first embodiment. In FIG. 30, the same or equivalent components illustrated in FIG. 1 are denoted by the same reference numerals. In FIG. 30, a programmable controller 100B includes a CPU unit 110B, the I/O unit 120, I/O units 150 to 180, and a terminal block 190.

Electric power is supplied to the CPU unit 110B from an external power supply 109 which is, for example, a commercial power supply for 100V to 240V AC. The CPU unit 110B is also connected to an external tool 108 through a removable connector (not shown) to be capable of writing an I/O control program and monitoring an operating state. The CPU unit 110B includes a microprocessor 111, a system memory 112B, a program memory 113B, a device memory 114a, a buffer memory 114b having functions described below, a battery 115, a bus interface circuit 116, a warning display unit 117, a serial interface 118, and a control power supply 119. The system memory 112B is, for example, a mask ROM memory or a non-volatile flash memory. The program memory 113B is, for example, a non-volatile flash memory, and stores I/O control programs created by a user. The device memory 114a is, for example, a RAM memory, and includes I/O image memories X and Y, an auxiliary relay M, and a data register D described below. The battery 115 serves for backing up a part of the device memory 114a. The bus interface circuit 116 serves for data communication with each of the I/O units. The serial interface 118 connects the external tool 108 and the microprocessor 111 to each other. Among the above-described components, the microprocessor 111, the system memory 112B, the program memory 113B, the device memory 114a, the buffer memory 114b, the bus interface 116, and the serial interface 118 are connected to each other through a bus. The control power supply 119 can also be provided outside the CPU unit 110B. The power supply unit, the CPU unit, and a predetermined number of I/O units constitute a basic unit.

The system memory 112B includes various control programs described above referring to FIGS. 18 and 19. The system memory 112B converts the I/O control programs in a sequential language, which is stored in the program memory 113B, into a machine language compatible with the microprocessor 111 to operate the microprocessor 111. The programs are stored by a manufacturer of the programmable controller at the time of shipping of the manufactured product.

A sequential program for I/O control created by the user using the external tool 108 which is, for example, a personal computer is written to the program memory 113B through the serial interface 118. Examples of the sequential program are represented as the sequence diagrams illustrated in FIGS. 20 to 25, 27, and 29 referred to above and FIG. 36 referred to below. The generation of the sequence diagram on the screen of the personal computer automatically generates the sequential program.

The I/O units 120 and 150 to 180 described above are connected to an end face of the CPU unit 110B. The I/O unit 120 is a general-purpose I/O unit described above referring to FIG. 1, whereas the I/O units 150 to 180 are special units for an ON/OFF switch sensor or a logic load of an ON/OFF operation, or an analog sensor or an analog load.

Figure 31:
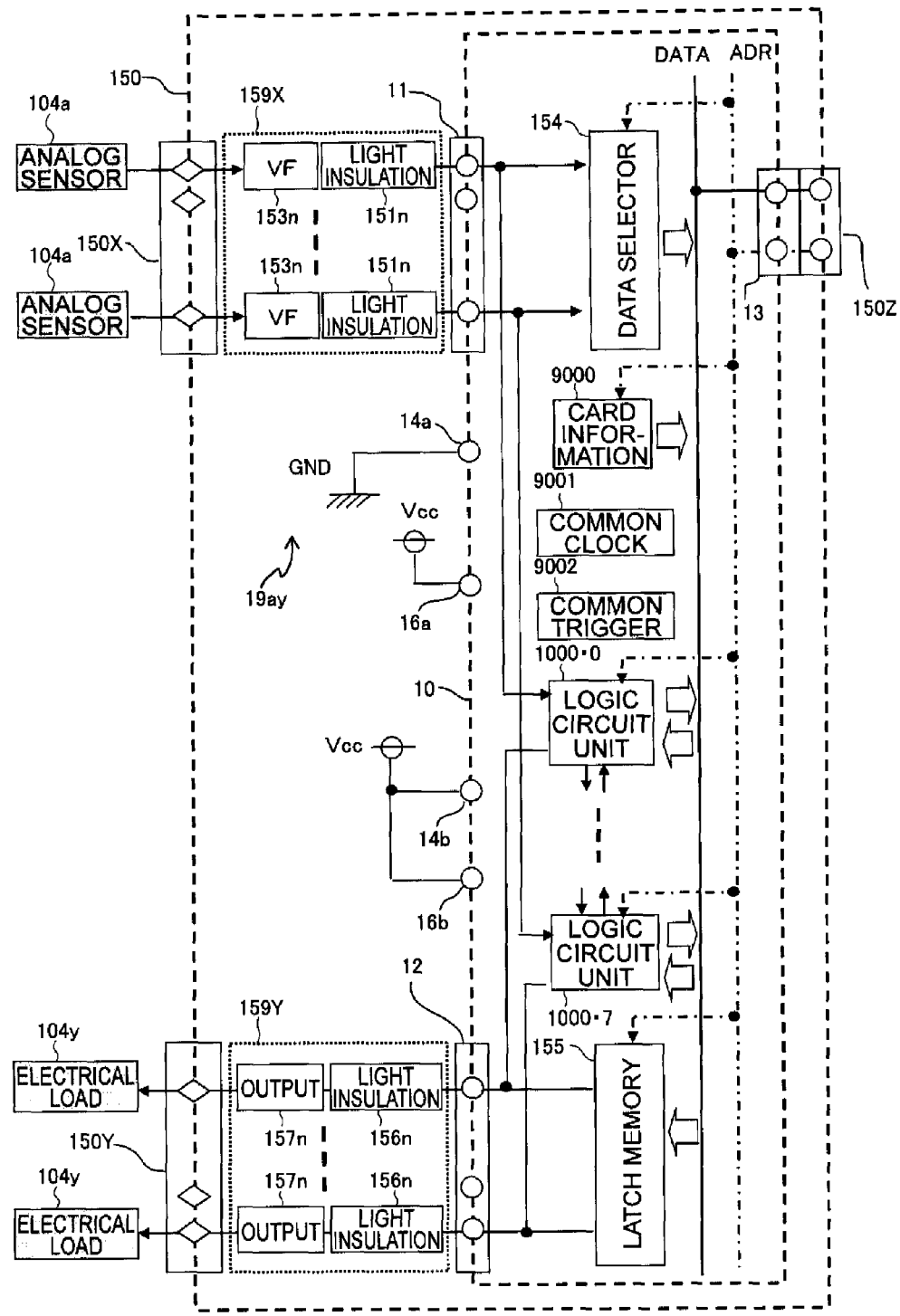
FIG. 31 is a view illustrating an internal configuration of a special unit illustrated in FIG. 30.
Figure 32:
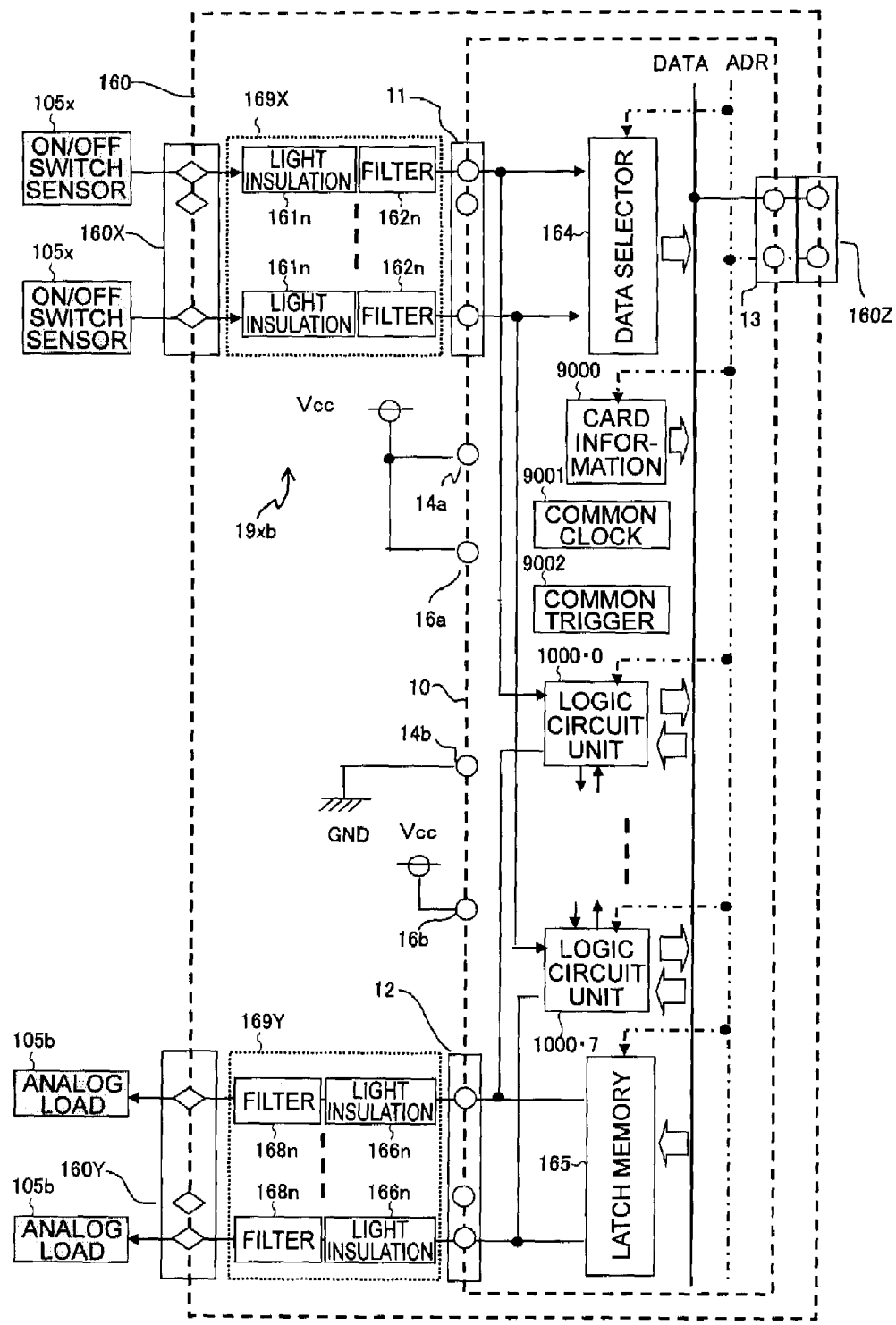
FIG. 32 is a view illustrating an internal configuration of another special unit illustrated in FIG. 30.
Figure 33:
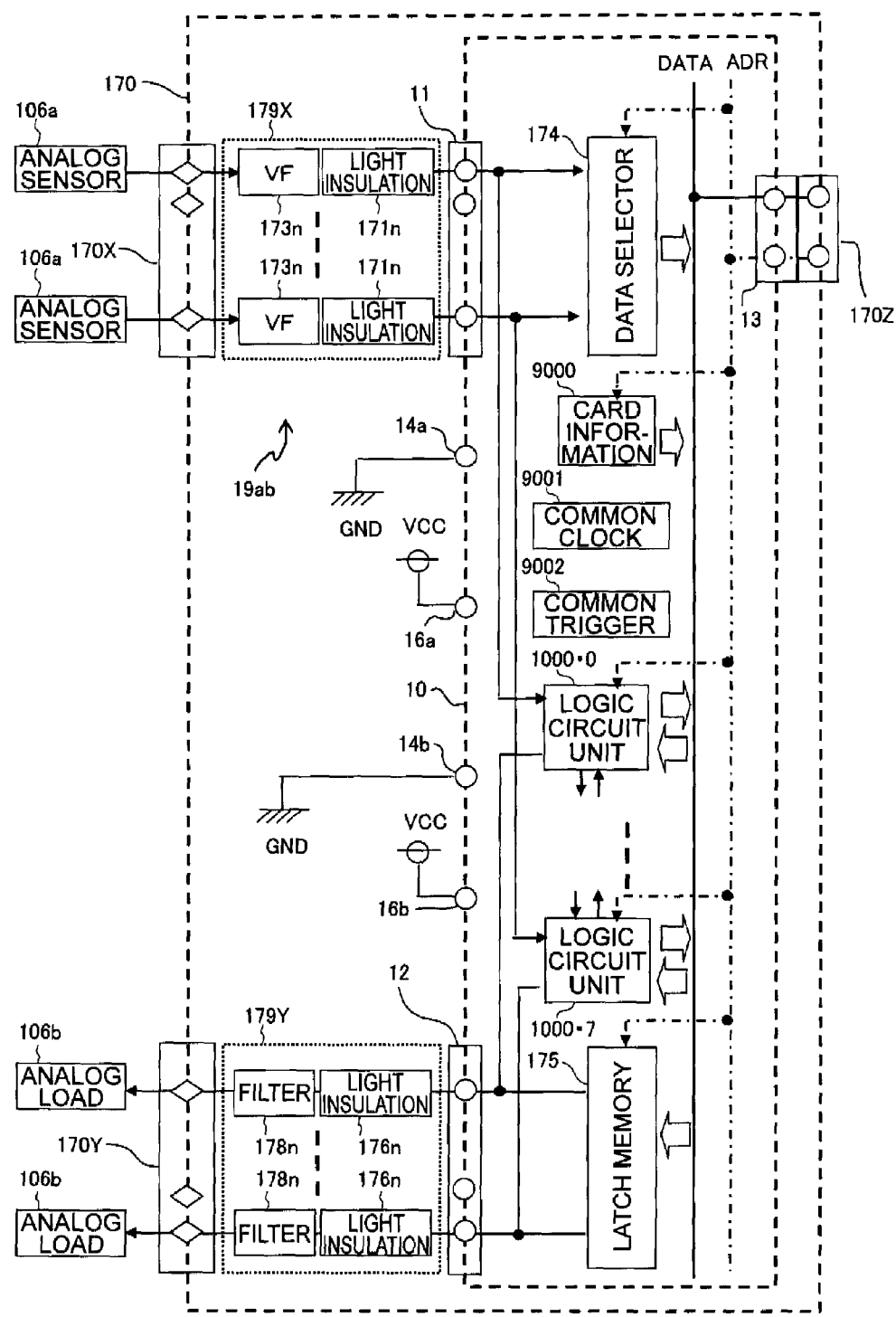
FIG. 33 is a view illustrating an internal configuration of a further special unit illustrated in FIG. 30.

Hereinafter, FIGS. 31 to 33 respectively illustrating internal configurations of the special units 150 to 170 illustrated in FIG. 30 will be referred to, mainly for the description of differences with the configurations illustrated in FIGS. 2 and 3. In FIGS. 31 to 33, the same or equivalent components are denoted by the same reference numerals. In FIG. 31, the special unit 150 includes input terminals 150X connected to eight analog sensors 104a and output terminals 150Y connected to eight electrical loads 104y performing a high-speed logic operation. An input interface circuit 159X for an analog circuit is provided between the input terminals 150X and the first port 11 provided for the integrated circuit element 10. The input interface circuit 159X includes voltage/frequency converters 153n for generating a pulse having a frequency proportional to an input voltage and input insulating circuits 151n. The combination of the voltage/frequency converter 153n and the input insulating circuit 151n connected in series is provided for each channel number: n=0 to 7. An output interface circuit 159Y for ON/OFF operation is provided between the output terminals 150Y and the second port 12 provided for the integrated circuit element 10. The output interface circuit 159Y includes output elements 157n which are power transistors and output insulating circuits 156n. The combination of the output element 157n and the output insulating circuit 156n connected in series is provided for each channel number: n=0 to 7.

The input terminals 150X and the input interface circuit 159X, the output terminals 150Y and the output interface circuit 159Y, a bus joint connector 150Z, and the integrated circuit element 10 are mounted on an electronic substrate 19ay to constitute the special unit 150. The first identification terminal 14a is connected to the ground circuit GND to indicate that the input interface circuit 159X is used for analog input, whereas the second identification terminal 14b is connected to the constant voltage power supply line Vcc to indicate that the output interface circuit 159Y is used for logic signals. The first signal terminal 16a is connected to the ground circuit GND when the input interface circuit is a comparison input circuit 189X described below and is connected to the constant voltage power supply line Vcc when the input interface circuit includes the voltage/frequency converter. A second signal terminal 16b is connected to the constant voltage power supply line Vcc to indicate that the output interface circuit 159Y is used for high-speed logic signals.

In FIG. 32, the special unit 160 includes input terminals 160X connected to eight ON/OFF switch sensors 105x and output terminals 160Y connected to eight analog loads 105b. An interface circuit 169X for high-speed logic circuit is provided between the input terminals 160X and the first port 11 provided for the integrated circuit element 10. The input interface circuit 169X includes input insulating circuits 161n and input filters 162n, each having a relatively small time constant of, for example, about 5 μsec. The combination of the input insulating circuit 161n and the input filter 162n connected in series is provided for each channel number: n=0 to 7. An output interface circuit 169Y for analog loads is provided between the output terminals 160Y and the second port 12 provided for the integrated circuit element 10. The output interface circuit 169Y includes output insulating circuits 166n and smoothing circuits 168n, each smoothing circuit including an operation amplifier serving as an output element (not shown). The combination of the output insulating circuit 166n and the smoothing circuit 168n connected in series is provided for each channel number: n=0 to 7. The smoothing circuit 168n smoothes the pulse width modulation signal generated from each of channel terminals 12n of the second port 12 to obtain an analog voltage proportional to an ON/OFF duty ratio.

The input terminals 160X and the input interface circuit 169X, the output terminals 160Y and the output interface circuit 169Y, the bus joint connector 160Z, and the integrated circuit element 10 are mounted on an electronic substrate 19xb to constitute the special unit 160. The first identification terminal 14a is connected to the constant voltage power supply line Vcc to indicate that the input interface circuit 169X is used for logic signals, whereas the second identification terminal 14b is connected to the ground circuit GND to indicate that the output interface circuit 169Y is used for analog signals. The first signal terminal 16a is connected to the constant voltage power supply line Vcc to indicate that the output interface circuit 169X is used for high-speed logic signals, whereas the logic level of the second signal terminal 16b is "H", indicating that the second signal terminal 16b is not used for analog comparison described below.

In FIG. 33, the special unit 170 includes input terminals 170X connected to eight analog sensors 106a and output terminals 170Y connected to eight analog loads 106b. An input interface circuit 179X for an analog circuit is provided between the input terminals 170X and the first port 11 provided for the integrated circuit element 10. The input interface circuit 179X includes voltage/frequency converters 173n for generating a pulse having a frequency proportional to an input voltage and input insulating circuits 171n. The combination of the voltage/frequency converter 173n and the input insulating circuit 171n connected in series is provided for each channel number: n=0 to 7. An output interface circuit 179Y is provided between the output terminals 170Y and the second port 12 provided for the integrated circuit element 10. The output interface circuit 179Y includes output insulating circuits 176n and smoothing circuits 178n, each smoothing circuit including an operational amplifier serving as an output element (not shown). The combination of the output insulating circuit 176n and the smoothing circuit 178n is provided for each channel number: n=0 to 7. The smoothing circuit 178n smoothes the pulse width modulation signal generated from each of the channel terminals 12n of the second port 12 to obtain an analog voltage proportional to an ON/OFF duty ratio.

The input terminals 170X and the input interface circuit 179X, the output terminals 170Y and the output interface circuit 179Y, a bus joint connector 170Z, and the integrated circuit element 10 are mounted on an electronic substrate 19ab to constitute the special unit 170. The first identification terminal 14a and the second identification terminal 14b are connected to the ground circuit GND to indicate that the identification terminals 14a and 14b are used for analog I/O, whereas the logic levels of the first signal terminal 16a and the second signal terminal 16b are "H" to indicate that the signal terminals 16a and 16b are not used for analog comparison described below.

Figure 34:
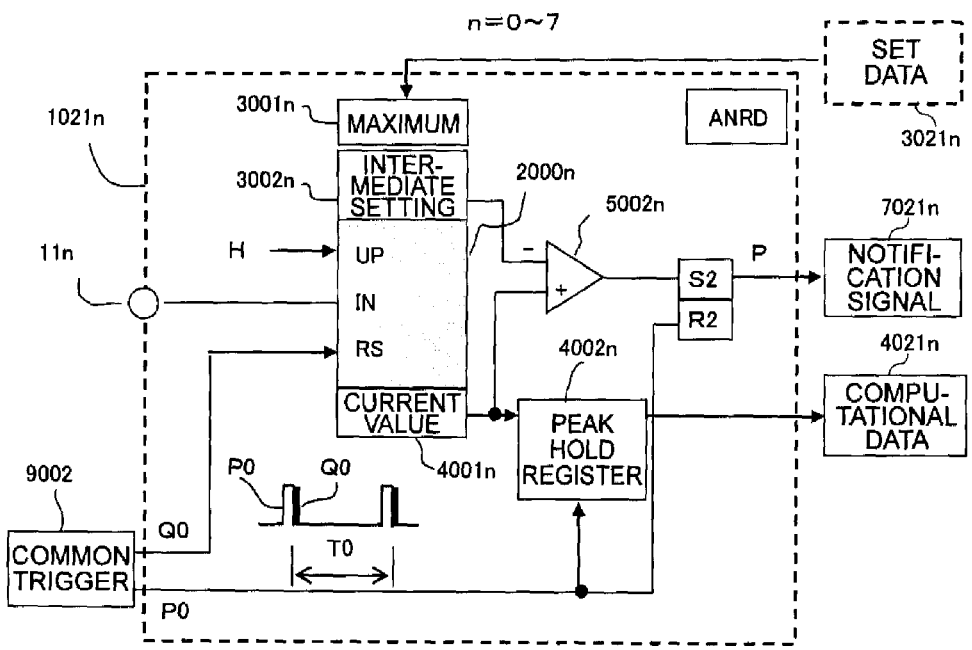
FIG. 34 is a block diagram illustrating a pulse density measuring circuit for analog signal.
Figure 35:
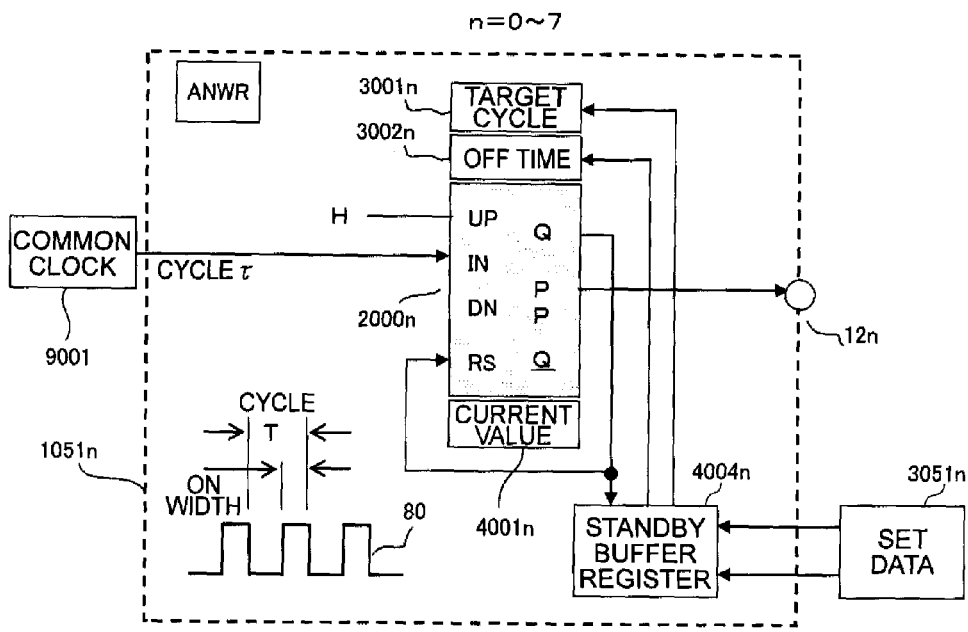
FIG. 35 is a block diagram illustrating a PWM output circuit for analog signal.

Hereinafter, the description will be continued referring to FIGS. 34 and 35. FIG. 34 is a block diagram illustrating the logic circuit unit 1000n illustrated in FIG. 4 used as a pulse density measuring circuit 1021n for analog signals (hereinafter, referred to as the analog signal pulse density measuring circuit 1021n), whereas FIG. 35 is a block diagram illustrating the logic circuit unit 1000n used as a PWM output circuit 1051n for analog loads (hereinafter, referred to as the analog load PWM output circuit). The analog signal pulse density measuring circuit 1021n can be used in place of the pulse density measuring circuit 1020n illustrated in FIG. 6. Although the PWM output circuit 1051n has the same configuration as that of the PWM output circuit 1050n illustrated in FIG. 11, the PWM output circuit 1051n has set data corresponding to a DA conversion instruction.

In FIG. 34, the reversible counter 2000n constituting the pulse density measuring circuit 1021n (n=0 to 7) performs a count-up operation when an input signal from the channel terminal 11n is input to the count input terminal IN. A 32-bit upper limit value is stored in the first setting register 3001n by using set data 3021n.

The common trigger circuit 9002 generates trigger signals P0 and Q0 for each constant cycle T0. A current counter value of the current value register 4001n is transferred to the peak hold register 4002n by the trigger signal P0. By the subsequent trigger signal Q0, a reset signal is fed to the reset terminal RST of the reversible counter 2000n. As a result, the content of the current value register 4001n is reset to zero. Therefore, the maximum count value of the reversible counter 2000n which is reset for each constant cycle T0 immediately before the resetting is stored for each time. The maximum count value serves as a pulse density (specifically, a pulse frequency) of the voltage/frequency converter, which is fed to the channel terminal 11n, to be transmitted to the microprocessor 111 by using computational data 4021n.

The maximum count value is set in the first setting register 3001n, whereas intermediate data is set in the second setting register 3002n by using the set data 3021n. The intermediate data has a value corresponding to about a half of the output frequency of the voltage/frequency converter corresponding to the input maximum analog signal voltage. The second comparison circuit 5002n sets the determination storage circuit S2 when the current counter value of the current value register 4001n becomes equal to or larger than the intermediate data stored in the second setting register 3002n. An output from the determination storage circuit S2 is transmitted as the count-up compare match output P by using a notification signal 7021n to the microprocessor 111. However, the determination storage circuit S2 is reset by the trigger signal P0 and is set by the second comparison circuit 5002n in a short period of time until the reversible counter 2000*n* is reset by the trigger signal Q0 (a time width of the trigger signal).

Therefore, in the case where any of zero and the maximum voltage is input in place of the analog signal voltage, the logic level of the output from the second comparison circuit 5002*n* is "L" when the input voltage is zero. Therefore, the logic level of the count-up compare match output P is "L". When the input voltage is the maximum voltage, the logic level of the output from the second comparison circuit 5002*n* is "H". Therefore, the logic level of the count-up compare match output P is "H". This means the following. Each of the special units 150 and 170 can handle eight analog input signals. For the application where only one analog input signal is to be handled, the remaining seven inputs can be used as ON/OFF logic inputs. Therefore, as compared with the case where a digitally converted value of the maximum input voltage is read into the microprocessor 111 by using the computational data 4021*n* to cause the microprocessor 111 to compare the digitally converted value with the intermediate value to perform logic determination, the user's processing is simplified.

In FIG. 35, the reversible counter 2000*n* constituting the PWM output circuit 1051*n* (n=0 to 7) counts up the clock signals generated from the common clock circuit 9001. The first setting register 3001*n* stores a target cycle T of the pulse width modulation signal 80, whereas the second setting register 3002*n* stores a target OFF time width of the pulse width modulation signal 80.

The microprocessor 111 transmits the set values as those described above by using the set data 3051*n* to the standby buffer register 4004*n*. The content of the standby buffer register 4004*n* is transmitted to the first setting register 3001*n* and the second setting register 3002*n* at the end of each cycle of the pulse width modulation signal 80. In the reversible counter 2000*n*, when the current count value of the current value register 4001*n* increases to reach the set value corresponding to the OFF time stored in the second setting register 3002*n*, the count-up compare match output P operates to be fed from the channel terminal 12*n* to the corresponding channel of the analog load 105*b* through the output interface circuit 169Y and the output terminal 160Y. The same operation is performed in the special units 170 and 180.

In the reversible counter 2000*n*, when the current count value of the current value register 4001*n* further increases to reach the set value corresponding to the cycle stored in the first setting register 3001*n*, the count-up output Q operates. As a result, the content of the current value register 4001*n* is reset. At the same time, the count-up compare match output P is also reset to switch the output from the channel terminal 12*n* OFF. As a result, the set data in the standby buffer register 4004*n* is transmitted to the first setting register 3001*n* and the second setting register 3002*n*.

Therefore, the cycle T of the pulse width modulation signal 80 is equal to the product of the cycle τ of the clock signal and the set value N1 stored in the first setting register 3001*n*: τ×N1. The OFF time width of the pulse width modulation signal 80 is equal to the product of the cycle τ of the clock signal and the set value N2 stored in the second setting register 3002*n*: τ×N2. Therefore, the ON time width of the pulse width modulation signal 80 output from the channel terminal 12*n* is calculated by: τ×(N1−N2). If an inverted logic output of the count-up comparison match output P is fed to the channel terminal 12*n*, the result obtained by: τ×N2 corresponds to the ON time width because the ON/OFF notion is inverted. Therefore, in the case of the logic inversion, the set value N2 stored in the second setting register 3002*n* is a set value corresponding to the ON time width.

Each of the special units 160,170, and 180 can perform eight analog outputs. For the application where only one analog output is required, the remaining seven outputs can be used for reducing the load on the ON/OFF operation. Specifically, for the analog output channels to which the PWM instruction is not applied, the PWM output is stopped. The content of the output image memory in the device memory 114*a* is transmitted to the output latch memory 165, 175 or 185 by the output processing 923 in FIG. 19.

(2) Detailed Description of the Functions and Operation

Figure 36:
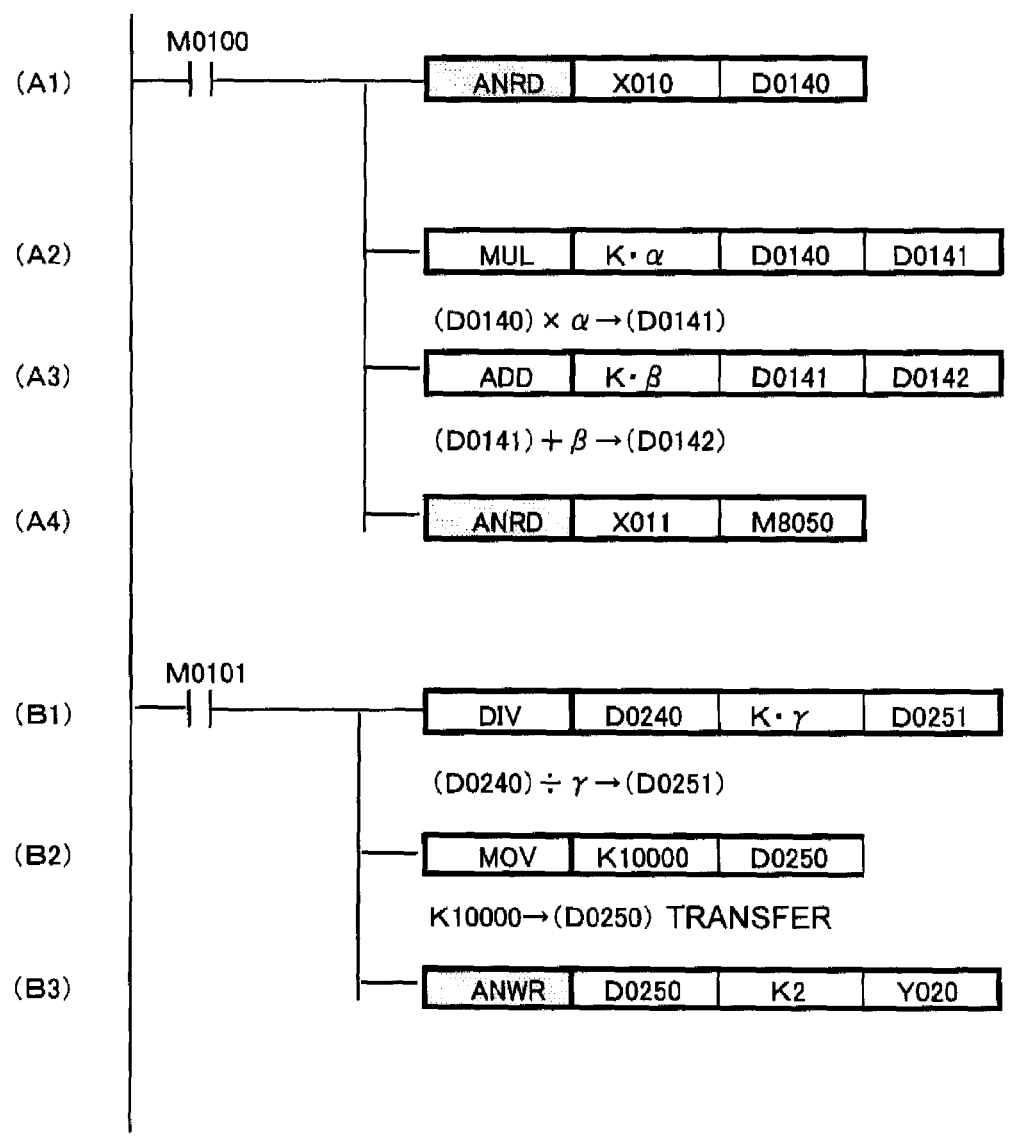
FIG. 36 is a view illustrating an exemplary use of an analog I/O instruction.

In the programmable controller configured as described above, the basic operation of the microprocessor 111 has been described referring to FIGS. 18 and 19, and therefore, the description thereof is herein omitted. An exemplary use of analog I/O instructions will be described below referring to FIG. 36. FIG. 36(A1) illustrates a circuit block indicating an AD conversion instruction ANRD which operates when an auxiliary relay M0100 is driven by a sequence circuit (not shown). The AD conversion instruction ANRD is a special instruction for measuring a density of a pulse from the voltage/frequency converter 153*n*, which is generated by an input signal X010 to the special unit 150, and for transferring the measured pulse density to a data register D0140 to obtain an AD-converted value. For example, assuming that a frequency generated from the voltage/frequency converter 153*n* is 0 to 100 KHz and a cycle T0 of the signal from the common trigger signal circuit 9002 is 10 msec when a signal voltage of the analog sensor 104*a* is 0 to 10V, the peak hold register 4002*n* stores a value of 1000 when the input signal voltage is 10V. Therefore, a value obtained by multiplying the measured voltage by 100 is stored in the data register D0140.

However, since a variation in the voltage/frequency converter 153*n* is supposed to be generated, a value obtained by digitally converting a known signal voltage is measured in advance at both a large frequency and a small frequency to calculate a calibration factor α and a bias correction value β. As a result, as illustrated in FIGS. 36(A2) and 36(A3), a detected voltage calibrated by a multiplication instruction MUL and an addition instruction ADD is obtained in a data register D0142. When an auxiliary relay number is designated by a second operand of the AD conversion instruction ANRD as illustrated in FIG. 36(A4), a constant 500 is stored in the second setting register 3002*n*. As a result, upon input of 10V as a logic signal input, the logic level of the count-up compare match output P changes to "H". On the other hand, upon input of 0V as a logic signal input, the logic level of the count-up compare match output P changes to "L". The count-up compare match output P is transmitted to the designated auxiliary relay 8050 by using the notification signal 7021*n*.

FIG. 36(B3) illustrates a circuit block indicating a DA conversion instruction ANWR which operates when an auxiliary relay M0101 is driven by a sequence circuit (not shown). The DA conversion instruction ANWR generates a pulse width modulation signal having the content of a data register D0250 as a cycle and the content of a subsequent data register D0251 as a duty ratio. Then, an analog output voltage smoothed by the smoothing circuit 168*n* is output to an output terminal Y020 of the special unit 160. In this exemplary case, as illustrated in FIG. 36(B2), a constant K10000 is stored in the data register D0250 by a transfer instruction MOV. By a division instruction DIV illustrated in FIG. 36(B1), the content of a data register D0240 which stores a voltage intended to be output is divided by the maximum value of the analog output voltage to calculate a required duty ratio. The obtained value is stored in the data register D0251. For example, when the analog output voltage is 0 to 10V, γ=10 is obtained. In view of a variation in the power supply voltage, however, an appropriate calibration constant γ is used as a result of initial calibration.

When the DA conversion instruction ANWR is driven, the value in the data register D0250, that is, K10000 is transferred to the first setting register 3001$n$ of the reversible counter 2000$n$ illustrated in FIG. 35. When the cycle τ of the common clock signal is equal to 1 μsec, the cycle of the PWM signal obtained from the channel terminal 12$n$ is 10 msec. If the ON duty ratio is 60%, 4000 μsec corresponding to the OFF time width is stored in the second setting register 3002$n$. If the ON duty ratio is 100%, 0 μsec corresponding to the OFF time width is stored in the second setting register 3002$n$. As a result, an output voltage VmAx from the smoothing circuit 168$n$ is obtained as 10V. For an analog output to which the DA conversion instruction ANWR is not applied, after the PWM output is brought into the stop state, an ON/OFF command is transmitted to the output latch memory 165 by the output processing 923 illustrated in FIG. 19 to generate an ON/OFF driving output from the channel terminal 12$n$.

(3) The other Examples

Figure 37:
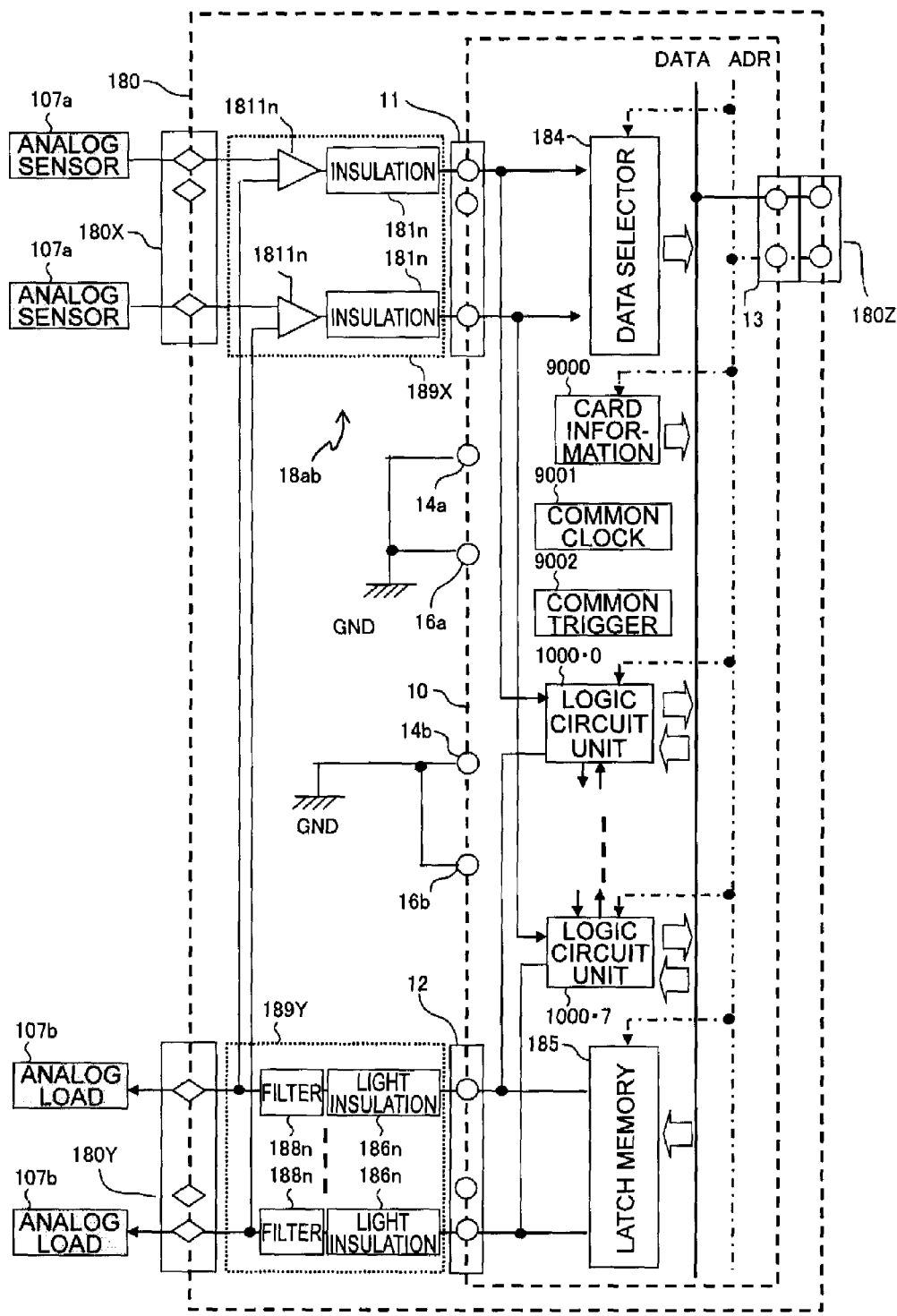
FIG. 37 is a view illustrating an internal configuration of a further special unit illustrated in FIG. 30.

Next, FIG. 37 illustrating an internal configuration of the special unit 180 shown in FIG. 30 will be referred to, mainly for the description of differences from the configurations illustrated in FIGS. 2 and 3. The same or equivalent components are denoted by the same reference numerals in FIGS. 2, 3, and 37. In FIG. 37, the special unit 180 includes input terminals 180X which can be connected to eight analog sensors 107$a$ and output terminals 180Y which can be connected to eight analog loads 107$b$. An input interface circuit 189X for an analog circuit is provided between the input terminals 180X and the first port 11 provided for the integrated circuit element 10. The input interface circuit 189X includes comparison circuits 1811$n$ and input insulating circuits 181$n$. The combination of the comparison circuit 1811$n$ and the input insulating circuit 181$n$ connected in series is provided for each channel number: n=0 to 7. An input signal voltage from the analog sensor 107$a$ is applied to one of the input terminals of the comparison circuit 1811$n$, whereas an output signal voltage obtained from an output interface circuit 189Y described below is applied to the other input terminal. The result of comparison between the two input voltages is input to each of the channel terminals 11$n$ of the first port 11 through the input insulating circuit 181$n$. The output interface circuit 189Y for analog loads is provided between the output terminals 180Y and the second port 12 provided for the integrated circuit element 10. The output interface circuit 189Y includes output insulating circuits 186$n$ and smoothing circuits 188$n$, each smoothing circuit including an operational amplifier operating as an output element (not shown). The combination of the output insulating circuit 186$n$ and the smoothing circuit 188$n$ connected in series is provided for each channel number: n=0 to 7. The smoothing circuit 188$n$ smoothes the pulse width modulation signal generated from each of channel terminals 12$n$ of the second port 12 to obtain an analog voltage proportional to an ON/OFF duty ratio.

The input terminals 180X and the input interface circuit 189X, the output terminals 180Y and the output interface circuit 189Y, a bus joint connector 180Z, and the integrated circuit element 10 are mounted on an electronic substrate 18$ab$ to constitute the special unit 180. The first and second identification terminals 14$a$ and 14$b$ are connected to the ground circuit GND to indicate that the terminals 14$a$ and 14$b$ are used for analog I/O, whereas the first signal terminal 16$a$ and the second signal terminal 16$b$ are connected to the ground circuit GND to indicate that the I/O interface circuits 189X and 189Y are used for analog comparison.

The special unit 180 is suitable for comparing the signal voltage from the analog sensor 107$a$ and a predetermined variable reference voltage to obtain the result of comparison. In this case, the second port 12 is used for obtaining a variable reference voltage. If, for example, only one output is used for analog comparison, the remaining seven outputs can be used for feeding an analog signal to the analog load 107$b$ or for logic output signals for a small load when the analog load is small. As an applied instruction for analog comparison, an ANRD instruction as in the case illustrated in FIG. 36(A4) is used. An input number is designated by a first operand of the ANRD instruction, whereas a number of the auxiliary relay which stores the result of comparison is designated by a second operand.

In the above-description, each of the programmable controllers 100A and 100B has been described as a train-type programmable controller in which the CPU unit and the I/O unit, each being housed within an independent box, are connected to each other through a joint connector. Alternatively, however, the programmable controller may be configured as follows. The CPU unit and each of the I/O units may be provided on a common base plate. The base plate includes a plurality of connectors which are connected to each other through a bus by a mother board. Each of the I/O units is connected to each of the connectors. Further alternatively, the programmable controller may be configured as a unit-type programmable controller including the CPU unit and the I/O units housed within one box. Although the communication between the CPU unit and each of the I/O units is performed through multiple data buses and address buses, the buses are used as data/address buses in practice. A control bus is additionally provided to reduce the number of signal lines. The communication between the CPU unit and the special unit may be a serial bus using a serial-parallel converter. For quickly making an execution completion notification of the special instruction, an interruption control signal line for the microprocessor can be provided.

In the above-described embodiment, each of various high-speed counters and the high-speed pulse outputs is provided with an individual number composed of the extension number and the placement number. The combination of the special instruction and the individual number determines the content of the parameter memory 8000$n$ of the logic circuit unit 1000$n$. Alternatively, the special instruction can be provided with a number corresponding to the extension number (for example, the high-speed counter instruction HSC is represented as a number varying from HSC00 to HSC96) to leave the I/O number without the extension number.

In the input interface circuit for a logic circuit illustrated in FIG. 2, the time constant of the input filter 132$n$ is set to, for example, 5 μsec to be able to handle the highest input pulse frequency. However, if the number of pulses having a lower frequency is desired to be counted in various applications, it is desirable to increase the time constant of the input filter 132$n$ to prevent an erroneous operation caused by noise. Therefore, in addition to the variable filter circuit having a time constant of 1 to 64 msec illustrated in FIG. 5, a variable filter having a time constant of about 5 to 20 μsec can be provided.

In the above description, each of the logic circuit units 1000$n$ includes the parameter memory 8000$n$. The microprocessor 111 transmits parameter data corresponding to an applied instruction to the parameter memory 8000$n$. Alternatively, however, the logic circuit unit 1000$n$ may include a plurality of parameter data, and the microprocessor 111 may select the parameter data to be used from the plurality of parameter data. In this case, a selection number of the parameter data is transmitted as a parameter. Furthermore, in the above description, the system memories 112A and 112B are denoted by different reference numerals in the first and second embodiments. In practice, however, the same system programs are stored in the system memories 112A and 112B.

(4) Summary and Characteristics of the Second Embodiment

As is apparent from the above description, the programmable controller 100B according to the second embodiment of the present invention includes the CPU unit 110B which includes the microprocessor 111, the system memory 112B operating in cooperation with the microprocessor 111, the program memory 113B to which the sequential program created by the user is transferred and written from the external tool 108, and the device memory 114a which has the I/O image memories X and Y for storing the I/O information and the control information, the auxiliary relay M, and the data register D, and one of or a plurality of the I/O units 120 and 150 to 180 connected to the CPU unit through the bus. Some or all of the I/O units serve as the special units 150 to 180 respectively including the integrated circuit elements 10 for sharing the special I/O processing function to complement the control function of the microprocessor 111. The special unit 150, 160, 170 or 180 includes the electronic substrate, on which the external connection terminals 150X and 150Y, 160X and 160Y, 170X and 170Y, or 180X and 180Y connected to at least one of or both of the plurality of external sensors and external loads, the multi-channel input interface circuit 159X, 169X, 179X or 189X, or the multi-channel output interface circuit 159Y, 169Y, 179Y or 189Y connected to the external connection terminal, the integrated circuit element 10 used for I/O control whose control specifications can be partially variably set, and the bus joint terminal 150Z, 160Z, 170Z or 180Z for connection to the microprocessor 111, are mounted. The integrated circuit element 10 includes the first port 11 to which the logic signal for ON/OFF operation is input from the input interface circuit 159X, 169X, 179X or 189X, the second port 12 for outputting the logic signal for ON/OFF operation is output to the output interface circuit 159Y, 169Y, 179Y or 189Y, the parameter memory 8000n corresponding to each channel number n, and the logic circuit unit 1000n whose operation specifications for the I/O processing are determined by the circuit organization data transmitted from the microprocessor 111 to the parameter memory.

The logic circuit unit 1000n further includes the notification bit memory 7000n, the calculation register 4000n, the setting register 3000n, the command latch memory 6000n, and the reversible counter 2000n. The reversible counter 2000n includes the current value register 4001n constituting a part of the calculation register 4000n. The circuit organization data transmitted to the parameter memory 8000n allows a plurality of high-speed input processings and a plurality of high-speed output processings to be performed. When the input signal from the external sensor is an analog signal, the input interface circuit 159X, 179X or 189X feeds a pulse having a frequency proportional to the input signal or a comparison determination logic signal to the integrated circuit element 10. When the external load is an analog load, the integrated circuit element 10 generates a pulse output having a commanded ON/OFF ratio as an output signal. The output interface circuit 169Y, 179Y or 189Y smoothes the received pulse output signal and then feeds the smoothed signal to the external load.

The CPU unit 110B includes the buffer memory 114b for data communication with the special unit 150, 160, 170 or 180. The system memory 112B includes the control programs serving as the organization processing means 908 and the data conversion/transfer means 921. The organization processing means 908 transmits the circuit organization data to the parameter memory 8000n and performs the address organization of the buffer memory 114b. The data conversion/transfer means 921 performs the data communication between the device memory 114a designated by the special instruction, and the setting register 3000n and the command latch memory 6000n, or the calculation register 4000n and the notification bit memory 7000n through the buffer memory 114b. The special instruction is composed of the instruction word indicating the type of instruction and the first operand, and at least one of the second operand and the third operand, the first to third operands being in no particular order.

Moreover, each of some or all of the reversible counters 2000n provided in the logic circuit unit 1000n includes the current value register 4001n, the first setting register 3001n, the second setting register 3002n, the first comparison circuit 5001n, and the second comparison circuit 5002n. Upon execution of the special instruction, a value is set in the current value register or the first and second setting registers from the microprocessor 111 through the buffer memory 114b.

The logic circuit unit 1000n included in the special unit 150, 160, 170 or 180 includes the general-purpose input circuit 1091 or the general-purpose output circuit 1092 for all the channels. The general-purpose input circuit 1091 is an input signal relay circuit, in which the input signal connected to the first port 11 is transmitted to the input image memory area allocated in the device memory 114a through the data selector 164 for input processing. The transfer from the data selector to the input image memory is executed by the input processing means 911 which is a control program stored in the system memory 112B. The general-purpose output circuit 1092 is an output signal relay circuit which outputs the signal from the output image memory area allocated in the device memory 114a through the output latch memory 155, 165, 175 or 185 provided in the logic circuit unit 1000n to the output circuit connected to the second port 12. The transfer from the output image memory to the output latch memory is executed by the output processing means 923 which is a control program stored in the system memory 112B. The general-purpose input circuit 1091 or the general-purpose output circuit 1092 is enabled when the logic circuit unit 1000n is not used as a high-speed I/O circuit or an analog I/O circuit.

The special unit 150, 160 or 170 includes both the multi-channel input interface circuit 159X, 169X or 179X and the multi-channel output interface circuit 159Y, 169Y or 179Y respectively connected to the external connection terminals 150X and 150Y, 160X and 160Y, or 170X and 170Y. The input interface circuit 159X, 169X or 179X is classified as any of the input interface circuit 169X for the ON/OFF switch sensor, which includes the input filter having a small time constant for handling the high-speed input pulse or the input filter having a large time constant, to which the high-speed input pulse is not input, and the input interface circuit 159X or 179X for the analog sensor, which includes the voltage/frequency converter. The output interface circuit 159Y, 169Y or 179Y is classified as any of the output interface circuit 159Y which includes a transistor for performing a high-speed switching operation for handling a high-speed output pulse as an output element or a transistor for performing a low-speed switching operation, which does not output a high-speed output pulse, and the output interface circuit 169Y or 179Y for analog loads, which includes the smoothing circuit 168n or 178n for the pulse width modulation signal output generated from the logic circuit unit 1000n. Each of a plurality of types of the special units 150, 160 and 170 are applicably composed of an arbitrary combination of any one of the high-speed logic input, the low-speed logic input and the analog input, and any one of the high-speed logic output, the low-speed logic output and the analog output, excluding the combination of the low-speed logic input and the low-speed logic output. Specifically, the special unit includes both the input interface circuit and the output interface circuit. Various specifications can be used for each of the input interface circuit and the output interface circuit. Therefore, the reversible counter provided for each channel is used in various special applications to be fully used, thereby enhancing the economical effects.

The integrated circuit element 10 or the special unit 150, 160 or 170 including the integrated circuit element 10 includes the card information storage memory 9000. The system memory 112B includes a control program serving as the setting abnormality detecting means 905. The card information storage memory 9000 stores the first and the second identification terminal information 14a and 14b for identifying whether the interface circuit for logic signals or the interface circuit for analog signals is connected to the first port 11 and the second port 12 and the first and the second signal terminal information 16a and 16b for identifying whether the interface circuit is for the low-speed logic signal or for the high-speed logic signal when the connected interface circuit is for the logic signal. The setting abnormality detecting means 905 detects that the type of the I/O interface circuits connected to the first port 11 and the second port 12, and the content of the instruction stored in the program memory 113B do not correspond to each other to stop the operation and notify the abnormality.

The logic circuit unit 1000n includes the pulse density measuring circuit 1021n which operates in response to the AD conversion instruction ANRD stored in the program memory 113B. The pulse density measuring circuit 1021n is a high-speed counter whose current counter value is reset for each predetermined time. The pulse density measuring circuit 1021n stores the maximum count value immediately before the resetting to obtain a digital value proportional to the frequency of the input pulse signal. The measured frequency is stored in the peak hold register 4002n. The AD conversion instruction ANRD is used for the special units 150 and 170 to which the input interface circuits 159X and 179X for the analog signal are respectively connected. The AD conversion instruction ANRD has the target input number X and the number D of the data register which stores the result of measurement of the pulse frequency generated from the voltage/frequency converter 153n or 173n of the input number as operands. Upon execution of the special instruction, the content of the peak hold register 4002n is transferred to and stored in the data register D as the computational data 4021n. Specifically, the logic circuit unit included in the special unit includes the pulse density measuring circuit which operates in response to the AD conversion instruction stored in the program memory. Specifically, when the pulse density measuring circuit configured by using one reversible counter allocated to each input channel is used for the input interface circuit for analog signals including the voltage/frequency converter, the pulse density measuring circuit can be used as the AD converter for obtaining the digitally converted value proportional to the input analog signal voltage.

In the pulse density measuring circuit 1021n, the intermediate set value is stored in the second setting register 3002n of the reversible counter 2000n. When an average value of the input signal voltages by the analog sensor 104a or 106a is equal to or higher than the input voltage corresponding to the intermediate set value, the count-up compare match output P for storing the generation of the compare match output from the second comparison circuit 5002n during the count-up operation is operated. When the average value of the input signal voltages to the channel terminal 11n is less than the input voltage corresponding to the intermediate set value, the count-up compare match output P is not generated from the second comparison circuit 5002n during the count-up operation to reset the count-up compare match output P. The AD conversion instruction ANRD is used for the special units 150 and 170 to which the input interface circuits 159X and 179X for analog signals are respectively connected. The AD conversion instruction ANRD has the target input number X and the number M of the auxiliary relay which stores the notification signal 7021n as operands. Upon execution of the special instruction, the content of the count-up compare match output P is transmitted as the notification signal 7021n to drive the auxiliary relay M. Specifically, in the pulse density measuring circuit, the intermediate set value is stored in the second setting register. Accordingly, in the special unit used for analog input signals, when the number of required analog input signals is small, the remaining analog input terminals are used as the logic signal input of the ON/OFF operation to prevent the terminals from being left uneconomically unused.

The logic circuit unit 1000n includes the PWM output circuit 1051n which operates in response to the DA conversion instruction ANWR stored in the program memory 113B. The PWM output circuit 105n generates the pulse width modulation signal having a variable duty ratio (ratio of the ON time to the ON/OFF cycle) in a predetermined cycle based on the contents of the first setting register 3001n and the second setting register 3002n. The DA conversion instruction ANWR is used for the special units 160, 170 and 180 to which the output interface circuits 169Y, 179Y and 189Y for analog signals are respectively connected. The DA conversion instruction ANWR has the target output number and the number D of the data register which stores the data for determining the cycle and the ON time width of the output pulse as operands. Upon execution of the special instruction, two items of the data for the cycle and the ON time width or the OFF time width of the output pulse are temporarily stored in the standby buffer register 4004n as the set data 3051n. The temporarily stored data is retransferred to the first setting register 3001n and the second setting register 3002n at the completion of generation of one pulse. Specifically, the logic circuit unit included in the special unit includes the PWM output circuit which operates in response to the DA conversion instruction which is stored in the program memory. Therefore, when the PWM output circuit configured by using one reversible counter allocated to each channel is used for the output interface circuit for analog signals which includes the smoothing circuit for the PWM signal, the PWM output circuit can be used as a DA converter for outputting an analog signal voltage proportional to the digital value commanded by the microprocessor.

Furthermore, the special unit 180 includes both the multi-channel input interface circuit 189X and the multi-channel output interface circuit 189Y respectively connected to the external connection terminals 180X and 180Y. The output interface circuit 189Y is an interface circuit for analog loads, which includes the smoothing circuit 188n for the pulse width modulation signal output PWM output by the logic circuit unit 1000n from the second port 12. The input interface circuit 189X includes the comparison circuit 1811n which compares the input signal from the analog sensor 107a and the smoothed signal of the pulse width modulation signal output PWM to generate and input a binarized logic signal to the first port 11. The special unit 180 drives the analog load for the non-overlapping I/O channel or obtains a signal indicating the result of comparison between the analog input signal and the variable comparison value. Specifically, the input interface circuit including the comparison circuit and the output interface circuit for analog signals are used to enable the analog comparison and the analog output. Therefore, the reversible counter allocated to each channel can be effectively used to prevent the generation of excessive I/Os. At the same time, various analog processings can be performed.

Third Embodiment (1) Detailed Description of a Configuration

Figure 38:
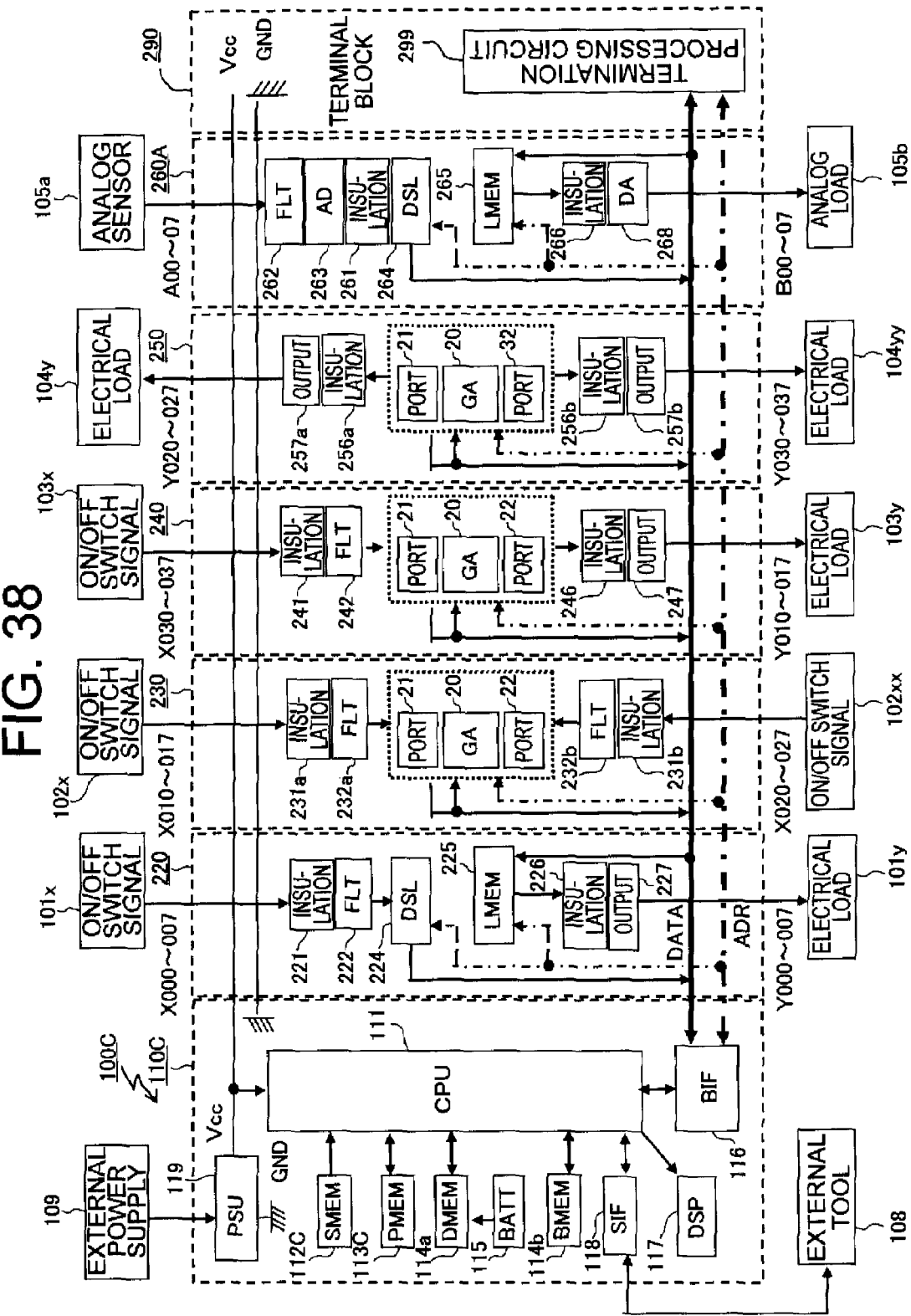
FIG. 38 is a view illustrating a unit configuration of a programmable controller according to a third embodiment of the present invention.

Hereinafter, FIG. 38 illustrating a unit configuration of a programmable controller according to a third embodiment of the present invention will be referred to. In FIG. 38, a programmable controller 100C includes a CPU unit 110C, the I/O units 220, 230, 240, 250 and 260A, and a terminal block 290.

Electric power is supplied to the CPU unit 110C from an external power supply 109 which is, for example, a commercial power supply for 100V to 240V AC. The CPU unit 110C is also connected to an external tool 108 through a removable connector (not shown) to be capable of writing an I/O control program and monitoring an operating state. The CPU unit 110C includes a microprocessor 111, a system memory 112C, a program memory 113C, a device memory 114a, a buffer memory 114b described below, a battery 115, a bus interface circuit 116, a warning display unit 117, a serial interface 118, and a control power supply 119. The system memory 112C is, for example, a mask ROM memory. The program memory 113C is, for example, a non-volatile flash memory, and stores I/O control programs created by a user. The device memory 114a is, for example, a RAM memory, and includes I/O image memories, an auxiliary relay, and a data register described below. The battery 115 backs up a part of the device memory 114a. The bus interface circuit 116 serves for data communication with each of the I/O units. The serial interface 118 connects the external tool 108 and the microprocessor 111 to each other.

Among the above-described components, the microprocessor 111, the system memory 112C, the program memory 113C, the device memory 114a, the buffer memory 114b, the bus interface 116, and the serial interface 118 are connected to each other through a bus.

Electric power is supplied from the external power supply 109 to the control power supply 119, which in turn supplies regulated 24V DC power to an input signal circuit (not shown) or, for example, a regulated 5V DC voltage to a constant-voltage power supply line Vcc. The constant-voltage power supply line Vcc is provided together with a ground circuit GND for each unit. The control power supply 119 can also be provided outside the CPU unit 110C. The power supply unit, the CPU unit, and a predetermined number of I/O units constitute a basic unit.

The system memory 112C includes various control programs described below referring to FIG. 44. The system memory 112C converts the I/O control programs in a sequential language, which is stored in the program memory 113C, into a machine language compatible with the microprocessor 111 to operate the microprocessor 111. The programs are stored by a manufacturer at the time of shipping of the manufactured product. The system memory 112C is a mask ROM memory or a non-volatile memory such as a flash memory.

An I/O control sequential program created by the user using the external tool 108 which is, for example, a personal computer, is written in the program memory 113C through the serial interface 118. Examples of the sequential program are illustrated as sequence diagrams of FIGS. 20 to 25, 27 and 29 described above. The generation of the sequence diagram on a personal computer screen automatically creates a sequential program. The program memory 113C may be a RAM memory which is backed up by the battery. In this case, the attachment of a memory cassette including a non-volatile memory such as a flash memory or an EPROM allows the non-volatile memory to be used as a program memory area.

The device memory 114a is a RAM memory which stores I/O signal information or an operating state of a device such as an auxiliary relay, a timer, a counter, and a data register open to the user, which is provided in the programmable controller 100C. A part of the device memory 114a is backed up by the battery 115 which is, for example, a lithium battery. The battery 115 keeps a storage state even if the power supply to the programmable controller 100C is cut off. The warning display unit 117 indicates an operating state of the microprocessor 111, and is composed of, for example, a plurality of light-emitting diodes or a seven-segment display. The warning display unit 117 displays an incoming power supply, a normal operating state, and various abnormal states.

The I/O unit 220 is connected to the CPU unit 110C through a connector (not shown) provided on an end face of the CPU unit 110C. An external On/Off switch signal 101x and an electrical load 101y are connected to the I/O unit 220 through an I/O terminal block (not shown). The I/O unit 220 as an exemplary embodiment is divided into a plurality of input units and a plurality of output units. The number of input units to be used and that of output units to be used correspond to the required number of inputs and that of outputs. The On/Off switch signal 101x is, for example, various operation switches and a sensor switch for confirming operations of actuators, which are provided on a control panel. For example, eight input signals can be connected to one input unit. For the connection of a larger number of the On/Off switch signals, the number of input units to be connected is increased. The electrical load 101y is, for example, various display lamps, an electromagnetic valve for driving the actuator, or an electromagnetic relay for driving a motor, which are provided on the control panel. For example, eight output signals can be connected to one output unit. For the connection of a larger number of electrical loads, the number of output units to be connected is increased.

An input interface circuit provided in the I/O unit 220 includes an input insulating circuit 221 such as a photo-coupler transistor or a photo-triac, an input filter 222 for restraining noise, and a data selector 224. An output interface circuit provided in the I/O unit 220 includes a latch memory 225 for a driving signal which drives the electrical load 101y, an output insulating circuit 226 such as a photo-coupler transistor, a photo-triac, or an electromagnetic relay, and an output element 227 such as a power transistor, a triac, or an electromagnetic relay.

The I/O unit 230 configures a special unit including the integrated circuit element 20, the first port 21 and the second port 22. The special unit is exclusively used for input. For example, eight ON/OFF switch signals 102x operating at high speed are input through an input insulating circuit 231a and an input filter 232a to the special unit, whereas eight ON/OFF switch signals 102xx operating at high speed are input through an input insulating circuit 231b and an input filter 232b.

The I/O unit 240 configures a special unit including the integrated circuit element 20, the first port 21 and the second port 22. The special unit is used for both input and output. For example, eight ON/OFF switch signals 103x operating at high speed are input through an input insulating circuit 241 and an input filter 242 to the special unit, whereas eight electrical loads 103y operating at high speed are activated through an output insulating circuit 246 and an output element 247.

The I/O unit 250 constitutes a special unit including the integrated circuit element 20, the first port 21, and the second port 22. The special unit is exclusively used for output. For example, eight electrical loads 104y operating at high speed are driven through an output insulating circuit 256a and an output element 257a, whereas eight electrical loads 104yy operating at high speed are driven though an output insulating circuit 256b and an output element 257b. Any of the integrated circuit elements 20 has the first port 21 and the second port 22 used for both I/O. Whether the special unit exclusively used for input, used for both I/O, or exclusively used for output is determined by the use of the first and second ports, that is, whether the first and second ports are used as input ports or output ports.

Upon connection of, for example, eight analog sensors 105a, an I/O unit 260A obtains 12-bit digitally converted data for each of eight-channel analog inputs by an input filter 262, a multi-channel AD converter 263, an input insulating circuit 261, and a data selector 264, which constitute an input interface circuit. Upon connection of, for example, eight analog loads 105b, the I/O unit 260A generates an analog converted output of 12-bit digital data through a latch memory 265, an output insulating circuit 266, and a multi-channel DA converter 268, which constitute an output interface circuit. The I/O unit 260A in practice is divided into analog input units and analog output units. The number of analog input units and analog output units corresponding to the number of required analog I/Os are used.

The terminal block 290 connected in the last stage includes a termination processing circuit 299. The termination processing circuit 299 connects a terminal of a data bus DATA and that of an address bus ADR, which are provided from the CPU unit 110C through the I/O units, to the constant-voltage power supply line Vcc and a ground circuit GND through a pull-up circuit and a pull-down circuit to restrain reflected noise of a high-speed signal. A feedthrough bus signal line as an exemplary embodiment includes sixteen buses for both address and data (hereinafter, referred to as address/data buses) and eight control signal buses. Whether the sixteen address/data buses are to deal with an address signal or transmitted/received data is designated by a control signal line. Furthermore, each of the I/O units includes a bus controller (not shown). Among multiple data selectors and latch memories, the one designated by the microprocessor 111 is connected to the data bus to be able to communicate with the microprocessor 111.

Figure 39:
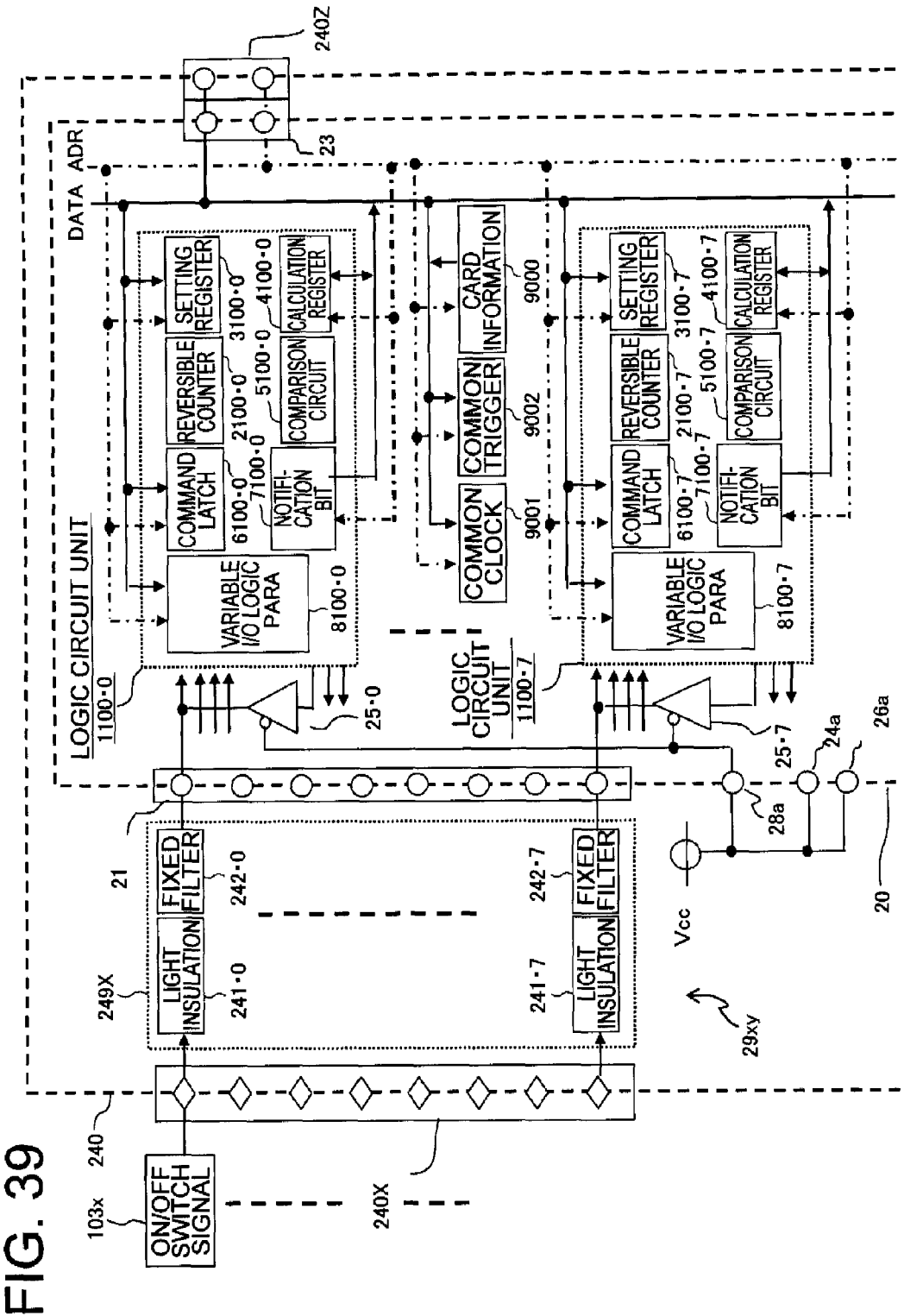
FIG. 39 is a view illustrating a configuration of a first half of a special unit illustrated in FIG. 38.
Figure 40:
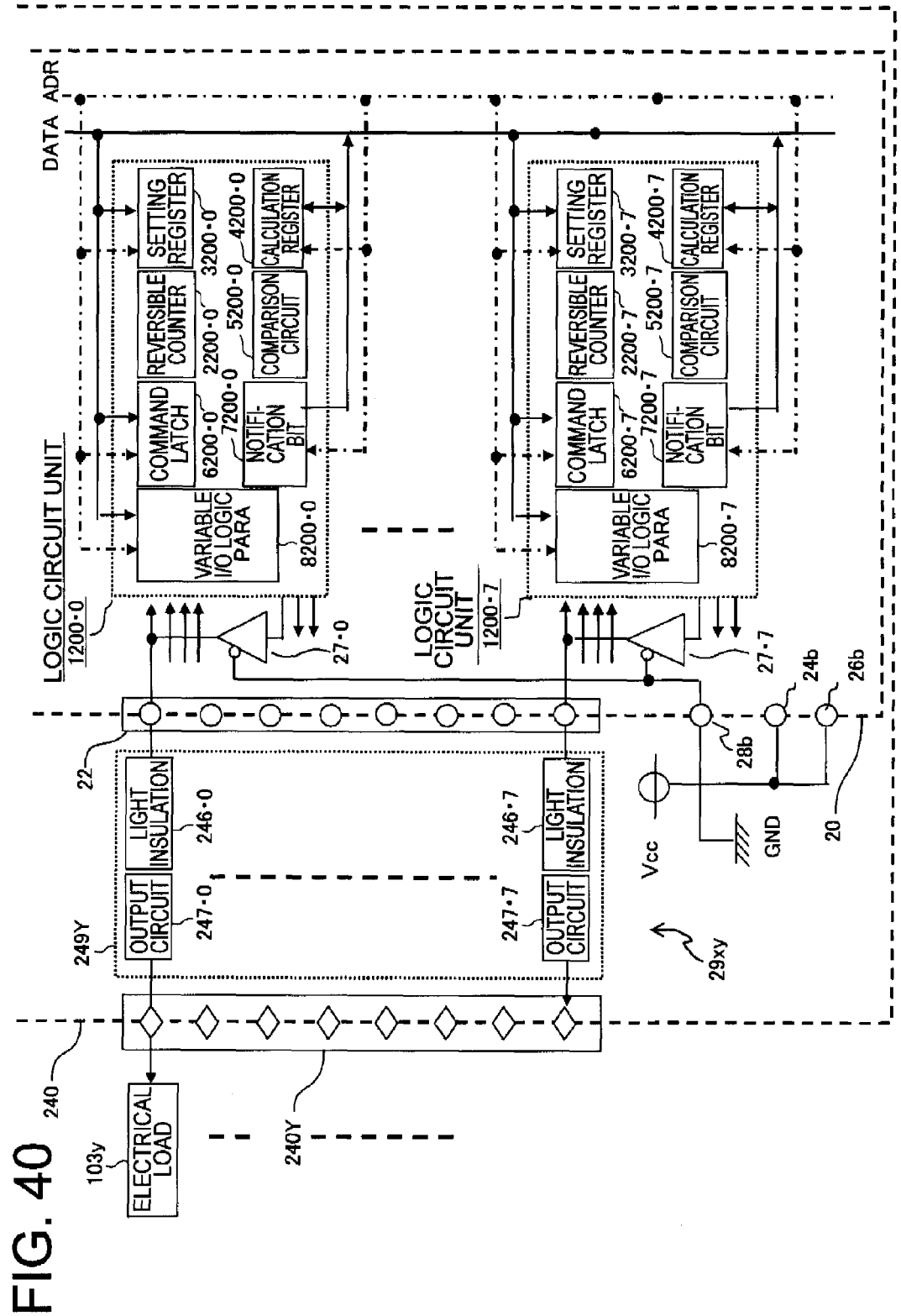
FIG. 40 is a view illustrating a configuration of a second half of the special unit illustrated in FIG. 38.

Hereinafter, the special unit 240 having a configuration illustrated in FIG. 38 will be described referring to FIGS. 39 and 40. FIG. 39 illustrates a configuration of the special unit 240 on the ON/OFF switch signal side, whereas FIG. 40 illustrates a configuration on the electrical load side. In FIGS. 39 and 40, the special unit 240 includes input terminals 240X to be connected to eight ON/OFF switch signals 103x and output terminals 240Y to be connected to eight electrical loads 103y. An input interface circuit 249X for a logic circuit is provided between the input terminals 240X and the first port 21 provided for the integrated circuit element 20. The input interface circuit 249X includes input insulating circuits 241n and input filters 242n having a relatively small time constant, for example, of about 5 μsec. The combination of the input insulating circuit 241n and the input filter 242n connected in series is provided for each channel number: n=0 to 7. An output interface circuit 249Y for ON/OFF operation is provided between the output terminals 240Y and the second port 22 provided for the integrated circuit element 20. The output interface circuit 249Y includes output elements 247n corresponding to power transistors and output insulating circuits 246n. The combination of the output element 247n and the output insulating circuit 246n connected in series is provided for each channel number: n=0 to 7.

The first port 21 includes channel terminals 21n, each corresponding to the channel number n=0 to 7. In the same manner, the second port 22 includes channel terminals 22n, each corresponding to the channel number n=0 to 7 (the channel terminals 21n and 22n are not illustrated with a reference numeral). For each channel terminal, a logic circuit unit 1100n or 1200n having the same configuration is provided. One of the plurality of input terminals of the logic circuit unit 1100n illustrated in FIG. 39 is directly connected to the channel terminal 21n, whereas one of the plurality of output terminals of the logic circuit unit 1100n is indirectly connected to the channel terminal 21n through a first gate element 25n. A gate terminal of each of the gate elements 25n is connected to the constant voltage power supply line Vcc through a first mode switching terminal 28a. This connection means that the first port 21 is connected not to the output interface circuit 249Y but to the input interface circuit 249X. At the same time, the logic level of the mode switching terminal 28a is "H" to bring the first gate element 25n into a closed state. The first identification terminal 24a is also connected to the constant voltage power supply line Vcc. This connection serves for identifying that the input interface circuit 249X is used not for analog signals but for logic signals. Furthermore, the logic level of a first signal terminal 26a is "H", which indicates that the first signal terminal 26a is not used for the analog comparison described above.

One of the plurality of input terminals of the logic circuit unit 1200n illustrated in FIG. 40 is directly connected to the channel terminal 22n, whereas one of the plurality of output terminals of the logic circuit unit 1200n is indirectly connected to the channel terminal 22n through a second gate element 27n. A gate terminal of each of the gate elements 27n is connected to the ground circuit GND through a second mode switching terminal 28b. This means that the second port 22 is connected not to the input interface circuit 249X but to the output interface circuit 249Y. At the same time, the logic level of the second mode switching terminal 28b is "L" to bring the second gate element 27n into a closed state. A second identification terminal 24b is connected to the constant voltage power supply line Vcc. This connection serves for identifying that the output interface circuit 249Y is used not for analog loads but for ON/OFF operation. Furthermore, the logic level of a second signal terminal 26b is "H", which indicates that the second signal terminal 26b is not used for the analog comparison described above. A bus joint terminal 240Z for connection to the microprocessor 111 through a bus is provided on an electronic substrate 29xy constituting the special unit 240. The bus joint terminal 240Z is connected to a bus joint terminal 23 of the integrated circuit element 20.

As described below in detail referring to FIG. 41, the logic circuit unit 1100n includes a reversible counter 2100n, a setting register 3100n, a calculation register 4100n, a comparison circuit 5100n, a command latch memory 6100n, a notification bit memory 7100n, and a parameter memory 8100n. In the same manner, the logic circuit unit 1200n includes a reversible counter 2200n, a setting register 3200n, a calculation register 4200n, a comparison circuit 5200n, a command latch memory 6200n, a notification bit memory 7200n, and a parameter memory 8200n. The components denoted by a reference numeral having 1 as a third digit number (number in the form of 1xx) are for the first port 21 (see FIG. 39), whereas the components denoted by a reference numeral having 2 as a third digit number (number in the form of 2xx) are for the second port 22 (see FIG. 40). Each element in the logic circuit units 1100$n$ and 1200$n$, which is designated by the microprocessor 111 through the address bus ADR, is uniquely connected to the data bus DATA to receive set data or a command signal from the microprocessor 111 or to transmit computational data or a notification signal to the microprocessor 111. Circuit organization information is transmitted from the microprocessor 111 to each of the parameter memories 8100$n$ and 8200$n$ for starting the operation of the programmable controller 100C. As a result, a specific circuit configuration of each of the eight logic circuit units 1100$n$ and the eight logic circuit units 1200$n$ is determined.

The card information storage memory 9000 serves to transmit the logic information of at least the first mode switching terminal 28$a$ and the second mode switching terminal 28$b$ and the first identification terminal 24$a$ and the second identification terminal 24$b$ to the microprocessor 111 and stores information of a wiring pattern provided on the electronic substrate 29$xy$, provided inside or outside the integrated circuit element 20. Each of the common clock circuit 9001 and the common trigger circuit 9002 is a timing signal generating circuit commonly used for all the logic circuit units 1100$n$ and 1200$n$. The common clock circuit 9001 generates a clock signal having a clock cycle τ of, for example, 1 μsec. The common trigger circuit 9002 generates a trigger signal having a signal cycle T0 of, for example, 10 msec and a signal width of 1 μsec, which is obtained by counting the clock signals.

Even in the special unit 230 or 250 illustrated in FIG. 38, the integrated circuit element 20 has the same configuration. In the special unit 230, however, a pair of the input terminals 230X and a pair of the input interface circuits 239X are used. The input interface circuits 239X for logic signals are connected to the first and second ports 21 and 22. The logic levels of the first mode switching terminal 28$a$ and the second mode switching terminal 28$b$ are both "H". In the special unit 250, a pair of the output terminals 250Y and a pair of the output interface circuits 259Y are used. The output interface circuits 259Y are connected to the first and second ports 21 and 22. The logic levels of the first and second mode switching terminals 28$a$ and 28$b$ are "L".

Figure 41:
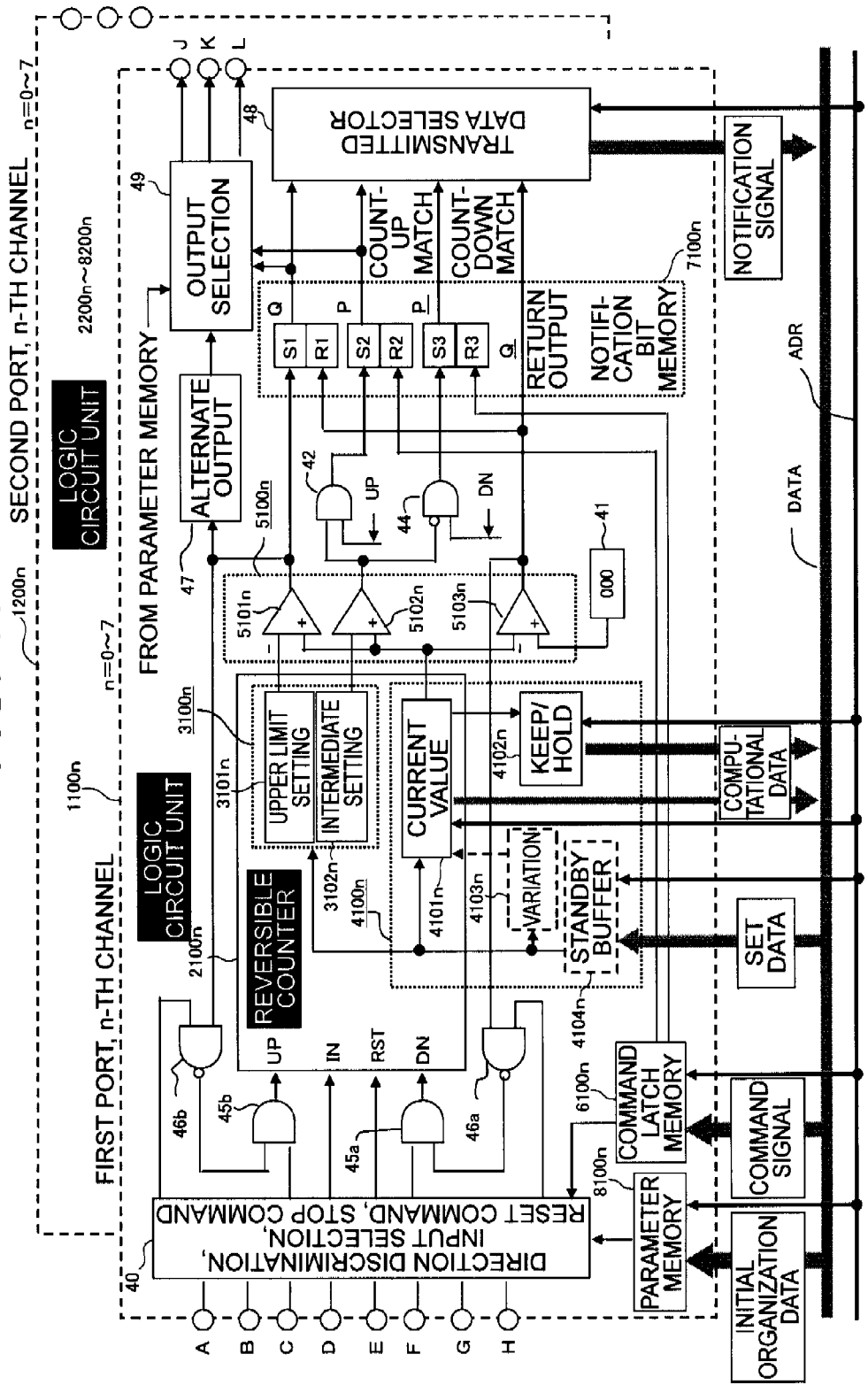
FIG. 41 is a view illustrating a detailed configuration of a logic circuit unit illustrated in FIGS. 39 and 40.

Hereinafter, FIG. 41 illustrating a detailed configuration of the logic circuits 1100$n$ shown in FIG. 39 and the logic circuit 1200$n$ shown in FIG. 40 will be referred to. In FIG. 41, the logic circuit unit 1100$n$ is allocated to the channel of the first port 21 with the channel number n, whereas the logic circuit unit 1200$n$ is allocated to the channel of the second port 22 with the channel number n. The logic circuits 1100$n$ and 1200$n$ are configured in the same manner, and are distinguished from each other only by the third digit number of the reference numeral as 1xx or 2xx. Therefore, in the following description, only the logic circuit unit 1100$n$ will be described. The reversible counter 2100$n$ constituting the main part of the logic circuit unit 1100$n$ increases or decreases the current count value of the current value register 4101$n$ when the logic level of the count input terminal IN changes from "L" to "H" while the logic level of the count-up command terminal UP or the count-down command terminal DN is "H". An incremental or decremental variation of the current counter value is determined by a numerical value stored in the variation register 4103$n$. Generally, a value of the variation register 4103$n$ is 1. The current counter value of the current value register 4101 is increased or decreased by one upon logical transition of the count input terminal IN.

Upon input of a reset command to a reset terminal RST of the reversible counter 2100$n$, the value of the current value register 4101$n$ is reset to zero. When some numerical value is stored in a preset register in a standby buffer register 4104$n$, the content of the preset register is transferred to the current value register 4101$n$. A keep/hold register 4102$n$ serves to regularly read and store the content of the current value register 4101$n$. The current value register 4101$n$, the keep/hold register 4102$n$, the variation adjusting register 4103$n$, and the standby buffer register 4104$n$ are collectively referred to as a calculation register 4100$n$. In particular, as is apparent from the following description, the variation adjusting register 4103$n$ is provided only for the reversible counter with a given channel number. Each of the reversible counters with the other channel numbers always increases or decreases the counter value by one. The setting register 3100$n$ includes a first setting register 3101$n$ which stores an upper limit count value and a second setting register 3102$n$ which stores an intermediate value less than the upper limit count value.

A first comparison circuit 5101$n$ is a value comparison circuit. A logic level of the first comparison circuit 5101$n$ changes to "H" to set a determination storage circuit S1 to generate a count-up output Q when a set value stored in the first setting register 3101$n$ and the current counter value of the current value register 4101$n$ are identical with each other or when the current counter value exceeds a set value. A second comparison circuit 5102$n$ is a value comparison circuit for comparing a set value stored in a second setting register 3102$n$ and the current counter value of the current value register 4101$n$. When the set value and the current counter value are identical with each other or the current counter value exceeds the set value in a count-up mode, the second comparison circuit 5102$n$ sets a determination storage circuit S2 through an AND element 42 to generate a count-up compare match output P. On the other hand, when the current counter value is less than the set value in a count-down mode, the second comparison circuit 5102$n$ sets a determination storage circuit S3 through a gate element 44 to generate a count-down compare match output $\underline{P}$.

A return comparison circuit 5103$n$ is a value comparison circuit which generates a return output $\underline{Q}$ to reset the determination storage circuit S1 when the current counter value of the current value register 4101$n$ decreases to be identical with a value of a zero register 41 or to be a negative value. A command signal from the microprocessor 111 can reset the determination storage circuits S2 and S3 or the current counter value of the current value register 4101$n$ through a command latch memory 6100$n$.

A notification bit memory 7100$n$ includes the count-up output Q, the return output $\underline{Q}$, the count-up compare match output P, and the count-down compare match output $\underline{P}$. The determination outputs described above are connected to the data bus DATA through a data selector 48. An alternate output circuit 47 is a logic circuit for alternatively inverting the logic of an output each time the logic level of the compare match output from the first comparison circuit 5101$n$ changes from "L" to "H".

An output selecting circuit 49 selects and determines an output circuit according to the content of a parameter memory 8100$n$. The output selecting circuit 49 determines, for example, whether to allocate terminals J and K as a forward pulse output FP and a reverse pulse output RP or as a forward-reverse pulse output FRP and a direction command output DIR. Moreover, the output selecting circuit 49 feeds the count-up compare match output P output from the determination storage circuit S2 or an operation completion output as the count-up output Q to a terminal L.

An input circuit unit 40 is an input processing circuit for the reversible counter 2100n. A specific circuit configuration of the input circuit unit 40 is determined based on the content of the parameter memory 8100n. Specific circuit configurations of the input circuit unit 40 and the output selecting circuit 49 will be described below referring to FIG. 42, FIGS. 5 to 14, and FIG. 34. For example, when the reversible counter 2100n constitutes a high-speed counter circuit, the reversible counter is any one of a 1-phase 1-input reversible counter in which a count direction is determined by a command signal, a 1-phase 2-input reversible counter to which a count-up/-down input is individually fed, and a 2-phase 2-input reversible counter in which a count-up/-down direction is determined based on a phase difference of a two-phase input. Furthermore, the high-speed counter circuit has any of a single edge evaluation mode, a double edge evaluation mode, and a quad edge evaluation mode depending on whether or not counting is started when the high-speed counter instruction is executed or when a count start command input is switched ON, whether or not a preset command input for transferring initial value data to the current value register is added, or whether the counting is performed at a rise or a fall of the pulse signal in each phase in the case of the 2-phase 2-input high-speed counter circuit. Each of various high-speed counter circuits as those described above is provided with a unique identification number. Circuit organization information determined by the combination of a special instruction and the identification number is stored in the parameter memory 8100n.

All the input signals, which are required to allow the logic circuit unit 1100n in each channel to demonstrate its predetermined various functions, are connected to input terminals A to H. The parameter memory 8100n selects and determines the input signal to be connected to the reversible counter 2100n from all the input signals and the circuit configuration used for the connection. The data from the parameter memory 8100n is transmitted from the microprocessor 111 upon start of the operation of the programmable controller 100C and is not changed during the operation of the programmable controller 100C. A part of the operation of the input circuit unit 40 can also be changed by the content of the command latch memory 6100n, which is transmitted from the microprocessor 111 during the operation. For example, the selection of the count-up/-down direction in the 1-phase 1-input high-speed counter is variably set by the content of the command latch memory 6100n. As described above, the input circuit unit 40 performs a command of discriminating a count direction of the reversible counter, a selective connection of the count input signal to the count input terminal IN, the selective connection of a reset signal to the reset terminal RST, and the selective connection of a stop command signal for forcibly stopping the count signal input to the count input terminal IN.

A NAND output element 46a is a gate circuit which acts on an AND element 45a to stop a subtractive counting operation when the logic level of the return comparison circuit 5103n changes to "H". Whether or not to enable the gate circuit is determined by the AND output element 46a based on the content of the input circuit unit 40. The AND element 45a is a gate circuit which feeds a count-down direction command signal obtained through the input circuit unit 40 to a count-down command terminal DN of the reversible counter 2100n. A NAND output element 46b is a gate circuit which acts on an AND element 45b to stop an additive counting operation when the logic level of the first comparison circuit 5101n changes to "H". Whether or not to enable the gate circuit is determined by the AND output element 46b based on the content of the input circuit unit 40. The AND element 45b is a gate circuit which feeds a count-up direction command signal obtained through the input circuit unit 40 to a count-up command terminal UP of the reversible counter 2100n.

Hereinafter, FIG. 42 which is a block diagram illustrating the logic circuit unit 1100n (1200n) illustrated in FIG. 41 constituted as a general-purpose input circuit (variable filter circuit) 1110n (1210n) and a general-purpose output circuit 1290n (1190n) will be referred to. In the following description, the second digit number of the reference numeral of the logic circuit unit 1100n (1200n) indicates the content of a specific type of various logic circuits. Although the logic circuit unit 1100n will be described below, the logic circuit unit 1200n is similarly configured when the logic circuit unit 1200n is used as an input port.

Figure 42:
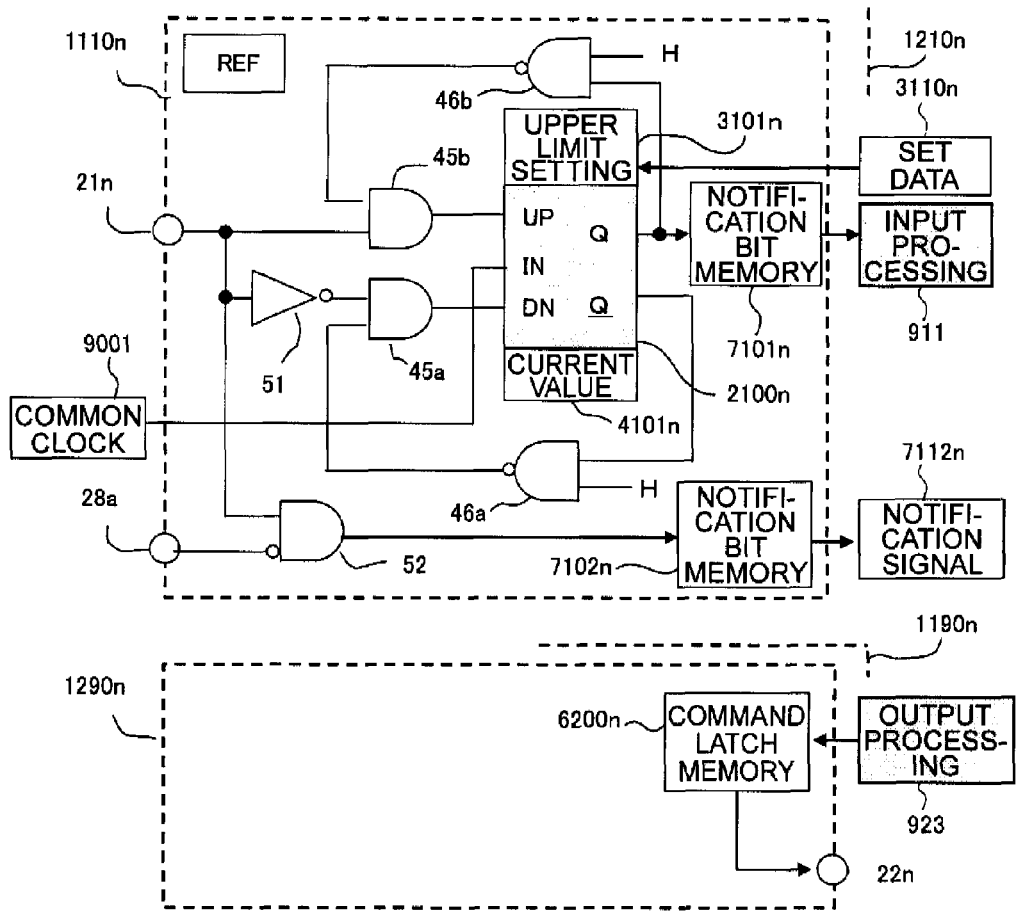
FIG. 42 is a block diagram illustrating a logic circuit unit illustrated in FIG. 41 configured as a general-purpose I/O circuit.

In FIG. 42, the general-purpose input circuit 1110n (n=0 to 7) constituted by the variable filter circuit includes the reversible counter 2100n using a clock signal generated from the common clock signal circuit 9001 as a count input signal. Set data 3110n corresponding to a filter constant is transmitted from the microprocessor 111 to be stored in a first setting register 3101n of the reversible counter 2100n. One of the ON/OFF switch signals 103x of the special unit 240 is input to the channel terminal 21n of the first port 21 with the channel number n through the input interface circuit 249X. When the ON/OFF switch signal 103x is switched ON to change the logic level of the channel terminal 21n to "H", the count-up direction command is fed to the count-up command terminal UP through the AND element 45b.

As a result, the reversible counter 2100n counts up the clock signals generated from the common clock signal circuit 9001 to gradually increase the current value of the current value register 4101n. When the current counter value reaches the filter constant prestored in the first setting register 3101n, the reversible counter 2100n generates the count-up output Q, which is transferred to the input image memory in the device memory 114a by the input processing means 911 described below through the notification bit memory 7101n.

On the other hand, upon generation of the count-up output Q from the reversible counter 2100n, the logic level of the count-up command terminal UP changes to "L" through the NAND element 46b and the AND element 45b to prevent the count-up operation for a value equal to or larger than the upper limit set value. When the ON/OFF switch signal 103x is turned OFF to change the logic level of the channel terminal 21n to "L", the count-down direction command is fed to the count-down command terminal DN through the NOT element 51 and the AND element 45a.

As a result, the reversible counter 2100n counts down the clock signals generated from the common clock signal circuit 9001 to gradually decrease the current value of the current value register 4101n. When the current counter value decreases to zero, the reversible counter 2100n generates the return output Q to transfer a logical transition of the count-up output Q to the input image memory in the device memory 114a by the input processing means 911 described below through the notification bit memory 7101n. On the other hand, upon generation of the return output Q, the logic level of the count-down command terminal DN changes to "L" through the NAND output element 46a and the AND element 45a to prevent the count-down operation below zero.

Therefore, when the ON/OFF switch signal 103x is switched OFF from the ON state or switched ON from the OFF state, the notification bit memory 7101n is changed with a response delay time corresponding to the product of the clock cycle τ of 1 μsec of the common clock signal circuit

9001 and the filter constant N stored in the first setting register 3101$n$: N×τ=N μsec. When chattering is generated in the ON/OFF switch signal 103$x$ to cause an irregular intermittent operation, the reversible counter 2100$n$ performs a count-up/-down operation. When the counter value reaches the upper limit set value as a result of the count-up operation, the ON operation is determined. On the other hand, the counter value reaches zero as a result of the count-down operation, the OFF operation is determined.

On the other hand, when the first port 21 is used as an output port, the logic level of the first mode switching terminal 28$a$ is "L". The logical state of the channel terminal 21$n$ is transmitted to the notification bit memory 7102$n$ through a minimum filter setting circuit 52 corresponding to a gate element to the notification bit memory 7102$n$. Then, the logical state is transmitted as a notification signal 7112$n$ to the microprocessor 111. The reversible counter 2100$n$ has a completely different I/O circuit configuration when the first port 21 is used as the output port. For example, a high-speed pulse output is fed to the channel terminal 21$n$. The notification signal 7112$n$ serves to monitor an operating state of the high-speed pulse output. However, since the computation cycle of the microprocessor 111 cannot follow the speed of the high-speed pulse output, each of the generated pulses cannot be individually monitored. However, the notification signal 7112$n$ can be used for sampling check of the state of generation of the pulse output.

The general-purpose output circuit 1290$n$ ($n$=0 to 7) feeds the output signal, which is transmitted by the microprocessor 111 from the output image memory in the device memory 114$a$ to the command latch memory 6200$n$ by the output processing means 923 described below, to the electrical load 103$y$ from the channel terminal 22$n$ through the output interface circuit 149Y and the output terminal 140Y. The general-purpose output circuit 1290$n$ is enabled when the special instruction for the channel terminal 22$n$ set for the output port is not in use. For example, when the channel terminal 22$n$ is occupied as the high-speed pulse output described below, the general-purpose output circuit 1290$n$ cannot be used as a general-purpose output.

Figure 43:
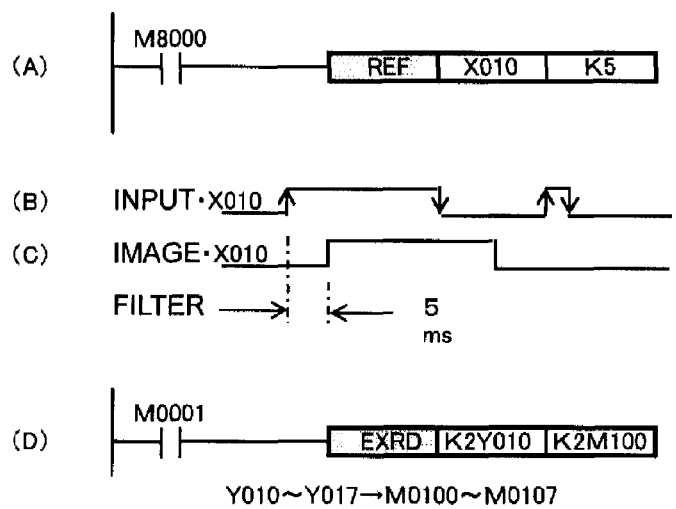
FIG. 43 is a sequence diagram illustrating an exemplary use of a variable filter instruction REF and a monitor read instruction EXRD.

Next, FIG. 43, which is a sequence diagram illustrating an exemplary use of a variable filter instruction REF and a monitor read instruction EXRD, will be referred to. FIG. 43(A) illustrates a circuit block for applying the variable filter instruction REF to an input X010 of the special unit 230 when a special auxiliary relay M8000 is closed to set the filter constant to 5 msec. The special auxiliary relay M8000 is automatically activated when a RUN switch of the programmable controller 100C is in the ON state. Therefore, as illustrated in FIG. 43(B), when the ON/OFF switch signal X010 connected to the special unit 230 performs the ON/OFF operation, an input signal stored in the notification bit memory 7101$n$ illustrated in FIG. 42 (in this exemplary case, $n$=0) has a response delay of 5 msec as illustrated in FIG. 43(C). Therefore, even when the ON/OFF switch signal X010 performs a short ON operation, the notification signal X010 cannot be recognized.

In the input processing 911 based on the notification bit memory 7101$n$, the transfer to the input image memory in the device memory 114$a$ is performed upon execution of the REF instruction or for one computation cycle of the programmable controller 100C. As a second operand of the REF instruction, for example, 1 to 63 msec can be set as a target response delay time. The cycle τ of the clock signal from the common clock circuit 9001 illustrated in FIG. 42 is, for example, 1 μsec. The upper limit set value of the reversible counter 2100$n$ for obtaining 1 msec as a response delay time is 1000. Therefore, in order to obtain the response delay time of 5 msec, the microprocessor 111 transfers a value of 5000 obtained by multiplying the response delay time by 1000 to the buffer memory 114$b$. The obtained value is transferred to the first setting register 3101$n$ as set data 3110$n$.

FIG. 43(D) illustrates a circuit block for driving the monitor read instruction EXRD by the auxiliary relay M0001 driven by a sequence circuit (not shown). A first operand of the monitor read instruction EXRD designates outputs Y010 to Y017 for eight bits, beginning with the output Y010, as transfer sources, whereas a second operand designates auxiliary relays M0100 to M0107 for eight bits, beginning with the auxiliary relay M0100, as transfer destinations. In short, the ON/OFF states of the outputs Y010 to Y017 are transferred to the auxiliary relays M0100 to M0107. The monitor read instruction EXRD is notified by using the notification signal 7112$n$ illustrated in FIG. 42 and serves to monitor the output state of each channel used as the output port. Although some of the outputs Y010 to Y017 generate the high-speed pulse outputs, the ON/OFF information read into the auxiliary relays M0100 to M0107 are updated upon execution of the monitor read instruction EXRD. Therefore, precise information cannot be obtained in terms of time.

Hereinafter, a configuration of the logic circuit unit 1100$n$ or 1200$n$ illustrated in FIG. 41 used for various specific high-speed I/O circuits will be described referring to FIGS. 5 to 14 mentioned above. The first and second embodiments and the third embodiment fundamentally differ from each other in that a pair of logic circuit units are provided for each channel $n$ in the third embodiment to handle a double number of I/Os.

FIG. 5: variable filter circuit

The variable filter circuit 1010$n$ illustrated in FIG. 5 is replaced by the variable filter circuits 1110$n$ and 1210$n$ illustrated in FIG. 42. The content of the notification bit memory 7000$n$ is transmitted to the auxiliary relay M designated by the variable filter instruction REF in the variable filter circuit 1010$n$ illustrated in FIG. 5, whereas the content of the notification bit memory 7000$n$ is automatically transmitted to the input image memory by the input processing means 911 without based on a sequential program in the variable filter circuits 1110$n$ and 1210$n$ illustrated in FIG. 42. Therefore, the general-purpose input circuit 1091 illustrated in FIG. 5 is not used in the third embodiment.

FIG. 6: pulse density measuring circuit

FIG. 6 illustrates the pulse density measuring circuit 1020$n$. According to the logic circuit units 1100$n$ and 1200$n$ illustrated in FIG. 41, a pair of pulse density measuring circuits 1120$n$ and 1220$n$ (not shown) configured in the same manner can be obtained.

FIG. 7: pulse width measuring circuit

FIG. 7 illustrates the pulse width measuring circuit 1022$n$. According to the logic circuit units 1100$n$ and 1200$n$ illustrated in FIG. 41, a pair of pulse width measuring circuits 1122$n$ and 1222$n$ (not shown) configured in the same manner can be obtained.

FIG. 8: edge detecting circuit

FIG. 8 illustrates the edge detecting circuit 1031$n$. According to the logic circuit units 1100$n$ and 1200$n$ illustrated in FIG. 41, a pair of edge detecting circuits 1131$n$ and 1231$n$ (not shown) configured in the same manner can be obtained.

FIG. 9: 1-phase 1-input counter circuit

FIG. 9 illustrates the 1-phase 1-input counter circuit 1030$n$. According to the logic circuit units 1100$n$ and 1200$n$ illustrated in FIG. 41, a pair of 1-phase 1-input counter circuits 1130$n$ and 1230$n$ (not shown) configured in the same manner can be obtained.

FIG. 10: 1-phase 2-input counter circuit

FIG. 10 illustrates the 1-phase 2-input counter circuit 1040m. According to the logic circuit units 1100n and 1200n illustrated in FIG. 41, a pair of 1-phase 2-input counter circuits 1140m and 1240m (not shown) configured in the same manner can be obtained.

FIG. 11: PWM output circuit

FIG. 11 illustrates the PWM output circuit 1050n. According to the logic circuit units 1100n and 1200n illustrated in FIG. 41, a pair of PWM output circuits 1150n and 1250n (not shown) configured in the same manner can be obtained. In this case, however, the general-purpose output circuits 1190n and 1290n illustrated in FIG. 42 can be used in place of the general-purpose output circuit 1092 shown in FIG. 11.

FIG. 12: first pulse output circuit

FIG. 12 illustrates the first pulse output circuit 1060m. According to the logic circuit units 1100n and 1200n illustrated in FIG. 41, a pair of first pulse output circuits 1160m and 1260m (not shown) configured in the same manner can be obtained.

FIG. 13: second pulse output circuit

FIG. 13 illustrates the second pulse output circuits 1070•0 and 1070•4. According to the logic circuit units 1100n and 1200n illustrated in FIG. 41, a pair of second pulse output circuits 1170•0 and 1270•0 and another pair of second pulse output circuits 1170•4 and 1270•4 (not shown), each being configured in the same manner, are obtained.

FIG. 14: modified pulse output circuit

FIG. 14 illustrates the modified pulse output circuits 1080•0 and 1080•4. According to the logic circuit units 1100n and 1200n illustrated in FIG. 41, a pair of modified pulse output circuits 1180•0 and 1280•0 and another pair of modified pulse output circuits 1180•4 and 1280•4 (not shown), each being configured in the same manner, are obtained. In the second pulse output circuit 1070•0 illustrated in FIG. 13 or the modified pulse output circuit 1080•0 illustrated in FIG. 14, four reversible counters 2000•0, 2000•1, 2000•2, and 2000•3 are used. In particular, the reversible counter 2000•3 is used for different purposes by changing the parameters. When a pair of the logic circuit units 1100n and 1200n are included, five reversible counters 2100•0, 2100•1, 2200•0, 2200•1 and 2200•2 are used to obtain the second pulse output circuit and the modified pulse output circuit without changing the parameters.

FIG. 37: analog comparison unit

In the special unit 180 shown in FIG. 37, the result of analog comparison is transmitted to the input image memory through the data selector 184. When a pair of the logic circuit units 1100n and 1200n are included, however, the result of analog comparison is transmitted to the input image memory through the variable filter circuit 1110n by using the first port 21 as an input port and the second port as an output port.

(2) Detailed Description of the Functions and Operation

In the programmable controller configured as described above, its functions and operation will be described in detail based on FIG. 44 which is a flowchart for illustrating a basic operation. In FIG. 44, the programmable controller 100C is powered ON in Step 900. As a result, power activation is detected in the programmable controller 100C to initialize each of the units. Subsequently, in Step 901, the microprocessor 111 starts operating. In subsequent Step 902, it is determined whether or not a RUN switch for operation/stop command (not shown) is switched ON. If the RUN switch is turned ON to be in an operating state, it is determined as YES and the process proceeds to Step 905. If the RUN switch is OFF, it is determined as NO and the process proceeds to Step 903.

In Step 903, it is determined whether or not the external tool 108 is connected and a program mode is set. If the program mode is set, it is determined as YES and the process proceeds to Step 904. If the external tool is not connected or a monitor mode is set even though the external tool is connected, it is determined as NO and the process proceeds to Step 910 corresponding to an operation completion step (hereinafter, referred to simply as Step 910). In Step 904, after the sequential program is transmitted by the external tool 108 to the program memory 113C, the process proceeds to Step 910. In Step 910, after the other control operations are performed, the process returns to Step 901 where the operation is started. Then, the above-described operation is repeated.

Therefore, if it is determined NO in both Steps 902 and 903, the microprocessor 111 operates cyclically through Steps 901, 902, 903, 910 and again 901 to wait for the switch-ON of the RUN switch in Step 902 or the setting of the program mode in Step 903.

Then, when the RUN switch is switched ON, programs in the program memory 113C are first checked in Step 905. One of the program checks is the determination of types of the I/O interface circuits connected to the first and the second ports based on the card information stored in the card information storage memory 9000 to determine if the types of the I/O interface circuits and the content of the instruction corresponding to the special unit stored in the program memory 113C correspond to each other. Besides, the I/Os of the special unit illustrated in FIG. 16 and 17 are checked not to be used in an overlapping manner. For example, if the high-speed counters with the extension numbers 01 and 10 are used, the input X031 is used in an overlapping manner. Therefore, an error is detected.

In subsequent Step 906, if abnormality is detected in the program check performed in Step 905, it is determined as YES and the process proceeds to Step 907. If no abnormality is detected, it is determined as NO and the process proceeds to Step 908. In Step 907, an abnormality notification command is generated for the display unit 117. At the same time, the operation is stopped to proceed to Step 910 (operation completion step).

In Step 908, circuit organization information is transmitted to the parameter memory 8100n and 8200n of the special unit based on the content of the program memory 113C. At the same time, the organization of allocation of the buffer memory 114b storing communication data for the special unit is performed. In the special unit which has received the circuit organization information, the circuit of each of the logic circuit units 1100n and 1200n is specifically organized based on the received parameters.

In subsequent Step 930, whether or not the variable filter instruction REF is used is checked. When neither the variable filter instruction REF nor the special instruction is used for the input, it is determined as NO and the process proceeds to Step 931. On the other hand, when either the variable filter instruction REF or the special instruction is used, it is determined as YES and the process proceeds to Step 909.

In Step 931, the initialization setting of the variable filter circuit is performed to set a standard filter constant of, for example, 10 msec as the input filter constant. Then, the process proceeds to Step 909. In Step 909, it is checked again whether or not the RUN switch is ON. If the RUN switch is OFF, it is determined as NO and the process proceeds to Step 910. If the RUN switch is ON, it is determined as YES and the process proceeds to Step 911.

In Step 911, the data selectors (for example, the data selector 224 used for the inputs X000 to X007 shown in FIG. 38) provided for the general input units are sequentially accessed to transfer and write the ON/OFF state of the ON/OFF switch signal connected to each of the input terminals to the input image memory allocated in the device memory 114a. At the same time, even in the case of the special unit, for the input used as a general-purpose input, for which the special instruction is not used, the ON/OFF state of the input is read from the notification bit memory 7101n or 7201n as illustrated in FIG. 42 to be transferred and written to the input image memory allocated in the device memory 114a.

In subsequent Step 912, the sequential program stored in the program memory 113C is sequentially read and executed in response to each instruction. In subsequent Step 913, it is determined whether or not the instruction read in Step 912 is for executing a special instruction for the special unit. If the instruction is not for executing the special instruction, it is determined as NO and the process proceeds to Step 922. In Step 922, it is determined whether or not the instruction is an END instruction for the completion of the sequential program. If the instruction is not the END instruction, it is determined as NO and the process returns to Step 912. Therefore, when the special instruction is not used, a cyclic operation through Steps 912, 913, 922 and again 912 is performed to sequentially execute general sequential instructions.

However, if it is determined as YES in Step 913 to read the special instruction, the process proceeds to Step 919a. In Step 919a, it is determined whether or not the special instruction read is a special instruction for making an operation completion notification. If the special instruction is for making the operation completion notification, it is determined as YES and the process proceeds to Step 919b. If not, it is determined as NO and the process proceeds to Step 921. In Step 919b, it is determined whether or not the operation completion notification for the executed special instruction has been obtained. If the completion notification has been obtained, it is determined as YES and the process proceeds to Step 921. If not, it is determined as NO and the process proceeds to Step 922. In Step 921, after another set data for the read special instruction is transmitted, the process proceeds to Step 922.

In step 921, after another set data for the read special instruction is transmitted, the process proceeds to Step 922. In Step 921, after the set data designated by the special instruction is converted into data which is easily handled in the special unit, the converted data is transferred to the buffer memory 114b. Then, the data is transmitted from the buffer memory 114b to the corresponding special unit.

For example, when the special instruction is the first pulse output instruction PLS for the first pulse output circuit 1260m described above referring to FIG. 12 and the special instruction designates the pulse frequency and the number of generated pulses, the pulse frequency is converted into a pulse cycle corresponding to an inverse of the pulse frequency in Step 923. Then, the obtained pulse frequency and the number of generated pulses are transmitted to the special unit. Since the special unit is determined to make a completion notification as the notification signal 7260m at the completion of generation of the designated number of pulses, the process does not proceed to Step 921 based on the determination in Step 919b until the completion of the generation of pulses. As a result, new set data is not transmitted. In the above-described manner, the sequential program stored in the program memory 113C is sequentially executed. Then, when the END instruction for the completion of the program is read, it is determined as YES in Step 922 and the process proceeds to Step 923.

In Step 923, the latch memories provided for the general output units (for example, the latch memory 225 used for the outputs Y000 to Y007 in FIG. 38) are sequentially accessed to sequentially transfer and write the content of the output image memory allocated in the device memory 114a to each latch memory. For the output used as a general-purpose output, for which the special instruction is not used, even in the case of the special unit, the ON/OFF state of the output is transferred and written to the command latch memory 6200n as illustrated in FIG. 42.

At the completion of the output process in Step 923, the process proceeds to Step 909. After the verification that the RUN switch is switched ON again, the process returns to Step 911 to cyclically execute the input processing, the sequential processing, and the output processing in the above-described manner. Some programmable controllers perform a batch process of the input processing and the output processing before or after the sequential processing, and the other programmable controllers directly read the input information or directly perform the output processing at appropriate timing during the sequential processing. Although the batch processing method is herein described for convenience, the direct processing method can also be used.

The above-described operation flow includes Step 905 corresponding to the setting abnormality detection means, Step 908 corresponding to the organization processing means, Step 911 corresponding to the input processing means, Step block 920 composed of Steps 919a and 919b, corresponding to transfer inhibition means, Step 921 corresponding to data conversion/transfer means, Step 923 corresponding to the output processing means and Step 931 corresponding to the initial setting means.

Figure 44:
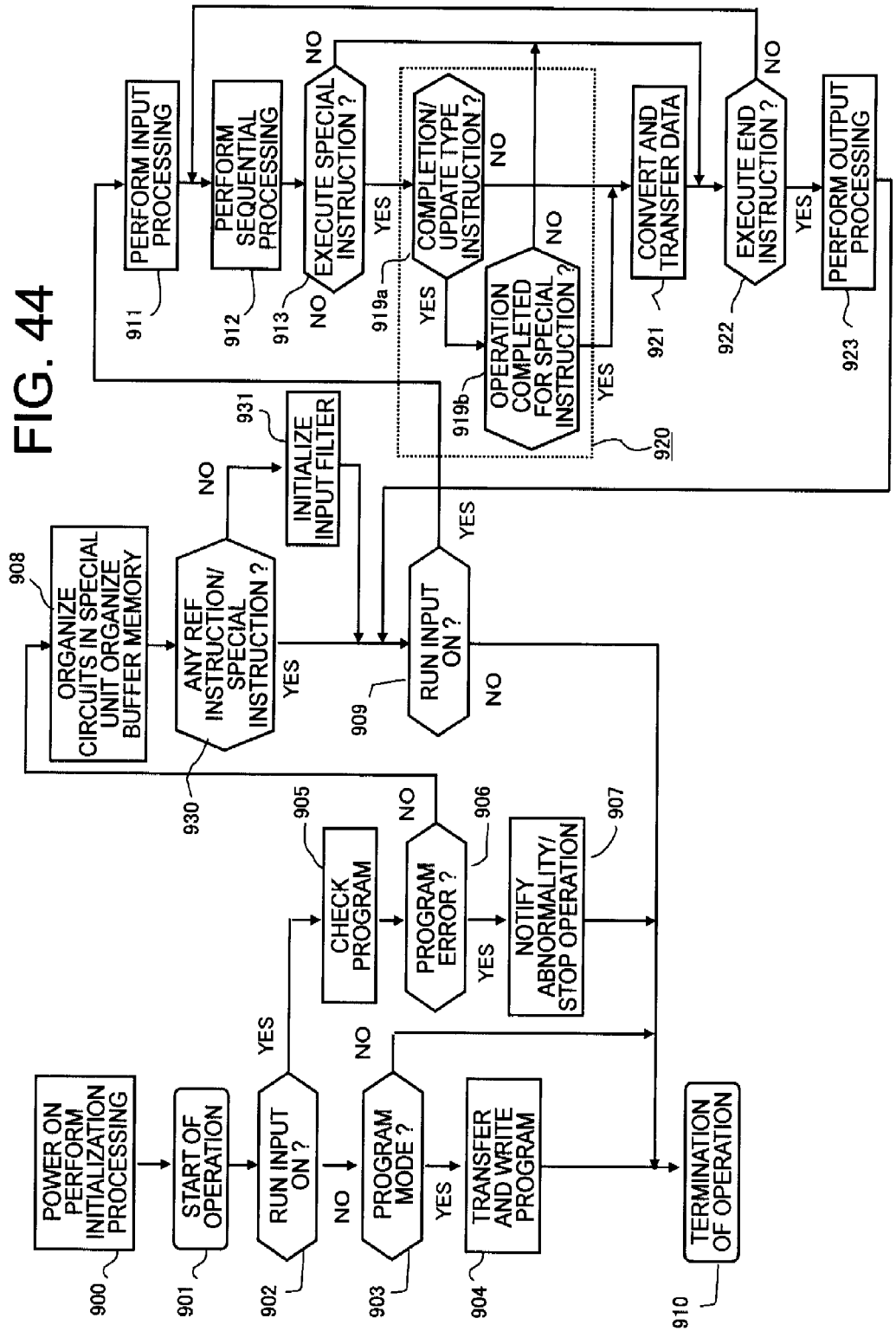
FIG. 44 is a flowchart for illustrating a basic operation of the configuration illustrated in FIG. 38.

In comparison between FIG. 44 and FIGS. 18 and 19, the filter constant for general-purpose input is automatically set to a reference value of, for example, 10 msec in Steps 930 and 931 in FIG. 44. If a filter constant other than that described above is required, a desired filter constant can be set by the variable filter instruction REF illustrated in FIG. 43(A). In FIG. 19, the parameter change means 918 is provided to change the role of the reversible counter 2000•3 in FIGS. 13 and 14. In FIG. 44, however, the allocation of the reversible counters in FIGS. 13 and 14 is changed to use five reversible counters. As a result, the parameters are not required to be changed.

(3) Summary and Characteristics of the Third Embodiment

The programmable controller 100C according to the third embodiment of the present invention includes the CPU unit 110C which includes the microprocessor 111, the system memory 112C operating in cooperation with the microprocessor 111, the program memory 113C to which the sequential program created by the user is transferred and written from the external tool 108, and the device memory 114a having the I/O image memories X and Y for storing the I/O information and the control information, the auxiliary relay M, and the data register D, and one of or a plurality of the I/O units 220 to 250, and 260A connected to the CPU unit 110C through the bus. A part or all of the I/O units serve as the special units 230 to 250 respectively including the integrated circuit elements 20 sharing the special I/O processing functions to complement the control function of the microprocessor 111. The special units 230 to 250 include the electronic substrate, on which the external connection terminals 230X, 240X, 240Y, and 250Y connected to at least one of or both of the plurality of external sensors and the plurality of external loads, the multi-channel input interface circuit 239X or 249X or output interface circuit 249Y or 259Y connected to the external connection terminal, the integrated circuit element 20 used for I/O control whose control specifications can be partially variably set, and the bus joint terminals 230Z to 250Z for connection to the microprocessor 111, are mounted.

The integrated circuit element 20 includes the first port 21 to which the logic signal performing the ON/OFF operation is input from the input interface circuit, the second port 22 for outputting the logic signal for performing the ON/OFF operation to the output interface circuit, the parameter memory 8100n or 8200n corresponding to each channel number n, and the logic circuit unit 1100n or 1200n whose operation specifications for the I/O processing are determined by the circuit organization data transmitted from the microprocessor 111 to the parameter memory.

The logic circuit unit 1100n or 1200n further includes the notification bit memory 7100n or 7200n for counting the logic input signal obtained through the input interface circuit 239X or 249X at high speed to transmit the count-up output or the count data as the notification signal or the computational data to the microprocessor 111, the calculation register 4100n or 4200n, and the reversible counter 2100n or 2200n which stores the set data or the command signal received from the microprocessor 111 in the setting register 3100n or 3200n and the command latch memory 6100n or 6200n to feed the high-speed pulse output based on the contents of the setting register and the command latch memory to the output interface circuit 249Y or 259Y. The reversible counter 2100n or 2200n includes the current value register 4101n or 4102n forming a part of the calculation register 4100n or 4200n. Whether to constitute the high-speed counter circuit for the input signal fed from the input interface circuit 239X or 249X to perform the high-speed input processing for transmitting the count-up output to the CPU unit 110C or to constitute the high-speed pulse output circuit based on the set data received from the CPU unit 110C to perform the high-speed output processing for feeding a predetermined pulse output to the output interface circuit 249Y or 259Y is determined for each channel according to the content of the special instruction included in the control program stored in the program memory 113C. When the circuit organization data transmitted to the parameter memory 8100n or 8200n causes a plurality of high-speed input processing and a plurality of high-speed output processing to be performed and the input signal from the external sensor is an analog signal, the input interface circuit feeds a pulse having a frequency or a comparison determination logic signal proportional to that of the input signal to the integrated circuit element 20. When the external load is an analog load, the integrated circuit element 20 generates a pulse output having an ON/OFF ratio as a commanded output signal. The output interface circuit smoothes the received pulse output signal and then feeds the smoothed signal to the external load.

The CPU unit 110C includes the buffer memory 114b for data communication with the special units 230 to 250. The system memory 112C includes the control programs functioning as the organization processing means 908 and the data conversion/transfer means 921. Immediately after the start of the operation of the programmable controller 100C, the organization processing means 908 searches through the content of the program memory 113C to extract the specific instruction corresponding to the special units 230 to 250 and transmits the type of the logic circuit unit 1100n or 1200n used in the special unit according to the content of the special instruction and the circuit organization data corresponding to the operation mode to the parameter memory 8100n or 8200n. At the same time, the organization processing means 908 performs the address organization of the buffer memory 114b for the communication with each logic circuit unit whose circuit organization is specified by the parameter. The data conversion/transfer means 921 converts the data into the set data in unit suitable for the operation of the logic circuit unit 1100n or 1200n and the command signal based on the content of the device memory 114a designated by the special instruction to transmit the set data and the command signal to the setting register 3100n or 3200n and the command latch memory 6100n or 6200n through the buffer memory 114b. At the same time, the data conversion/transfer means 921 transfers the computational data or the notification signal obtained from the logic circuit unit 1100n or 1200n to the device memory 114a designated by the special instruction through the buffer memory 114b. The special instruction is composed of an instruction word indicating the type of instruction, a first operand, and at least one of a second operand and a third operand, the first to third operands being in no particular order. The first operand designates an identification number for specifying a target I/O number of the special unit. The second operand designates a number of the data register which stores the computational data obtained from the calculation register or a number of the data register which stores the set data transmitted to the setting register, or directly designates a set constant. The third operand designates a number of the auxiliary relay which stores the notification signal obtained from the notification bit memory or a number of the auxiliary relay which stores the command signal to be transmitted to the command latch memory.

Moreover, each of some or all of the reversible counters 2100n and 2200n provided in the logic circuit units 1100n and 1200n includes the current value register 4101n or 4201n, the first setting register 3101n or 3201n, the second setting register 3102n or 3202n, the first comparison circuit 5101n or 5201n, and the second comparison circuit 5102n or 5202n. The current value register 4101n or 4201n increases or decreases the number of operations of the count input to the reversible counter 2100n or 2200n according to the count direction and stores a cumulative total value from an initial value at the start of the operation of the reversible counter. The first comparison circuit 5101n or 5201n is a value comparison circuit which generates a first compare match output when the value stored in the first setting register 3101n or 3201n and the value stored in the current value register 4101n or 4201n are identical with each other. The second comparison circuit 5102n or 5202n is a value comparison circuit which generates a second compare match output when the value stored in the second setting register 3102n or 3202n and the value stored in the current value register 4101n or 4201n are identical with each other. A value is set for the current value register or each of the first and second setting registers from the microprocessor 111 through the buffer memory 114b when the special instruction is executed.

The integrated circuit element 20 included in each of the special units 230 to 250 includes the multi-channel first port 21 having the first mode switching terminal 28a and the multi-channel second port 22 having the second mode switching terminal 28b and a pair of the logic circuit units 1100n and 1200n corresponding to the channel number n. The first port 21 is used as an I/O port connected to the input terminal 230X or 240X or the output terminal 250Y for connection to an external device through the input interface circuit 239X or 249X or the output interface circuit 259Y provided outside the integrated circuit element 20. Whether the first port 21 is used as an input port or an output port is selected and determined by the logic level input to the first mode switching terminal 28a. The second port 22 is used as an I/O port connected to the input terminal 230X or the output terminal 240Y or 250Y for connection to an external device through the input interface circuit 239X or the output interface circuit 249Y or 259Y provided outside the integrated circuit element 20. Whether the second port 22 is used as an input port or an output port is selected and determined by the logic level input to the second mode switching terminal 28b. Whether the logic circuit unit 1100n or 1200n constitutes a high-speed counter circuit for an input signal fed from the input interface circuit to perform the high-speed input processing or the analog input processing for transmitting the count-up output to the CPU unit 110C or constitutes a high-speed pulse output circuit based on the set data received from the CPU unit 110C to perform the high-speed output processing or the analog output processing for feeding a predetermined pulse output to the output interface circuit is determined according to the content of the special instruction included in the control program stored in the program memory 113C.

The pair of logic circuit units 1100n and 1200n include the following components corresponding to its own channel number n. The logic circuit unit 1100n includes the reversible counter 2100n, the setting register 3100n, the calculation register 4100n, the command latch memory 6100n, the comparison circuit 5100n, the notification bit memory 7100n, and the parameter memory 8100n. In the same manner, the logic circuit unit 1200n includes the reversible counter 2200n, the setting register 3200n, the calculation register 4200n, the command latch memory 6200n, the comparison circuit 5200n, the notification bit memory 7200n, and the parameter memory 8200n. Specifically, the integrated circuit element included in the special unit includes the pair of logic circuit units and the first and second ports used for I/O. Whether each of the first and second ports are used as an input port or an output port is freely selected and determined according to the type of the interface circuit. Therefore, only by changing the type of the interface circuit, even a single integrated circuit element can be used for the special unit for I/O or exclusively for input or output, or for the high-speed I/O processing or the analog I/O processing to demonstrate its multi-purpose function. As a result, the effect of mass production produced by the extension of the range of applications reduces the cost of manufacturing the integrated circuit element to obtain sophisticated I/O control functions with a low-cost programmable controller.

The logic circuit units 1100n and 1200n include the general-purpose input circuits 1110n and 1210n or the general-purpose output circuits 1290n and 1190n corresponding to their own channel number n, respectively. The general-purpose input circuit 1110n or 1210n is an input signal relay circuit for transmitting the logic input signal connected to the first port 21 or the second port 22 to the input image memory area allocated in the device memory 114a through the notification bit memory 7101n (7201n). The transfer from the notification bit memory to the input image memory is executed by the input processing means 911 which is a control program stored in the system memory 112C. The general-purpose output circuit 1290n or 1190n is an output signal relay circuit for outputting the command signal received by the command latch memory 6100n or 6200n provided for the logic circuit unit 1100n or 1200n from the output image memory area allocated in the device memory 114a to the output circuit 249Y or 259Y connected to the first port 21 or the second port 22. The transfer from the output image memory to the command latch memory is executed by the output processing means 923 which is a control program stored in the system memory 112C. Each of the general-purpose input circuits 1110n and 1210n and the general-purpose output circuits 1190n and 1290n is enabled when the logic circuit unit is not used as a high-speed I/O circuit or an analog I/O circuit. Specifically, the integrated circuit element included in the special unit includes the general-purpose I/O circuit in addition to the high-speed I/O circuit. Therefore, when the number of I/Os which require the high-speed I/O processing is small, the remaining I/O terminals can be efficiently used as general-purpose I/Os to economically and effectively use the special unit.

The general-purpose input circuit constitutes the variable filter circuit 1110n or 1210n corresponding to each channel number n. The system memory 112C includes a control program serving as the initial setting means 931. Each of the variable filter circuit 1110n (1210n) includes the reversible counter 2100n (2200n) for reversibly counting a predetermined clock signal depending on the logic level of the input signal and the notification bit memory 7101n (7201n) serving as an input determination circuit. The first setting register 3101n (3201n) stores the filter constant received as the set data 3110n (3210n). When the value of the current value register 4101n (4201n) increases to reach the set value in the first setting register, the count-up output Q is generated to stop the count-up operation. On the other hand, when the current value of the current value register 4101n decreases to zero, the return output $\overline{Q}$ is generated in place of the count-up output Q to stop the count-down operation. The input determination circuit 7101n (7201n) is set by the count-up output Q and is reset by the return output $\overline{Q}$. The output from the input determination circuit is transmitted to the input image memory area in the device memory 114a by the input processing means 911.

The initial setting means 931 functions at the start of the operation of the programmable controller 100C to search for the variable filter instruction through the program memory 113C. For the input signal for which the variable filter instruction REF is not used, the predetermined filter constant serving as a reference is transmitted to the first setting register 3101n (3201n). The variable filter instruction REF is a special instruction having the target input relay number and the number of the data register which stores the required input filter constant as the set data or the directly set constant as operands. Upon execution of the special instruction, the set data is transmitted to the first setting register 3101n (3201n) corresponding to the input relay number. Specifically, when the input terminal of the special unit is used as a general-purpose input, the filter constant is automatically set to the reference constant. At the same time, the input filter can be variably set by the variable filter instruction as needed. The variable filter circuit includes the reversible counter allocated to each input channel. Therefore, by setting the filter constant of the input filter to be larger than that of a filter provided for a general input circuit, an input signal containing large superimposed noise can be sufficiently smoothed to be fetched into the CPU unit. By setting the filter constant of the input filter to be smaller than that of a filter provided for a general input circuit, an input signal containing small superimposed noise can be quickly fetched into the CPU unit. In this manner, the input processing corresponding to the actual type of the input signal circuit can be performed. Moreover, for the input channel which does not perform the high-speed input processing, the reversible counter allocated to each channel can be effectively used. As a result, a wide range of variable filter circuits can be easily obtained.

The integrated circuit element 20 includes the first gate element 25n and the second gate element 27n corresponding to each channel number n, the minimum filter setting circuit 52, and the monitor read instruction EXRD stored in the program memory 113. The first gate element 25n and the second gate element 27n are a plurality of gate elements which are connected between the output terminal of the logic circuit unit 1100n or 1200n and the first port 21 and the second port 22 to block each output signal according to the logic levels of the first mode switching terminal 28a and the second mode switching terminal 28b. When the input interface circuit is connected to the first port 21 and the second port 22, the first gate element 25n and the second gate element 27n block the output signals. When the output interface circuit is connected to the first port 21 and the second port 22, the first gate element 25n and the second gate element 27n enable the output signal. The minimum filter setting circuit 52 functions when the output interface circuit is connected to the first port 21 and the second port 22 to enable the output signal from the first gate element 25n and the second gate element 27n. The minimum filter setting circuit 52 stores the output signal in the notification bit memory 7102n (7202n) without through the filter circuit. The monitor read instruction EXRD has operands for designating the output relay number and the transfer destination device number of the device memory 114 to read out the content of the notification bit memory 7102n (7202n) input through the minimum filter setting circuit 52 as the notification signal 7112n (7212n). Specifically, when the first and second ports are used as output ports, the variable filter circuit can be disabled to monitor and read out a state of the output signal by the special instruction. Therefore, when the first and second ports are used as input ports, the state of the output signal in place of the input signal transmitted to the input image memory in the device memory through the variable filter circuit can be read into the designated device memory by the special instruction to prevent erroneous information from being transferred to the input image memory of the corresponding number.

The integrated circuit element 20 or the special units 230 to 250 including the integrated circuit elements include the card information storage memory 9000. The system memory 112C includes a control program serving as the setting abnormality detecting means 905. The card information storage memory 9000 stores at least one of the logic information of the first mode switching terminal 28a and the second mode switching terminal 28b, which indicates whether the first port 21 and the second port 22 are set as input ports or output ports, and the logic information of the first identification terminal 24a and the second identification terminal 24b, which identifies whether the I/O interface circuits are logic signal circuits or analog signal circuits. The card information storage memory 9000 is connected to the CPU unit 110C through the data bus to allow the microprocessor 111 to read out the content of the card information storage memory 9000. The setting abnormality detecting means 905 detects that the types of the I/O interface circuits connected to the first port 21 and the second port 22, and the content of the instruction stored in the program memory 113C do not correspond to each other to stop the operation and notify the abnormality. Specifically, for starting the operation, the card information for the type of the I/O interface circuit of the special unit and the content of the instruction in the program memory are verified and compared. If an inappropriate instruction is used, the setting abnormality detecting means 905 stops the operation and notifies the abnormality. Therefore, it is possible to find the presence of an erroneous control program to perform a debug processing. In addition, a dangerous operation can be avoided. Accordingly, the safety is improved.

Each of some or all of the reversible counters 2100n and 2200n provided in the logic circuit units 1100n and 1200n includes the standby buffer registers 4104n and 4204n. The standby buffer registers 4104n and 4204n temporarily stores the numeric data transmitted from the buffer memory 114b. The content of the standby buffer registers is transmitted to the first setting registers 3101n and 3201n or the second setting registers 3102n and 3202n based on the timing signals generated from the logic circuit units 1100n and 1200n. Whether the numeric data transmitted from the buffer memory 114b is transmitted to the first and the second setting registers through the standby buffer registers with a time difference or is directly transmitted to the first and the second setting registers without through the standby buffer registers is determined based on the content of the special instruction.

The system memory 112C includes the control program serving as the transfer inhibiting means 920 executed during the operation of the programmable controller 100C. The special instruction used for the special units 230 to 250 is an instruction for generating the operation completion signal. From the start of the execution of the special instruction to the acquisition of the operation completion signal, the transfer inhibiting means 920 inhibits the transmission of the set data at least to the first setting registers 3101n and 3201n and the second setting registers 3102n and 3202n. The operation completion signal is obtained by reading the content of the notification bit memories 7100n and 7200n when the number of the pulse signals input to the first port 21 or the pulse signals generated from the second port 22 reaches a preset target number of pulses or the generation/count of the pulses is completed by the command signal.

Each of some or all of the reversible counters 2100n and 2200n provided in the logic circuit units 1100n and 1200n includes the variation adjusting registers 4103n and 4203n. The variation adjusting registers 4103n and 4203n are activated when a count-up/-down input is fed to the reversible counters 2100n and 2200n. The values stored in the variation adjusting registers 4103n and 4203n are added to or subtracted from the current values of the current value registers 4101n and 4201n.

Fourth Embodiment (1) Detailed Description of a Configuration and Functions

Figure 45:
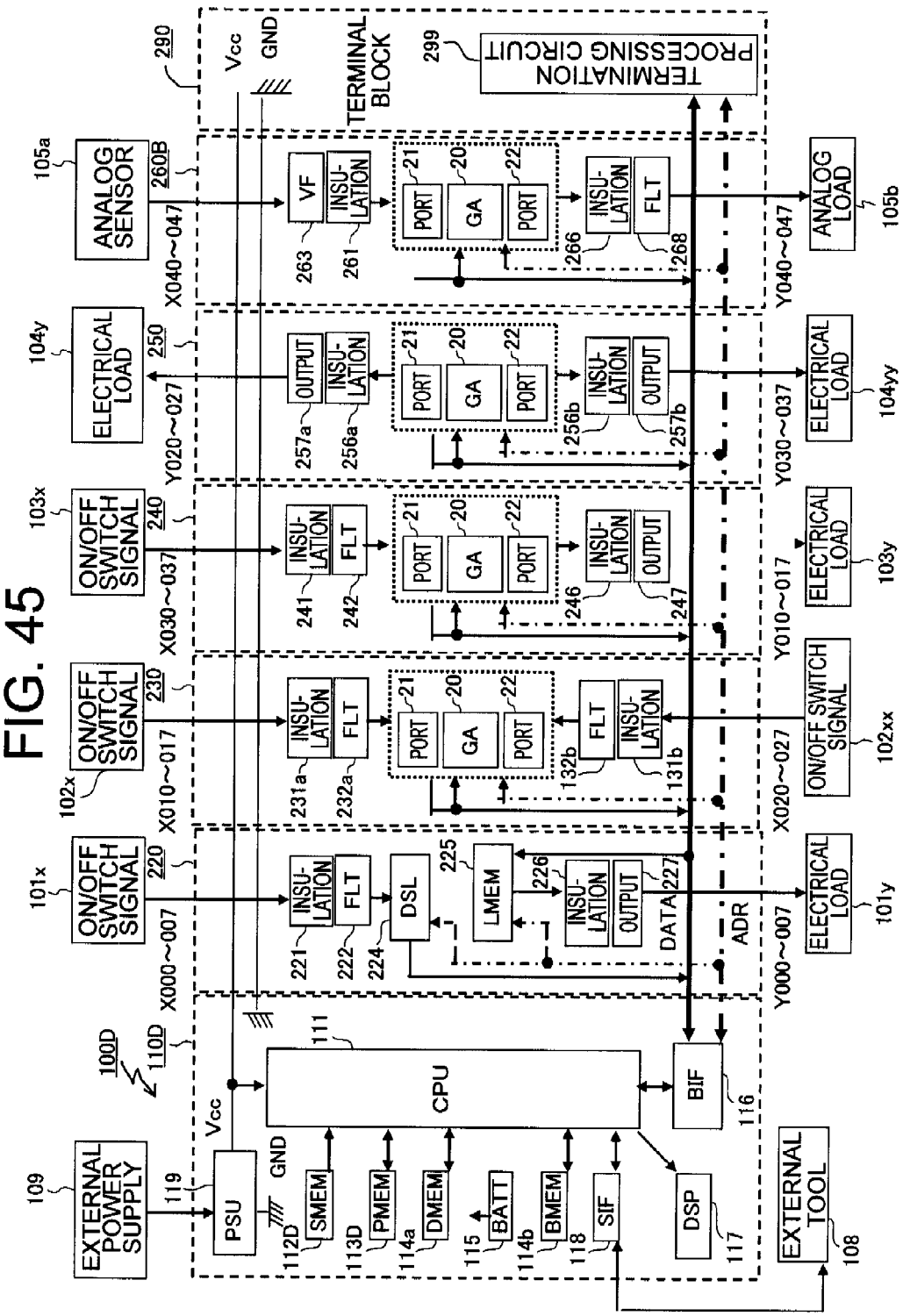
FIG. 45 is a view illustrating a unit configuration of a programmable controller according to a fourth embodiment of the present invention.

Hereinafter, a description of FIG. 45 illustrating a unit configuration of a programmable controller according to a fourth embodiment of the present invention will be made, mainly for the description of differences from FIG. 38. In FIGS. 45 and 38, the same or equivalent components are denoted by the same reference numerals. The basic operation of the microprocessor 111 is as described above referring to the flowchart of FIG. 44.

In FIG. 45, a programmable controller 100D includes a CPU unit 110D, I/O units 220 to 250 and 260B, and a terminal block 290. Electric power is supplied to the CPU unit 110D from the external power supply 109 which is, for example, a commercial power supply for 100V to 240V AC. The CPU unit 110D is also connected to the external tool 108 through a removable connector (not shown) to be capable of writing an I/O control program and monitoring an operating state with the external tool 108. The CPU unit 110D includes the microprocessor 111, a system memory 112D, a program memory 113D, the device memory 114a, the buffer memory 114b described above, the battery 115, the bus interface circuit 116, the warning display unit 117, the serial interface 118, and the control power supply 119. The system memory 112D is, for example, a mask ROM memory. The program memory 113D is, for example, a non-volatile flash memory, and stores I/O control programs created by a user. The device memory 114a is, for example, a RAM memory, and includes I/O image memories, an auxiliary relay, and a data register described below. The battery 115 backs up a part of the device memory 114a. The bus interface circuit 116 serves for data communication with each of the I/O units. The serial interface 118 connects the external tool 108 and the microprocessor 111 to each other.

Among the above-described components, the microprocessor 111, the system memory 112D, the program memory 113D, the device memory 114a, the buffer memory 114b, the bus interface 116, and the serial interface 118 are connected to each other through a bus. The control power supply 119 can also be provided outside the CPU unit 110D. The power supply unit, the CPU unit, and a predetermined number of I/O units constitute a basic unit.

The system memory 112D includes various control programs described above referring to FIG. 44. The system memory 112D converts the I/O control programs in a sequential language, which is stored in the program memory 113D, into a machine language compatible with the microprocessor 111 to operate the microprocessor 111. The programs are stored by a manufacturer in the shipping stage of the manufactured product. A sequential program for I/O control created by the user using the external tool 108 which is, for example, a personal computer is written to the program memory 113D through the serial interface 118. Examples of the sequential program are represented as the sequence diagrams illustrated in FIGS. 20 to 25, 27, 29, 36, and 43 referred to above. The generation of the sequence diagram on the screen of the personal computer automatically generates the sequential program.

The above-described I/O units 220 to 250 are connected to an end face of the CPU unit 110D. The subsequent I/O unit 260B configures a special unit including the integrated circuit element 20, the first port 21, and the second port 22. The special unit is used for both input and output. For example, analog signal voltages generated by eight analog sensors 105a are input through the voltage/frequency converters 263 and the input insulating circuit 261 to the special unit, whereas eight analog loads 105b are driven by the special unit through the output insulating circuit 266 and the smoothing circuit 268.

Figure 46:
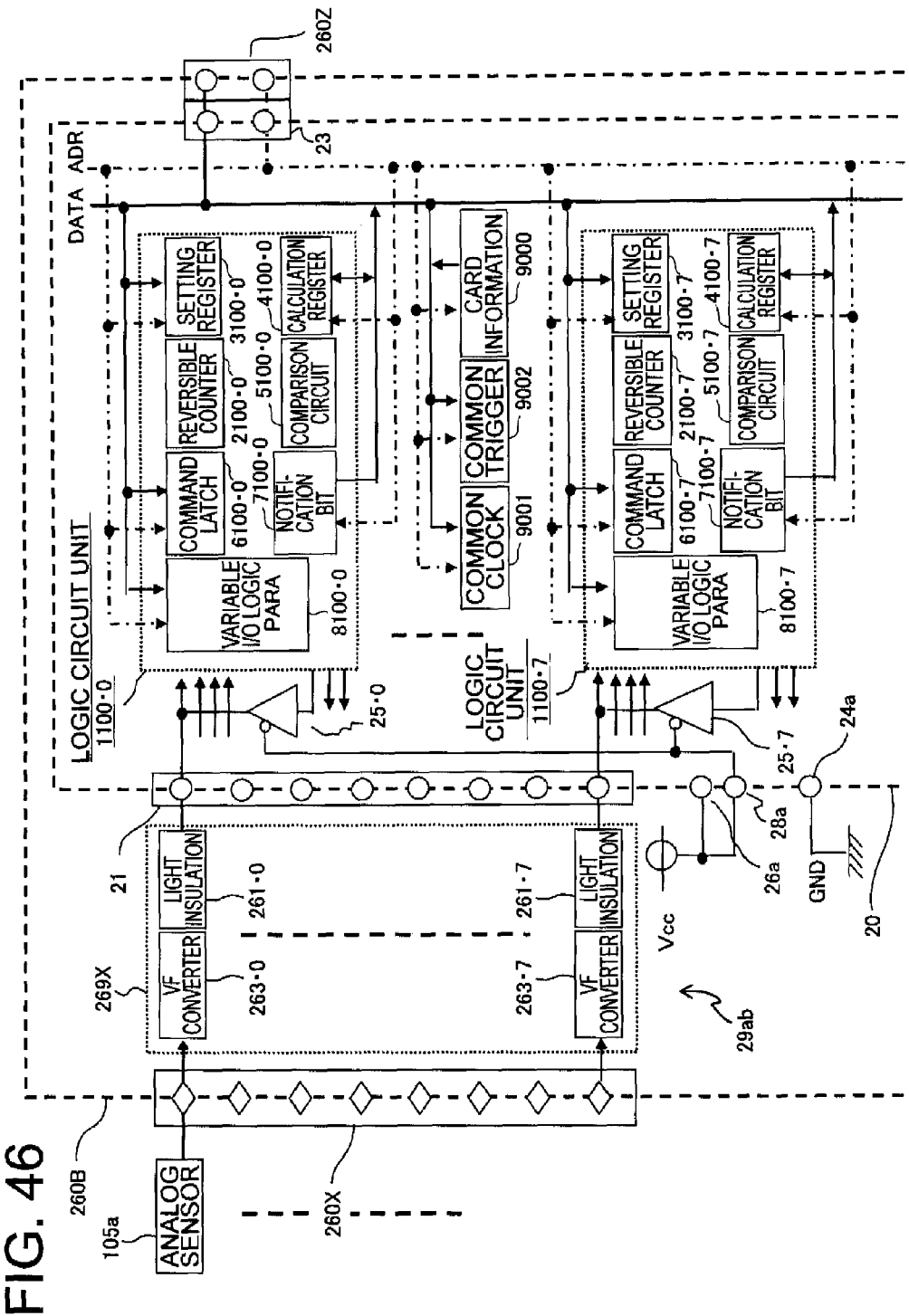
FIG. 46 is a view illustrating a first half of a special unit illustrated in FIG. 45.
Figure 47:
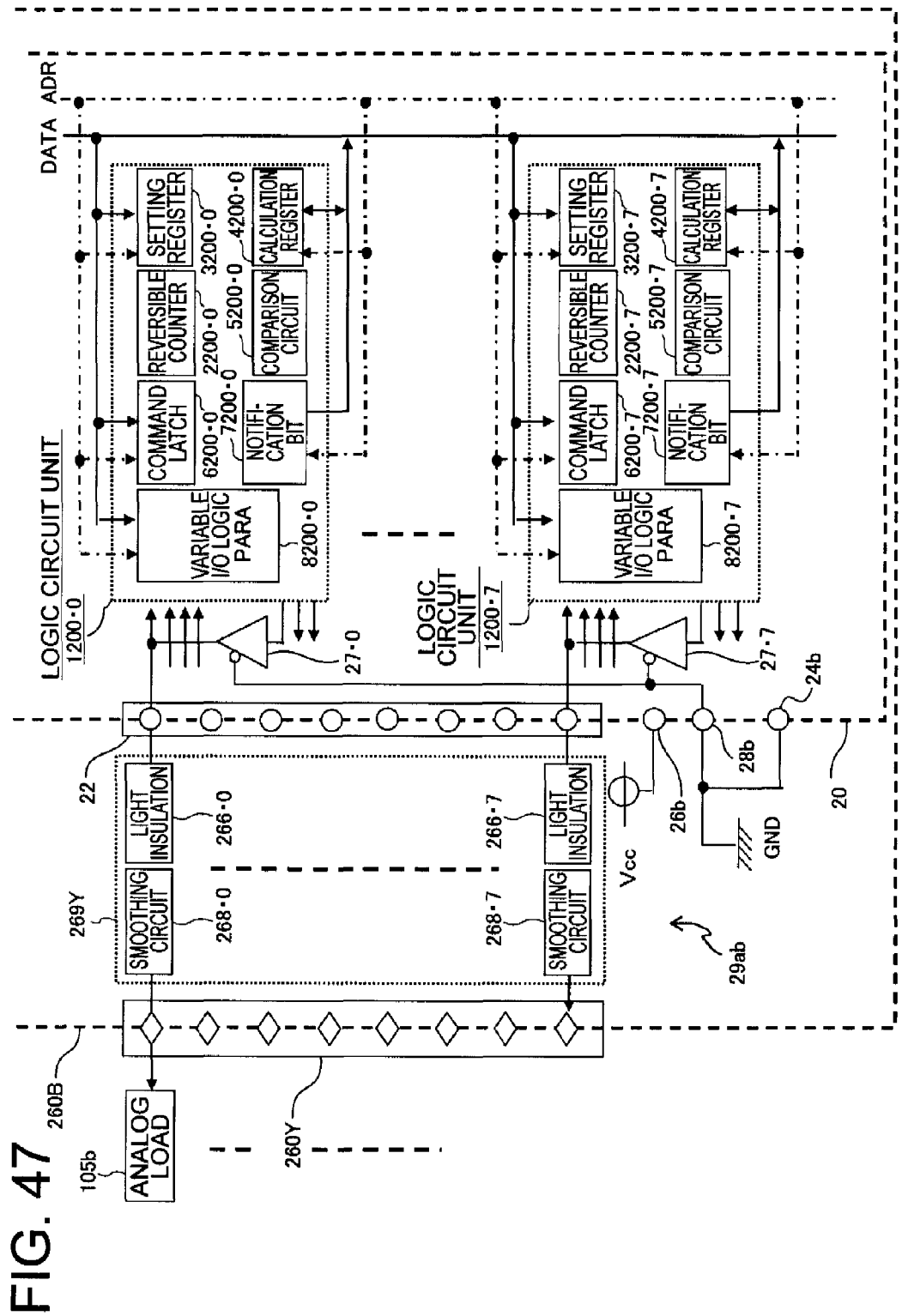
FIG. 47 is a view illustrating a second half of the special unit illustrated in FIG. 46.

Hereinafter, the special unit 260B illustrated in FIG. 45 will be described referring to FIGS. 46 and 47, mainly for the description of differences from FIGS. 39 and 40. FIG. 46 illustrates a configuration of the special unit 260B on the analog sensor side, whereas FIG. 47 illustrates the configuration of the special unit 260B on the analog load side. The same or equivalent components are denoted by the same reference numerals. In FIGS. 46 and 47, the special unit 260B includes input terminals 260X connected to eight analog sensors 105a and output terminals 260Y connected to eight analog loads 105b. An input interface circuit 269X for analog circuit is provided between the input terminals 260X and the first port 21 provided for the integrated circuit element 20. The input interface circuit 269X includes voltage/frequency converters 263n for generating a pulse having a frequency proportional to an input voltage and input insulating circuits 261n. The combination of the voltage/frequency converter 263n and the input insulating circuit 261n connected in series is provided for each channel number: n=0 to 7. An output interface circuit 269Y for analog loads is provided between the output terminals 260Y and the second port 22 provided for the integrated circuit element 22. The output interface circuit 269Y includes output insulating circuit 266n and smoothing circuit 268n. The combination of the output insulating circuit 266n and the smoothing circuit 268n connected in series is provided for each channel number: n=0 to 7.

The first port 21 includes the channel terminals 21n (not illustrated with reference numerals), each corresponding to the channel number n=0 to 7. In the same manner, the second port 22 includes the channel terminals 22n (not illustrated with reference numerals). The logic circuit unit 1100n is provided for each of the channel terminals 21n, whereas the logic circuit unit 1200n is provided for each of the channel terminals 22n. The logic circuit units 1100n and 1200n have the same configuration. One of a plurality of input terminals of the logic circuit unit 1100n is directly connected to the channel terminal 21n, whereas one of a plurality of output terminals is indirectly connected to the channel terminal 21n through the first gate element 25n. A gate terminal of each of the gate elements 25n is connected to the constant voltage power supply line Vcc through the first mode switching terminal 28a, which means that the first port 21 is connected not to the output interface circuit 269Y but to the input interface circuit 269X. Moreover, the logic level of the first mode switching terminal 28a is "H". As a result, the first gate element 25n is in an open state. The first identification terminal 24a is connected to the ground circuit GND, which serves to identify that the input interface circuit 269X is used not for the logic signal but for the analog signal. Furthermore, the logic level of the first signal terminal 26a is "H", which indicates that the first signal terminal 26a is not used for the analog comparison described above.

One of a plurality of input terminals of the logic circuit unit 1200n is directly connected to the channel terminal 22n, whereas one of a plurality of output terminals is indirectly connected to the channel terminal 22n through the second gate element 27n. A gate terminal of each of the gate elements 27n is connected to the ground circuit GND through the second mode switching terminal 28b, which means that the second port 22 is connected not to the input interface circuit 269X but to the output interface circuit 269Y. Moreover, the logic level of the second mode switching terminal 28b is "L". As a result, the second gate element 27n is in a closed state. The second identification terminal 26b is connected to the ground circuit GND, which serves to identify that the output interface circuit 269Y is used not for the logic loads but for the analog loads. Furthermore, the logic level of the second signal terminal 26b is "H", which indicates that the second signal terminal 26b is not used for the analog comparison described above. The electronic substrate 29ab included in the special unit 260B is provided with the bus joint terminal 260Z for bus connection with the microprocessor 111. The bus joint terminal 260Z is connected to the bus joint terminal 23 of the integrated circuit element 20.

Hereinafter, a configuration of the logic circuit unit 1100n or 1200n illustrated in FIG. 41 used for various specific analog I/O circuits will be described referring to FIG. 34 mentioned above. The first and second embodiments and the third and fourth embodiments fundamentally differ from each other in that a pair of logic circuit units are provided for each channel n in the third and fourth embodiments to handle a double number of I/Os.

FIG. 34: pulse density measuring circuit

FIG. 34 illustrates the pulse density measuring circuit 1021n for analog input. According to the logic circuit units 1100n and 1200n illustrated in FIG. 41, a pair of pulse density measuring circuits 1121n and 1221n (not shown) configured in the same manner can be obtained.

FIG. 35: PWM output circuit

FIG. 35 illustrates the PWM output circuit 1051n for analog output. According to the logic circuit unit 1100n or 1200n illustrated in FIG. 41, a pair of PWM output circuits 1151n and 1251n (not shown) having the same configuration are obtained. Therefore, for example, the I/O unit 170 illustrated in FIG. 30 includes eight analog input terminals 170X and eight analog output terminals 170Y. Accordingly, since the I/O unit 170 includes only eight logic circuit units 1000n in total, eight I/Os can be handled in total. On the other hand, for example, the I/O unit 260B illustrated in FIG. 45 includes eight analog input terminals 260X and eight analog output terminals 260Y. Since the I/O unit 260B includes eight logic circuit units 1100n and eight logic circuit units 1200n, eight inputs and eight outputs, in total, sixteen analog I/Os can be handled.

The special unit 260B can perform eight analog outputs. In the application which requires only one analog output, the remaining seven analog outputs can be used for a load of the ON/OFF operation. In this case, data for the OFF time width in the set data 3151n or 3251n illustrated in FIG. 35 is set to zero or maximized to bring the outputs in the completely ON or OFF state. If ON/OFF information is written to the output image memory in the device memory 114a, the ON/OFF information can be transmitted to the command latch memories 6100n and 6200n by the general-purpose output circuits 1190n and 1290n illustrated in FIG. 42 to output the ON/OFF signals from the command latch memories 6100n and 6200n to the channel terminals 21n and 22n even without transmitting the numeric data. For the analog output channel to which the PWM instruction is not applied, the content of the output image memory in the device memory 114a is automatically transmitted to the command latch memories 6100n and 6200n by the output processing means 923.

The special unit 260B can perform eight analog inputs. In the application which requires only one analog input, the remaining seven analog inputs can be used as ON/OFF switch signals. This is as described above referring to FIGS. 34 and 36(A4). Although the system memory in the third embodiment is denoted by 112C and that in the fourth embodiment is denoted by 112D in the above description, the same system memory is used as the system memories 112C and 112D.

(2) Summary and Characteristics of the Fourth Embodiment

As is apparent from the above description, the programmable controller 100D according to the fourth embodiment of the present invention includes the CPU unit 110D which includes the microprocessor 111, the system memory 112D operating in cooperation with the microprocessor 111, the program memory 113D to which the sequential program created by the user is transferred and written from the external tool 108, and the device memory 114a which has the I/O image memories X and Y for storing the I/O information and the control information, the auxiliary relay M, and the data register D, and one of or a plurality of the I/O units 220 to 250 and 260B connected to the CPU unit through the bus. Some or all of the I/O units serve as the special units 230 to 250 and 260B respectively including the integrated circuit elements 20 for sharing the special I/O processing function to complement the control function of the microprocessor 111. The special units 230 to 250 and 260B include the electronic substrate, on which the external connection terminals 230X, 240X, 260X, and 240Y, 250Y and 260Y connected to at least one of or both of the plurality of external sensors and external loads, the multi-channel input interface circuit 239X, 249X, or 269X, or the multi-channel output interface circuit 249Y, 259Y, or 269Y connected to the external connection terminal, the integrated circuit element 20 used for I/O control whose control specifications can be partially variably set, and the bus joint terminal 230Z to 250Z, or 260Z for connection to the microprocessor 111, are mounted. The integrated circuit element 20 includes the first port 21 to which the logic signal for ON/OFF operation is input from the input interface circuit 239X, 249X, or 269X, the second port 22 for outputting the logic signal for ON/OFF operation is output to the output interface circuit 249Y, 259Y, or 269Y, the parameter memories 8100n and 8200n corresponding to each channel number n, and the logic circuit units 1100n and 1200n whose operation specifications for the I/O processing are determined by the circuit organization data transmitted from the microprocessor 111 to the parameter memories.

The logic circuit units 1100n and 1200n further include the notification bit memories 7100n and 7200n, the calculation registers 4100n and 4200n, the setting registers 3100n and 3200n, the command latch memories 6100n and 6200n, and the reversible counters 2100n and 2200n. The reversible counters 2100n and 2200n include the current value registers 4101n and 4201n constituting a part of the calculation registers 4100n and 4200n. The circuit organization data transmitted to the parameter memories 8100n and 8200n allows a plurality of high-speed input processing and a plurality of high-speed output processing to be performed. When the input signal from the external sensor is an analog signal, the input interface circuit 269X feeds a pulse having a frequency proportional to the input signal to the integrated circuit element 20. When the external load is an analog load, the integrated circuit element 20 generates a pulse output having a commanded ON/OFF ratio as an output signal. The output interface circuit 269Y smoothes the received pulse output signal and then feeds the smoothed signal to the external load.

The CPU unit 110D includes the buffer memory 114b for data communication with the special unit 230 to 250 and 260B. The system memory 112D includes the control programs serving as the organization processing means 908 and the data conversion/transfer means 921. The organization processing means 908 transmits the circuit organization data to the parameter memories 8100n and 8200n and performs the address organization of the buffer memory 114b. The data conversion/transfer means 921 performs the data communication between the device memory 114a designated by the special instruction, and the setting registers 3100n and 3200n and the command latch memories 6100n and 6200n, or the calculation registers 4100n and 4200n and the notification bit memories 7100n and 7200n through the buffer memory 114b. The special instruction is composed of the instruction word indicating the type of instruction and the first operand, and at least one of the second operand and the third operand, the first to third operands being in no particular order.

Moreover, each of some or all of the reversible counters 2100n and 2200n provided in the logic circuit units 1100n and 1200n includes the current value registers 4101n and 4201n, the first setting registers 3101n and 3201n, the second setting register 3102n and a second setting register 3202n, the first comparison circuit 5101n and a first comparison circuit 5201n, and the second comparison circuit 5102n and a second comparison circuit 5202n. Upon execution of the special instruction, a value is set in the current value register or the first and second setting registers from the microprocessor 111 through the buffer memory 114b.

The integrated circuit element 20 included in each of the special units 230 to 250 and 260B includes the multi-channel first port 21 having the first mode switching terminal 28a and the multi-channel second port 22 having the second mode switching terminal 28b and a pair of the logic circuit units 1100n and 1200n corresponding to the channel number n. Whether the first port 21 is used as an input port or an output port is selected and determined by the logic level input to the first mode switching terminal 28a. Whether the second port 22 is used as an input port or an output port is selected and determined by the logic level input to the second mode switching terminal 28b. Whether the logic circuit unit 1100n or 1200n constitutes a high-speed counter circuit for an input signal fed from the input interface circuit to perform the high-speed input processing or the analog input processing for transmitting the count-up output to the CPU unit 110D or constitutes a high-speed pulse output circuit based on the set data received from the CPU unit 110D to perform the high-speed output processing or the analog output processing for feeding a predetermined pulse output to the output interface circuit is determined according to the content of the special instruction included in the control program stored in the program memory 113D. The pair of logic circuit units 1100n and 1200n include the following components corresponding to its own channel number n. The logic circuit unit 1100n includes the reversible counter 2100n, the setting register 3100n, the calculation register 4100n, the command latch memory 6100n, the comparison circuit 5100n, the notification bit memory 7100n, and the parameter memory 8100n. In the same manner, the logic circuit unit 1200n includes the reversible counter 2200n, the setting register 3200n, the calculation register 4200n, the command latch memory 6200n, the comparison circuit 5200n, the notification bit memory 7200n, and the parameter memory 8200n.

The integrated circuit element 20 or the special units 230 to 250 and 260B including the integrated circuit element includes the card information storage memory 9000. The system memory 112D includes a control program serving as the setting abnormality detecting means 905. The card information storage memory 9000 stores at least one of the logic information of the first mode switching terminal 28a and the second mode switching terminal 28b, which indicates whether the first port 21 and the second port 22 are set as input ports or output port, and the logic information of the first identification terminal 24a and the second identification terminal 24b, which identifies whether the I/O interface circuits are logic signal circuits or analog signal circuits. The card information storage memory 9000 is connected to the CPU unit 110D through the data bus to allow the microprocessor 111 to read out the content of the card information storage memory 9000. The setting abnormality detecting means 905 detects that the types of the I/O interface circuits connected to the first port 21 and the second port 22, and the content of the instruction stored in the program memory 113D do not correspond to each other to stop the operation and notify the abnormality.

Fifth Embodiment (1) Detailed Description of Configuration and Functions

Figure 48:
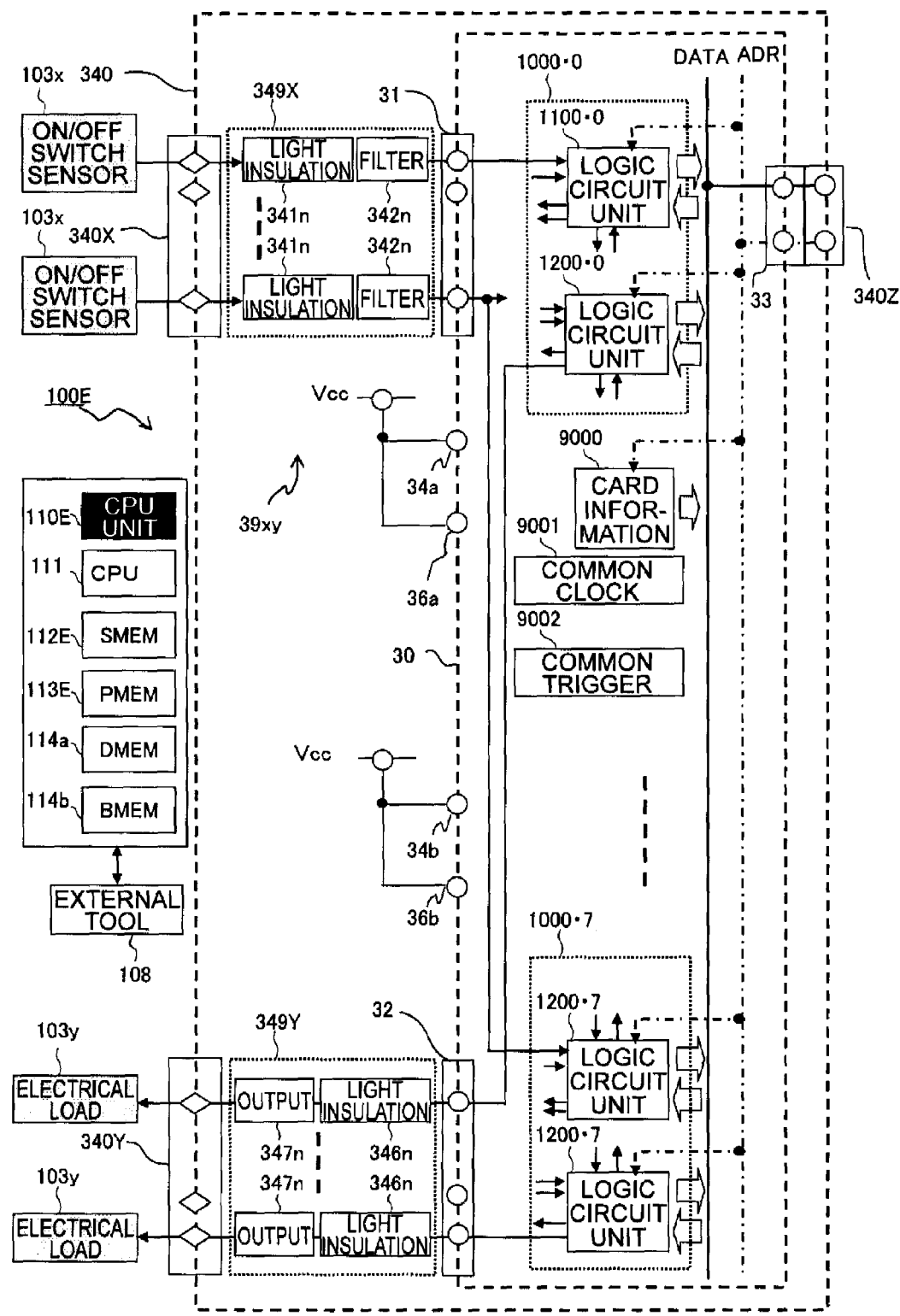
FIG. 48 is a view illustrating an internal configuration of a special unit according to a fifth embodiment of the present invention.

Hereinafter, an internal configuration of a special unit according to a fifth embodiment of the present invention will be described referring to FIG. 48. In FIG. 48, a CPU unit 110E includes the microprocessor 111, a system memory 112E, a program memory 113E, the device memory 114a, and the buffer memory 114b. A sequential program is transferred to be written to the program memory 113E from the external tool 108. A special unit 340 connected to the CPU unit 110E through a bus includes input terminals 340X connected to eight ON/OFF switch sensors 103x and output terminals 340Y connected to eight electrical loads 103y.

An input interface circuit 349X for high-speed logic input is provided between the input terminals 340X and the first port 31 provided for the integrated circuit element 30. The input interface circuit 349X includes input insulating circuits 341n and input filters 342n having a relatively small time constant of, for example, about 5 μsec. The combination of the input insulating circuit 341n and the input filter 342n connected in series is provided for each channel number: n=0 to 7. An output interface circuit 349Y for ON/OFF operation is provided between the output terminals 340Y and the second port 32 provided for the integrated circuit element 30. The output interface circuit 349Y includes output elements 347n corresponding to power transistors and output insulating circuits 346n. The combination of the output element 347n and the output insulating circuit 346n connected in series is provided for each channel number: n=0 to 7. The input terminals 340X and the input interface circuit 349X, the output terminal 340Y and the output interface circuit 349Y, a bus joint connector 340Z, and the integrated circuit element 30 are mounted on an electronic substrate 39xy to constitute the special unit 340.

The first port 31 includes channel terminals 31n (not illustrated with a reference numeral) respectively corresponding to the channel numbers n=0 to 7, whereas the second port 32 includes channel terminals 32n (not illustrated with a reference numeral) respectively corresponding to the channel numbers n=0 to 7. A pair of logic circuit units 1100n and 1200n are allocated to each channel n. The logic circuit units 1100n and 1200n transmit and receive a signal to/from the data bus DATA, and also transmit and receive a signal therebetween. Furthermore, the logic circuit units 1100n and 1200n receive a signal from the channel terminal 31n and output a signal to the channel terminal 32n.

The details of each of the logic circuit units 1100n and 1200n correspond to those illustrated in FIG. 41. As a representative high-speed input processing operation, for example, a high-speed pulse signal is input from the channel terminal 31n. The logic circuit unit 1100n counts the input high-speed pulse signals. When the number of pulse signals reaches a predetermined target number, the logic circuit unit 1100n transmits the count-up output to the microprocessor 111 through the data bus DATA. The target number is transmitted in advance as set data from the microprocessor 111 through the data bus DATA.

As a representative high-speed output processing operation, for example, a high-speed pulse output is generated from the channel terminal 32n based on the pulse cycle and the number of generated pulse which has been transmitted in advance as the set data to the logic circuit unit 1200n.

The first identification terminal 34a serves to identify that the input interface circuit 349X connected to the first port 31 is for the logic input. A wiring pattern of the first identification terminal 34a is connected to set the logic level of the first identification terminal 34a to "H". The second identification terminal 34b serves to identify that the output interface circuit 349Y connected to the second port 32 is for the logic output. A wiring pattern of the second identification terminal 34b is connected to set the logic level of the second identification terminal 34b to "H".

The logic levels of the first signal terminal 36a and the second signal terminal 36b are "H", which indicates that the I/O interface circuits for the high-speed logic are connected thereto. When the I/O interface circuits are for the analog comparison, the logic levels of the first signal terminal 36a and the second signal terminal 36b are set to "L".

Identification terminal information as described above is supplied to the card information storage memory 9000 to be transmitted to the microprocessor 111 through the data bus DATA. The common clock circuit 9001 generates a clock signal τ having, for example, a cycle of 1 μsec and supplies the clock signal to each logic circuit unit 1000n as needed. The common trigger circuit 9002 generates trigger signals P0 and Q0 in tandem, each having, for example, a signal cycle of T0=10 msec and a width of 1 μsec, and supplies the trigger signals P0 and Q0 to each logic circuit unit 1000n as needed.

The logic circuit unit 1100n includes a 16-bit reversible counter 2100n, a setting register 3100n, a calculation register 4100n, and a comparison circuit 5100n. In the same manner, the logic circuit unit 1200n includes a 16-bit reversible counter 2200n, a setting register 3200n, a calculation register 4200n, and a comparison circuit 5200n. A pair of the reversible counters 2100n and 2200n are dependently connected to each other depending on the contents of the parameter memories 8100n and 8200n to operate as a single 32-bit reversible counter 2000n. When the pair of reversible counters 2100n and 2200n are dependently connected to each other to be the single reversible counter 2000n, a pair of the setting registers 3100n and 3200n, a pair of the calculation registers 4100n and 4200n, and a pair of the comparison circuits 5100n and 5200n are combined to operate as a single 32-bit set register 3000n, a single 32-bit calculation register 4000n, and a single 32-bit comparison circuit 5000n, respectively.

Whether the reversible counters provided for each channel are treated as the two 16-bit counters 2100n and 2200n or as the single 32-bit counter 2000n is identified by the type of a special instruction to the reversible counter, specifically, depending on whether the special instruction is a 32-bit instruction or a 16-bit instruction. As illustrated in FIGS. 39 and 40, if a first gate element 35n and a second gate element 37n corresponding to the first gate element 25n and the second gate element 27n, respectively, are provided for each of the logic circuit units 1100n and 1200n, the first port 31 and the second port 32 can be used as I/O ports.

(2) Summary and Characteristics of the Fifth Embodiment

As is apparent from the above description, the programmable controller 100E according to the fifth embodiment of the present invention includes the CPU unit 110E which includes the microprocessor 111, the system memory 112E operating in cooperation with the microprocessor 111, the program memory 113E to which the sequential program created by the user is transferred and written from the external tool 108, and the device memory 114a which has the I/O image memories X and Y for storing the I/O information and the control information, the auxiliary relay M, and the data register D, and one of or a plurality of the I/O units 340 connected to the CPU unit through the bus. Some or all of the I/O units serve as the special unit 340 respectively including the integrated circuit elements 30 for sharing the special I/O processing function to complement the control function of the microprocessor 111. The special unit 340 includes the electronic substrate 39xy, on which the external connection terminals 340X and 340Y connected to at least one of or both of the plurality of external sensors and external loads, the multi-channel input interface circuit 349X, or the multi-channel output interface circuit 349Y connected to the external connection terminal, the integrated circuit element 30 used for I/O control whose control specifications can be partially variably set, and the bus joint terminal 340Z for connection to the microprocessor 111, are mounted. The integrated circuit element 30 includes the first port 31 to which the logic signal for ON/OFF operation is input from the input interface circuit 349X, the second port 32 for outputting the logic signal for ON/OFF operation is output to the output interface circuit 349Y, the parameter memories 8100n and 8200n corresponding to each channel number n, and the logic circuit units 1100n and 1200n whose operation specifications for the I/O processing are determined by the circuit organization data transmitted from the microprocessor 111 to the parameter memory.

The logic circuit units 1100n and 1200n further includes the notification bit memories 7100n and 7200n for counting the logic input signal obtained through the input interface circuit 349X at high speed to transmit the count-up output or the count data as the notification signal or the computational data to the microprocessor 111, the calculation registers 4100n and 4200n, and the reversible counters 2100n and 2200n which store the set data or the command signal received from the microprocessor 111 in the setting registers 3100n and 3200n and the command latch memories 6100n and 6200n to feed the high-speed pulse output based on the contents of the setting register and the command latch memory to the output interface circuit 349X. The reversible counters 2100n and 2200n include the current value registers 4101n and 4201n forming a part of the calculation register. Whether to constitute the high-speed counter circuit for the input signal fed from the input interface circuit 349X to perform the high-speed input processing for transmitting the count-up output to the CPU unit 110E or to constitute the high-speed pulse output circuit based on the set data received from the CPU unit 110E to perform the high-speed output processing for feeding a predetermined pulse output to the output interface circuit 349Y is determined for each channel according to the content of the special instruction included in the control program stored in the program memory. When the circuit organization data transmitted to the parameter memories 8100n and 8200n causes a plurality of high-speed input processing circuits and a plurality of high-speed output processing circuits to be performed and when the input signal from the external sensor is an analog signal, the input interface circuit feeds a pulse or a comparison determination logic signal having a frequency proportional to that of the input signal to the integrated circuit element 30. When the external load is an analog load, the integrated circuit element 30 generates a pulse output having an ON/OFF ratio as a commanded output signal. The output interface circuit smoothes the received pulse output signal and then feeds the smoothed signal to the external load.

The CPU unit 110E includes the buffer memory 114b for data communication with the special unit 340. The system memory 112E includes the control programs functioning as the organization processing means 908 and the data conversion/transfer means 921. Immediately after the start of the operation of the programmable controller 100E, the organization processing means 908 searches through the content of the program memory 113E to extract the specific instruction corresponding to the special unit 340 and transmits the type of the logic circuit units 1100n and 1200n used in the special unit according to the content of the special instruction and the circuit organization data corresponding to the operation mode to the parameter memories 8100n and 8200n. At the same time, the organization processing means 908 performs the address organization of the buffer memory 114b for the communication with each logic circuit unit whose circuit organization is specified by the parameter. The data conversion/transfer means 921 converts the data into the set data in unit suitable for the operation of the logic circuit units 1100n and 1200n and the command signal based on the content of the device memory 114a designated by the special instruction to transmit the set data and the command signal to the setting registers 3100n and 3200n and the command latch memories 6100n and 6200n through the buffer memory 114b. At the same time, the data conversion/transfer means 921 transfers the computational data or the notification signal obtained from the logic circuit units 1100n and 1200n to the device memory 114a designated by the special instruction through the buffer memory 114b. The special instruction is composed of an instruction word indicating the type of instruction, a first operand, and at least one of a second operand and a third operand, the first to third operands being in no particular order. The first operand designates an identification number for specifying a target I/O number of the special unit. The second operand designates a number of the data register which stores the computational data obtained from the calculation register or a number of the data register which stores the set data transmitted to the setting register, or directly designates a set constant. The third operand designates a number of the auxiliary relay which stores the notification signal obtained from the notification bit memory or a number of the auxiliary relay which stores the command signal to be transmitted to the command latch memory.

Moreover, each of some or all of the reversible counters 2100$n$ and 2200$n$ provided in the logic circuit units 1100$n$ and 1200$n$ includes the current value registers 4101$n$ and 4201$n$, the first setting registers 3101$n$ and 3201$n$, the second setting registers 3102$n$ and 3202$n$, the first comparison circuits 5101$n$ and 5201$n$, and the second comparison circuits 5102$n$ and 5202$n$. The current value registers 4101$n$ and 4201$n$ increase or decrease the number of operations of the count input to the reversible counters 2100$n$ and 2200$n$ according to the count direction and stores a cumulative total value from an initial value at the start of the operation of the reversible counters. The first comparison circuits 5101$n$ and 5201$n$ are a value comparison circuit which generates a first compare match output when the value stored in the first setting registers 3101$n$ and 3201$n$ and the value stored in the current value registers 4101$n$ and 4201$n$ are identical with each other. The second comparison circuits 5102$n$ and 5202$n$ are a value comparison circuit which generates a second compare match output when the value stored in the second setting registers 3102$n$ and 3202$n$ and the value stored in the current value registers 4101$n$ and 4201$n$ are identical with each other. A value is set for the current value register or each of the first and second setting registers from the microprocessor 111 through the buffer memory 114$b$ when the special instruction is executed.

The integrated circuit element 30 included in the special unit 340 includes the multi-channel first port 31 and the multi-channel second port 32, and the pair of logic circuit units 1100$n$ and 1200$n$ corresponding to each channel number n. The first port 31 is connected to the input terminal for connection to an external device through the input interface circuit for logic signal or analog signal provided outside the integrated circuit element 30. The second port 32 is connected to the output terminal for connection to an external device through the output interface circuit for logic signal or analog signal provided outside the integrated circuit element 30. Whether the logic circuit units 1100$n$ and 1200$n$ constitute the high-speed counter circuit for the input signal fed from the input interface circuit to perform the high-speed input processing or the analog input processing for transmitting the count-up output to the CPU unit 110E or constitute the high-speed pulse output circuit based on the set data received from the CPU unit 110E to perform the high-speed output processing or the analog output processing for feeding a predetermined pulse output to the output interface circuit is determined based on the content of the special instruction included in the control program stored in the program memory 113E.

The pair of logic circuit units 1100$n$ and 1200$n$ include the following components corresponding to its own channel number n. The logic circuit unit 1100$n$ includes the reversible counter 2100$n$, the setting register 3100$n$, the calculation register 4100$n$, the command latch memory 6100$n$, the comparison circuit 5100$n$, the notification bit memory 7100$n$, and the parameter memory 8100$n$. In the same manner, the logic circuit unit 1200$n$ includes the reversible counter 2200$n$, the setting register 3200$n$, the calculation register 4200$n$, the command latch memory 6200$n$, the comparison circuit 5200$n$, the notification bit memory 7200$n$, and the parameter memory 8200$n$. When the special instruction is a double-length instruction, the pair of reversible counters 2100$n$ and 2200$n$ are dependently connected to each other to form the single double-length reversible counter 2000$n$. Specifically, the integrated circuit element included in the special unit includes a pair of the logic circuit units, and the first and second ports. The pair of logic circuit units can be used as two separate reversible counters or as a single double-length reversible counter. Therefore, for example, the reversible counters can be used in the following manner. Each of the reversible counters is configured as a 16-bit counter. One of the reversible counters can be used as a 16-bit high-speed counter, whereas the other reversible counter can be used as a 16-bit pulse output circuit. Alternatively, the pair of reversible counters can be used as any one of a 32-bit high-speed counter and a 32-bit pulse output circuit. As a result, the size of the integrated circuit element can be reduced to allow the integrated circuit to be used for various applications.

The integrated circuit element 30 or the special unit 340 including the integrated circuit element 30 includes the card information storage memory 9000. The system memory 112E includes a control program serving as the setting abnormality detecting means 905. The card information storage memory 9000 stores the first identification terminal information 34$a$ and the second identification terminal information 34$b$ for identifying whether the interface circuits for logic signal or for analog signal are connected to the first port 31 and the second port 32. The card information storage memory 9000 is connected to the CPU unit 111E through the data bus to allow the content of the card information storage memory 9000 to be read by the microprocessor 111. The setting abnormality detecting means 905 detects that the types of the I/O interface circuits connected to the first port 31 and the second port 32, and the content of the instruction stored in the program memory 113E do not correspond to each other to stop the operation and notify the abnormality. Specifically, for starting the operation, the card information for the type of the I/O interface circuit of the special unit and the content of the instruction in the program memory are verified and compared. If an inappropriate instruction is used, the setting abnormality detecting means 905 stops the operation and notifies the abnormality. Therefore, it is possible to find the presence of an erroneous control program to perform a debug process. In addition, a dangerous operation can be avoided. Accordingly, the safety is improved.

Further, each of some or all of the reversible counters 2100$n$ and 2200$n$ provided in the logic circuit units 1100$n$ and 1200$n$ includes the standby buffer registers 4104$n$ and 4204$n$. The standby buffer registers 4104$n$ and 4204$n$ temporarily store the numeric data transmitted from the buffer memory 114$b$. The contents of the standby buffer registers are transmitted to the first setting registers 3101$n$ and 3201$n$ or the second setting registers 3102$n$ and 3202$n$ based on the timing signal generated from the logic circuit units 1100$n$ and 1200$n$. Whether the numeric data transmitted from the buffer memory 114$b$ is transmitted to the first and the second setting registers through the standby buffer register with a time difference or is directly transmitted to the first and the second setting registers without through the standby buffer register is determined based on the content of the special instruction.

The system memory 112E includes the control program serving as the transfer inhibiting means 920 executed during the operation of the programmable controller 110E. The special instruction used for the special unit 340 is an instruction for generating the operation completion signal. From the start of the execution of the special instruction to the acquisition of the operation completion signal, the transfer inhibiting means 920 inhibits the transmission of the set data at least to the first setting registers 3101$n$ and 3201$n$ and the second setting registers 3102$n$ and 3202$n$. The operation completion signal is obtained by reading the content of the notification bit memories 7100$n$ and 7200$n$ when the number of the pulse signals input to the first port 31 or the pulse signals generated from the second port 32 reaches a preset target number of pulses or the generation/count of the pulses is completed by the command signal.

Further, each of some or all of the reversible counters 2100$n$ and 2200$n$ provided in the logic circuit units 1100$n$ and 1200$n$ includes the variation adjusting registers 4103$n$ and 4203$n$. The variation adjusting registers 4103$n$ and 4203$n$ are activated when a count-up/-down input is fed to the reversible counters 2100$n$ and 2200$n$. The values stored in the variation adjusting registers 4103$n$ and 4203$n$ are added to or subtracted from the current values of the current value registers 4101$n$ and 4201$n$.

What is claimed is:

1. A programmable controller comprising:

a CPU unit including a microprocessor, a system memory operating in corporation with the microprocessor, a program memory for storing a sequential program, and a device memory for storing I/O information and control information; and at least one I/O unit connected to the CPU unit through a bus, at least one of the I/O units comprising a special unit including an integrated circuit element for sharing a special I/O processing function to complement a control function of the microprocessor, wherein:

the special unit includes an electronic substrate, on which a multi-channel input interface circuit and a multi-channel output interface circuit each connected to external connection terminals, and the integrated circuit element used for I/O control whose control specifications can be partially variably set are provided;

the integrated circuit element includes a parameter memory corresponding to each channel number and a logic circuit unit whose operation specifications for I/O processing are determined by circuit organization data transmitted from the microprocessor to the parameter memory corresponding to each channel number;

the logic circuit unit includes a notification bit memory for counting a logic input signal obtained through the input interface circuit at high speed to transmit a count-up output as a notification signal to the microprocessor, a calculation register for transmitting count data as computational data to the microprocessor, a setting register for storing set data received from the microprocessor, a command latch memory for storing a command signal received from the microprocessor, and a reversible counter for feeding a high-speed pulse output based on contents of the setting register and the command latch memory to the output interface circuit;

whether the reversible counter constitutes a high-speed counter circuit for an input signal fed from the input interface circuit to perform high-speed input processing for transmitting the count-up output to the CPU unit or constitutes a high-speed pulse output circuit based on the set data received from the CPU unit to perform high-speed output processing for feeding a predetermined pulse output to the output interface circuit is determined for each channel according to a content of a special instruction included in a control program stored in the program memory;

a plurality of types of the high-speed input processing and a plurality of types of the high-speed output processing are performed by the circuit organization data transmitted to the parameter memory; and the input interface circuit feeds a pulse having a frequency proportional to an input signal to the integrated circuit element when the input signal from an external sensor connected to the external connection terminal is an analog signal, whereas the integrated circuit element generates a pulse output at a commanded ON/OFF ratio as an output signal and the output interface circuit smoothes the received pulse output signal to feed the smoothed pulse output signal to an external load when the external load is an analog load.

2. The programmable controller according to claim 1, wherein:

the CPU unit includes a buffer memory for data communication with the special unit;

the system memory includes control programs serving as organization processing means and data conversion/transfer means;

the organization processing means searches through a content of the program memory immediately after start of an operation of the programmable controller to extract a special instruction corresponding to the special unit to transmit the circuit organization data corresponding to a type of the logic circuit unit and an operation mode which are used in the special unit to the parameter memory according to a content of the special instruction and to perform address organization of the buffer memory for communication with each of logic circuit units whose circuit organization is specified;

the data conversion/transfer means converts a content of the device memory specified by the special instruction into set data in unit suitable for an operation of the logic circuit unit and a command signal to transmit the obtained set data and command signal to the setting register and the command latch memory through the buffer memory and transfers any one of computational data and a notification signal obtained from the logic circuit unit to the device memory designated by the special instruction through the buffer memory; and the special instruction includes an instruction word indicating a type of instruction, a first operand, and at least one of a second operand and a third operand, the first to third operands being included in no particular order, the first operand designating an identification number for specifying a target I/O number of the special unit, the second operand designating any one of a number of the data register storing the computational data obtained from the calculation register and a number of the data register storing the set data transmitted to the setting register and a directly set constant, and the third operand designates any one of a number of the auxiliary relay storing the notification signal obtained from the notification bit memory and a number of the auxiliary relay storing the command signal transmitted to the command latch memory.

3. The programmable controller according to claim 2, wherein:

the reversible counter includes a current value register for increasing/decreasing the number of operations of a count input according to a count direction to store a cumulative value from an initial value at start of an operation of the reversible counter, a first setting register for storing an upper limit count value, a second setting register for storing an intermediate value less than the upper limit count value, a first comparison circuit including a value comparison circuit for generating a first compare match output when a value stored in the first setting register and a value stored in the current value register are identical with each other, and a second comparison circuit including a value comparison circuit for generating a second compare match output when a value stored in the second setting register and the value stored in the current value register are identical with each other; and a value is set for any one of the current register and each of the first setting register and the second setting register from the microprocessor through the buffer memory upon execution of the special instruction.

4. The programmable controller according to claim 2, wherein:

the logic circuit unit includes a general-purpose input circuit for transferring an input signal to an input image memory area allocated in the device memory through a data selector for input processing based on execution of input processing means corresponding to the control program stored in the system memory and a general-purpose output circuit for transferring data in an output image memory area allocated in the device memory to an output latch memory provided in the logic circuit unit upon execution of output processing means corresponding to the control program stored in the system memory; and the general-purpose input circuit and the general-purpose output circuit are enabled when the logic circuit unit is used neither as a high-speed I/O circuit nor as an analog I/O circuit.

5. The programmable controller according to claim 2, wherein:

the integrated circuit element includes a multi-channel first port having a first mode switching terminal and a multi-channel second port having a second mode switching terminal, and a pair of the logic circuit units corresponding to each channel number;

the first port is an I/O port connected to any one of an input terminal and an output terminal for connection to an external device through any one of an input interface circuit and an output interface circuit provided outside the integrated circuit element;

whether the first port is used as an input port or an output port is selected and determined based on a logic level input to the first mode switching terminal;

the second port is an I/O port connected to any one of an input terminal and an output terminal for connection to an external device through any one of an input interface circuit and an output interface circuit provided outside the integrated circuit element;

whether the second port is used as an input port or an output port is selected and determined based on a logic level input to the second mode switching terminal;

whether the pair of logic circuit units constitute a high-speed counter circuit for an input signal fed from the input interface circuit to perform any one of high-speed input processing and analog input processing for transmitting a count-up output to the CPU unit or the pair of logic circuit units constitute a high-speed pulse output circuit based on the set data received from the CPU unit to perform any one of high-speed output processing and analog output processing for feeding a predetermined pulse output to the output interface circuit is determined according to the content of the special instruction included in the control program stored in the program memory; and each of the pair of logic circuit units includes the reversible counter, the setting register, the calculation register, the command latch memory, a comparison circuit, the notification bit memory, and the parameter memory, corresponding to each channel number n.

6. The programmable controller according to claim 2, wherein:

the integrated circuit element includes a multi-channel first port, a multi-channel second port, and a pair of logic circuit units corresponding to each channel number;

the first port is connected to an input terminal for connection to an external device through an input interface circuit for logic signals or for analog signals provided outside the integrated circuit element;

the second port is connected to an output terminal for connection to the external device through an output interface circuit for logic signals or for analog signals provided outside the integrated circuit element;

whether the pair of logic circuit units constitute a high-speed counter circuit for an input signal fed from the input interface circuit to perform any one of high-speed input processing and analog input processing for transmitting a count-up output to the CPU unit or the pair of logic circuit units constitute a high-speed output circuit based on the set data received from the CPU unit to perform any one of high-speed output processing and analog output processing for feeding a predetermined pulse output to the output interface circuit is determined according to the content of the special instruction included in the control program stored in the program memory;

each of the pair of logic circuit units includes the reversible counter, the setting register, the calculation register, the command latch memory, a comparison circuit, the notification bit memory, and the parameter memory corresponding to each channel number; and the pair of reversible counters are dependently connected to each other to constitute a single double-length reversible counter when the special instruction is a double-length instruction.

7. The programmable controller according to claim 3, wherein:

at least one of the reversible counters provided for the logic circuit unit includes a standby buffer register;

the standby buffer register temporarily stores numeric data transmitted from the buffer memory, and a content of the standby buffer register is transferred to any one of the first setting register and the second setting register based on a timing signal generated from the logic circuit unit; and whether the numeric data transmitted from the buffer memory is transferred to the first setting register and the second setting register with a time difference through the standby buffer register or is directly transferred to the first setting register and the second setting register without through the standby buffer register is determined based on the content of the special instruction.

8. The programmable controller according to claim 3, wherein:

the system memory includes a control program serving as transfer inhibiting means executed during an operation of the programmable controller;

when the special instruction applied to the special unit is an instruction for generating an operation completion signal, the transfer inhibiting means inhibits transmission of the set data at least to the first setting register and the second setting register from the start of execution of the special instruction until the operation completion signal is obtained; and the operation completion signal is obtained by reading the content of the notification bit memory when any one of the number of pulse signals input to the first port and the number of pulse signals generated from the second port reaches a preset target number of pulses or the generation/count of the pulses is completed by the command signal.

9. The programmable controller according to claim 3, wherein:

the logic circuit unit includes an edge detecting circuit operating in response to an edge detection instruction stored in the program memory;

the edge detecting circuit includes a single-count reversible counter operating in response to an input logical transition of the channel terminal connected to the input interface circuit for high-speed logic signals to detect and store at least one of a rising edge and a falling edge to transmit the detected edge as a notification signal, the microprocessor receiving the notification signal resets a detection storage signal by the command signal so that the edge detecting circuit restarts next edge detection;

the edge detection instruction is used for the special unit to which the input interface circuit for high-speed logic signals is connected and is a special instruction having a target input number X and a number M of the auxiliary relay storing the result of detection as operands;

upon execution of the special instruction, a value exceeding 1 is stored in the first setting register of the reversible counter whereas a set value of 1 is stored in the second setting register, and the rising edge is detected by a count-up compare match output for storing a compare match during a count-up operation of the second comparison circuit, and the generation of the count-up compare match output inverts a count direction and a count input logic;

the falling edge is detected by a count-down compare match output for storing a compare match during a count-down operation of the second comparison circuit; and the count-up compare match output and the count-down compare match output are transmitted as a notification signal to the auxiliary relay M to reset the operation of the auxiliary relay M to transmit a detection restart command to the command latch memory by a command signal.

10. The programmable controller according to claim 3, wherein:

the logic circuit unit includes a pulse density measuring circuit operating in response to any one of a pulse density measurement instruction and an AD conversion instruction stored in the program memory;

the pulse density measuring circuit is a high-speed counter whose current count value is reset for each predetermined period of time and stores a maximum count value immediately before resetting to obtain a digital value proportional to a frequency of the input pulse signal to store the measured frequency in a peak hold register;

the pulse density measurement instruction is used for the special unit to which the input interface circuit for high-speed logic signals is connected, and is a special instruction having a target input number X and a number D of the data register storing the result of measurement as operands, and upon execution of the special instruction, a content of the peak hold register is transferred as computational data to the data register D to be stored therein; and the AD conversion instruction is used for the special unit to which the input interface circuit for analog signals is connected, and is a special instruction having the target input number X and the number D of the data register storing the result of measurement of the pulse frequency generated from a voltage/frequency converter of the input number as operands, and upon execution of the special instruction, a content of the peak hold register is transferred as computational data to the data register D to be stored therein.

11. The programmable controller according to claim 4, wherein:

the input interface circuit is classified as any one of an input interface circuit for ON/OFF switch sensor including any one of an input filter having a small time constant for a high-speed input pulse and an input filter having a larger time constant, to which the high-speed input pulse is not input, and an input interface circuit for an analog sensor including a voltage/frequency converter;

the output interface circuit is classified as any one of an output interface circuit including any one of a transistor for performing a high-speed ON/OFF switch operation for a high-speed output pulse as an output element and a transistor for performing a low-speed ON/OFF switch operation, from which the high-speed output pulse is not output, as an output element and an output interface circuit for an analog load including a smoothing circuit for a pulse width modulation signal output generated from the logic circuit unit; and a plurality of types of the special units are applicably configured with an arbitrary combination of any one of a high-speed logic input, a low-speed logic input and an analog input, and any one of a high-speed logic output, a low-speed logic output and an analog output, except for a combination of the low-speed logic input and the low-speed logic output.

12. The programmable controller according to claim 4, wherein:

the logic circuit unit includes a variable filter circuit operating in response to a variable filter instruction stored in the program memory;

the variable filter circuit includes a reversible counter for counting up/down a predetermined clock signal according to a logic level of an input signal and a notification bit memory serving as an input determination circuit;

a filter constant received as the set data is stored in the first setting register of the reversible counter, and the reversible counter generates a count-up output to stop a count-up operation when a value of the current value register of the reversible counter increases to reach a set value in the first setting register and generates a return output in place of the count-up output to stop a count-down operation when the current value of the current value register decreases to be zero;

the notification bit memory is set by the count-up output and reset by the return output, and an output from the notification bit memory is transmitted as a notification signal; and the variable filter instruction is a special instruction having a target input relay number, any one of a number of the data register storing a required input filter constant and a directly set constant, and a number of the auxiliary relay storing the notification signal as operands, and the input filter constant is transmitted as the set data to the first setting register of the reversible counter corresponding to the input relay number and the auxiliary relay is operated by the notification signal upon execution of the special instruction.

13. The programmable controller according to claim 4, wherein:
the special unit includes a card information storage memory;
the system memory includes a control program serving as setting abnormality detecting means;
the card information storage memory stores first identification terminal information for identifying whether an interface circuit for logic signals or an interface circuit for analog signals is connected to the first port and second identification terminal information for identifying whether the interface circuit for logic signals or the interface circuit for analog signals is connected to the second port, and, if the interface circuit for logic signals is connected, first signal terminal information and second signal terminal information, each for identifying whether the interface circuit is for low-speed logic signals or for high-speed logic signals,
the card information storage memory is connected to the CPU unit through the data bus to allow the content of the card information storage memory to be read by the microprocessor; and
the setting abnormality detecting means detects that types of the I/O interface circuits connected to the first port and the second port and a content of the instruction stored in the program memory do not match with each other to stop the operation and make a notification of abnormality.

14. The programmable controller according to claim 5, wherein:
the logic circuit unit includes any one of a general-purpose input circuit and a general-purpose output circuit corresponding to each of the channel numbers;
the general-purpose input circuit is an input signal relay circuit for transmitting a logic input signal connected to any one of the first port and the second port to the input image memory area allocated in the device memory through the notification bit memory, the transfer from the notification bit memory to the input image memory being executed by input processing means corresponding to the control program stored in the system memory;
the general-purpose output circuit is an output signal relay circuit for outputting a command signal received by the command latch memory provided in the logic circuit unit from the output image memory area allocated in the device memory to the output circuit connected to any one of the first port and the second port, the transfer from the output image memory to the command latch memory being executed by output processing means corresponding to the control program stored in the system memory; and
the general-purpose input circuit and the general-purpose output circuit are enabled when the logic circuit unit is used neither as a high-speed I/O circuit nor as an analog I/O circuit.

15. The programmable controller according to claim 5, wherein:
the integrated circuit element includes a first gate element and a second gate element corresponding to each channel number and a minimum filter setting circuit and stores a monitor read instruction in the program memory;
the first gate element is connected between an output terminal of the logic circuit unit and the first port, whereas the second gate element is connected between the output terminal of the logic circuit unit and the second port, the first gate element and the second gate element being a plurality of gate elements for blocking each of the output signals according to logic levels of the first mode switching terminal and the second mode switching terminal, the first gate element and the second gate element being for blocking the output signal when the input interface circuit is connected to the first port and the second port and for enabling the output signal when the output interface circuit is connected to the first port and the second port;
the minimum filter setting circuit functions when the output interface circuit is connected to the first port and the second port to enable the output signal from the first gate element and the second gate element, thereby storing the output signal in the notification bit memory without through the filter circuit; and
the monitor read instruction is a special instruction having operands for designating a number of the output relay and a transfer destination device number from the device memory, the monitor read instruction being for reading a content of the notification bit memory input through the minimum filter setting circuit as a notification signal.

16. The programmable controller according to claim 5, wherein:
the special unit has a card information storage memory;
the system memory includes a control program serving as setting abnormality detecting means;
the card information storage memory includes at least one of logic information of the first mode switching terminal and the second mode switching terminal indicating whether each of the first port and the second port is set as an input port or an output port and logic information of the first identification terminal and the second identification terminal for identifying whether the I/O interface circuit is a logic signal circuit or an analog signal circuit;
the card information storage memory is connected to the CPU unit through the data bus to allow a content of the card information storage memory to be read by the microprocessor; and
the setting abnormality detecting means detects that a type of the I/O interface circuit connected to the first port and the second port and a content of the instruction stored in the program memory do not match with each other to stop the operation and make a notification of abnormality.

17. The programmable controller according to claim 6, wherein:
the special unit has a card information storage memory;
the system memory includes a control program serving as setting abnormality detecting means;
the card information storage memory includes first identification terminal information for identifying whether the interface circuit for logic signals or the interface circuit for analog signals is connected to the first port and second identification terminal information for identifying whether the interface circuit for logic signals or the interface circuit for analog signals is connected to the second port;
the card information storage memory is connected to the CPU unit through the data bus to allow a content of the card information storage memory to be read by the microprocessor; and the setting abnormality setting means detects that a type of the I/O interface circuit connected to the first port and the second port and a content of the instruction stored in the program memory do not match with each other to stop the operation and make a notification of abnormality.

18. The programmable controller according to claim 7, wherein:
the logic circuit unit includes a PWM output circuit operating in response to any one of a PWM output instruction and a DA conversion instruction stored in the program memory;
the PWM output circuit generates a pulse width modulation signal at a variable duty ratio (ratio of an ON time and an ON/OFF cycle) in a predetermined cycle based on contents of the first setting register and the second setting register;
the PWM output instruction is applied to the special unit to which the output interface circuit for logic signals is connected, and is a special instruction having a target output number and a number D of the data register storing data for determining a cycle of the output pulse and an ON width as operands, and upon execution of the special instruction, two data associated with a cycle of the output pulse and any one of the ON width and an OFF width are temporarily stored as set data in the standby buffer register, the temporarily stored data being retransferred to the first setting register and the second setting register at completion of generation of one pulse; and
the DA conversion instruction is applied to the special unit to which the output interface circuit for analog signals is connected, and is a special instruction having the target output number and the number D of the data register storing data for determining a cycle of the output pulse and the ON width as operands, and upon execution of the special instruction, two data associated with a cycle of the output pulse and any one of the ON width and an OFF width are temporarily stored as set data in the standby buffer register, the temporarily stored data being retransferred to the first setting register and the second setting register at completion of generation of one pulse.

19. The programmable controller according to claim 10, wherein:
the pulse density measuring circuit is configured so that a count-up compare match output for storing generation of a compare match output by the second comparison circuit in a count-up operation operates when an intermediate set value is stored in the second setting register of the reversible counter and an average value of input signal voltages by an analog sensor is equal to or higher than an input voltage corresponding to the intermediate set value, whereas the second comparison circuit does not generate the compare match output during the count-up operation to reset the count-up compare match output when the average value of the input signal voltages to the channel terminal is less than the input voltage corresponding to the intermediate set value; and
the AD conversion instruction is applied to the special unit to which the input interface circuit for analog signals is connected, and is a special instruction having a target input number X and a number M of the auxiliary relay storing the notification signal as operands, and upon execution of the special instruction, a content of the count-up compare match output is transmitted as a notification signal to drive the auxiliary relay M.

20. The programmable controller according to claim 8, wherein:
at least one of the reversible counters provided to the logic circuit unit includes a variation adjusting register; and
the variation adjusting register functions upon application of a count-up/-down input to the reversible counter to add or subtract a value stored in the variation adjusting register to/from the value of the current value register.

21. The programmable controller according to claim 8, wherein;
the logic circuit unit includes a high-speed counter circuit operating in response to a high-speed counter instruction stored in the program memory;
the high-speed counter circuit is any one of a 1-phase 1-input reversible counter whose count direction is determined by the command signal, a 1-phase 2-input reversible counter to which a count-up input and a count-down input are individually fed, and a 2-phase 2-input reversible counter whose up/down direction is determined by a phase difference between two-phase inputs;
as an operation mode of the high-speed counter circuit, the high-speed counter circuit starts counting upon execution of the high-speed counter instruction, the high-speed counter circuit is provided with a count start command input, or the high-speed counter circuit is provided with a preset command input for transferring initial value data to the current value register, and the 2-phase 2-input high-speed counter circuit has any one of single edge evaluation, double edge evaluation and quad edge evaluation as a count mode depending on whether counting is performed at a rising edge or a falling edge of the pulse signal in each phase, the high-speed counter circuit being provided with a unique identification number;
the identification number is a multi-digit number composed of a combination of a placement number indicating a position of connection of the special unit including the high-speed counter circuit and an extension number for identifying a channel number indicating an input terminal number of the special unit and corresponding to each of the operation modes;
the high-speed counter instruction is a special instruction having operands for designating an identification number of the target high-speed counter circuit, any one of a number D of the data register storing a target count number for generating the count-up output and a directly set constant K, a number M of the auxiliary relay for designating a count direction in the case of the 1-phase 1-input counter, and a number C of the counter storing the count-up output; and
upon execution of the special instruction, the set data and a count direction command signal are transmitted to the first setting register corresponding to the identification number and the command larch memory to transmit the count-up output as a count completion notification signal from the notification bit memory to the device memory of the designated counter number.

22. The programmable controller according to claim 8, wherein:
the logic circuit unit includes a pulse width measuring circuit operating in response to a pulse width measurement instruction stored in the program memory;
the pulse width measuring circuit includes a reversible counter for counting a clock signal in a predetermined cycle according to an input logical transition of the channel terminal connected to the input interface circuit for high-speed logic signals and stores a current count value from a transition of the input logic to a next transition in a peak hold register to transmit the current count value as computational data and a measurement completion signal as a notification signal, and the microprocessor receiving the notification signal resets the measurement completion signal by the command signal so that the pulse width measuring circuit restarts the measurement of the pulse width;

the pulse width measurement instruction is used for the special unit to which the input interface circuit for high-speed logic signals is connected, and is a special instruction having a target input number X, a number D of the data register storing the result of measurement and a number M of the auxiliary register storing a measurement completion signal as operands; and upon execution of the special instruction, a content of the peak hold register is transmitted as computational data to the data register to be stored therein while the measurement completion signal drives the auxiliary relay M to reset an operation of the auxiliary relay M to transmit a measurement restart command to the command latch memory by a command signal.

23. The programmable controller according to claim 8, wherein:

the logic circuit unit includes a first pulse output circuit allocated to each odd or even channel number;

the first pulse output circuit operates in response to a first pulse output instruction stored in the program memory, and has any one of a pair of pulse outputs for generating any one of a forward pulse output and a reverse pulse output and a pulse output mode in which a rotation direction command output is added to a reversible pulse output as an operation mode;

a pulse output circuit in each of the output modes has a unique identification number occupying two reversible counters of adjacent channels, one of the reversible counter including a first setting register and a second setting register to which constants proportional to a low-speed pulse cycle and a high-speed pulse cycle are written, whereas another reversible counter including a first setting register and a second setting register to which constants associated with the number of pulses generated in a high-speed operation and the number of pulses generated in a low-speed operation are written;

the identification number is a multi-digit number composed of a combination of a placement number indicating a position of connection of the special unit including the first pulse output and an extension number for identifying a channel number indicating an output terminal number of the special unit, the extension number corresponding to each of the operation modes;

the first pulse output instruction is a special instruction having an identification number of a target pulse output circuit, an operand for specifying a number of the data register storing a target number of pulses to be generated, the target number being negative or positive according to a rotation direction, the number of pulses in the low-speed operation, a pulse cycle in the high-speed operation, and a pulse cycle in the low-speed operation, and an operand for specifying a number of the auxiliary relay storing a forced stop command, any one of a forward rotation limit stop command and a reverse rotation limit stop command, and a pulse generation completion signal; and upon execution of the special instruction, the target number of pulses to be generated, the number of pulses in the low-speed operation, the pulse cycle in the high-speed operation, and the pulse cycle in the low-speed operation are transmitted as set data, and the rotation direction command, the forced stop command, and any one of the forward rotation limit stop command and the reverse rotation limit stop command are transmitted as a command signal to the first setting register and the second setting register of the reversible counter corresponding to the identification number and the command latch memory to transmit the pulse generation completion signal as a notification signal from the notification bit memory to the designated auxiliary relay M.

24. The programmable controller according to claim 14, wherein:

the general-purpose input circuit includes a variable filter circuit corresponding to each channel number;

the system memory includes a control program serving as initial setting means;

the variable filter circuit includes a reversible counter for reversibly counting a predetermined clock signal according to a logic level of an input signal and a notification bit memory serving as an input determination circuit;

the first setting register stores a filter constant received as the set data, and generates the count-up output to stop a count-up operation when a value of the current value register increases to reach the set value in the first setting register and generates a return output in place of the count-up output to stop a count-down operation when the current value of the current value register decreases to be zero;

the notification bit memory is set by the count-up output and reset by the return output, and an output from the notification bit memory is transmitted to the input image memory area in the device memory by the input processing means;

the initial setting means functions upon start of an operation of the programmable controller to search for presence of a variable filter instruction in the program memory and transmits a predetermined filter constant serving as a reference to the first setting register for the input signal for which the variable filter instruction is not used; and the variable filter instruction is a special instruction having a number of a target input relay, and any one of a number of the data register storing the required input filter constant as the set data and a directly set constant as operands, the set data being transmitted to the first setting register corresponding to the input relay number upon execution of the special instruction.

25. The programmable controller according to claim 18, wherein:

the special unit includes both a multi-channel input interface circuit and a multi-channel output interface circuit connected to the external connection terminals;

the output interface circuit is an interface circuit for an analog load, including a smoothing circuit for a pulse width modulation signal output from the second port of the logic circuit unit;

the input interface circuit is an interface circuit including a comparison circuit for comparing an input signal from the analog sensor and a smoothed signal of the pulse width modulation signal output to generate a binarized logic signal to be input to the first port; and the special unit drives the analog load for a non-overlapping I/O channel or obtains a comparison result signal between an analog input signal and a variable comparison value.

26. The programmable controller according to claim 20, wherein:

the logic circuit unit includes a second pulse output circuit operating in response to a second pulse output instruction stored in the program memory;

the second pulse output circuit has any one of a pulse output mode with a pair of pulse outputs for generating any one of a forward pulse output and a reverse pulse output and a pulse output mode in which a rotation direction command output is added to a reversible pulse output as an operation mode, a pulse output circuit in each of the modes has at least a setting register for the number of generated pulses, a setting register for a pulse frequency and a setting register for an acceleration/deceleration speed, and is provided with a unique identification number for occupying four reversible counters corresponding to two inputs and three outputs;

the second pulse output circuit includes a reversible counter having an adder function enabling addition of a value stored in the variation adjusting register to a value of the current value register upon application of a count-up input, and storage of a predetermined coefficient value in the first setting register of the reversible counter and a target pulse frequency in the variation adjusting register allows a count-up output in a cycle inversely proportional to the pulse frequency to be obtained to obtain a count-up output corresponding to the target pulse cycle by resetting the current value register with the generation of the count-up output;

the identification number is a multi-digit number composed of a combination of a placement number indicating a position of connection of the special unit including the second pulse output circuit and an extension number for identifying a channel number indicating an output terminal number of the special unit, the extension number corresponding to each of the operation modes;

the second pulse output instruction is a special instruction having an operand for specifying an identification number of a target pulse output circuit, an operand for specifying a number D of the data register storing a target number of pulses to be generated, the target number being positive or negative according to a rotation direction, and any one of a pulse cycle and a pulse frequency, an operand for specifying the number D of the data register storing data for setting the acceleration/deceleration speed, and an operand for specifying a number M of the auxiliary relay storing a forced stop command, any one of a forward rotation limit stop command and a reverse rotation limit stop command, and a pulse generation completion signal; and upon execution of the special instruction, the target number of pulses to be generated, the acceleration/deceleration speed data, the target pulse frequency, and deceleration start position data are transmitted as set data, and the rotation direction command, the forced stop command, and any one of the forward rotation limit stop command and the reverse rotation limit stop command are transmitted as a command signal to the first setting register and the second setting register of each of the reversible counters corresponding to the identification number and the command latch memory to transmit the pulse generation completion signal as a notification signal from the notification bit memory to the designated auxiliary relay M.

27. The programmable controller according to claim 21, wherein:
the high-speed counter circuit has a high-speed output function operating in response to a high-speed compare instruction stored in the program memory;

the high-speed compare instruction is a special instruction having an identification number of the target high-speed counter circuit, any one of a number D of the data register storing a comparison target value and a directly set constant K, and a number M of the auxiliary relay for storing a compare match output as operands;

the special instruction is enabled when the first port is used as a high-speed input port and the second port is used as a logic output port; and upon execution of the special instruction, the comparison target value is transmitted as the set data to the second setting register of the reversible counter corresponding to the identification number, a count-up compare match output corresponding to a compare match storage signal in a count-up operation of the second comparison circuit is output to an output terminal of a channel number corresponding to that of a count input of the high-speed counter circuit, the count-up compare match output drives the designated auxiliary relay M as a notification signal, and the auxiliary relay M is driven to be reset to reset the count-up compare match output.

28. The programmable controller according to claim 23, wherein:
each of the first pulse output circuit and the second pulse output circuit is provided with monitor means using a current position read instruction stored in the program memory;

the current position read instruction is a special instruction having an operand for specifying an identification number of a target pulse output circuit and an operand for specifying a number D of the data register storing current position information with respect to any one of a forward rotation limit position, a reverse rotation limit position, and a zero-point position; and upon execution of the special instruction, a content of the current value register storing pulse output information of the pulse output circuit corresponding to the identification number after completion of movement is transmitted as computational data to sequentially algebraically add the computational data to the data register D according to a moving direction, and predetermined initial position data is written in advance at a reference position including any one of the zero-point position and the forward/reverse rotation limit position in the data register D by a sequential program.

29. The programmable controller according to claim 26, wherein:
the logic circuit unit has a modified pulse output circuit obtained by partially modifying the second pulse output circuit, the modified pulse output circuit is provided with a positioning I/O signal stored in the program memory to operate in response to a zero return instruction;

the system memory includes a control program serving as parameter change means for obtaining the modified pulse output circuit;

the positioning input signal has a near-point dog signal operating in a vicinity of a zero point and a zero-point signal provided to a servo motor driven by the pulse output, to which a Z-phase signal for generating an output of one pulse for each revolution of the servo motor is input;

the positioning output signal has a clear signal for resetting a residual pulse of a positioning deviation of a servo amplifier for driving the servo motor at the completion of zero return;

the zero return instruction is a special instruction having an identification number of a target modified pulse output circuit, an operand for specifying a number D of the data register storing at least any one of a high-speed pulse frequency and a pulse cycle for zero return, any one of a low-speed pulse frequency and a pulse cycle for a creep operation in the vicinity of the zero point, acceleration/deceleration speed setting data, and the number of zero-point signals, and an operand for specifying a number M of the auxiliary relay storing a zero return direction command, a forced stop command, any one of a forward rotation limit stop command and a reverse rotation limit stop command, and a zero return completion signal;

upon execution of the special instruction, the pulse frequency for a high-speed operation, the pulse frequency for a low-speed creep operation, the acceleration/deceleration speed setting data, the number of zero-point signals are transmitted as set data, whereas the zero return direction command, the forced stop command, any one of the forward rotation limit stop command and the reverse rotation limit stop command are transmitted as a command signal to the first setting register and the second setting register of each of the reversible counters corresponding to the identification number and the command latch memory to transmit the zero return completion signal as a notification signal from the notification bit memory to the designated auxiliary relay M; and the parameter change means modifies the I/O circuit of the last reversible counter, which has counted the number of generated pulses in response to the second pulse output instruction, to use the reversible counter as the last reversible counter for counting the number of zero-point signals in response to the zero return instruction, the change in connection is enabled for a limited period from the start of execution of the zero return instruction to the completion thereof and is normally reproducibly set to a connection circuit for the second pulse output instruction.

30. The programmable controller according to claim 28, wherein:

a third pulse output instruction is applied to the first pulse output circuit and the second pulse output circuit in place of the first pulse output instruction and the second pulse output instruction stored in the program memory;

the third pulse output instruction designates a target movement position in place of a target amount of movement designated by the first pulse output instruction and the second pulse output instruction; and the data conversion/transfer means calculates a current target amount of movement based on a deviation between a current position detected and stored by the current position read instruction and the target movement position to transmit the target amount of movement to the first setting register and the second setting register through the buffer memory.

* * * * *